US005323444A

United States Patent [19]

Ertz et al.

[11] Patent Number: 5,323,444

[45] Date of Patent: Jun. 21, 1994

[54] EMERGENCY CALL SYSTEM WITH CALL CAPACITY/LAST CHANCE ROUTING FEATURE

[75] Inventors: Douglas J. Ertz, Boulder; Lisa M. Neal, Denver; Michael J. Nelson, Broomfield, all of Colo.

[73] Assignee: U S West Advanced Technologies, Inc., Boulder, Colo.

[21] Appl. No.: 745,662

[22] Filed: Aug. 16, 1991

[51] Int. Cl.[5] .......... H04M 11/04

[52] U.S. Cl. .......... 379/45; 379/49; 379/142; 379/212; 379/265

[58] Field of Search .......... 379/37, 38, 42, 45–47, 379/49, 92, 93, 96–98, 127, 142, 212–214, 265–267; 340/525

[56] References Cited

U.S. PATENT DOCUMENTS

| | | | |
|---|---|---|---|
| 3,881,060 | 4/1975 | Connell et al. | 379/45 |
| 4,788,715 | 11/1988 | Lee | 379/266 |
| 4,893,325 | 1/1990 | Pankonen et al. | 379/45 |
| 4,924,491 | 5/1990 | Compton et al. | 379/45 |
| 4,964,155 | 10/1990 | Pinard | 379/266 |
| 5,020,095 | 5/1991 | Morganstein et al. | 379/266 |
| 5,025,468 | 6/1991 | Sikand et al. | 379/266 |
| 5,077,788 | 12/1991 | Cook et al. | 379/45 |
| 5,166,972 | 11/1992 | Smith | 379/45 |

OTHER PUBLICATIONS

Bell Communications Research, E911 Public Safety Answering Point: Interface Between a 1/1AESS TM Switch and Customer Premises Equipment, Technical Reference TS-TSY-000350, Issue Nov. 1, 1987.

P. Ruggieri, "Dial 911 for Profits", Sound & Communications May 1984, pp. 9, 10, 13.

E. G. DeNigris et al., "Enhanced 911:Emergency Calling with a Plus", Mar. 1980, Bell Laboratories Record, pp. 74–79.

*Primary Examiner*—Wing F. Chan

*Attorney, Agent, or Firm*—Timothy R. Schulte; Chester E. Martine

[57] ABSTRACT

A community emergency response service system is provided with three types of destinations to which emergency calls may be routed. These include public safety answering points (PSAPs), switch directory numbers and public switching telephone network directory numbers. A last chance routing system is effective upon failure of the system to route an incoming one of such emergency calls to one of such three types of destinations. The last chance routing facility performs a linear search of all PSAPs within such system to determine whether any of such PSAPs has been inspected for availability to handle such emergency call. When such linear search identifies a PSAP which has not previously been inspected with respect to its availability to handle such emergency call, a determination is made as to whether such PSAP is currently available. Such determination includes determining whether such PSAP is currently at its call capacity. That call capacity is determined based upon a call capacity depth established for each workstation at such answering point. The call capacity limit is obtained by multiplying such call capacity depth times the current number of workstations that are active at such PSAP.

46 Claims, 74 Drawing Sheets

FIG. 28
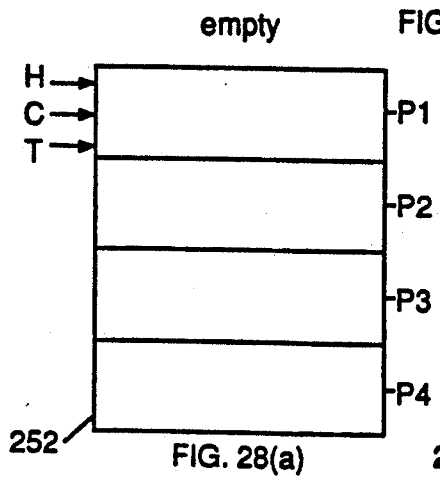
FIG. 28(a)
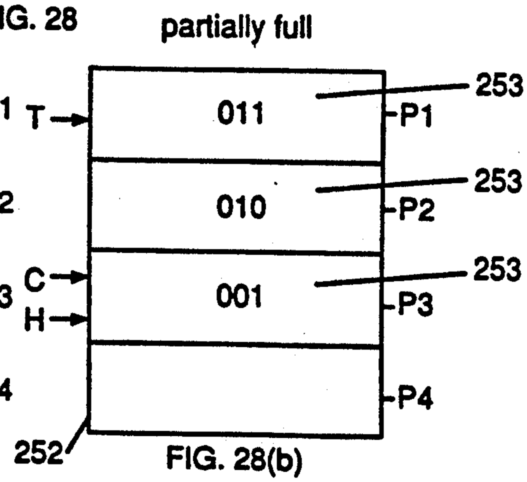
FIG. 28(b)
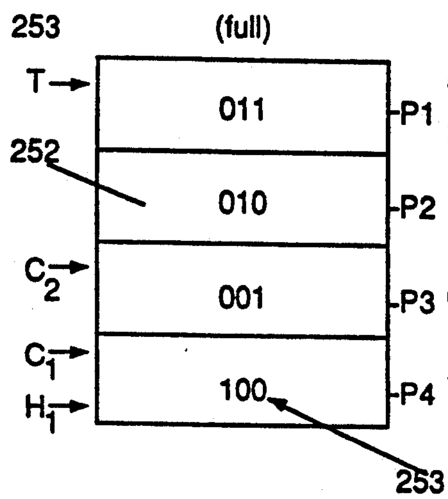
FIG. 28(c)
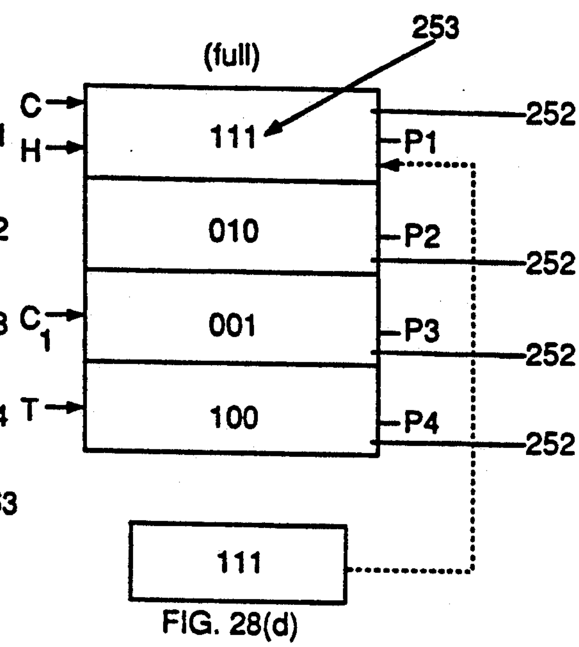
FIG. 28(d)
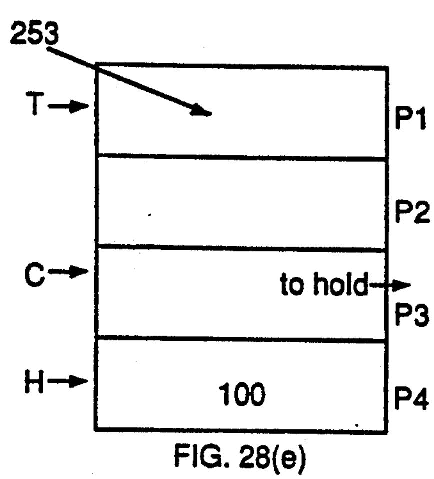
FIG. 28(e)
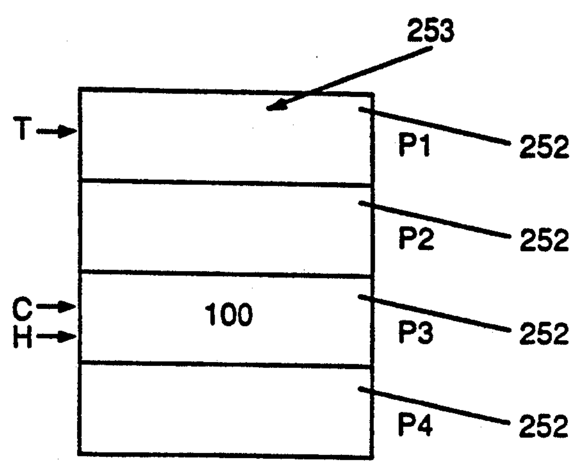
FIG. 28(f)

EMERGENCY CALL SYSTEM WITH CALL CAPACITY/LAST CHANCE ROUTING FEATURE

Pursuant to 37 C.F.R. 1.96(b)(2)(i), computer programs are submitted herewith as Computer-Output-Microfilm (COM) output and are referred to as the Microfilm Appendix.

BACKGROUND OF THE INVENTION

1. Field of the Invention

This invention relates to a telephone system for emergency calls and more particularly to a system which facilitates the administration of the call capacity of a public safety answering point (PSAP) and provides last chance routing of emergency calls after an attempt to route such calls to designated and alternate PSAPs.

2. Discussion of Prior Art

In the field of telephony, equipment and services for routing emergency telephone calls (911 Calls) have been associated with the universal telephone number (TN) "9-1-1", abbreviated herein as "911" and referred to as an emergency service number ("ESN"). These equipment and services are herein respectively designated "911 Equipment" and "911 Services".

Prior 911 Equipment has generally been provided for large metropolitan areas which are served by a public switched telephone network (PSTN) generally having more than one-hundred fifty thousand subscriber lines. The PSTN is divided into service areas, each of which may have over 150,000 subscriber lines. Each subscriber's telephone number (TN) in a particular service area is assigned to a particular ESN, and is served by a specific end office (EO). The EO routes a 911 Call that is on a particular one of its subscriber lines to the 911 Equipment via trunks. The trunks are generally capable of carrying automatic number identification ("ANI") codes. Those trunks having such capability are referred to herein as "ANI trunks." ANI code is in the form of eight bits, including a seven digit TN and one information bit that represents the numbering plan digit, or area code, within which the call originated.

Each ESN represents a geographic region within the service area where all subscribers in that region are served by the same primary group of emergency service agencies (ESPs). The groups could, for example, include a fire department, a police department and a hazardous material recovery department of a particular municipality.

In the past, the 911 Equipment has been used to provide 911 Services. The 911 Services are separately provided for each service area by PSAP equipment which responds to 911 Calls having the same ESN. Because so many subscriber lines (e.g., over 150,000) are served by the EO for a given urban service area, the PSAP for the given urban service area (an "urban PSAP") is staffed by attendants on a twenty-four hour a day basis. Such an urban PSAP is generally always ready to receive 911 Calls, and is thus generally always "active", as compared to a PSAP which has suspended its 911 Services and which is referred to as being "inactive."

Attendants are people who are trained to handle 911 Calls using the particular 911 Equipment at the PSAP according to the procedures that have been established at that PSAP. Such procedures may include how the PSAP is designated. A PSAP may be designated "first choice" or "alternate", which refers to the order in which 911 Calls are directed to the PSAP to be answered. First choice PSAPs are the first PSAPs which should receive 911 Calls from the service area. Alternate PSAPs are PSAPs which receive 911 Calls when some event prevents the first choice PSAP from receiving the 911 Call. For example, the alternate PSAP may receive the 911 Call as a transfer from a first choice PSAP or directly from subscribers or the public via subscriber lines when the first choice PSAP to which the 911 Call is assigned is experiencing power failure, doesn't answer the 911 Call within a specified time, or when all routes to the first choice PSAP are busy. These and other situations at the first choice PSAP result in overflow of 911 Calls to the alternate PSAP.

The PSTN includes a feature that automatically provides the caller's ANI Code. When a 911 Call is received at a PSAP via an ANI Trunk, it will be received with the ANI code.

An ALI/DMS also includes a feature that automatically provides the caller's address and other pertinent details, referred to as the automatic location identification (ALI) feature. Via ALI, when a 911 Call is received at a PSAP it is received with such details, which is referred to as the ALI code. However, in existing 911 Equipment the database for producing the ALI code is generally stored in the PSTN at a central location for a very wide geographic area. For example, for the states of Arizona, Colorado, New Mexico and Wyoming in one PSTN, the ALI database for the ALI code for a relatively small area in Wyoming is stored in Denver, Colorado. To provide the ALI Code for a 911 Call in that area in Wyoming, a long distance call must be made to Denver, and redundant long distance lines must be kept available to assure reliability. This increases the cost and time required to provide the ALI code for 911 Calls in remote areas.

911 Equipment known to Applicants provides incoming 911 Call data to the PSAPs in the form of a string of data. This data is unrelated to the first choice PSAP and to the trunk that carries the 911 Call to the 911 Equipment. The ALI code is obtained from an ALI/DMS host which is part of the PSTN. Neither the ALI/DMS nor the 911 Equipment organizes that code into a format that is efficiently and quickly useful to the PSAP attendant for determining why the 911 Call was not properly and quickly routed to the first choice PSAP or another PSAP.

In one example of prior 911 Equipment, only information identifying the trunk that is carrying the 911 Call is sent to the first choice PSAP. A remote system provides for the display of the ANI and NPD of the incoming 911 Call. However, because such system is remote from the first choice PSAP, problems arise from queuing and transmission delays.

911 Equipment known to Applicants includes that used in connection with the trademark "1A ESS" by The American Telephone & Telegraph Company ("1A 911 Equipment"), which is used to provide "E9-1-1" service. In the IA 911 Equipment, in an endeavor to answer all incoming 911 Calls, when a particular 911 Call has not been initially routed to a PSAP or other transfer point the 1A 911 Equipment searches a "link" list of destinations to which a particular 911 Call could possibly be routed. These destinations are searched on a most logical basis, and only include destinations (such as alternate PSAPs) that were previously "searched" in a prior attempt to route the 911 Call. The search loops once through the link list.

Problems with such logical searches of previously searched destinations are that:

(1) the link list, being based on previously searched destinations, may omit destinations which are available to answer the 911 Call, but which are not searched because they are not on the link list, and (2) if the search of the link list fails to locate an available destination, an attempt is made to route the 911 Call to a default destination, and if that is not available, to disconnect the call. As a result, only one additional search of the link list is conducted prior to disconnecting the 911 Call, which tends to increase the probability of disconnecting the 911 Call.

Additionally, many COs provide incoming calls to the 1A 911 Equipment and incoming trunks are connected from the 1A 911 Equipment to an ANI facility. Significantly, the number of such incoming trunks limits the number of calls that may be sent to the ANI facility. Because the ANI facility is then connected to the key of the 1A 911 Equipment the number of calls available to such key is limited.

SUMMARY OF THE PRESENT INVENTION

Existing urban PSAPs in high density service areas are more likely to be operated economically to provide 911 Services because, in part, the high density results in substantial minimum numbers of 911 Calls at all hours of a twenty-four hour day. Therefore, at least one attendant is generally required at all times at any given PSAP to handle this relatively high minimum number of 911 Calls. The 911 Equipment operates at high capacity and the relatively high cost thereof is spread over the relatively large number of subscriber lines in the service area. This can render the 911 Service economical on a per-subscriber- line basis.

On the other hand, problems have been experienced in attempting to provide high quality, reliable, and cost-effective 911 Services for PSTNs having relatively few subscriber lines (compared to urban areas) in a service area (i.e., "low density"). Applicants' studies indicate that because of the low density, the average number of 911 Calls per hour from such low density service areas during peak911 calling hours are often substantially less than the minimum average number of 911 Calls per hour at off-peak 911 calling hours experienced by high density service areas. Such studies indicate that as a result, the 911 Equipment that is suitable for a high density service area would be too costly for low and very low density service areas. Further, the low average number of 911 Calls per hour at off-peak 911 calling hours indicates to Applicants that it is not economical to provide PSAP staff, for example, on a twenty-four hour per day basis at all PSAPs in such very low or low density service areas.

These studies indicate to Applicants that different 911 Equipment must be used for such very low and low density service areas, and that improvements are required in the operational methods performed by PSAPs of 911 Equipment servicing such service areas. Such different 911 Equipment is considered as being enhanced and 911 Calls received by such different 911 Equipment are referred to as E9-1-1 calls.

As an example of such improvements in operational methods, the present invention provides an improved method and system for limiting the number of incoming E9-1-1 calls that a given PSAP will accept. Acceptance of an incoming E9-1-1 call by a PSAP is to occur when such PSAP is both active and, at the time at which the incoming E9-1-1 call is to be routed to the given PSAP, such PSAP is not experiencing an "overflow" condition. The overflow condition may be defined by the person who administers the operations of a given PSAP or of the system. This is initially done by determining whether any limit is to be placed on the capacity of the given PSAP to handle E9-1-1 calls (i.e. is "call capacity" administered?). If so, it indicates that for the given PSAP there is a limit administered for the number of next incoming E9-1-1 calls which may be in process of being handled at that given PSAP at a current time $t_c$ at which an E9-1-1 call is to be routed. E9-1-1 calls that are in process of being handled by a given PSAP include E9-1-1 calls currently (1) in a queue to a notification line of the given PSAP, and (2) being handled by the given PSAP. E9-1-1 calls currently being "handled" by the given PSAP include E9-1-1 calls currently:

(a) ringing at a notification line to the given PSAP;

(b) ringing at an attendant workstation at the given PSAP;

(c) being answered by an attendant of the given PSAP; and (d) put on hold by the attendant at a workstation of the given PSAP.

Such limit is referred to as the "call capacity" or "call capacity limit" ($N_{CC}$) of the given PSAP. When the number $N_{BH}$ of E9-1-1 calls in process of being handled by the given PSAP equals the call capacity $N_{CC}$, the given PSAP is said to be "at call capacity." The call capacity limit $N_{CC}$ is based on a number ($N_{CCD}$) referred to as the "PSAP call capacity depth." This number $N_{CCD}$ may be established (or set) using an administration screen which enables the call capacity depth to be set. The PSAP call capacity depth $N_{CCD}$ represents the number, per workstation of the given PSAP, of E9-1-1 calls which may be in process of being handled. The call capacity limit is determined by multiplying the call capacity depth number $N_{CCD}$ times the current number ($N_{RC}$) of attendant workstations of the given PSAP which are active. The value of the call capacity limit $N_{CC}$ is obtained by obtaining the product of the call capacity depth number $N_{CCD}$ and a workstation number $N_{RC}$. The number $N_{RC}$ indicates the number of attendant workstations of the given PSAP which are active at the current time $t_c$ at which the next incoming E9-1-1 1 call is to be routed.

The present invention also includes a last chance E9-1-1 call routing facility, which includes determinations as to whether the call capacity limit for a given PSAP has been administered, and if so, whether at the time of last chance routing the particular PSAP is at call capacity. Last chance routing involves three types of destinations, which are listed in order of preference as a call handling destination. First is a PSAP, next a switch destination number (DN) and third a public switching telephone network directory number (PSTN DN). Last chance routing first determines whether any PSAP is available to handle a given one of the E9-1-1 calls. If not, a determination is made as to whether any switch DN is available to answer the incoming E9-1-1 call. If not, a further determination is made as to whether any PSTN DN is available to answer the incoming E9-1-1 call. The determination with respect to the availability of PSAPs to handle the incoming 911 Call includes sequentially searching all of said PSAP destinations that are a part of the system until one of such PSAP destinations has been identified as one to which no prior attempt has been made to route such E9-1-1 call. At that juncture, a determination is then made as to whether such PSAP is available to handle the incoming 911 Call. The determination of availability of the switch DNs is made only after completing the sequential search of the PSAPs and then making such determination of such PSAPs to which no prior attempt was made to route the incoming E9-1-1 call. Such determination with respect to the ability of a particular PSAP to handle the incoming E9-1-1 call includes determining whether call capacity is administered with respect to such PSAP, and if so, determining whether, at the time of routing of the incoming E9-1-1 call, such PSAP is at call capacity. If so, then such PSAP is not available to handing the incoming 911 Call.

An object of the present invention is to provide methods and systems for assuring that all unsearched emergency call handling destinations are searched to determine whether such destinations are available to handle an emergency telephone call.

Another object of the present invention resides in a community emergency response service system which routes incoming emergency calls to a destination selected from a public safety answering point, a switch DN or a public switch telephone network DN, wherein a last chance routing facility becomes effective when initial attempts have been unsuccessfully made to route an emergency telephone call to such destinations.

Yet another object of the present invention is to provide a last chance routing method and system which, upon unsuccessful attempts to route an emergency call to an initial destination, conducts a linear search of public safety answering point (PSAP) destinations to identify a PSAP which has not already been searched and which is available to handle such emergency call.

Still another object of the present invention resides in a last chance routing method and system wherein a determination is made as to whether a particular public safety answering point (PSAP) is available to handle an emergency telephone call, and such determination includes whether such PSAP is at call capacity at the time such emergency call is to be routed.

A further object of the present invention resides in defining a call capacity limit for a particular PSAP, wherein such call capacity limit is based upon a call capacity depth established for each of many workstations at the PSAP.

A still further object of the present invention resides in providing a call capacity depth per workstation of a PSAP, and obtaining a call capacity for such PSAP by multiplying such call capacity depth by the current number of such workstations that are actively handling emergency telephone calls at such PSAP.

DESCRIPTION OF THE DRAWINGS

Other objects, features and advantages of the present invention will be apparent from an examination of the following detailed descriptions which include the attached drawings in which:

FIG. 21(*b*) is a schematic diagram of a table for storing time interval information representing night service schedules during a one week period;

FIG. 28(a)-28(f) are schematic diagrams indicating the transfer of records among four call history logs according to various activities taken by the attendant;

OVERVIEW OF C.E.R.S. SYSTEM 200

Figure 1:
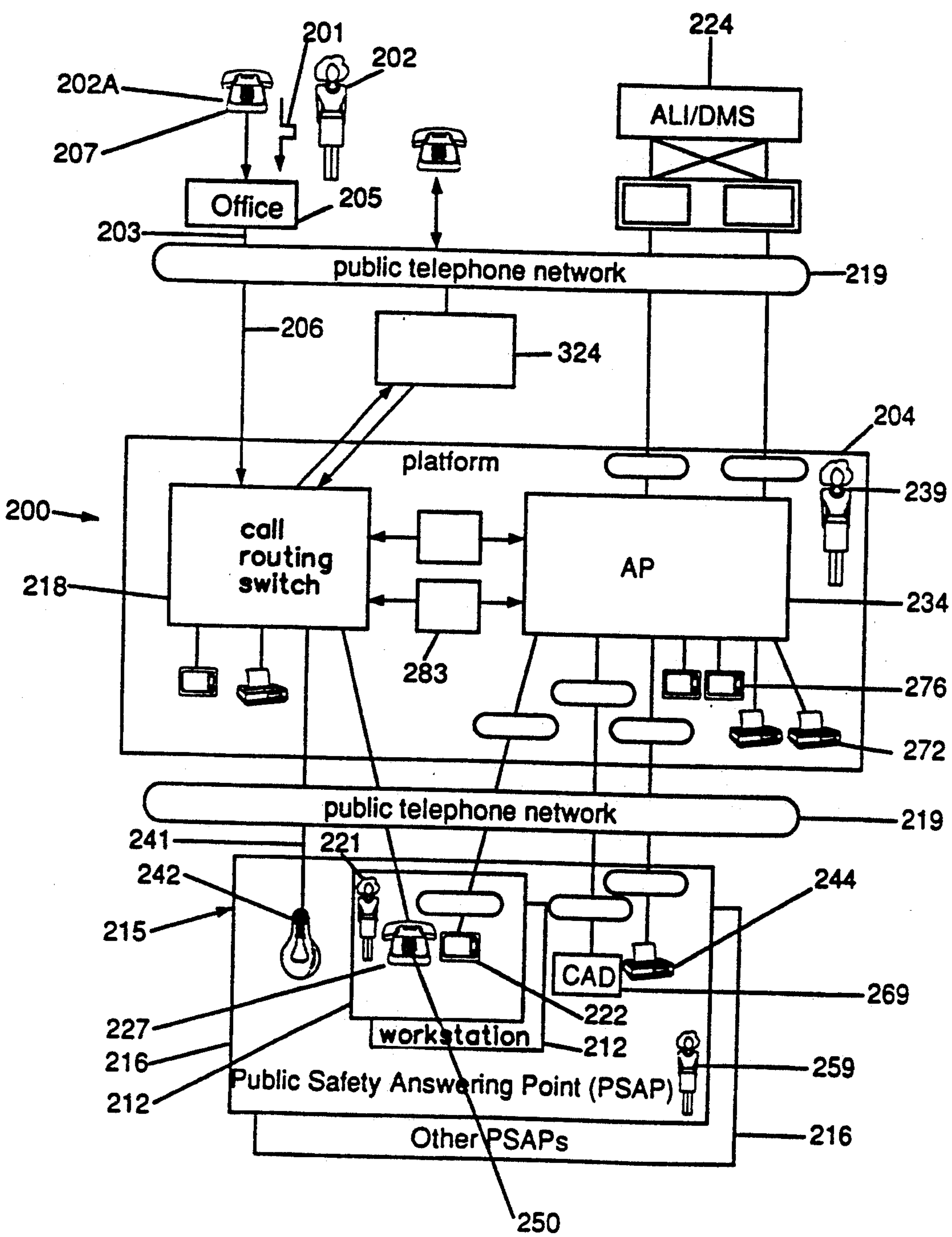
FIG. 1 is a schematic diagram showing a community emergency response service (C.E.R.S.) system having a platform for routing an incoming E9-1-1 call to a public safety answering point (PSAP) where the call is directed to an emergency service provider.
Figure 2:
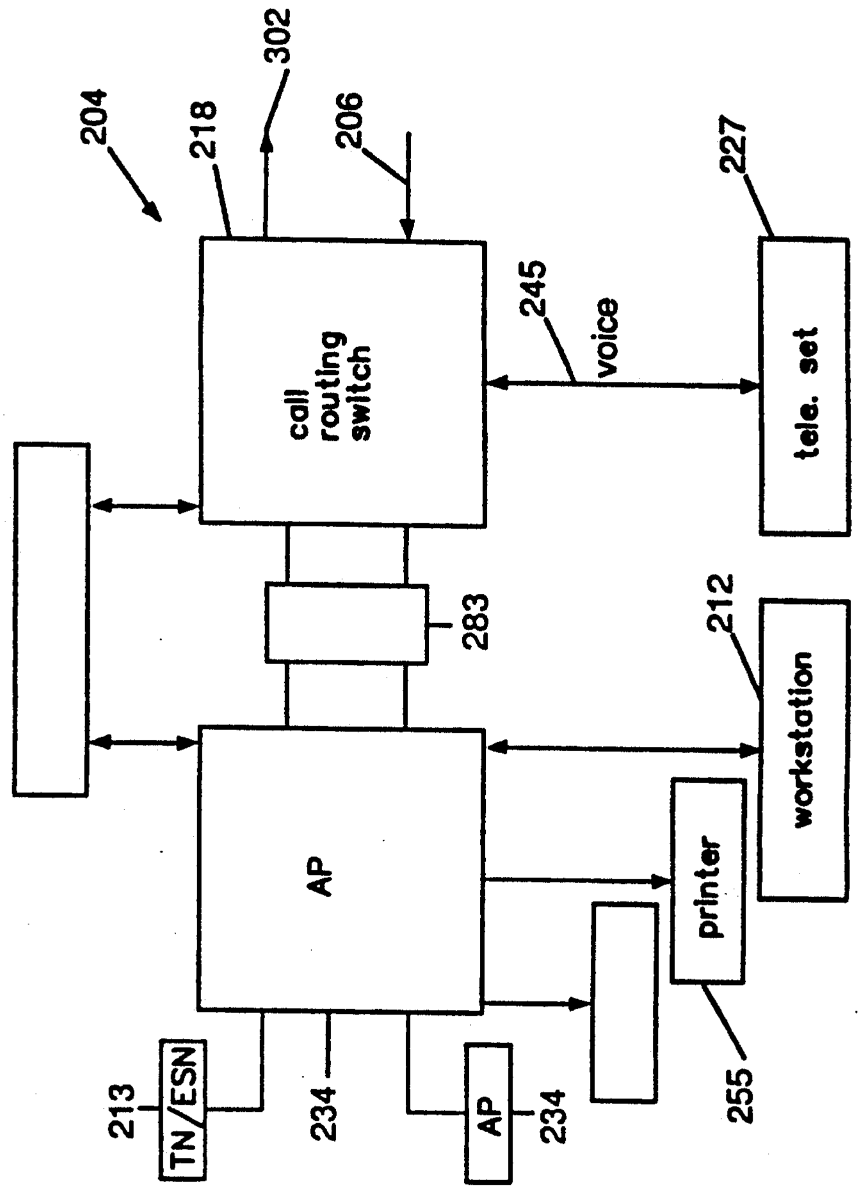
FIG. 2 is a schematic diagram of an applications processor (AP) and a switch of the platform, indicating the components of the system with which the C.E.R.S. system interfaces.

Emergency Calls: Referring to FIG. 1, an overview of a community emergency response service (C.E.R.S.) system 200 starts with emergency calls (E9-1-1 calls) 201 originated at a telephone by a caller which may be a subscriber, referred to as an emergency service requestor (ESR) 202, having a telephone set 202A. The E9-1-1 calls 201 on subscriber lines 203 serviced by an E9-1-1 platform 204 are routed from serving end offices 205 to the platform 204 via emergency service or incoming (ES) trunks 206. These trunks 206 carry only E9-1-1 traffic, using signaling techniques that are capable of forwarding the telephone number (TN) of the ESR 202 originating the E9-1-1 call 201 to the platform 204.

Figure 14:
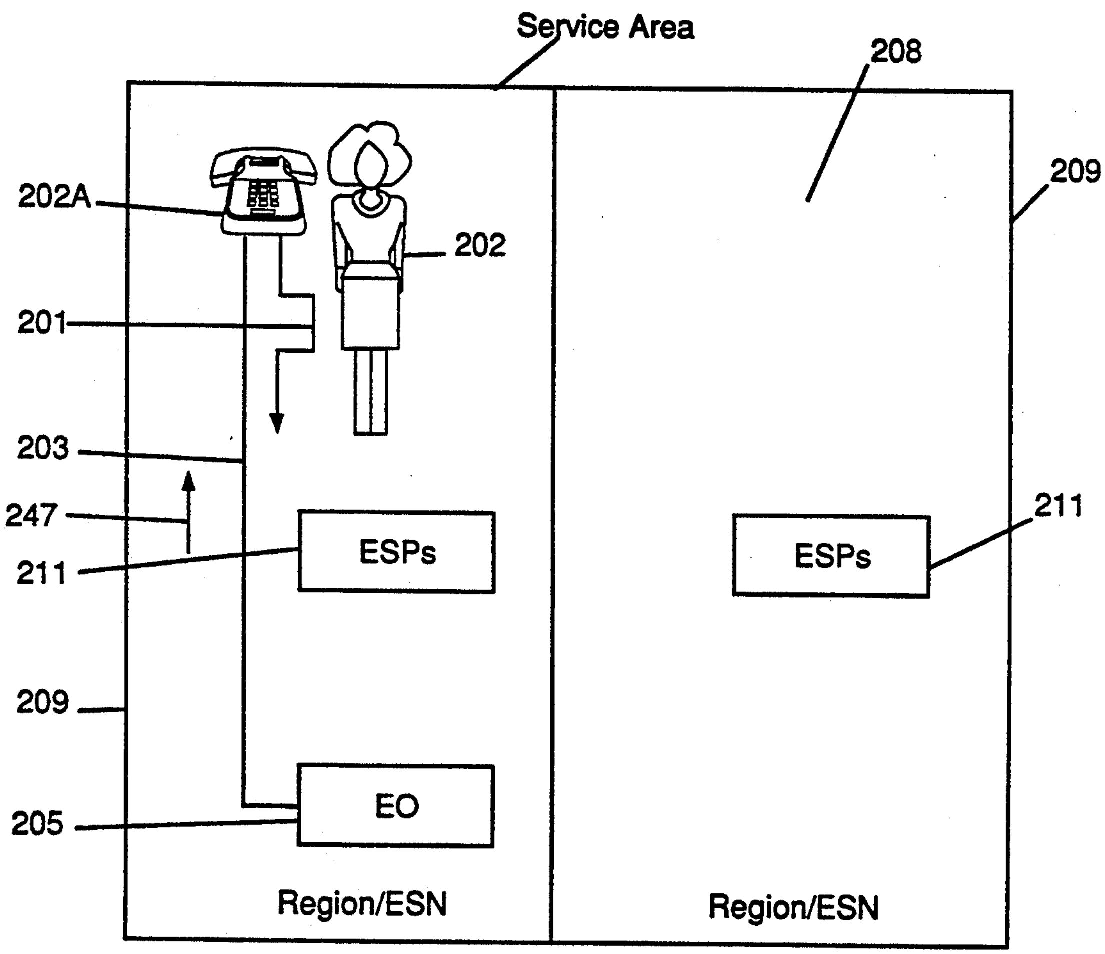
FIG. 14 is a schematic diagram illustrating an E9-1-1 service area having geographic regions therein to which an emergency service number (ESN) is assigned.

Service Area: Each subscriber's telephone number in an E9-1-1 service area 208 is assigned to an emergency service number (ESN) (FIG. 14). Each ESN represents a geographic area or region 209 within the service area 208 where all subscribers 202 in that region 209 are served by the same primary group of emergency service agencies or emergency service providers (ESPs) 211. ESNs are established by municipal agencies in cooperation with the telephone company which provides the C.E.R.S. platform 204. After each telephone number (TN) has been assigned to an ESN, a TN/ESN table 213 (FIG. 10) is developed and maintained such that each subscriber's TN is properly associated with the appropriate ESN.

Figure 3:
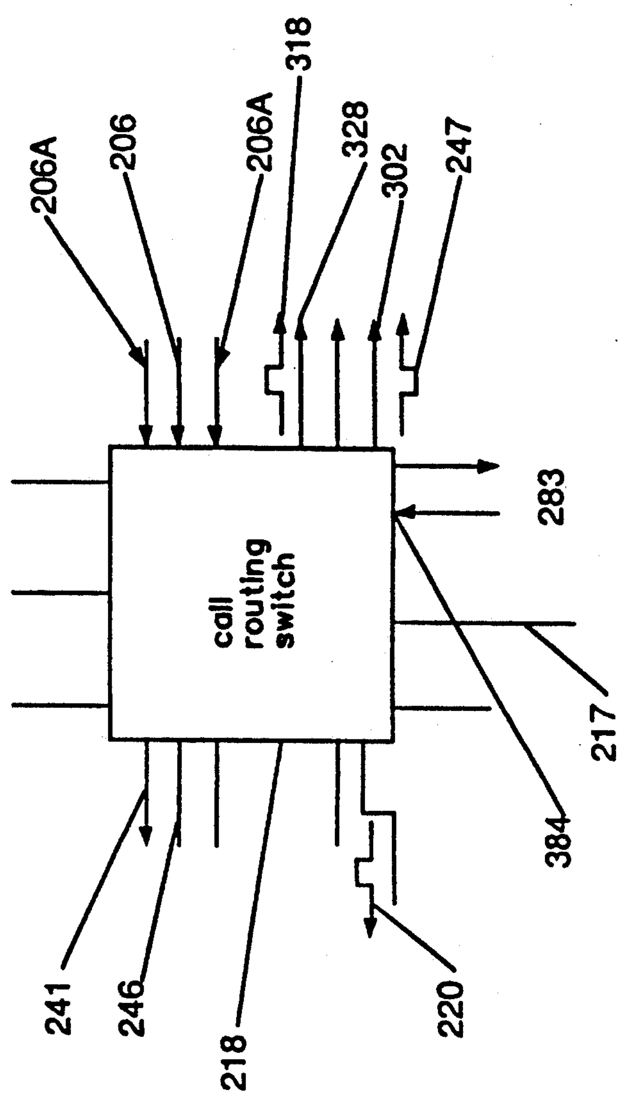
FIG. 3 is a schematic diagram of the switch of the platform, illustrating interfaces of the switch.

Call Handling Destination: When an E9-1-1 call 201 arrives at the platform 204, the TN/ESN table 213 is searched using the telephone number associated with the ESR 202 and identification of the incoming ES trunk 206. The incoming trunk 206 provides information that determines the area code or numbering plan digit (NPD) of the ESR 202 and the default method of routing the E9-1-1 call 201 to an appropriate call handling destination 215. Once the ESN is found, the E9-1-1 call 201 is routed to the call handling destination 215 that has been assigned the responsibility of handling emergency (or E9-1-1 requests) for that ESR's TN. Assignment of such call handling destinations 215 for each ESN is administered and stored on the platform 204. These call handling destinations 215 may be public safety answering points (PSAPs) 216, a line 217 connection to a call routing switch 218 of the platform 204 (FIG. 3), other destinations within a public switched telephone network (PSTN) 219, or a busy signal 220. The call handling destinations 215 are to be distinguished from the emergency service providers 211, FIG. 14 which are the ultimate destination to which the ESR 202 wishes to be connected upon dialing "9-1-1."

Figure 10:
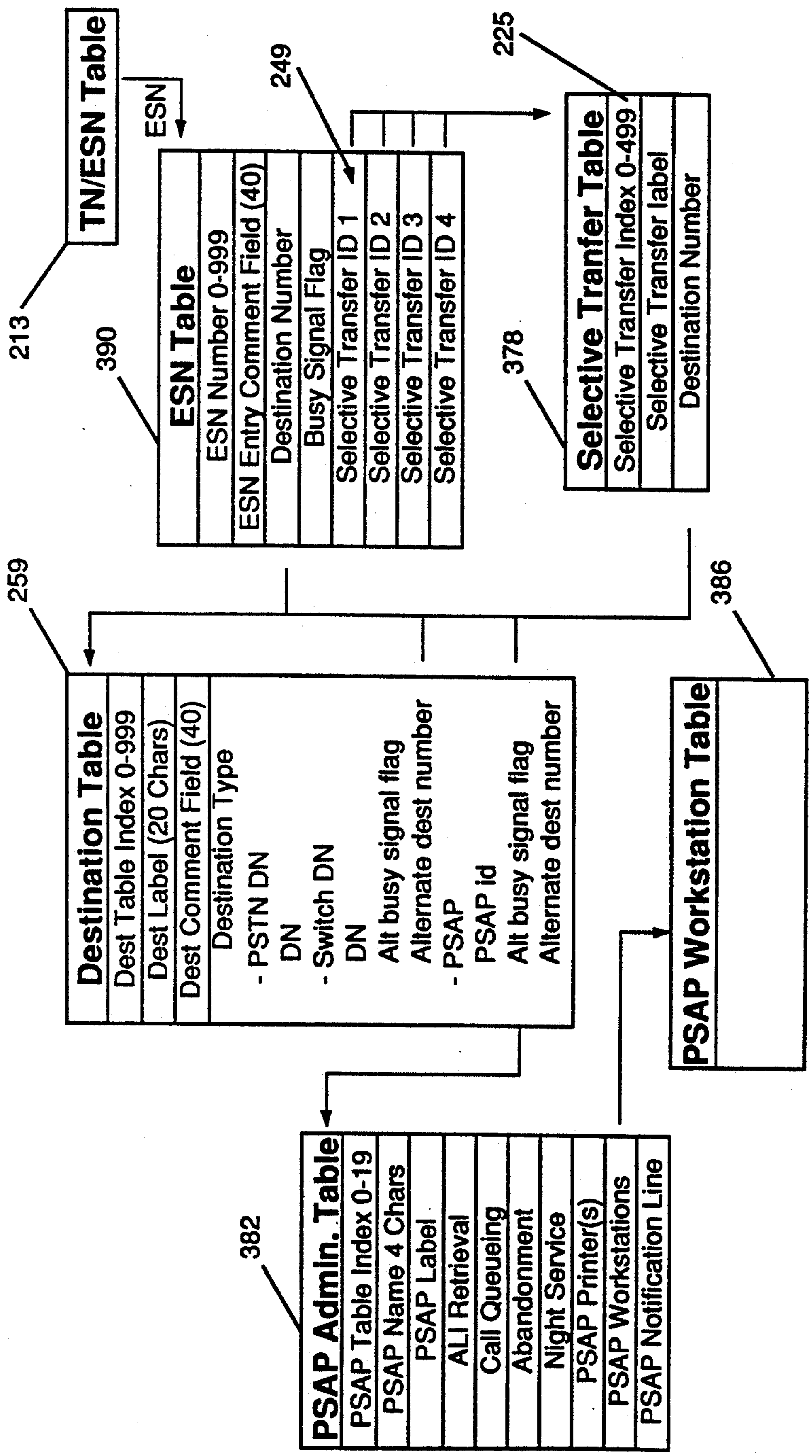
FIG. 10 is a diagram of tables in the AP for storing data used in routing the E9-1-1 calls to various PSAPs.

Routing the E9-1-1 Call: E9-1-1 calls 201 routed to a PSAP 216 by the platform 204 are sent to a common notification line 241 at the PSAP 216. Any attendant 221 at the PSAP 216 can pick up the E9-1-1 call 201 from the notification line 241. The attendant's screen 222 of its workstation 212 is then updated with information associated with the ESR's telephone number. Depending on the context, the word "screen" is used to refer to (1) the video (or display) portion of the workstation 212, and (2) information displayed or presented on that video portion in a specific format for viewing, such as by the attendant 221 or another administrator who uses the system 200. The attendant's screen 222 displays call origin information (Chart ALI1, FIG. 15B), including the caller's telephone number, the call routing reason, the inbound trunk 206 the call arrived on, information such as the ESR's name and street address assigned to the ESR's telephone number by an external (ALI/DMS) database system 224, and selective transfer points 225 (FIG. 10). A maximum of four selective transfer points can be assigned to an ESN. These transfer points 225 are usually ultimate call destinations associated with commonly called emergency service providers 211 (police, fire, medical, etc.) (FIG. 14) that are assigned by the local jurisdiction to serve the ESR's geographic region 209. Information about these selective transfer points 225 is displayed on the screen 222 with other E9-1-1 call information when a match within the TN/ESN table 213 has been found for the NPD and the TN of the ESR 202. Via a single operation performed by the attendant 221, the established E9-1-1 call 201 can then be transferred to the appropriate emergency service provider 211 without the attendant 221 having to determine and manually dial the digits of the ESP's telephone number.

Figure 16A:
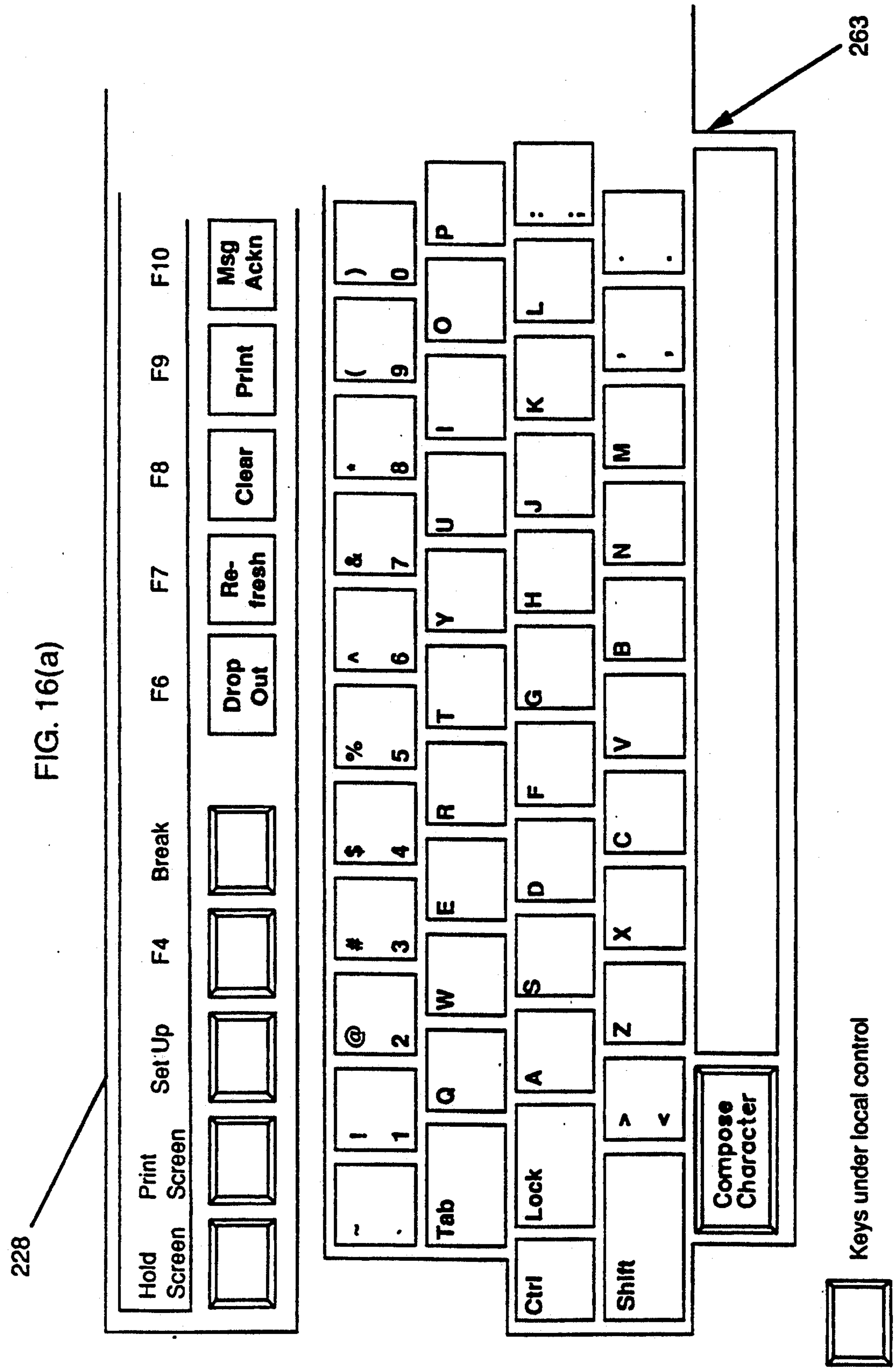
Figure 16B:
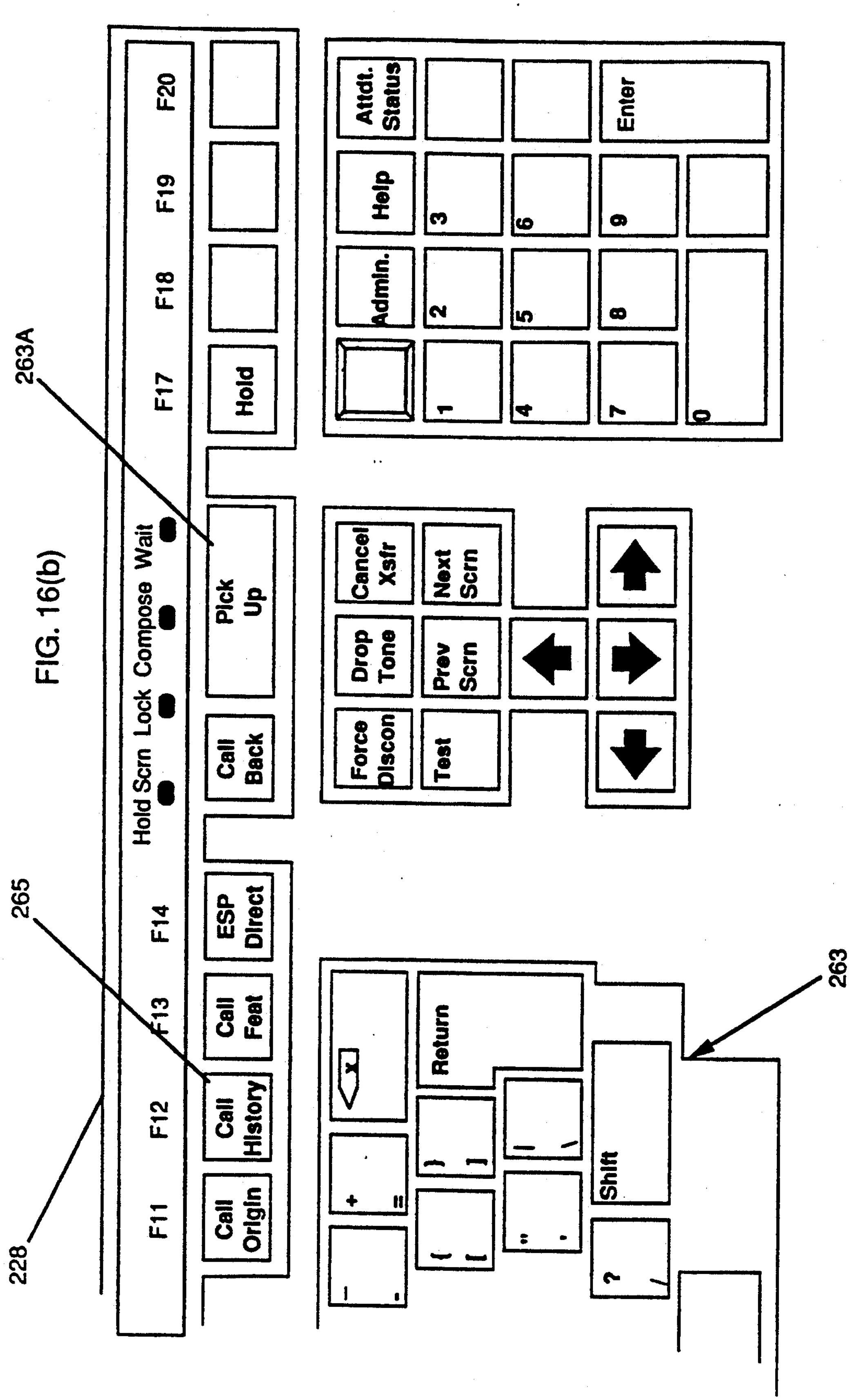

The attendant 221 can also use fixed or manual transfer features to connect an E9-1-1 call 201 to an ESP 211 if the ESP 211 needed is not one of the four selective transfer points 225 assigned to the ESN. The fixed transfer feature is provided by an auxiliary directory screen display (FIG. 17) that can be used to look up, generate, or transfer E9-1-1 calls 201 to other emergency service providers 211. Manual transfers are done by manually dialing a telephone number on a workstation telephone set 227 or by manually entering a telephone number at a workstation keyboard 228 (FIG. 16).

Call History/Call Back: When a first attendant 221 transfers an E9-1-1 201 call to a second attendant 221, calling information is presented on both attendants' screens 222. After the transfer is complete, the first attendant 221 originating the transfer can remain on the line until the E9-1-1 call 201 is complete or disconnected. If the first attendant 221 chooses to disconnect, the connection between the ESR 202 and the second attendant 221 is maintained. Attendants 221 can handle two E9-1-1 calls 201 simultaneously by placing one on hold in a hard hold storage facility 229 (FIG. 18, FIG. CH1, Step 10) and (1) working the other, or (2) reviewing (FIG. CH5, Step 39) call history information about prior E9-1-1 calls answered and attempting to reestablish a call to the ESR 202 which originated a prior E9-1-1 call (call back) (FIG. CH6, Steps 52 and 53).

Routing E9-1-1 Calls 201/Administration: Still referring to FIGS. 1 and 13, operations, telephony facilities, and data used by the platform 204 during normal operations are as follows. Routing an E9-1-1 call 201 consists of recognizing that an E9-1-1 call 201 has been received over one of the E9-1-1 inbound ES trunks 206 and controlling the E9-1-1 call 201 until it has been directed to a call handling destination 215, handled by that destination 215, or connected to the busy-tone 220. The routing method applied to an E9-1-1 call 201 is determined by administration, attributes of the E9-1-1 call 201, and previous attempts to route the E9-1-1 call 201 (FIGS. 19 and 20). Administration includes administrable parameters for the ES trunk 206 on which the E9-1-1 call 201 was received. Attributes of an E9-1-1 call 201 that influence the selection of the routing method include whether or not automatic number identification (ANI) was received successfully. The routing methods supported include Selective Routing, Alternate Routing, Default Routing, Switch-Controlled Default Routing, Night Service Routing, and Last Chance Routing (FIGS. 19 and 20).

Workstation Interface: Information on the screen 222 of the attendant's workstation 212, the functions performed by the keyboard 228 and uses of the PSAP telephone sets 227 result in "workstation interfaces" which are used for call handling, administration, and for call routing. The screens 228 shown in FIGS. 15 and 17, for example, are part of that interface.

When an E9-1-1 call 201 is re-directed to a different call handling destination 215 from the PSAP 216 to which such E9-1-1 call 201 was originally directed, the platform 204 can be administered to print a call entry at the PSAP 216. This allows the original PSAP 216 to track E9-1-1 calls 201 that it would normally handle. This E9-1-1 call entry is only made if a PSAP 216 was the first choice destination for that E9-1-1 call 201.

Selective Routing: The Selective Routing method (FIG. 19, Step 2) automatically routes an incoming E9-1-1 call 201 to the appropriate call handling destination 215 based upon information retrieved from the TN/ESN table 213 (FIG. 10). To accomplish Selective Routing, a trunk group 206A (FIG. 3) that received the incoming E9-1-1 call 201 must be provisioned to provide ANI. When an E9-1-1 call 201 arrives at the platform 204, an applications processor (AP) 234 searches a trunk group translations table 235 (FIG. 10) for a match with the number of the ES trunk 206 over which the E9-1-1 call 201 arrived. When a match is found, the AP 234 retrieves the NPD assigned to the ES trunk 206. The AP 234 next searches the TN/ESN table 213 (FIG. 10) for a match using the combination of the NPD assigned to the receiving trunk 206 and the ANI telephone number. When a match is found, the platform 204 retrieves the ESN associated with the NPD-telephone number combination. Using the ESN, the platform 204 directs the E9-1-1 call 201 to the destination 215 associated with the ESN. If the combination of the NPD and ANI telephone number does not derive a call handling destination 215 ESN from the TN/ESN table, Default Routing (FIG. 19, Step 15) is applied.

Alternate Routing: An alternate destination may be another call handling destination 215 or the busy signal 220. Alternate Routing (FIG. 19, Step 13) is used under any of the following conditions: (1) the first call handling destination 215 to which an attempt is being made to route the E9-1-1 call 201 ("current destination") cannot receive the E9-1-1 call 201 due to facility failure or improper system translations (FIG. 19, Step 12), (2) that current destination 215 is an Abandoned PSAP 216 (FIG. 20, Step 105), (3) that current destination 215 is a PSAP 216 in Night Service (FIG. 20, Step 106) and Alternate Routing is the designated routing method (FIG. 20, Step 113), or (4) that current destination 215 is a PSAP 216 that has reached call capacity (FIG. 20, Step 104). If that current destination 215 cannot receive the E9-1-1 call 201, the platform 216 attempts to route the E9-1-1 call 201 to one of the alternate destinations (FIG. 20, Step 109) administered specifically for the current destination. This alternate destination becomes the new current destination for the E9-1-1 call 201. For destinations that are telephone numbers in the PSTN 219, an alternate destination is not specified.

States of PSAPs: The status or state of a PSAP 216 can be changed to Abandoned (FIG. 21) at any time. When this occurs, Alternate Routing (FIG. 20, Step 109) is applied to all E9-1-1 calls 201 that would have been directed to this PSAP 216 by another routing method. In this event, the platform 204 changes the destination of the routing attempt from the current destination to the alternate destination specified for that E9-1-1 call 201. Other PSAP states are described below and include Night Service, Active, Busy and at call capacity.

Default Routing: The Default Routing process (FIG. 19, Step 18) directs an E9-1-1 call 201 to a call handling destination 215 based on the ES trunk 206 on which the E9-1-1 call 201 was received. Default Routing is used when any of the following conditions (FIG. 20, Step 100) exist: (1) an incoming E9-1-1 call 201 is not accompanied by the telephone number of the ESR 202, (2) the telephone number of the ESR 202 is not received correctly, (3) the NPD-telephone number combination is not found in the TN/ESN table 213, (4) the platform 204 attempted to route the E9-1-1 call 201 to a destination 215 that was not administered on the platform 204, (5) Selective Routing has been disabled for the ES trunk 206, (6) no alternate was specified when the platform 204 attempted to perform alternate routing or (7) a loop was detected while doing alternate routing. The Default Routing process is based on the ES trunk 206 over which the E9-1-1 call 201 is received. Because each ES trunk 206 is associated with one end office 205, a general conclusion can be reached as to the probable locations of appropriate emergency service providers 211 for the caller 202. When Default Routing is used, the platform 204 uses the default destination administered for the trunk 206 that received the E9-1-1 call 201.

Figure 22:
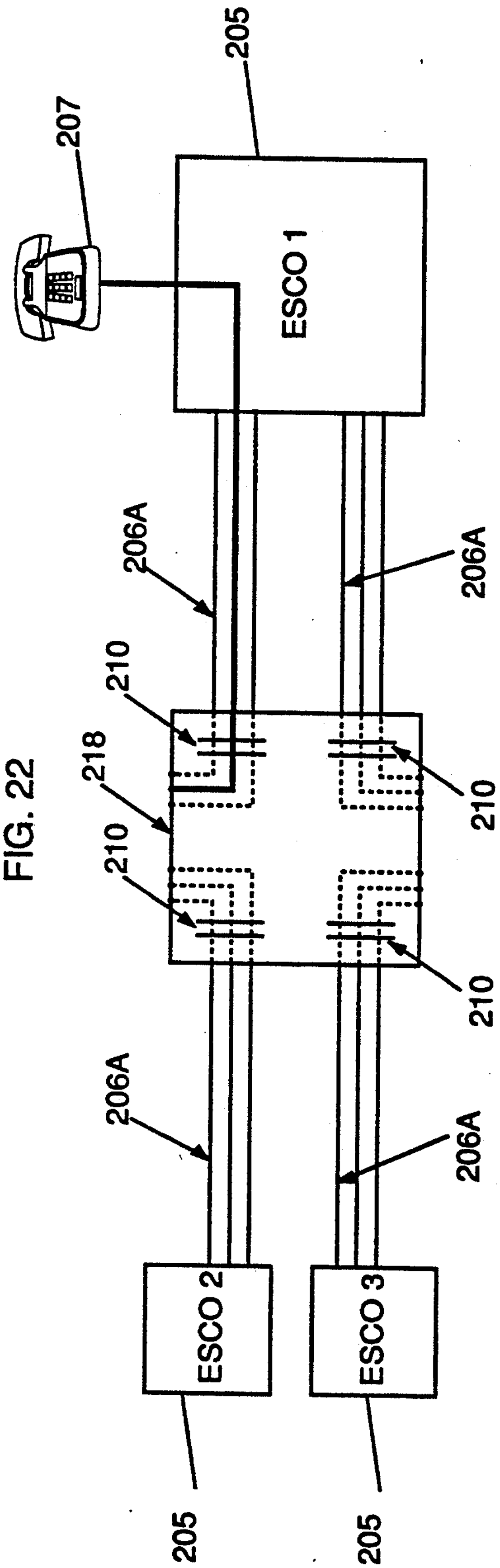
FIG. 22 is a schematic diagram of a switch which performs switch default routing.

The Switch-Controlled Default Routing (FIG. 22) process is an abnormal condition-handling mechanism. It is used when the platform's switch 218 does not receive from the AP routing instructions for a new E9-1-1 call 201 within a specified period of time. The switch 218 directs the E9-1-1 call 201 to a switch platform destination 215.

A manager of the platform (platform or system administrator 239) should ensure that the platform's switch default telephone number for a particular trunk 206 is the same as the telephone number associated with the default destination for the same trunk 206 as is administered on the AP 234.

Night Service Routing: Night Service routing (FIGS. 23) allows all E9-1-1 calls 201 which normally would be routed to a particular PSAP 216 to be automatically forwarded to another destination 215 based upon the day of the week and the time of day at which the E9-1-1 calls 201 are received by the platform 204. When the platform 204 attempts to route the E9-1-1 call 201 to a destination 215 that is "in" Night Service, the night service destination 215 (FIG. 24) becomes the current destination to which the platform. 204 attempts to route the E9-1-1 call 201. The destination 215 can be a PSAP 216, a telephone number on the switch 218, a telephone number in the PSTN 219, or the busy-tone 220. A Night Service destination 215 Can either be specified directly (administered/FIG. 24) or designated as the same destination as the alternate destination. Night Service routing can affect the destination of a selective transfer attempt from a PSAP 216.

Last Chance Routing: Last Chance routing(FIG. 19, Step 27) is used when the platform 204 has failed to reach a destination 215 via all other forms of routing. The platform 204 first attempts to route the E9-1-1 call 201 to any PSAP 216 that is available. If no PSAPs 216 are able to handle the E9-1-1 call 201, the platform 204 attempts to route the E9-1-1 call 201 to any non-PSAP destinations 215 that are TNs on the switch 218. If no TNs on the switch 218 are available to handle the E9-1-1 call 201, the platform 204 attempts to route the E9-1-1 call 201 to telephone numbers on the PSTN 219. If Last Chance routing fails to route the E9-1-1 call 201 to a destination 215, the E9-1-1 call 201 is routed to the busy signal 220, and an entry in the system call log 244 is created. If Last Chance Routing is used to route an incoming E9-1-1 call 201, a minor system alarm is generated, including a log message at a platform printer 255.

Check Destination: The AP 234 directs the processing of an incoming E9-1-1 call 201, except under Switch Default Routing. The call handling destination 215 to which an E9-1-1 call 201 is ultimately directed is determined by a series of table searches and destination inspections, as illustrated in FIGS. 19(*a*) and 20. Data in a destination table 259 (FIG. 10) is subject to the following conditions. A physical destination can be represented more than once in the destination table 259. This allows varying the alternate destination handling. An alternate destination 215 is not specified for destinations that are administered as telephone numbers on the PSTN 219. An alternate destination 215 (table 259, FIG. 10) should be specified for each destination entry that is identified as either a PSAP 216 or a telephone number on the switch 219. The alternate and current destinations 215 cannot be the same. Instead of another destination 215, a destination's alternate can be the busy signal 220, PSAP 216, a PSTN 219 or platform TN.

Referring to FIG. 20, the platform 204 inspects the status of a destination 215 before attempting to route an E9-1-1 call 201 to the destination. If the current destination 215 is replaced by a new destination 215 during the inspecting process, the process of status inspection is repeated. If the destination is a PSAP 216, the platform 204 inspects the following status information before routing the E9-1-1 call 201. If the PSAP 216 is defined to be Abandoned (FIG. 21), the E9-1-1 call 201 is handled according to alternate routing (FIG. 20, Steps 105 and 109). If a PSAP Night Service schedule 262 (FIG.

23) coincides with the current date and time current $t_c$, the E9-1-1 call 201 is handled according to Night Service routing. If the PSAP 216 is administered to limit the number of E9-1-1 calls 201 directed to the PSAP 216 and a call capacity limit is met (FIG. 20, Step 104), the current destination 215 is replaced by the alternate destination 215.

For all destinations 215 including PSAPs 216, the platform 204 inspects the following status information before routing the E9-1-1 call 201. If the destination 215 is not administered, the platform 204 selects the default destination 215 assigned to the E9-1-1 call 201 and attempts to route the E9-1-1 call 201 to that destination 215 (FIG. 19, Step 16). If the switch 218 fails to route the E9-1-1 call 201 because of a lack of resources on the switch 218, or an invalid request by the AP234 (such as redirecting to a DN that does not exist), the E9-1-1 call 201 is re-submitted for routing using the alternate route if not using last chance routing. If using last chance routing the next PSAP, DN or DN on PSTN is used depending upon what type of destination is currently being inspected.

The destination 215 associated with a selective transfer operation (FIG. 19(*a*), Step 2) is subject to destination inspection and the appropriate routing steps. A check for destination validity is performed. If the call handling destination 215 is in Night Service or is Abandoned or is at administered call capacity (FIG. 20), the C.E.R.S. system 200 attempts to route the E9-1-1 call to an alternate destination 215. If the alternate is a PSAP 216 that is Abandoned, administered or in Night Service, the C.E.R.S. system 200 continues to search for the next possible alternate. In the case that the alternate is not a PSAP 216 (is a TN), then the destination checks are not performed. The transfer search will continue until all possible alternate transfer scenarios are exhausted. There is a message 240 placed on the attendant's screen 227 showing that an alternate was chosen. The last transfer of the E9-1-1 call 201 is to the busy signal 220 (FIG. 19, Step 34).

Figure 25:
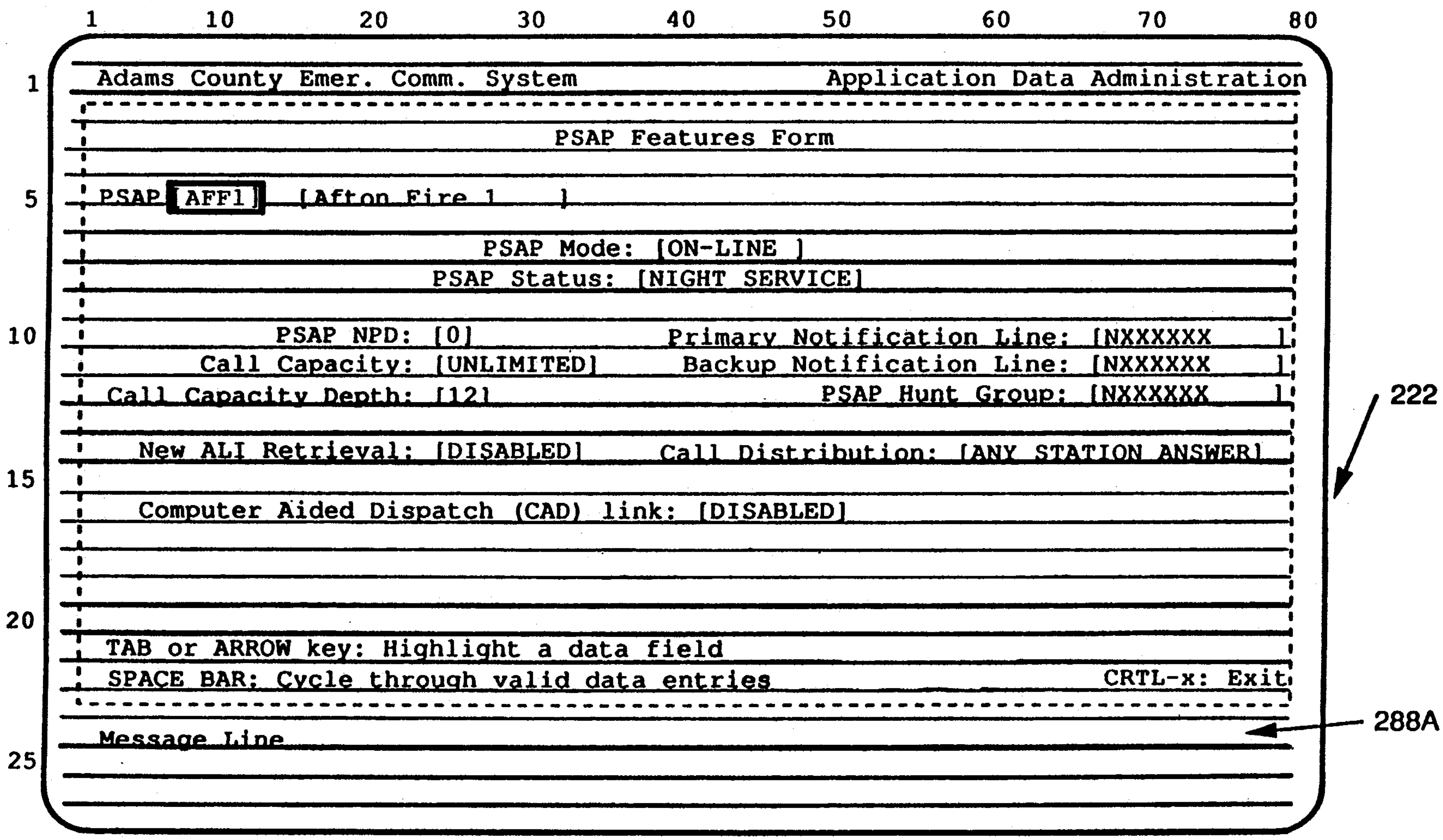
FIG. 25 is a diagram of a screen of the workstation in an administration mode, illustrating various features of a PSAP which may be administered.

PSAP Workstation Call Handling Operations: Call handling operations performed at each PSAP workstation 212, and the information displayed when those operations are performed, are described below. These operations include handling an incoming E9-1-1 call 201, handling the emergency, and connecting the E9-1-1 call 201 to the ESP 211. Incoming E9-1-1 calls 201 are directed to the PSAP 216 using an any station answer call distribution feature. This feature sends all incoming E9-1-1 calls 201 destined for a given PSAP 216 to the notification line 241 (FIGS. 1 and 4), a single telephone line terminated within the given PSAP 216. This line 241 is attached to an audible and/or visual notification device 242 (FIG. 1) so that all attendants 221 at the given PSAP 216 can easily perceive the arrival of incoming E9-1-1 calls 201 to the given PSAP 216. E9-1-1 calls 201 are queued (first in/first out) in a hunt group queue 243 (FIG. 4) if they are directed to the PSAP 216 when the notification line 241 is busy. The oldest E9-1-1 call 201 in the hunt group queue 243 is directed to the notification line 241 when the E9-1-1 call 201 on the notification line 241 is answered. Any attendant 221 at a PSAP 216 can answer E9-1-1 calls 201 directed to this notification line 241 by performing a call pick up operation (FIG. 16). The total number of E9-1-1 calls 201 waiting to be handled at a PSAP 216 can be limited by administration (FIG. 25). When this call capacity limit is met or exceeded, all subsequent E9-1-1 calls 201 are re-directed to the alternate destination 215 until the limit is no longer met or exceeded.

An attendant 221 (second) can receive transferred calls 201 from an attendant 221 (first) at another PSAP 216 or at the same PSAP 216. These calls 201 are answered when the second attendant 221 goes off-hook. The calling party (or ESR) information for transferred calls displayed at the second attendant's destination 215 matches the information displayed for the first attendant 221 initiating the transfer. The workstation screen 222 (FIG. 13) of the second attendant 221 answering the transfer also contains information that identifies the PSAP 216 and the first attendant 221 initiating the transfer.

Figure 26:
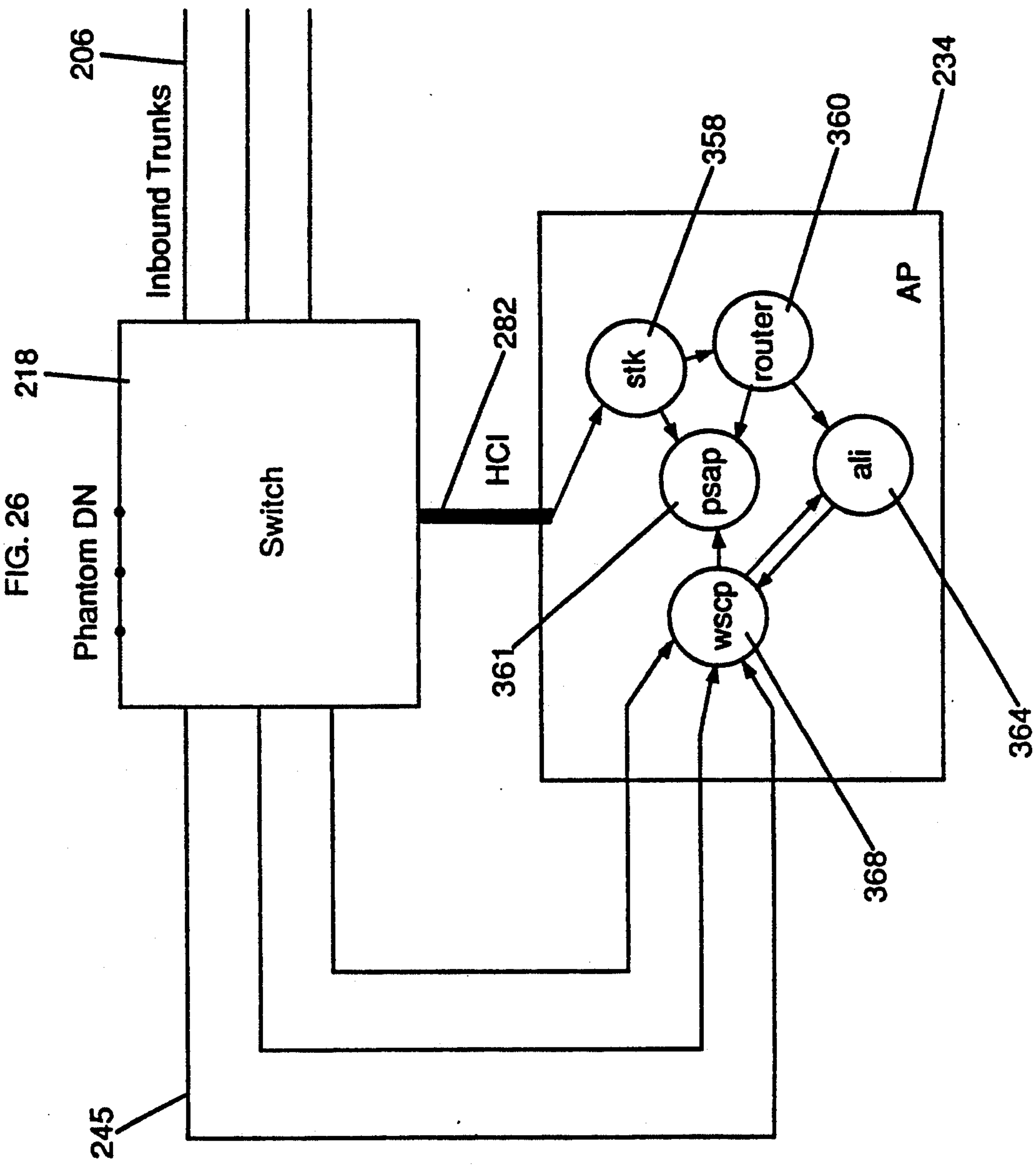
FIG. 26 is a schematic diagram of the platform of the C.E.R.S. system, illustrating the switch and attendant lines therefrom to the AP.

Incoming 9-1-1 calls 201 in which the caller 202 hangs up prematurely are classified by the platform 204 as abandoned. The platform 204 further classifies abandoned E9-1-1 calls 201 as (1) E9-1-1 calls 201 abandoned before the attendant 221 answers, where the 9-1-1 caller (ESR) 202 hangs up before the E9-1-1 call 201 can be answered by an attendant 221; and (2) E9-1-1 calls 201 abandoned after the attendant 221 answers, where the 9-1-1 caller 202 hangs up during an established E9-1-1 call 201 before all other parties in the E9-1-1 call 201 disconnect. In both types, if the E9-1-1 call 201 is routed to a PSAP 216, a low-tone 47 is used to indicate to the attendant that the caller 202 abandoned (all tones are generally indicated by the reference number 247—see FIG. 3). The low tone 247 is present on the line 203 for a short period of time. The volume of the low-tone 247 is not high enough to prevent audible conversation between parties connected while the low-tone is present. The low-tone 247 is removed from an attendant's line 246 (FIG. 26) if the attendant 221 performs any call operations that change the calling state of a voice line 245 (i.e., when the attendant 221 disconnects, initiates a new call 318 (FIG. 3), or attempts a call back operation).

Figure 5:
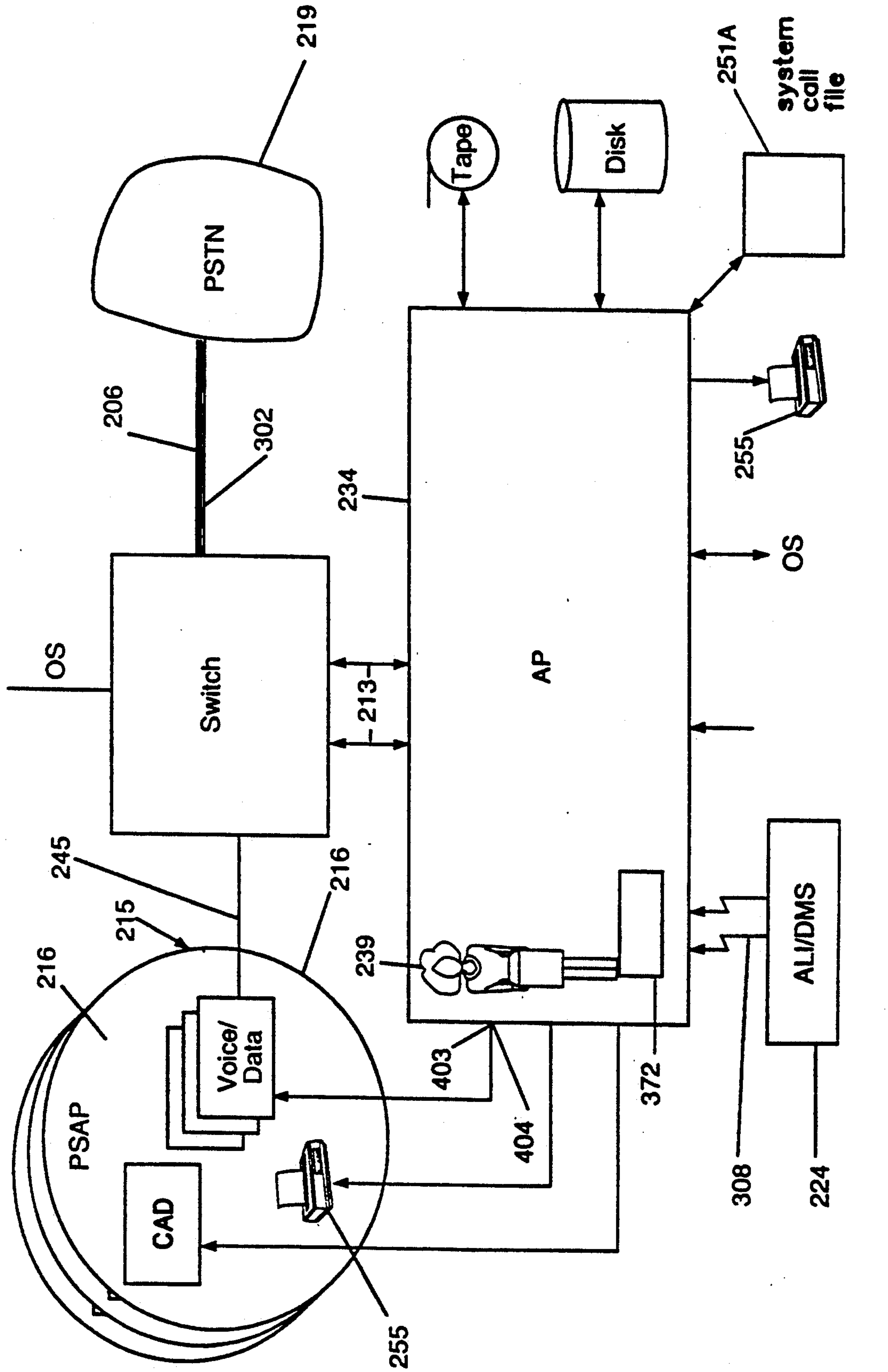
FIG. 5 is a schematic diagram of the switch and the platform, showing interfaces of each with other components of the C.E.R.S. system.

When an E9-1-1 call 201 is abandoned by an E9-1-1 caller 202 before it can be answered, the E9-1-1 call 201 is held up by the platform switch 218 and the low tone 247 is provided when answered. When the AP 234 is running, the ES trunk 206 is held for two minutes. The trunk 206 is dropped if not answered within that time and a message 288 is logged at the PSAP call log printer 255 (FIG. 5). All attendants 221 at the PSAP 216 will get a message 240 on their screen 222 (FIG. 15B, line twenty-four) with respect to the E9-1-1 call 201. If the ANI was not provided by the PSTN 219 or the E9-1-1 call 201 was routed to this PSTN 219 or to a telephone number on the switch 218, then the E9-1-1 call 201 is dropped immediately.

If the AP 234 is down, the ES trunk 206 will be held up (active) until an attendant 221 answers. If the AP 234 restarts and the E9-1-1 call 201 is not answered within two minutes after restart, an alarm is raised. The ESP 202 answering the E9-1-1 call hears the low-tone 247. If the ESP 202 is a PSAP attendant 221, the attendant's terminal screen 222 contains call information (FIG. 15*b*) based on ANI received with the E9-1-1 call 201 and caller abandoned notification. The call information is recorded in the call log 244 when the attendant 221 disconnects. No actions are performed by the platform 204 for an E9-1-1 call 201 if the caller 202 hangs up before ANI can be collected.

When an E9-1-1 call 201 is abandoned by an E9-1-1 caller 202 after the E9-1-1 call 201 has been answered by an attendant 221, the PSAP attendants 221 receive visual indication on their terminal screens 222 that the E9-1-1 call 201 has been abandoned (FIG. 15, shown at line 24).

E9-1-1 calls 201 received at a workstation 212 from sources other than ES trunks 206 are known as "anonymous calls". An anonymous call is received at a workstation 212 as a result of the dialing of the seven-digit telephone number assigned to the workstation 212 or the PSAP 216. It is referred to as an anonymous call because caller location information does not accompany the E9-1-1 call 201. An anonymous call can be received at the workstation telephone 227 from two different sources; a location in the PSTN 219, or telephone lines connected to the serving switch 324 (FIG. 1). Anonymous calls can be received at a PSAP 216 or at a PSAP workstation 212 from non-E9-1-1 trunks. Any telephone directly connected to serving switch 324 can be dialed from any other telephone also connected to the serving switch 324.

PSAP Attendant call Routing Operations

Call handling operations are performed by PSAP attendants 221 through their workstation interfaces using the keyboards 228 and/or the telephone sets 227. These operations include the following.

Call Pick Up: An attendant 221 directs a next E9-1-1 call 201 to his or her workstation 212 from the notification line 241 by using pickup capabilities provided by the workstation interface (FIG. 16). This pick up operation can be performed at any time except (1) when the workstation telephone set 227 has been taken out of service by the switch 218, (2) the workstation telephone set 227 is ringing while on-hook, (3) a previous E9-1-1 call 201 is in process while attendant 221 is off hook answering the other E9-1-1 call or (4) another party is on consultation-hold.

No audible feedback is given for the first three items. However, the attendant 221 will hear a tone 247 (reorder tone) if the pick up operation is performed while a caller 202 is on consultation hold. The attendant 221 will also hear the reorder tone 247 if the pick up operation is performed when no E9-1-1 call 201 is present at the notification line 241. The attendant's telephone set 227 rings when the pick up operation is performed while the telephone set 227 is on-hook. When the attendant 221 goes off-hook, the E9-1-1 call 201 on the notification line 241 is directed to the attendant workstation 212. If the operational statue of a workstation 212 is currently Not Receiving Calls, it is automatically changed to Receiving Calls when the call pick up operation is performed (see screen 222 in FIG. 15, line 2 "receiving calls").

Figure 13:
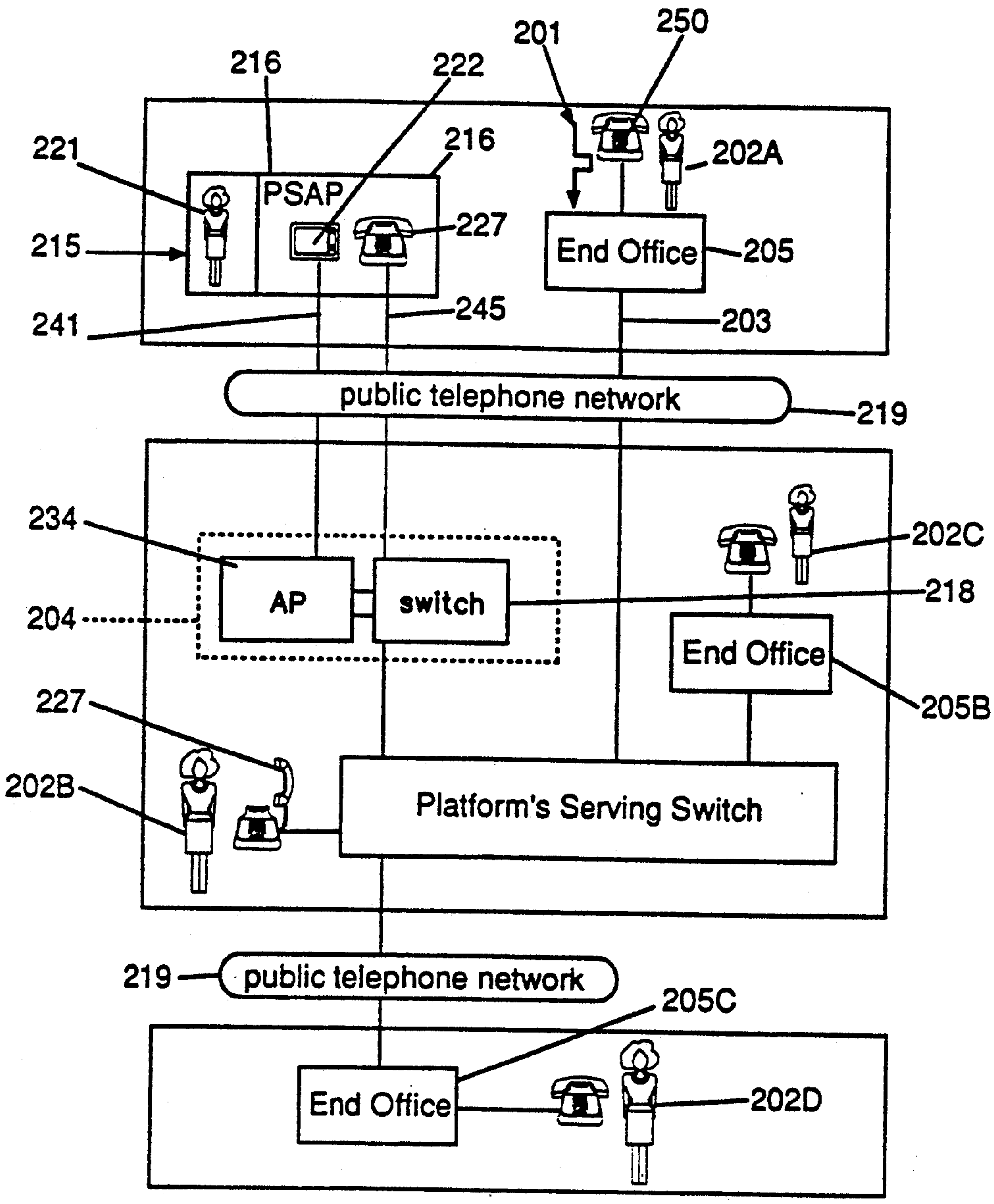
FIG. 13 is a schematic diagram showing a platform providing community emergency response services to three geographic regions.

Referring to FIGS. 4 and 13, the following special conditions exist if there is one E9-1-1 call 201 at the notification line 241, at least one E-9-1-1 201 call in the hunt group queue 243, and more than one attendant 221 attempts to perform a call pick up: (1) one attendant 221 is allocated the E9-1-1 call 201 at the notification line 241, and (2) E9-1-1 calls 201 in the hunt group queue 243 are directed to the attendants 221 which request call pick up until all E9-1-1 calls 201 have been allocated or all outstanding pick up requests have been satisfied. Those attendants 221 not allocated an E9-1-1 call 201 will hear the reorder tone 247.

Selective Transfer: This method enables the PSAP attendant 221 to quickly transfer an incoming E9-1-1 call 201 to one of the four possible transfer points 225 displayed with an E9-1-1 call 201 (FIG. initiates a selective transfer with a single operation, e.g., Arrow Key to the transfer "label" corresponding to the desired destination 215, followed by "RETURN," or press a number key 263 (1 through 4) followed by "return" (FIG. 16). The selective transfer operation has the following characteristics:

1. Only one selective transfer by any one attendant 221 at the same PSAP 216 can be performed at a time.

2. Each attendant 221 involved in an E9-1-1 call 201 has the capability to perform a selective transfer. In this manner, multiple emergency service providers 211 can be bridged onto an E9-1-1 call 201 by a process of call chaining. For example, call chaining is accomplished when attendant #1 adds attendant #2 to a E9-1-1 call 201, after which attendant #2 adds attendant #3 to the E9-1-1 call 201, and so on.

3. The selective transfer destination(s) displayed at the workstation screen 222 (FIG. 27) are always based on the ESN derived from the TN/ESN table 213 translations, regardless of the particular PSAP 216 that is handling the call E9-1-1 201.

4. If an ESN for an E9-1-1 call 201 cannot be derived from the TN/ESN table 213 translations, the PSAP attendant 221 is not allowed to invoke a selective transfer during the E9-1-1 call 201.

5. The E9-1-1 call 201 can be transferred to one of the alternate destinations that is different from the current one selected by the attendant 221 if the current call handling destination 215 is a PSAP 216 on the platform 204 and the current destination 215 is in one of the Abandoned or Night Service states (FIG. 21), or if the incoming call capacity limit (FIG. 25, lines 11 and 12) has been reached. When one of the above states exists for the current destination 215 the attendant 221 performing the transfer is notified that the E9-1-1 call 201 is being transferred (or redirected) to an alternate destination.

6. Additional selective transfers cannot be performed by the attendant 221 until the party added to the E9-1-1 call 201 via a previous transfer has been dropped from the E9-1-1 call 201 or has disconnected.

7. Selective transfer can also be performed after the caller 201 has disconnected. In this situation, an E9-1-1 call 201 is placed to the transfer point destination. The caller information on the attendant's screen 222 is displayed at the destination if the destination is another PSAP 216.

For all transfers (selective, fixed or manual), the parties in the E9-1-1 call 201 will hear (1) the busy signal 220 (FIG. 19, Step 34) if physical switching facilities are not available to complete the E9-1-1 call 201 or (2) the recorder tone 247 if the destination 215 selected or dialed is not a valid telephone number. E9-1-1 calls 201 transferred to the PSTN 219 will receive tones or recorded announcements 247 provided by the PSTN 219 if the E9-1-1 call 201 cannot be completed because of resource problems within the PSTN 219. The selective transfer label and telephone number (may be an ESP number) are administered on the AP 234.

Fixed Transfer: In this method, the PSAP attendant 221 can transfer an E9-1-1 call 201 by selecting a fixed transfer destination 215 from a directory 249 (FIG. 10) of commonly used telephone numbers displayed at the workstation 212 and administered separately for the PSAP 216. Any E9-1-1 calls 201 transferred using the fixed transfer operation are directed to the number found in the directory 249. No alternate routing is available for this feature. The fixed transfer directory 249 can also be used to generate a call when no call is active from the PSAP 216.

Manual Transfer: If the attendant 221 chooses to transfer an E-9-1-1 call 201 to a telephone number that is not provided by the selective transfer or fixed transfer functions, the attendant can perform a manual transfer by entering a telephone number using the terminal interface provided by the workstation 212 or using the telephone set keypad 250 (FIGS. 1 and 13).

Consultation Hold: E9-1-1 calls 201 can be placed on consultation (or "soft") hold by the attendant 221 performing a flash-hook action on the workstation telephone set 227. The same E9-1-1 call 201 can be retrieved when the attendant 221 performs a second flash-hook. Call pick up cannot be performed while an E9-1-1 call 201 is on consultation hold. If the ESR 202 abandons the E9-1-1 call 201 while on consultation hold, the call connection is held for two minutes. If the E9-1-1 call 201 is attempted to be retrieved after the caller 202 abandoned, the low tone 247 stays on the line 203 for five seconds after the retrieval attempt. After two minutes the connection is dropped and a message 263 is displayed on the screen 222 of the attendant's terminal 222 (line 24).

Hard Hold: By placing an established E9-1-1 call hold, the attendant 221 can drop the voice path with an ESR 202, but retain the ability to reestablish the connection. Once an E9-1-1 call 201 has been put on hard hold, the attendant 221 can use the call pick up operation or dial telephone numbers to set up calls with other parties, including three-way calls. A dial tone 247 is heard immediately on the attendant's line 245 after the E9-1-1 call 201 has been placed on hard hold, and does so by pressing a HOLD key 266 of the keyboard 228. Each attendant 221 can place one E9-1-1 call 201 on hard hold. The functionality provided by hard hold is similar to consultation hold, except that a flash-hook does not restore the voice connection with the party on hard hold. The voice connection can only be re-established using the hard hold retrieval operation provided by the platform 204. The workstation telephone set 227 rings if the attendant 221 attempts to retrieve the E9-1-1 call 201 from hard hold while on-hook. The retrieval operation can only be performed after all connections have been dropped, except for the hard-held connection.

Callers 202 whose E9-1-1 calls 201 are placed on hard hold hear silence. The E9-1-1 customer 202 has the option of buying devices (not shown) that provide some type of announcement to callers 202 on hard hold. If a caller 202 whose E9-1-1 call 201 has been placed on hard hold disconnects before the attendant 221 retrieves the E9-1-1 call 201 and the attendant 221 attempts to retrieve the now-abandoned E9-1-1 call 201, a message 263 appears on the screen 222 (FIG. 17, line 24) of the attendant's workstation 212 indicating that the caller 202 has disconnected. If the caller 202 abandons while on hard hold (FIG. 17, line 4 of screen 222), the E9-1-1 call connection will be held for two minutes. If the E-9-1-1 call 201 is attempted to be retrieved after the caller abandoned, the low tone 247 stays on the line 203 for five seconds after the retrieval attempt.

Any of the attendant operations can be performed while a party is on hard hold, with the following exceptions:

1. Parties that are active in a conference (e.g., three-way) call cannot be placed on hard hold.
2. An E-9-1-1 call 201 cannot be placed on hard hold if another E9-1-1 call 201 is currently on consultation hold.
3. An E9-1-1 call 201 cannot be retrieved from hard hold if another E9-1-1 call 201 is on consultation hold.

ALI Fetch/New ALI Fetch Operations: The platform 204 provides the attendant 221 with the ability to make additional on-demand requests for automatic location identification (ALI) and selective transfer destination data. This functionality allows the attendant 221 access to such data when the attendant 221 determines that the information presented on the screen 222 is insufficient, incorrect or does not match the location of the emergency. This functionality is provided by ALI Fetch and New ALI Fetch operations, as follows:

1. The ALI Fetch operation re-retrieves ALI information associated with the telephone number currently displayed on the attendant's screen 222.
2. The New ALI Fetch operation allows the attendant 221 to enter a telephone number at the workstation 212 and retrieve New ALI and selective transfer information for the telephone number entered.

The following characteristics are common to both types of on-demand retrieval of call information:

1. If a "clear screen" operation is performed after making the request for retrieval of call information, the attendant's screen 222 is repainted.
2. The attendant's screen 222 is not updated if the attendant 221 is viewing information from the workstation's call history log 251 when the response from the ALI/DMS system 224 is received.
3. A count of the number of on-demand retrievals of call information performed by the platform 204 is kept. This count can be accessed via reports produced for the platform 204.

Via ALI Fetch, the attendant 221 can ask the E9-1-1 platform 204 at any time to re-retrieve ALI information associated with the telephone number displayed with the ALI information on the screen 222. An attendant 221 may wish to make this ALI Fetch if the ALI information being viewed on the screen 222 is believed to be incorrect because of transmission errors. The information received in the response to ALI Fetch replaces the ALI information associated with the E9-1-1 call 201. The ALI information displayed on the attendant's screen 222 when the request was performed is replaced by data retrieved from the ALI Fetch request.

New ALI Fetch: The New ALI Fetch function allows an attendant 221 to enter a telephone number and receive the associated ALI and selective transfer points 225. There are two factors considered in sequencing what happens to the call history log 251 when an ALI Fetch is performed. These involve whether or not there is an active (active voice connection) E9-1-1 call 201 (FIG. 15, line 4) present in the workstation's call history log 251 when the ALI Fetch is performed. The workstation's call history log 251 (FIGS. 18 and 28) has four positions 252 for call records 253 or entries. As more New ALI Fetch operations are performed, the active E9-1-1 call 201 is identified as a later and later received E9-1-1 call 201 in the call history log 251 may be removed from the call history log 251 even though such E9-1-1 call 201 is active.

The E9-1-1 platform 204 searches the TN/ESN table 213 (FIG. 10) for the telephone number entered and displays the selective transfer points assigned to the ESN associated with the new telephone number The E9-1-1 platform 204 also sends a request to the ALI/DMS system 224 for ALI information. When there is no match found, a message 263 displays the condition that ALI data is not available. If the attendant 221 is viewing the same screen 222 that was viewed when the New ALI Fetch was performed, the New ALI information is displayed on the screen 222 (FIG. 15) when received. If the attendant 221 is viewing a different screen 222 from the screen 222 which was being viewed when the New ALI Fetch was initiated, a message 263 indicates the fact that the data has been received on the screen 222. The attendant 221 returns to the screen 222 that was viewed when the New ALI Fetch was performed to view the new ALI information. The information received in response to a New ALI Fetch is distributed to the call history log 251 (FIG. 18) and/or the call log 244. That New ALI information may be inserted in both the call history log 251 and to a PSAP ALI printer 254 (if ALI printing is activated). The selective transfer information is inserted only in the call history log 251.

An entry is made in a system call file 251A (FIG. 5) and, if administered, at a PSAP call printer 255 (FIG. 5) when an attendant 221 enters a new telephone number for an E9-1-1 call 201 currently being handled. This information contains the telephone number (via ANI) originally received with the E9-1-1 call 201, the telephone number entered by the attendant 221, the time at which the request was made, and the position number associated with the workstation 222 making the request. The ANI information originally received for the E9-1-1 call 201 is always displayed on the attendant's screen 222. This information is not overwritten when a new telephone number is entered and is displayed on the screens 222 of all attendants 221 attached to the E9-1-1 call 201. The ability to perform the New ALI Fetch function may be disabled for each PSAP 216.

Clear/Refresh Screen: Clearing the screen 222 is accomplished with a CLEAR SCREEN key 264 (FIG. 16) of the keyboard 228. When data on an attendant's screen 222 becomes garbled because of transmission problems between the AP 234 and the attendant workstation 212, the attendant 221 can request re-transmission of all data by employing a refresh screen function. This operation does not cause a new ALI request to be submitted.

Call History: Information for (1) E9-1-1 calls 201 and/or (2) New ALI Fetch operations previously handled at a workstation 212 can be quickly viewed on the workstation screen 222 by the attendant 221 at anytime by employing a call history function. These E9-1-1 calls 201 accessible via the call history function include the last "n" calls which were previously handled by the attendant 221. In the preferred embodiment of the C.E.R.S. system 200, "n" =four. In the embodiment described, data representing these last "n" E9-1-1 calls 201 are stored in the four positions 252 of the call history log 251. To perform any call routing function with respect to a particular E9-1-1 call 201, a record 253 representing such E9-1-1 call 201 is read from the call history log 251 and is displayed on the screen 222 at the workstation 212. An E9-1-1 call 201 is added to the call history log 251 if its characteristics meet certain criteria. Generally, ALI data for an E9-1-1 call 201 that is incoming to the particular workstation 212 arrives after the E9-1-1 call 201. Therefore, the later arriving ALI data for a given E9-1-1 call 201 in the call history log 251 is matched to such E9-1-1 call 201 and added to the call history log 251. An E9-1-1 call 201 that has been placed on hard hold at the workstation 212 already has such ALI data, so when such E9-1-1 call 201 is taken off hard hold it is again added to the call history log 251 with its ALI data.

A particular E9-1-1 call 201 in the call history log 251 may be displayed on the screen 222 by use of a CALL HIST key 265 (FIG. 16) of the keyboard 228. Repeated use of this key 265 results in paging through and sequentially displaying on the screen 222 all of the E9-1-1 calls 201 currently in the call history log 251. When the desired or "selected" E9-1-1 call appears on the screen 222 (FIG. 15), then that selected E9-1-1 call 201 may be handled by the attendant 221.

Call Back: Having used the CALL HIST key 265 to select and currently display a particular E9-1-1 call 201 previously handled at the workstation 212, the attendant 221 may initiate placing a return call 318 (FIG. 3) to the caller 202 who placed that particular E9-1-1 call 201. That return call 318 (or "call back") is initiated by a single operation, namely the attendant 221 pressing a CALL BACK key 267 of the keyboard 228 (FIG. 16). The return or call back call 318 is then placed to the TN which is in the call history record 252 of that particular E9-1-1 call 201 and which is currently displayed on the screen 222. If New ALI Fetch has been performed, the telephone number used in the call back operation is the telephone number which has been entered in the call history log 251 based on the New ALI Fetch operation. The call back function causes the displayed TN to be checked, and if it is valid, causes the switch 218 to place the call 318 back to that caller (ESR) 202 who may still be at the telephone set 207 (FIG. 1) to which such TN is assigned. The call back function enables the attendant 221 to quickly, in a single operation without leaving the workstation 212, re-call such caller 202 and obtain current information as to the status of the emergency which initially prompted the caller 202 to plate the E9-1-1 call 201. Having done that, the attendant 221 may quickly take further action on that emergency call 201, or quickly attend to handling another E9-1-1 call 201.

Drop Out: This function allows the PSAP attendant 221 to disconnect from either a two-party or a three-party E9-1-1 call. This function enables the attendant 221 to handle another E9-1-1 call 201 or perform other operations. When the attendant 221 is connected to either a two-party or three-party E9-1-1 call and invokes the drop out function (key 267A, FIG. 16), the E9-1-1 platform 204 disconnects the attendant 221 and returns a dial tone 247 to the attendant 221. When the attendant 221 is in a three-party E9-1-1 call and invokes the drop out function, the E9-1-1 platform 204 leaves the remaining parties in a two-party call.

Drop Transfer: This function allows the attendant 221, with a single action (key "CNCL XFR", FIG. 16), to drop all parties added to an E9-1-1 call 201 after the attendant 221 has initiated a three-way call. Once the drop transfer function is performed, the attendant 221 and the original calling party remain connected. The drop transfer function is allowed only for three-way calls.

Forced Disconnect: This function allows the PSAP attendant 221 to release the incoming ES trunk 206 to which the PSAP attendant 221 was connected (connected trunk) even though the calling party has not yet hung up. The forced disconnect function prevents blockage of incoming ES trunks 206 to the platform. The forced disconnect function has the following characteristics:

1. The forced disconnect function is only available when the attendant 221 is connected with an E9-1-1 call 201 over an incoming ES trunk 206. The function is not available for other types of connections.
2. When the attendant 221 is in a two-party E9-1-1 call 201 and invokes the forced disconnect function, the platform 204 releases the incoming ES trunk 206 and returns dial tone 247 to the attendant 221.
3. When the attendant 221 is in a three-party E9-1-1 call and invokes the Forced Disconnect function, the platform 204 releases the incoming ES trunk 206 and leaves the attendant 221 in a call with the remaining parties.

Receiving/Not Receiving Call State of Attendant's Position: The term "attendant's position(s)" identifies a particular one of the many workstations 212 at a given PSAP 216. At any time an attendant 221 can remove or insert a particular workstation 212 from the workstations which are available at the given PSAP 216 for picking up incoming E9-1-1 calls 201. These available workstations 212 may be considered as a "pool." Workstations 212 in the pool are considered Receiving Calls (FIG. 15, line 2 of screen 222), while those removed from the pool are treated as Not Receiving Calls. Thus, an attendant's position has the same condition ("Receiving Calls" or "Not Receiving Calls" as the workstation 212 at such position). The conditions of Receiving Calls/Not Receiving Calls of each attendant's workstation 212 have the following characteristics:

1. An electronic Do Not Disturb condition (message line 24, FIG. 15) is placed on the attendant's workstation DN line 257 while the workstation 212 is Not Receiving Calls. This condition prevents callers 202 from ringing the attendant's telephone set 227. Any party calling the workstation telephone set 227 during the Not Receiving Calls state hears a special busy-tone 247. The Do Not Disturb condition is removed when the attendant's position is returned to the Receiving Calls state.

2. If incoming E9-1-1 call capacity is limited (FIG. 25, line 12) for a given PSAP 216, the number of workstations 212 of such given PSAP 216 currently Receiving Calls is used to determine the number of E9-1-1 calls 201 that can be directed that given PSAP 216.

3. All workstation operations are available to the attendant while the position is Not Receiving Calls.

4. All attendant positions are initialized in the Not Receiving Calls state when the C.E.R.S. system 200 is restarted or initialized. Attendants 221 are responsible for enabling their positions following such initialization. A Do Not Disturb condition is not placed on the voice lines 245 when the AP 234 restarts in case the attendant 221 is in the process of handling E9-1-1 calls 201 when the AP 234 becomes operational. In this case, any E-9-1-1 calls 201 sent to the attendant's telephone set 227 while it is disabled can be answered by the attendant 221 and information for that E9-1-1 call 201 is displayed on the attendant's screen 222.

5. Failure to re-activate the workstation 212 could cause E9-1-1 calls 201 to be sent by alternate routing to other PSAPs 216 (e.g., if incoming call capacity for the notification line 241 is limited, FIG. 25, line 12).

6. An attendant 221 can change the workstation 212 to the Not Receiving Calls state while connected in an E9-1-1 call 201. When the Not Receiving Calls state is activated, the Do Not Disturb condition is placed on the workstation voice line 245 immediately and the number of workstations 212 used to calculate the limit for incoming call capacity is reduced by one. However, the E9-1-1 call 201 which is currently in progress remains established until the attendant 221 terminates the connection.

Manual Operations: In the event that the AP 234 is not operational, several operations are manually available to the attendant 221. Administrable access codes permit call pick up, hard hold, and removing the Do-Not-Disturb condition. In addition, the attendant 221 can perform a manual transfer of an E9-1-1 call 201 by executing the following sequence: (1) A flash-hook, (2) dial digits for the transfer destination, and (3) a second flash-hook.

Computer Aided Dispatch Interface: The C.E.R.S. system 200 supports an interface to computer aided dispatch (CAD) system equipment 269 (FIG. 1). This provides a link between the AP and CAD equipment 269 (FIG. 1) provided by the user of the C.E.R.S. system 200.

Information Displaced On Attendant Screen 222

In general, referring to FIGS. 15(*a*) and 15(*b*), the following information may be displayed on the screen 222 of each attendant's workstation 212.

Call Waiting: Referring to line 4 on the screen 222, the displays of all attendant positions at a PSAP 216 are updated when an E9-1-1 call 201 arrives at the notification line 241 associated with that PSAP 216. The "EMERGENCY CALL WAITING" message 263 presented gives attendants 221 visual indication that an E9-1-1 call 201 is waiting. The message 263 remains on the screen 222 until the E9-1-1 call 201 has been picked up or until the E9-1-1 caller 201 has disconnected.

ANI Data: The ANI information collected for a particular E9-1-1 call 201 is always displayed at the workstation 212 until the attendant 221 clears the screen 222 (line 7 on the screen 222 in FIG. 15). This seven digit number is preceded by the area code of the caller's serving end office 205. When any of the following conditions exist, the telephone number normally supplied via ANI for incoming E9-1-1 calls 201 is not received by the platform 204:

1. E9-1-1 calls 201 arriving over a trunk 206 that is not capable of forwarding ANI data.
2. E9-1-1 calls 201 arriving from subscribers 202 on party lines.
3. Transmission errors occurring on ES trunks 206 between the end office 205 and the platform 204.

In these situations, the ANI is displayed as "Area Code-911-OXXX" where XXX is the number of the emergency service central office (ESCO) 205 assigned to the telephone office which serves the caller 202.

Figure 15A:
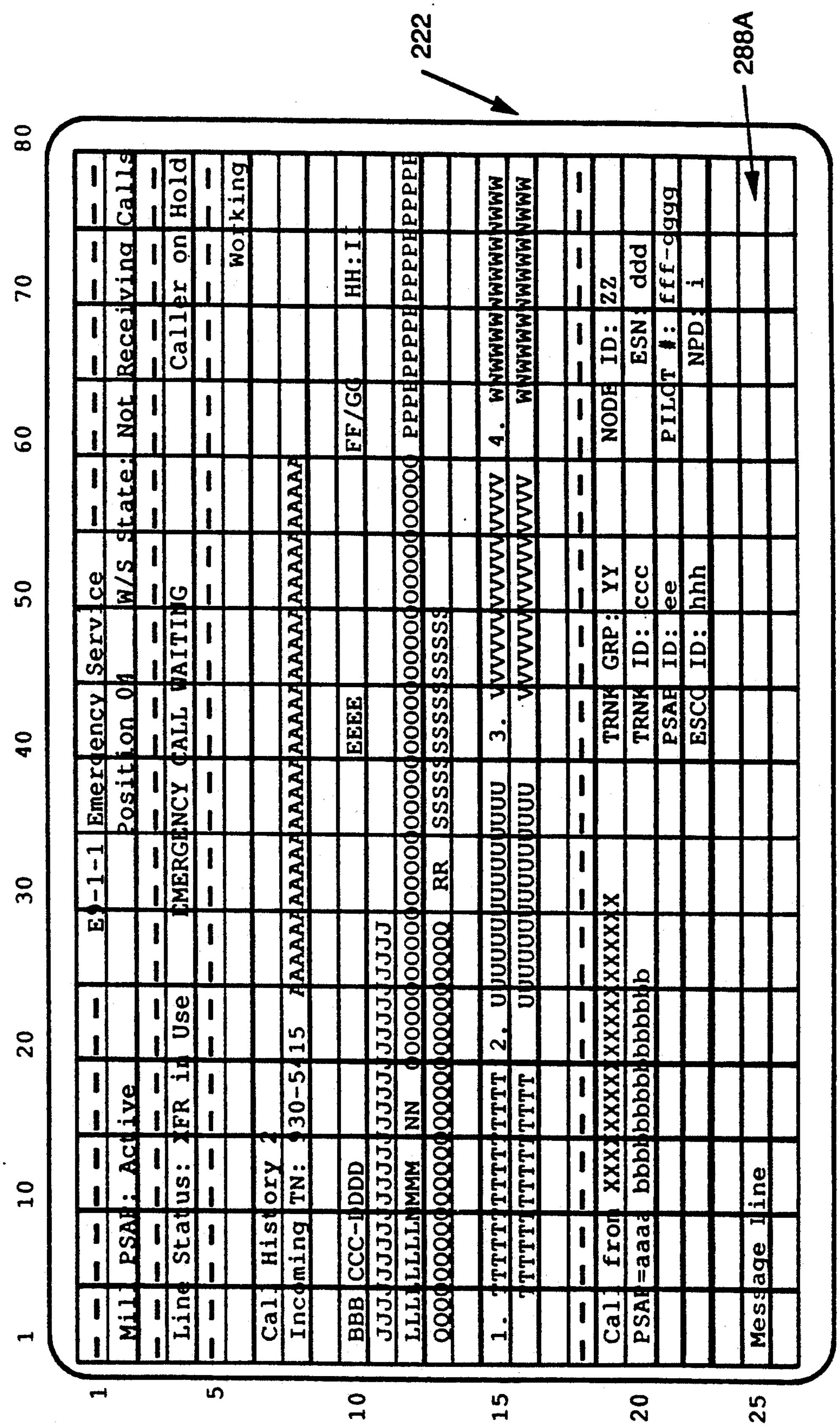
FIG. 15A is a diagram of a screen of a workstation with a "key" which denotes what information may be displayed for an incoming E9-1-1 call.

ALI Data: Referring to FIGS. 15*a* and *b*, the following data is retrieved from the ALI/DMS system 224 and displayed when either an E-9-1-1 call 201 is picked up from the notification line 241 Or an incoming E9-1-1 call 201 has been transferred from another PSAP attendant 221:

| | Chart ALI 1 |
|---|---|
| Line No. of Screen 222 | Data |
| 10 | The area code assigned to the telephone number used to retrieve ALI information. |
| 10 | The seven-digit telephone number. |
| 10 | The class of service assigned to telephone number |
| 10 | The time stamp for ALI retrieval (date and time). |
| 11-12 | Customer name and street address information assigned to telephone number. |
| 12 | Location information (e.g., apartment number, suite number, etc.) |
| 13 | The city and state in which the telephone number is located |
| FIG. 15, lines | The identifier of the ALI/DMS node receiving and responding to the request. This information can be used ALI/DMS personnel to track ALI/DMS retrieval problems. |
| CO | The PSAP identifier. Because the connections from the ALI/DMS system 224 to the system 200 are at the platform 204, this field is used to identify the connection pair 308 (FIG. 5) used to transport the data between the platform 204 and the ALI/DMS system 224. |
| CO | The ESN assigned to a telephone number. |
| CO | Pilot number (billing telephone number) assigned to the telephone number. |
| 13 | Free field information (a 15-character field for additional information useful to an attendant 221). |

The ALI information described above is not displayed on the screen 222 if the NPD plus the ANI associated with the E9-1-1 call 201 is not found in the ALI/DMS database 224 or the E9-1-1 call 201 is received with out the ANI information. However, the information displayed is generated by the ALI/DMS system 224 and indicates to the attendant 221 that the information stored in the ALI/DMS system 224 is incomplete.

Selective Transfer Points: Referring to FIGS. 15*a* and *b*, line 15 and 16, the display on the workstation screen 222 contains information for up to four of the selective transfer points 225, which are determined by the ESN number assigned to the subscriber's telephone number in the TN/ESN table 213. The selective transfer points 225 are displayed when an E9-1-1 call 201 is initially answered by an attendant 221. When an E9-1-1 call 201 is transferred to another PSAP 216, the same selective transfer points 225 are also displayed at the workstation 212 of the PSAP attendant 221 to which the E9-1-1 call 201 has been transferred. The telephone number labels for each selective transfer point 225 displayed on the workstation screen are determined by the platform administrator 239.

Call Origination Information: Referring to FIGS. 15*a* and *b*, lines 19-22, information about the ES trunk 206 carrying the incoming E9-1-1 call 201 can be displayed at the discretion of the workstation attendant 221 This information is used by maintenance personnel to isolate problems in the ES trunks 226. The call origination information consists of the name of the end office 205 serving the caller 202, the trunk group number as administered at the end office 205, and the member number of the trunk 206 within the trunk group 206A.

Figure 17:
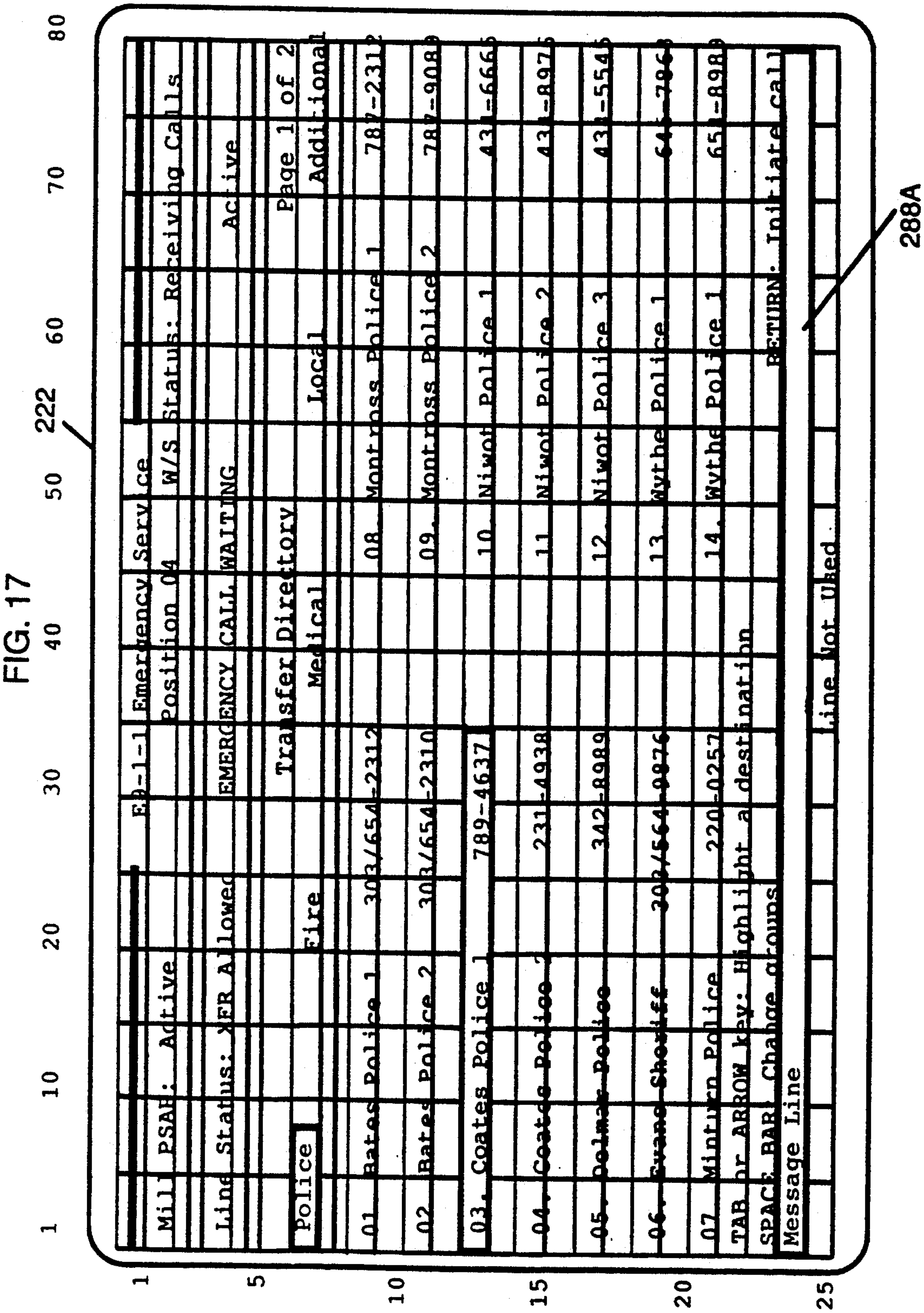
FIG. 17 is a diagram of a screen of the workstation used for transferring an incoming E9-1-1 call to an emergency service provider.

Call On Hard Hold: Referring to FIG. 17, line 4, an E9-1-1 call 201 on hold is indicated on a workstation screen 222 only when the E9-1-1 call 201 is placed on hard hold. The hard hold function causes the workstation 212 to display (1) an indication that an E9-1-1 call 201 received by the workstation 212 has been placed on hard hold, and (2) a visual reminder while the attendant goes on-hook.

Workstation Status: Referring to FIGS. 15*a* and *b*, line 2, the current state ("Receiving Calls" or "Not Receiving Calls") of an attendant's position is always displayed. A "Yes/No" confirmation message 263 appears on the attendant's screen 222 when the workstation 212 is the only one at a PSAP 216 that is in the Receiving Calls state and an attempt is made to take the last workstation 212 out of service. If confirmation is received, the workstation 212 is put into the Not Receiving Calls state and the state of the PSAP 216 is changed to Abandoned. To re-activate the PSAP 212, the PSAP 259 manager or attendants 221 at the PSAP 216 can perform PSAP abandonment administration.

PSAP Status: Referring to FIGS. 15*a* and *b*, at line 2, the current state of the PSAP (Active, Abandoned or Night Service) is displayed on each workstation screen 222 in the PSAP 216 (e.g., "Mill PSAP Active).

Figure 29:
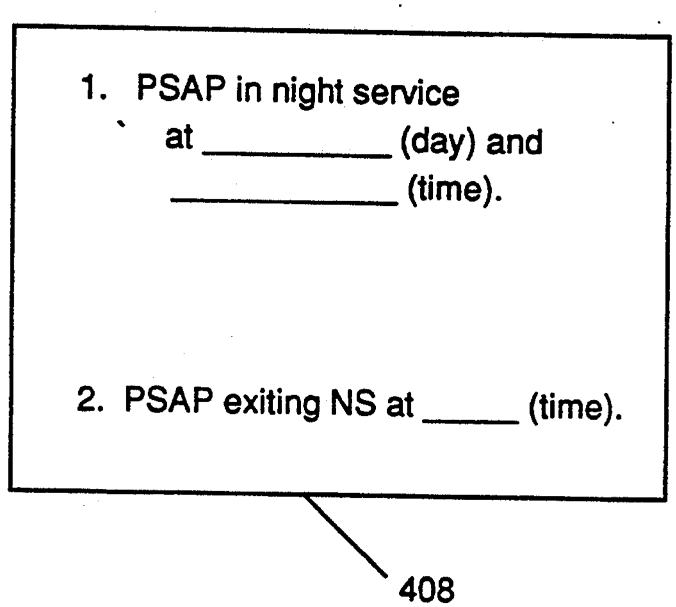
FIG. 29 is a schematic diagram of system log files of C.E.R.S. system.

Transfer Directory: Referring to FIGS. 17 and 29, the platform 204 provides the attendant 221 with data from the directory 249 of telephone numbers that can be used to transfer or originate E9-1-1 calls 201. The attendant 221 can display the directory 249 on the workstation 212 at any time. The transfer directory 249 has the following characteristics:

1. supports a maximum of 210 telephone numbers.
2. entries in the directory database can be sorted among five subdirectories. These sub-directories are viewed on the screen 222 separately.
3. entries are displayed in alphabetical order.
4. the directory display requires only one attendant 221 action to return to the previously viewed call information display.

Call History: Referring to FIGS. 15*a* and *b*, a visual indication is provided on the screen 222, revealing which workstation 212 is currently being displayed on the screen 222. As described above, there are four positions 252 in the call history log 251 to hold call history information. With no active E9-1-1 call 201 present, the four positions 252 may be used to show the last four E9-1-1 calls 201 in their order of arrival. With an E9-1-1 call 201 active, there are three of those positions filled with call history data and the fourth position contains the active E9-1-1 call 201 information. All of the data in these positions 252 is kept in order of E9-1-1 call arrival, i.e., FIFO (first in first out). The call history display on the screen 222 (FIG. 15*a*) contains the following information:

| | Call History Display Chart CH1 |
|---|---|
| Line # on Screen 222 | Data |
| 7 | The ANI data received with the call 201. |
| 10-14 | Any ALI information retrieved from the ALI/DMS for the E9-1-1 call 201. |
| 9 | The telephone number entered for ALI Fetch, if any |
| 19-22 | All call origination information |
| 15-16 | Selective transfer points 225 for the E9-1-1 call 201. |

Routing Information: Referring to FIG. 15, the workstation display on the screen 222 contains an indication of the route by which the E9-1-1 call 201 arrived at the attendant's position.

| Call Routing Display Chart | |
|---|---|
| Line # of Screen 222 | Data |
| 8 | This display field indicates to the attendant 221 whether or not: The E9-1-1 call 201 is a transfer from another attendant. The E9-1-1 call 201 was routed to the PSAP 216 because of routing rules established for the C.E.R.S. system 200. Information displayed must distinguish between the following routing reasons: New call (Selective routing). Alternate routing. PSAP 216 Abandoned. Default routing. Night Service routing. Last Chance routing. Switch-controlled Default routing. Attendant-initiated call (includes call back and calls initiated internally). Unknown. |

The information displayed pertains to the routing method last used to route the E9-1-1 call 201 to the call handling destination 215 receiving the E9-1-1 call 201.

Abandoned Calls: Referring to FIG. 15, line 24, a message 263 is displayed on the workstation screen 222 when the attendant 221 picks up an unanswered abandoned E9-1-1 201 call. A message 263 is also displayed when a caller 202 disconnects prior to the attendant 221 terminating the E9-1-1 call 201 (answered abandoned call).

Broadcast Messages: Each display on a screen 222 has space available for broadcast messages 288 from the platform administrator 239. These messages 288 can only be displayed when no E9-1-1 call 201 is active. If a message 288 is broadcast during an E9-1-1 call 201, it will be displayed when the E9-1-1 call 201 is terminated.

Management of C.E.R.S. System 200

Figure 30:
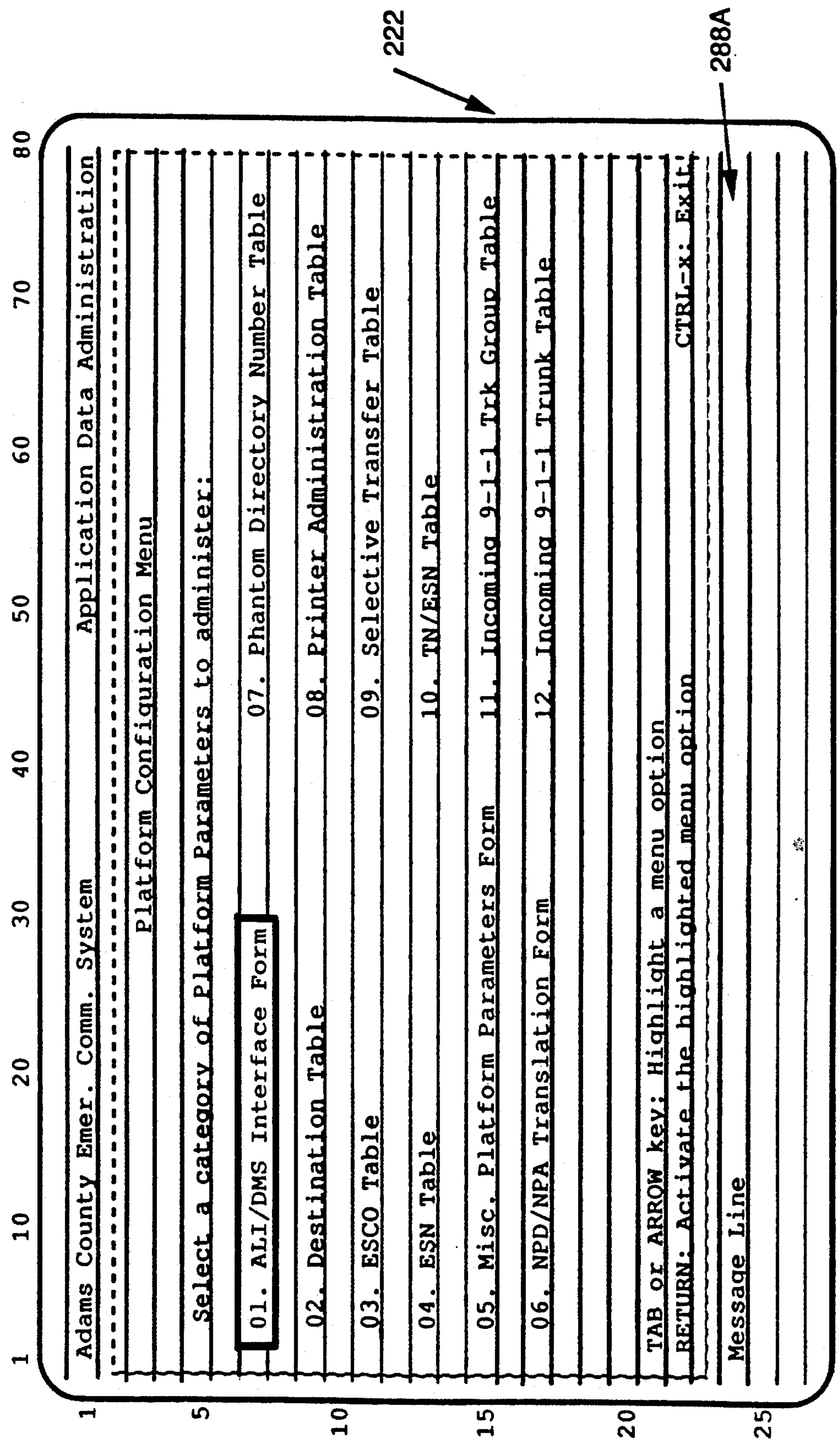
FIG. 30 is a diagram of a screen which enables a platform to be configured.

Three C.E.R.S. system management capabilities are provided and are generally described as follows:

Administration: Referring to FIGS. 30, administration of the system 200 involves, among other things, the configuration of several different parameters (e.g. platform configuration that can be changed to control an individual PSAP 216 and those parameters that control features the functionality of which is the same over the entire platform 204. Administration by the PSAP manager 259 (FIG. 1) can only be performed at a PSAP workstation 212 that is Not Receiving Calls. Administration by the platform administrator 239 can be performed at an administration terminal 276 located at the platform 204 as well as a PSAP workstation 212 that is Not Receiving Calls.).

Figure 31:
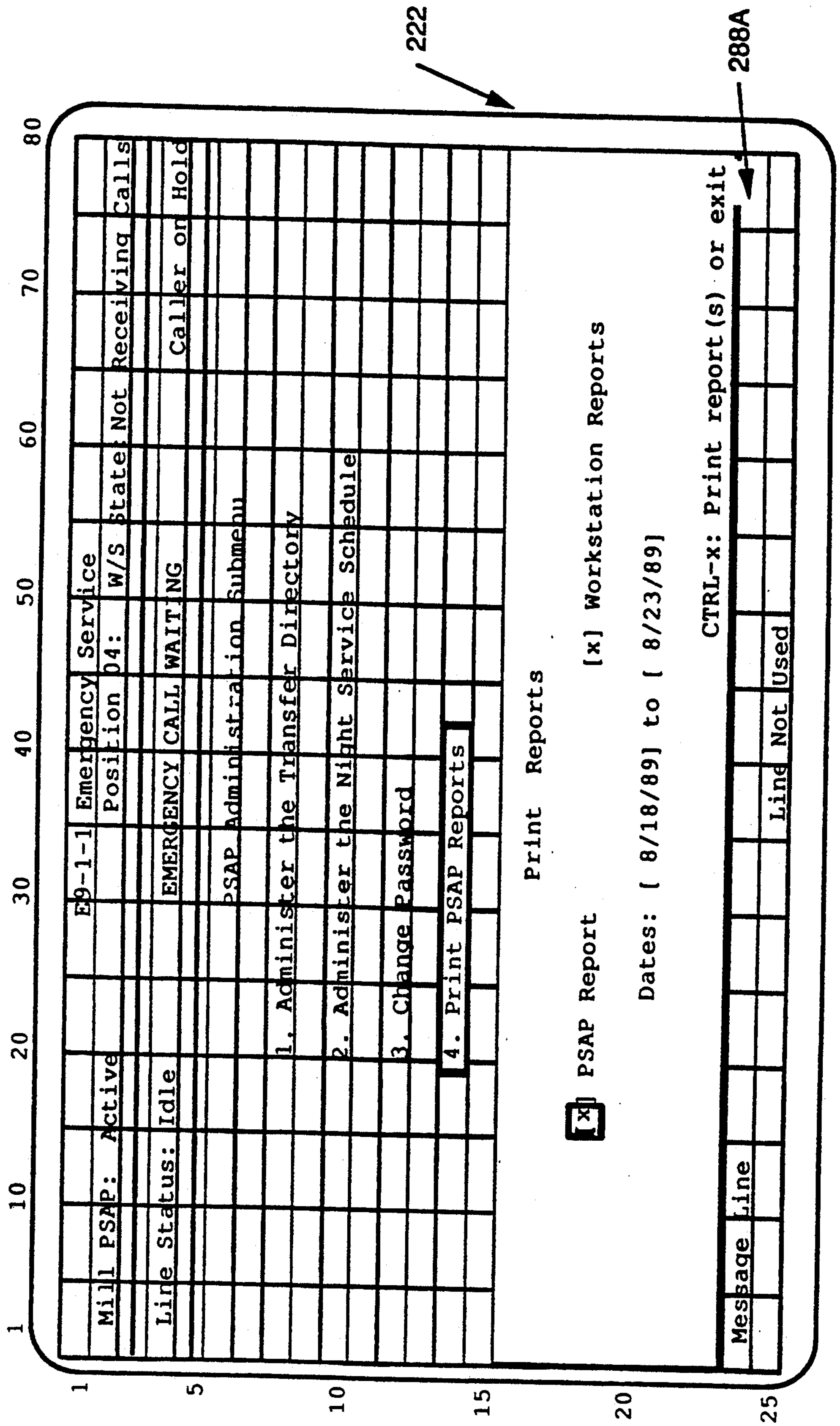
FIG. 31 is a diagram of a screen which enables night service states to be administered.
Figure 32:
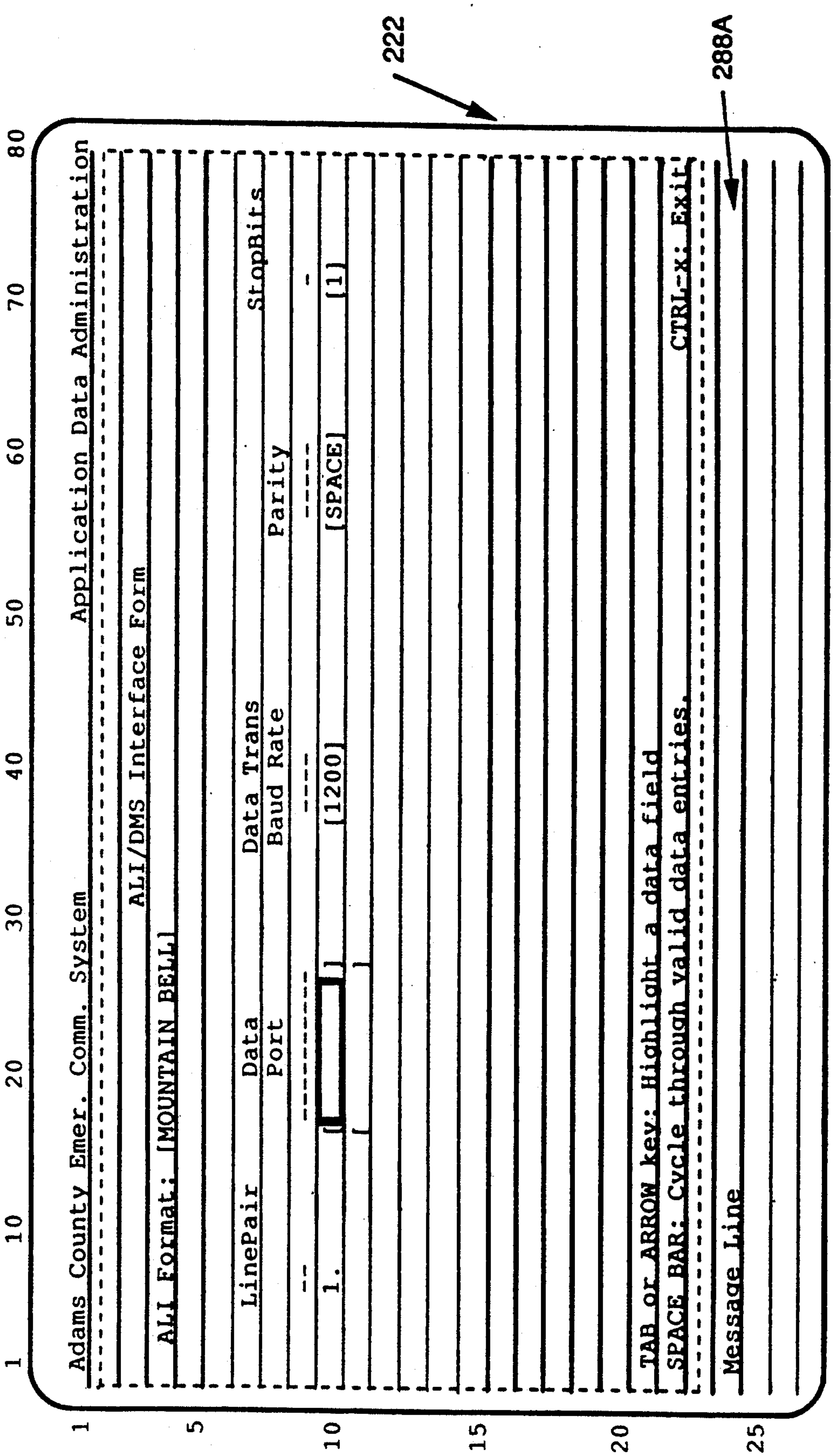
FIG. 32 is a diagram of a screen indicating an ALI/DMS interface.

Reports: Reports (FIG. 31) are produced that assist in both the administration and maintenance of the C.E.R.S. system 200.

Operational Support Software: This allows connection of the system 200 to a remote operational support system for Network Elements (not shown).

Platform 204

The above description of FIG. 1 referred to hardware and software components used to configure the C.E.R.S. platform 204. The following describes the platform 204 to facilitate an understanding as to how the platform hardware and software form the C.E.R.S. system 200. Where reference numbers do not appear for a particular platform item, the particular item is not specifically shown, but is included in the platform 204 shown in FIG. 1.

The main components of the platform 204 are (1) the switch 218, (2) generic switch software, (3) a switch administration terminal, (4) switch maintenance printers, (5) the applications processor (AP) 234, AP operating system software, (7) AP reports printers, (8) an AP log printer, (9) an AP system administration console or terminal, (10) an E9-1-1 administration console or terminal, (11) dial-up modems, (12) a host command interface, (13) datasets for host command interface (HCI) links, (14) the platform's PSAP modems and (15) C.E.R.S. applications software.

Switch 218: The platform 204 uses a Mitel GX5000 as the switch 218. The GX5000 switch 218 consists of four main components, (1) a main control section, (2) peripheral control sections, (3) digital service units (DSUs), and (4) peripheral interface cards (PICs). The main control section provides direct control of the peripheral control sections, the DSUs and indirect control of the PICs. It also provides the user interface for both maintenance and customer data entry (CDE) translations. The GX5000 switch 218 includes a main control processor which executes its operating system from random access memory (RAM). It also maintains a copy of the current switch activity, as well as system messages 288 (FIG. 1) used by the main control processor, to handle normal system operation. The RAM used by the switch 218 is split between a main control card (a PIC) and a control RAM II card (a PIC).

The incoming ES trunks 206 provide connections to the ESR's end offices 205 into the platform 204. The incoming ES trunks 206 for the platform 204 are standard message trunks and terminate on the switch 218. Outgoing trunks provide the PSAPs 216 with access to ESR's 202 and ESP's 211 in the public switched telephone network (PSTN) 219.

Two-wire dedicated private-line facilities 245 from the switch 218 connect the platform 204 to each telephone set 227 of each workstation 212 at each public safety answering point (PSAP) 216. The identical telephone line 241 is also provided for the notification device 242 at the PSAP 216. The telephone sets 227 and the notification device 242 at each PSAP 216 adhere to certain transmission, signalling, and loop requirements. These requirements are detailed in the Bell Communications Research document LATA Switching Systems Generic Requirements TR-TSY-00064 (PUB 48501).

Application Processor (AP) 234: The applications processor 234, may be an IBM System/88 processor, a Stratus computer running the VOS operating system. The VOS operating system is a multi-process environment with IPC mechanisms, system events, time events, and supports a variety of file I/O mechanisms. The Stratus computer has duplicated hardware components and can be configured with parallel processors. It achieves a level of fault tolerance by comparing results from different hardware components. The Stratus hardware and VOS operating system makes the fault tolerance and parallel processing abilities transparent to software. IBM System/88 operating system software provides operating system functions for the C.E.R.S.

application software 287. Various circuits and the modems interconnect the AP 234 to the PSTN 219. Via the PSAP modems, the data circuits provide connectivity between the platform 204 and the PSAP workstations 212, and printers 255. The PSAP modems have the following parameters: CCITT V.22bis modems, which operate at 300, 1200 or 2400 bps., two-wire, full-duplex, dedicated (i.e., leased) line, and asynchronous.

Circuits provide connectivity between the platform 204 and the (ALI/DMS). The connection between the AP 234 and the All/DMS database 224 requires one pair of RS-232C physical connections between the AP 234 and ALI modems at the platform 204. Dedicated four-wire facilities between the platform's ALI modems and an ALI/DMS D line support the platform 204. The platform 204 supports one pair of the ALI retrieval lines. The ALI modems are two full-duplex, asynchronous modems running at 1200 bps.

The host command interface (HCI) links provide communications links between the AP 204 and the switch 218. The HCI allows both the AP 234 and the switch 218 to send and receive messages and commands. The HCI consists of two DNI cards on the switch 218 and two 2103 datasets (not shown), and two 1629 UCA cards on the AP 234. Twisted pairing wiring (not shown) connects the switch's DNI cards to the 2103 datasets by way of a CO main distribution frame. This wiring is connected between the 2103 datasets and CO main distribution frame, and between the CO main distribution frame and the DNI cards.

The C.E.R.S. Platform 204 and the PSTN 219: Proper interaction between the platform 204 and the PSTN 219 requires the following engineering considerations: (1) telephone numbering and dialing plan, (2) incoming E9-1-1 calls 201, (3) non-9-1-1 incoming calls from the PSTN 219, (4) outgoing calls from the platform 204 to the PSTN 219.

When an incoming E9-1-1 call 201 is answered by a PSAP attendant 221, the incoming E9-1-1 call 201 may be transferred to an ESP 211. If the ESP 211 is another C.E.R.S. system PSAP 216, the transfer is made internally by the platform 204 without interaction with the PSTN 219. Transfers from a PSAP 216 to an ESP 211 in the PSTN 219 are handled differently from transfers to other PSAPs 216. E9-1-1 calls 201 from a PSAP 219 to a public telephone ESP 211 are routed by the platform 204 to the switch 218. The switch 218 connects the E9-1-1 call 201 to the intended ESP 211 by utilizing normal PSTN connections.

There are provisions for direct inward dialing from the PSTN 219 to the platform 204. Service for non-9-1-1 calls from the PSTN 219 to the platform 204 are through existing local lines in the PSAP region 209 or in new PSAP sites through the addition of outside business lines (not shown).

The platform 204 can support up to one hundred attendant workstations 212 distributed over a maximum of twenty PSAPs 216. Each PSAP 216 is also equipped with the notification device 242 that requires a telephone number. Additionally, the platform 204 can support configurations in which only telephone lines (not shown) are connected to secondary emergency service providers (ESPs) 211, without accompanying data terminals. Any telephone number can be assigned to these extensions. PSAP attendants 221 can transfer calls from their workstation telephone sets 227 to other PSAPs 216 by simply dialing the telephone number assigned to the destination PSAP 216.

The switch 218 is administered so that PSAP attendants 221 can make E9-1-1 call 201 connections to ESR's 202 in the PSTN 219. If translations in the switch 218 determine that the call 201 is intended for a public telephone ESR 202, the E9-1-1 call 201 is routed by the platform 204 to a trunk connected to a switch in the PSTN 219. The switch 218 then routes the E9-1-1 call 201 to the intended ESP 202. The switch 218 is responsible for providing equal access.

Incoming E9-1-1 Calls 201 When an ESR 202 dials "9-1-1" the digits are interpreted as an emergency E9-1-1 call 201 by a switch (not shown) of the end office 205 that serves the ESR 202 (FIG. 1). The E9-1-1 call 201 is then forwarded from the end office 205 to the platform 204 by the ES trunks 206 which are designated by their traffic use code as emergency service trunks. FIG. 1(*a*) illustrates an incoming 9-1-1 call 201. Automatic number identification (ANI) accompanies most incoming E9-1-1 calls 201. The ANI is used by the platform 204 to determine the correct PSAP 216 to serve the E9-1-1 call 201 and to obtain the location of the telephone 207 of the ESR 202 placing the E9-1-1 call 201. The following Chart PSTN identifies the characteristics required of the PSTN 219 for the platform 204 to process incoming E9-1-1 calls 201 properly:

Chart PSTN

1. Routing tables of the end office 205 must be modified to direct all "9-1-1" call attempts to the ES trunk group dedicated to the platform 201.
2. Each wire center within the service area 208 served by the C.E.R.S. system 200 must provide ES trunks 206 to the platform 204.
3. Called party dialed digits are sent on all ES trunks 206 even though the called digits (i.e., "9-1-1") are always the same. This allows the platform 204 to distinguish between actual "9-1-1" calls and other types of seizures of the ES trunk 206, such as:
   a) false trunk seizures resulting from carrier facilities failure or from spurious noise.
   b) seizure for testing purposes.

In either of these cases, the trunk seizure must not result in an E9-1-1 call 201 directed to a PSAP 216. Transmittal of called party information helps prevent these types of trunk seizures from being connected to the PSAPs 216. The called party digits which are sent can be "9-1-1", "1-1" or simply "1".
4. Incoming ES trunks 206 are configured to be one-way outbound trunks from each end office 205 to the platform 204. The trunks 206 are one-way to prevent the PSAP 216 from inadvertently blocking incoming E9-1-1 calls 201 with outbound telephone traffic from the PSAP 216.
5. Incoming ES trunks 206 must be designed to give the PSAP attendant 221 control of disconnect. This configuration allows the attendant 221 to better control the emergency situation. However, for a brief time period between the initiation of an E9-1-1 call 201 and the final connection to the PSAP attendant 221, the calling party (ESR) 202 still has control over disconnect.
6. If the platform 204 receives an E9-1-1 call 201 without ANI, the platform 204 will manufacture a fictitious ANI for that E9-1-1 call 201. The form of the fictitious ANI is a seven digit code: 911-0XXX, where XXX represents the ESCO number of the originating end office 205. ANI failure can occur for several reasons:
   a) Central office ANI equipment failure.
   b) When the 9-1-1 caller (ESR) 202 is on a multi-party line. E9-1-1 calls 201 from these party lines cannot be automatically identified and always require operator number identification (ONI).
   c) When the 9-1-1 caller (ESR) 202 is on a PBX line which does not support automatic identified outward dialing (AIOD).

As discussed when an E9-1-1 call 201 arrive without accompanying ANI, the platform 204 directs the E9-1-1 call -continued

| Chart PSTN |
|---|
| 201 to a PSAP 216 using default routing tables and information derived from the incoming trunk group. |
| 7. The platform 204 only accepts ANI composed of seven digits. |

Outgoing Calls from the Platform 204 to the PSTN 219: Outgoing calls from a workstation telephone 227 to subscribers 202 in the PSTN 219 are considered essential to E9-1-1 service. Outgoing calls to the PSTN 219 are generated at a PSAP 216 when an attendant 221 transfers an E9-1-1 call 201 to a destination 215 in the PSTN 219, or when the attendant 221 initiates a new call to a public telephone subscriber 202.

Modifications to AP 234 and Switch 218: Some of the features provided by the platform 204 are accomplished by using the platform equipment in a manner that is unusual for emergency call applications. Other aspects of the C.E.R.S. system 200 result from providing certain hardware configurations on the switch 218 that are not normal to a call routing switch such as the Mitel GX5000 switch 218.

Phantom Directory Numbers: An E-9-1-1 call 201 that arrives at the switch 218 over an emergency service trunk 206 is placed in a temporary holding state. The temporary holding state is based on use of a phantom directory number (PDN), which allows the AP 234 to interact with the switch 218 and send the E9-1-1 call 201 to a destination based on the call routing features of the platform 204. The PDN is implemented using a signal party line (or SPL) circuit without an attached terminal device (i.e., no attached telephone). There must be at least one PDN circuit allocated for each emergency service trunk 206.

The incoming emergency service trunks 206 are organized into switch trunk groups based on their associated originating central office (CO) 205. These emergency service trunk groups are administered to direct E-9-1-1 calls 201 that they receive to a hunt group DN. The hunt group DN has PDNs as members and is organized to selected an idle PDN by way of a circular selection pattern. All E9-1-1 calls 201 received from a CO can be directed to a unique PDN hunt group pilot DN. The PDN hunt group DN is administered to reroute the E9-1-1 call 201 to a switch-determined default destination 215 after a certain programmable period of time. This re-rerouting capability has the following features:

1. It allows the platform 204 to direct E9-1-1 calls 201 from a particular CO, or group of trunks from a CO, to a unique default call handling destination.
2. It is used to accomplish the switch default routing feature described below.
3. A second default call handling destination is administered in the PDN hunt group in case the first call handling destination is not available.

ESRs hear ringing while they are connected to a PDN.

This time period of ringing is relatively short, less than two seconds. An extra PDN may be provided per emergency service trunk group. This extra PDN is used to ensure that the loss of a PDN single party line circuit will not result in fewer PDNs than incoming emergency service trunks 206. Also, PDNs in a particular PDN hunt group may be distributed across multiple switch single party line circuit cards.

PSAP Notification Lines 241 Each PSAP 216 has one of the notification devices 242 which signals the arrival of an E9-1-1 call 201 at the PSAP 216. These devices 242 are connected to the switch 218 by the single party line circuit. The switch 218 also provides an additional backup circuit in the event that this circuit fails. Ringing is applied to this line when the PSAP 216 receives an E9-1-1 call 201. The notification device 242 may be a common audible ringer or a visual notification device which uses ringing voltage to announce the arrival of an E9-1-1 call 201 on the notification line 241. The notification device 242 should be installed in or near the PSAP workstations 212 in an easily discernable location. Because a PSAP 216 can have more than One E9-1-1 call 201 directed to it at any particular time, the platform switch 218 implements a first-in, first-out call queue in front of the PSAP notification line 241.

The notification line 241 is the only member in a PSAP hunt group. This PSAP hunt group is administered to support queuing, to form a PSAP hunt group queue. Any E9-1-1 calls 201 sent to the PSAP 216 while the notification line 241 is occupied are queued by the switch 218 at the PSAP hunt group queue. When the notification line 241 is idle, the first E9-1-1 call 201 in the PSAP hunt group queue is moved to the notification line 241. The platform 204 removes the ringing voltage from the notification line 241 when the E9-1-1 call 201 is picked up by a PSAP attendant 221. This has the following consequences:

1. If there are no more E9-1-1 calls 201 in the PSAP hunt group queue, the notification device 242 will deactivate.
2. If the notification device 242 does not deactivate there are more incoming E-9-1-1 calls awaiting being handled at the PSAP 216.

Figure 4A:
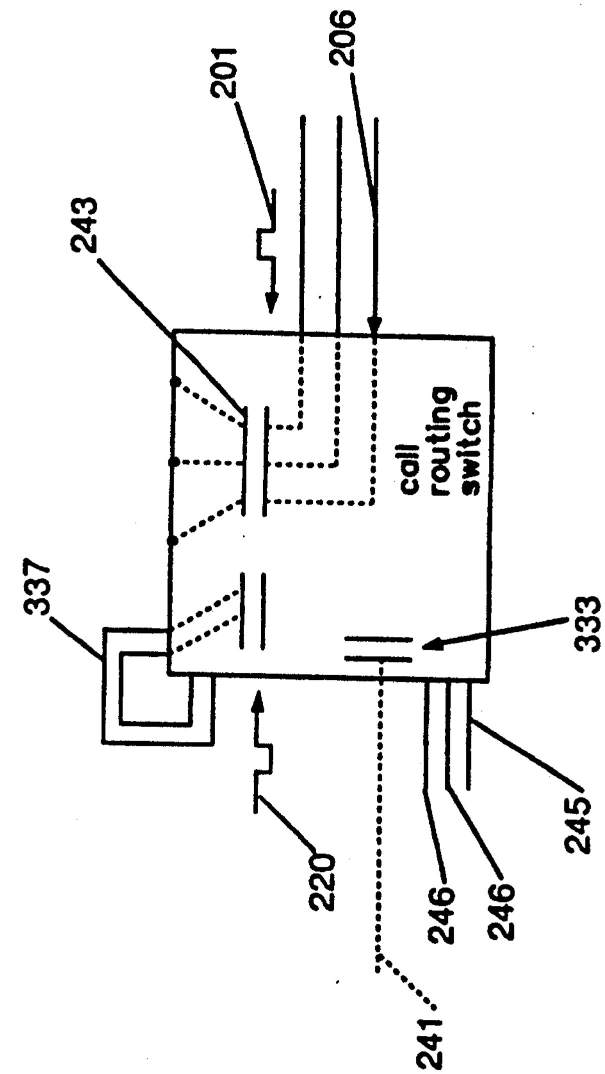
FIG. 4A is a schematic diagram of the switch, showing internal circuits for use in routing an incoming E9-1-1 call to a PSAP.
Figure 4B:
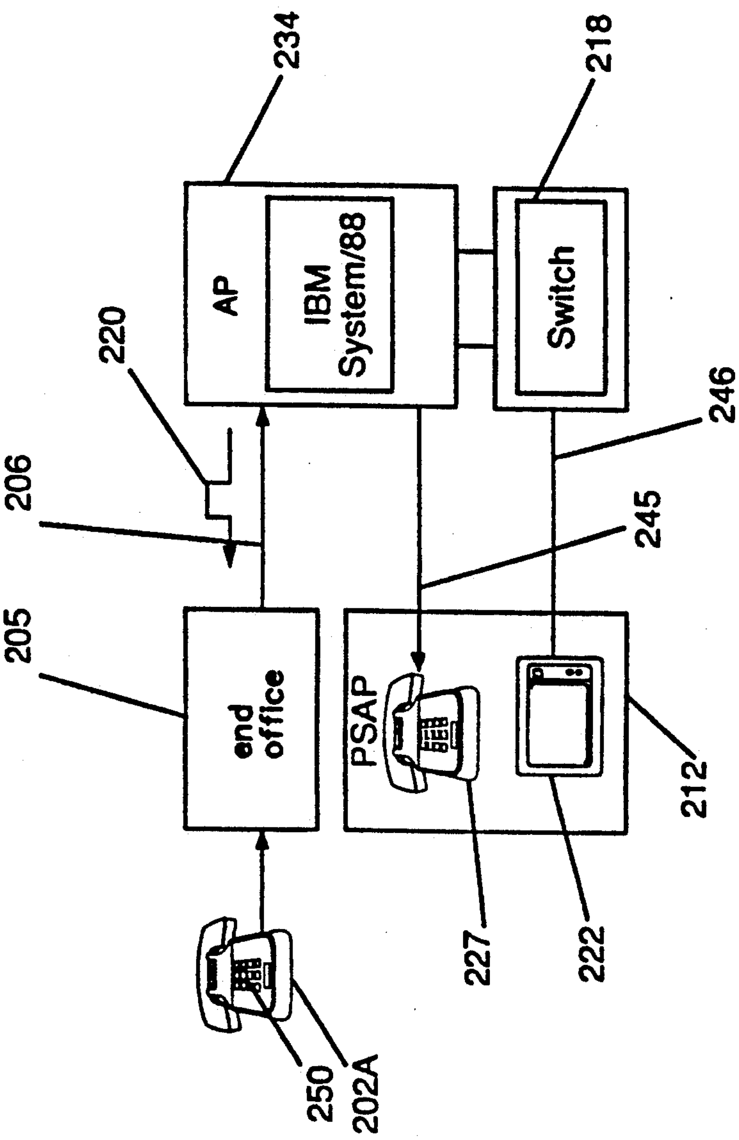
FIG. 4B is a schematic diagram illustrating an incoming E9-1-1 call being routed to the C.E.R.S. system.

Loop-Back Trunks for Busy Tone: Features of the platform 204 can require that an ESR 202 be connected to a busy tone 220 (FIG. 4B). To accomplish this, the platform 204 directs the E9-1-1 call 201 to a special outgoing or loop-back trunk group or outgoing busy-tone trunk group having outgoing trunks connected to loop-back trunks 337 (FIG. 4A).

When no outgoing busy tone trunks 337 are available, the platform 204 disconnects the E9-1-1 calls 201 that would have been routed to the busy tones 220. If no loop back trunks 337 are available the ESR 202 is disconnected and control is reverted to the ESR's end office 205. Incoming trunks 206 are administered such that E9-1-1 calls 201 to unknown DNs are given a busy signal 220.

In a preferred embodiment, a circular hunt group is configured on the switch 218 for the loopback trunks for the busy the tone. This circular hunt group has as members all of the outbound loop-back trunks used to provide busy tone.

Interaction of the Switch 218 and the AP 234: The switch 218 provides an interface to the AP 234 for the following devices:

1. the incoming trunks 206 to receive emergency calls 201 (combination of ANI and non-ANI capable trunks).
2. the outgoing trunks 302 to originate calls and transfer calls to TN of the PSTN 219.
3. control of the PSAPs common notification line 241 to the PSAP 216.
4. the telephone lines 245 to the PSAP attendants 221.
5. telephone lines to DNs connected to the switch 218.
6. special platform devices such as the PDNs 327.

The switch 218 allows the AP 234 to manipulate these devices (via the translate command) and receive notification (via the monitor command) when an event occurs on a DN or a trunk 206. A DN can be a line or a trunk. The translate command sent to the switch 218 from the AP 234 converts a DN into a logical equipment identifier (LID) and allows the AP 234 to manipulate these DNs. When an E9-1-1 call 201 is in progress on a monitored LID, the switch 218 sends the AP 234 a message 288 with a unique call reference numeric identifier. The call reference number is unique to a particular E9-1-1 call's LID and is used to track that instance of an active call on that particular LID. Two LIDs involved in the same E9-1-1 call generally have different call reference numbers. A device which is idle or unavailable has a nil (0) call reference number.

Architecture of C.E.R.S. System 200

Figure 6:
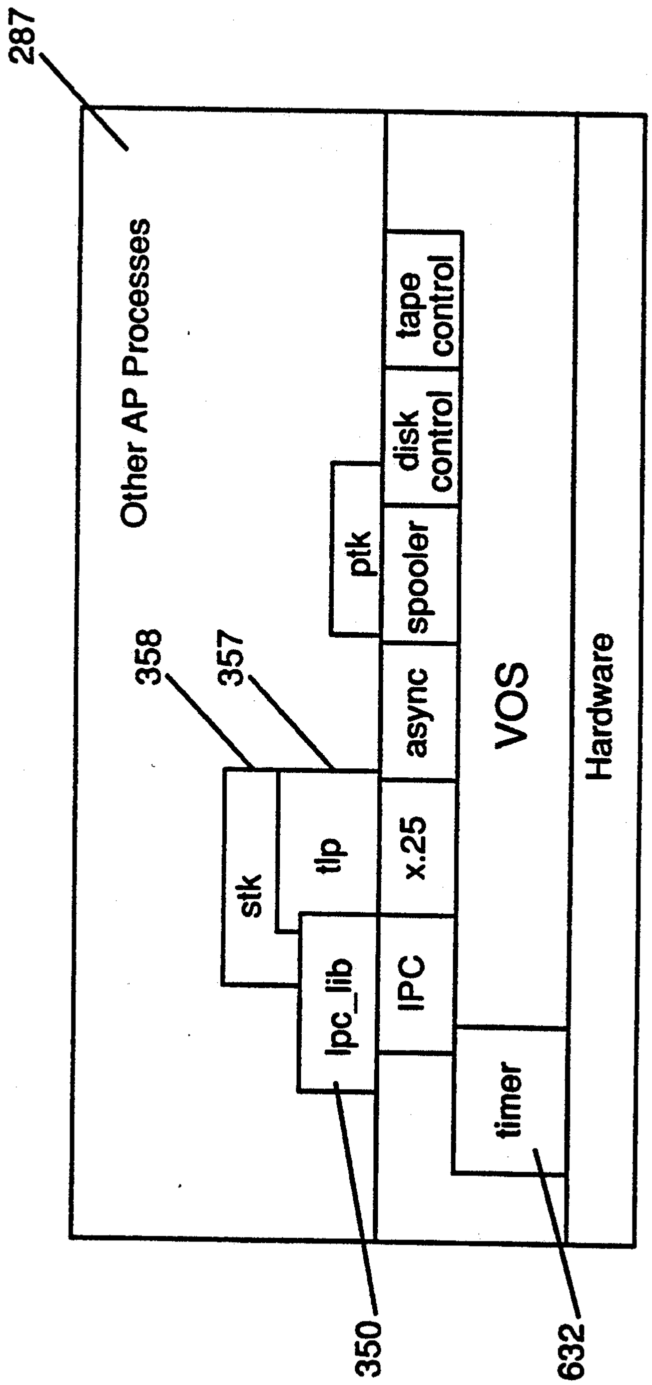
FIG. 6 is a schematic diagram of the interface layers of software used in the platform, including an stp process which interfaces with an HCI interface to the switch.

The C.E.R.S. system 200 is designed to interface with the PSTN 219 and other external systems to perform its function of establishing a voice connection from an ESR 202 on the PSTN 219 to an ESP facility 211. This function is provided by the platform 204 operating under the applications software 287. Referring to FIG. 6, service layer software 350 of the C.E.R.S. system 200 provides a generic foundation on which application software 287 is based. Included within the service layer software 350 are the following capabilities:

1. Initialization and shutdown of the system 200.
2. x.25 HCI link layer interface to the switch 218.
3. Switch application command interface and distribution of switch messages 288 to application processes 351 of the application software 287. Notification of switch 218 HCI link 283 status.
4. Measurements collection mechanism.
5. Inter-process communication facilities.
6. Interfaces to shared memory.
7. Process discrete and interval timing notification facilities.
8. Asynchronous inter-process communication and I/O port control via system event facilities.
9. Log message: ability to log files, console, and standard out. Allows severity classification of error messages, logging process id, and a system wide unique error number for each message 288. Used with system error and debugging/development messages 288.

In general, each application process 351 must provide:

1. Conform to the init process 352 interaction scenarios.
2. Dump metrics before exiting.
3. Close all IPC connections before exiting.
4. All log messages 288 must contain system-wide unique error numbers based on the process error base and contain sufficient information to determine what the problem is and what features or services are affected by the problem.
5. Message logging with a process 351 is designed such that a process 351 does not log the same message 288 repeatedly in a short period of time (30 minutes). Errors that can result in multiple instances are throttled within the controlling process 351.
6. Each process 351 declares certain global variables that are utilized by software libraries (not shown). Two of these libraries are Lib_err_num and Sys_err_num. Lib_err_num is set to a value based on the library's assigned numeric range in a cascade.h process (not shown). Sys_err_num is similarly set to any error value that is returned from an operating system provided call.
7. Processes 351 that have multiple other processes 351 connected to them ensure that an other process request to connect is not a duplicate request. (i.e. the process 351 terminated without disconnecting and is now re-connecting). If a duplicate connected request is determined, the server process 351 terminates the previous other process connection including disconnecting the old IPC connection and opening a new connection.

The software libraries and sub-components to processes 351 adhere to the following guidelines:

generic libraries which do not log messages 288 other than of a class ML_TRACE_LIBRARY. The process 351 returns unique error numbers based on the assigned library log message base. The global variables Lib_err_num and Sys_err_num must both be set.

Overview of Applications Software 287

Figure 7:
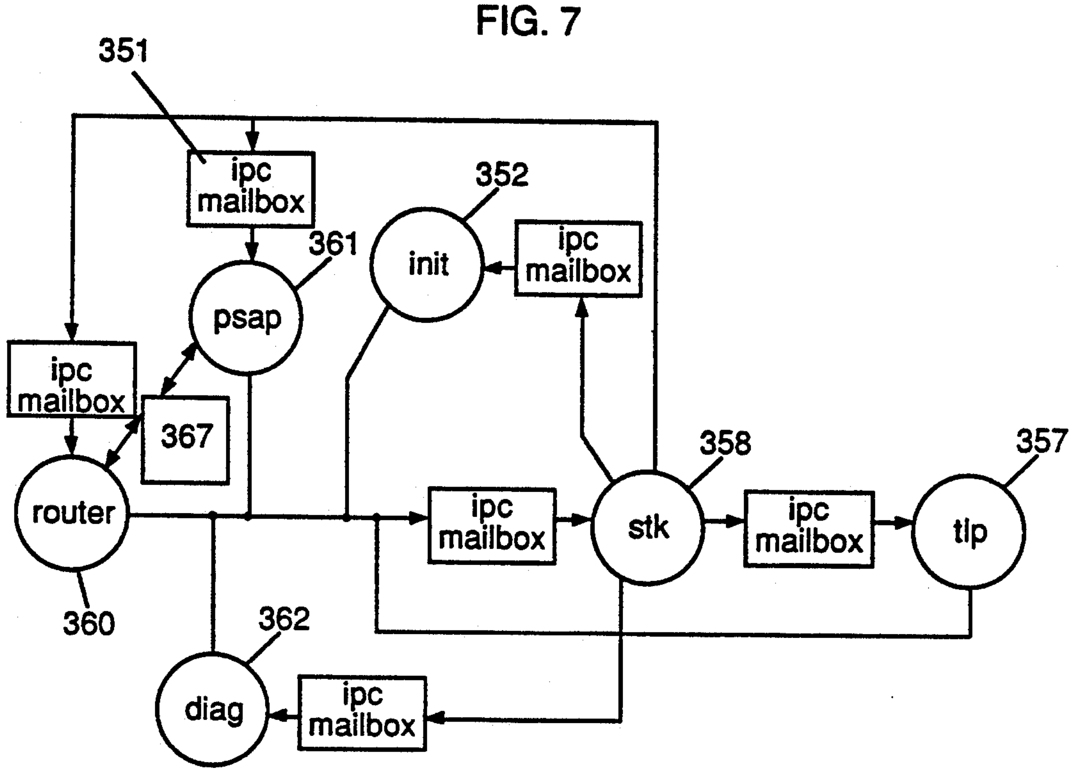
FIG. 7 is a schematic diagram showing other AP software processes with which the stk process functions, including router and psap processes.
Figure 8:
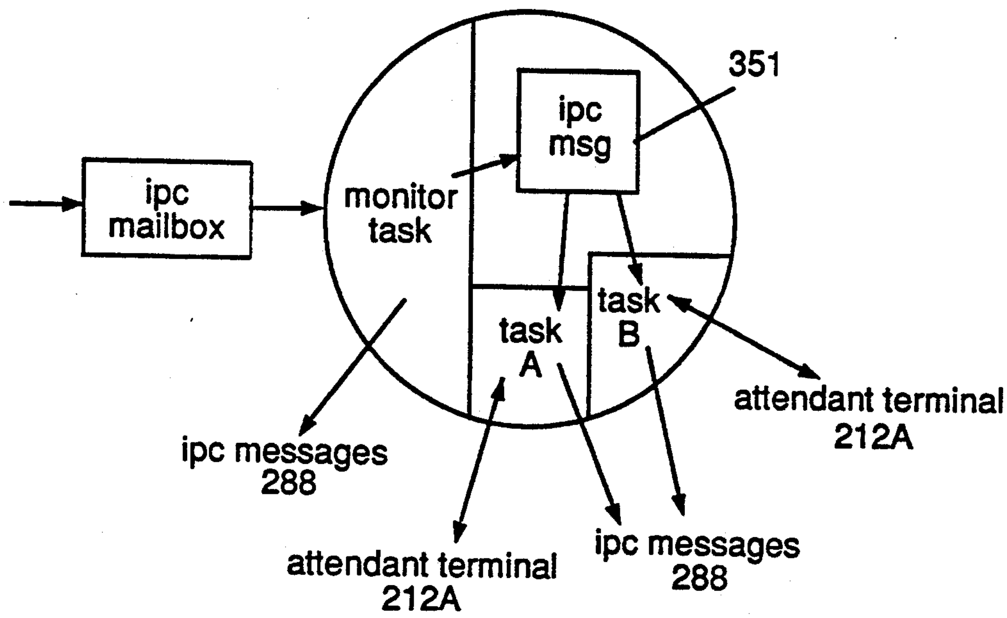
FIG. 8 is a schematic diagram of the internal architecture of the psap process.
Figure 9:
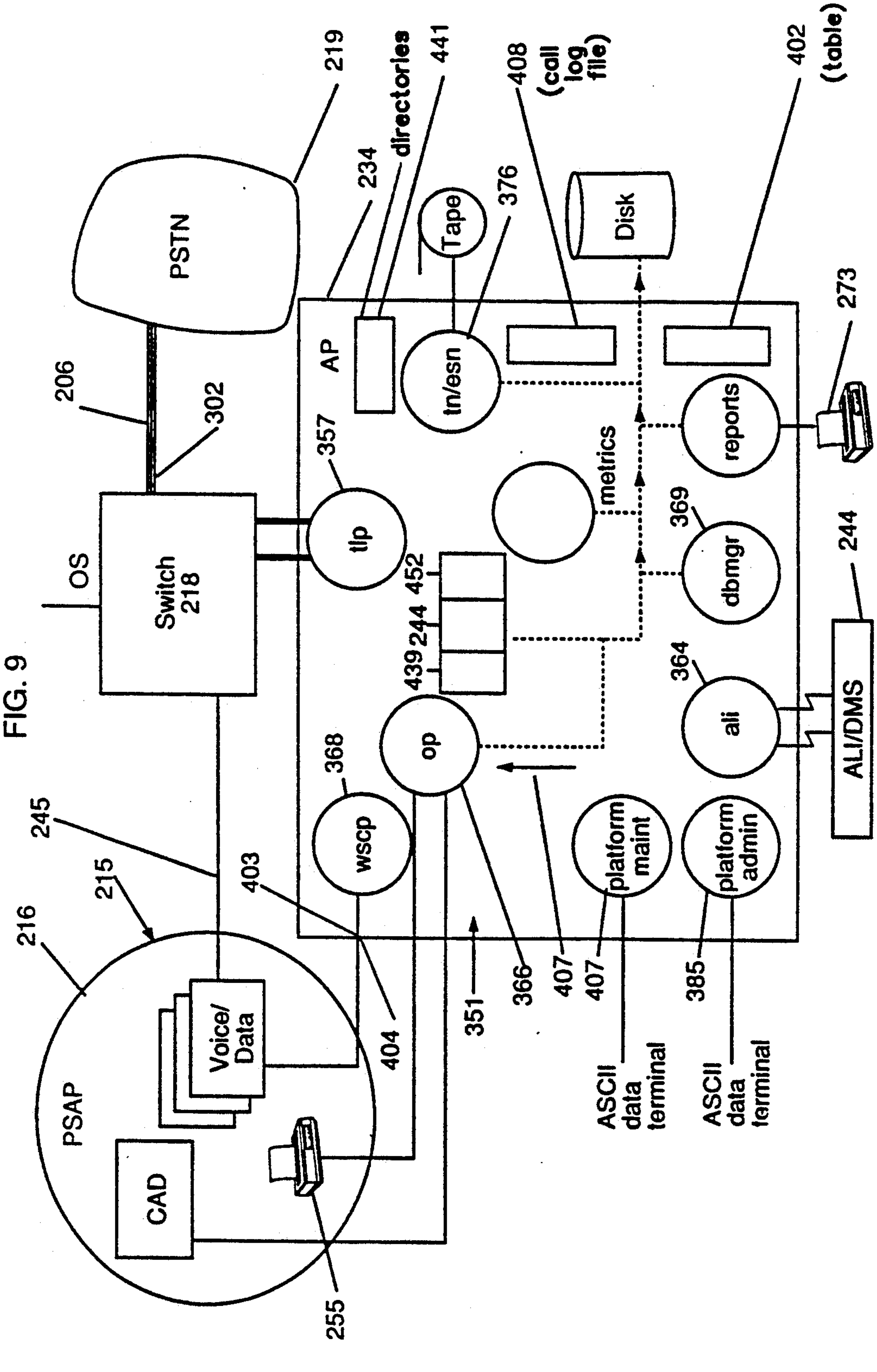
FIG. 9 is a schematic diagram of the external interfaces of the AP software used to route an incoming E9-1-1 call to a PSAP.

Referring to FIGS. 7, 8 and 9, processes 351 are either permanent or transient processes in the system 200. Permanent processes 351 are started at initialization of the system 200 and do not terminate normally unless the system 200 is brought down or is re-configured (i.e. another PSAP 216 is added). The application software 287 is started by executing the VOS command macro file e911.cm. e911.cm performs any environmental checks and associated setup. The command macro then starts the init process 352 which is the parent to all other permanent processes 351. When the AP software 287 is installed a batch job is established to invoke e911.cm. The batch job has the attribute that it is restarted if the AP 234 re-boots.

The following processes 351 are permanent processes that are started at initialization of the C.E.R.S. system 200:

| | | | | | | | |
|---|---|---|---|---|---|---|---|
| 1) | init | 2) | tlp | 3) | stk | 4) | mtk |
| 5) | dbmgr | 6) | op | 7) | ali | 8) | router |
| 9) | psap | 10) | diag | 11) | fiso | 12) | cm |
| 13) | wscp | (s) ∅ or more of these processes are started. | | | | | |

The following processes 351 are transient processes that are associated with a particular operation, such as system administration, maintenance, or report regeneration:

| | | | |
|---|---|---|---|
| 1) | tnesn_tools | 2) | adm_dbedit |
| 3) | format_tnesn | 4) | rpt |
| 5) | init_shutdown | 6) | ml_set_log |
| 7) | dpsc | 8) | platform_maint |
| 9) | platform_admin | | |

Init Process 352 (FIG. 71 The init process 352 is a permanent process started by the e911.cm command macro. Init is the parent process for all other permanent processes (i.e. init starts all other permanent processes). The init process 352 performs the following duties: (1) permanent process start up, (2) monitoring for death of child processes, (3) constant monitor of each process for basic sanity, and (4) shutdown of all permanent processes.

The init process 352 determines what processes 351 to start by inspecting the proc_tbl.dat file. This file also indicates the start up order of the processes 351, each processes' associated command line arguments, and whether the process is critical to operations of the system 200. Each process 351 that init 352 starts is required to acknowledge successful start-up via an IPC message 288 back to init 352. Init 352 has an IPC connection to each permanent process 351 and each permanent process 351 has an IPC connection to init 352.

After all processes have been started init 352 waits for process termination, routinely monitors each processes' basic sanity, and waits for other command inputs. Child processes of init must respond with a positive acknowledgment message when init sends one a constant monitor message. If the child does not respond to several constant monitor messages init assumes that the process is no longer functioning correctly and takes corrective action.

Tlp Process 357 (FIG. 7): A transport layer process (tlp) 357 is a permanent process that provides the AP x.25 message transport connectivity to the switch 218 via the HCI link 283. Two links are operated in tandem to provide redundancy. The tlp process 357 interfaces with an stk process 358 (FIG. 7) to provide client processes with a switch command interface. The tlp process 357 performs the following operations:

x.25 transport interface control between the AP 234 and the switch 218. The tlp process 357 interfaces with the AP x.25 interface board to provide the HCI 282 connectivity. Provides adherence to the transport methodology of the HCI link 283 including sending commands down one link and receiving responses on both links.

2. Monitoring and recovery of the two HCI links 283 between the AP 234 and the switch 218.
3. Message sequence number maintenance and recovery.
4. Collection of and forwarding of complete x.409 messages 288 to the stk process 358.
5. Reception of complete x.409 messages 288 from the stk process 358, x.25 packaging, and control of transporting to the switch 218.
6. Monitoring status of links 283 and reporting to the stk process 358.
7. Consideration to flow control of the HCI link 283.

The init process 252, and the stk process 358 connect (via IPC) with the tlp process 357.

Stk Process 358 (FIG. 7): The switch tool-kit (stk) process running on the AP 234 provides an interface to the switch 218 for all processes 351 desiring an interface with the application software 287. The stk process 35B converts LIDs from the switch 218 to switch identifiers (SIDs) when processing requests or sending status information to clients, and:

1. Completes the encoding of x.409 messages 288 before transport to the switch 218 and decoding after reception of messages from the switch 218.
2. Ensures that processes 351 eventually receive a from request.
3. Allows more than one process 351 to receive monitor information about a particular line without the overhead of multiple monitors to the switch 218.
4. Ensures that only one request per DN has been sent to the switch 218. The stk process 358 queues one outstanding requests per DN.
5. Notifies processes 351 of HCI link status.
6. Provides function primitives for processes 351 to access capabilities of the switch 218.
7. Provides a level of message filtering to processes 351.
8. Cooperates with the tlp process 357 to implement the end-to-end HCI transport service.
9. Recovery of translate and monitors on DNs in the event of an HCI link 283 failure.

The following processes connect (via IPC) with the stk process: (1) the init process 352, (2) the tlp process 357, (3) a router process 360, (4) a psap process 361, and (5) a diag process 362.

Mtk Process 363: A mtk (metric tool kit) process 363 alerts and assists client processes to write measurement (or metric) data. These features are provided through the mtk process 363 and associated library routines.

The mtk process 363 allows its clients to connect to it and register the metrics type they will be collecting. The mtk process 363 matches this metric type with entries in a metrics_tbl.dat file to determine the data collection interval. It then sets system timer events (e.g., for Night Service (FIG. 24)) so that it can send an IPC message 288 to clients at the appropriate time. The client process write metrics to specific file based on metric type via utilities provided by the mtk process 363. The following processes connect with the mtk process 363 and write metrics: (1) the router process 360, (2) the psap process 361, (3) an ali process 364, and (4) the diag process 362.

The router Process 360: The router process 360 monitors activities on incoming ES trunks 206 and redirects E9-1-1 calls 201 received to an appropriate call handling destination 215. The router process 360 maintains an image of the TN/ESN table 213 within its process space. The router process 360 is based on a finite state machine design that is driven by the call processing messages 288 from the switch 218. The router process 360 is responsible for the following activities:

1. Selecting a call handling destination 215 to receive an E9-1-1 call 201 If the destination 215 is a PSAP 216 the router process 360 notifies the psap process and monitors call progress until it is answered by a PSAP attendant 221. This includes monitoring the status of PSAP destinations (i.e. night service abandonment, call capacity, etc.)
2. Routing E9-1-1 calls 201 via routing instructions of the router process 360. Selective Routing requires the router process 360 to tightly integrate with the TN/ESN table 213, for example.
3. Track all E9-1-1 calls 201 being handled within the platform 204 that originated on an inbound ES trunk 206.
4. Handling of abandoned E9-1-1 calls 201 before routing is completed.
5. Entering call entries in the call log 244 for E9-1-1 Calls 201 that were not directed to a PSAP 216.
6. Participate with the psap process 361 to complete telephony operations, including Selective Transfer between PSAPs 216.
7. Monitoring and allocating C.E.R.S. system 200 resources used to provide routing and other functions.
8. Coordinating the timing for PSAPs 216 entering and leaving Night Service and Abandonment. The router process 360 maintains timer events that signal when a PSAP 216 is scheduled to enter and leave Night Service. The router process 360 also sends a PSAP state change to an op process 366 to be logged.

9. Collecting metrics that are used to report routing activity and trunk activity.
10. Participating in system integrity activities.

The router process 360 and the psap process 361 share a global memory 367 that is used to identify the state of the PSAP attendants 221 for each PSAP 216. The psap process 361 updates the global memory to indicate the status of each attendant workstation 212 (Receiving Calls or Not Receiving Calls). The router interfaces with the following processes 351 through IPC: (1) the init process 352, (2) the stk process 358, (3) the psap process 361, (4) the ali process 364, (5) a wscp (PSAP workstation control) processes 368, (6) a dbmgr (Data Base Manager) process 369, (7) an op (Output) process 366, (8) a TN/ESN Table formatting and run time update process 372, and (9) the mtk (Metrics Collection) process.

Figure 58:
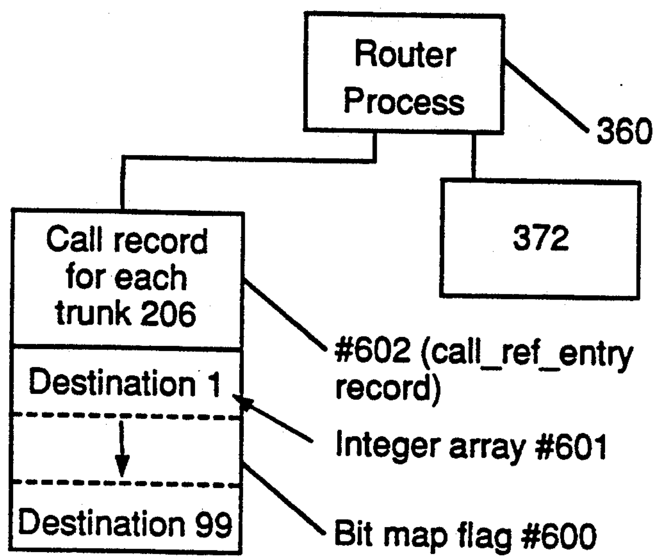

The router process 360 reads some administered data into memory 372 (FIG. 58) and it also maintains dynamic state tables, including (1) the ESN table 213, (2) a destination table 373, (3) a trunk table 374, (4) a trunk group table 377, (5) a selective transfer table 378, (6) a night service table 379, (7) a NPD/NPA translation table 387, a PSAP Table 382, and (8) a call table 383, which is a dynamic table that tracks every E9-1-1 call 201 being handled by the C.E.R.S. system 200, including the call state and call history (this information is used to detect abandoned E9-1-1 calls 201 and to notify PSAP attendants how an E9-1-1 call 201 arrived to them.

Figure 12:
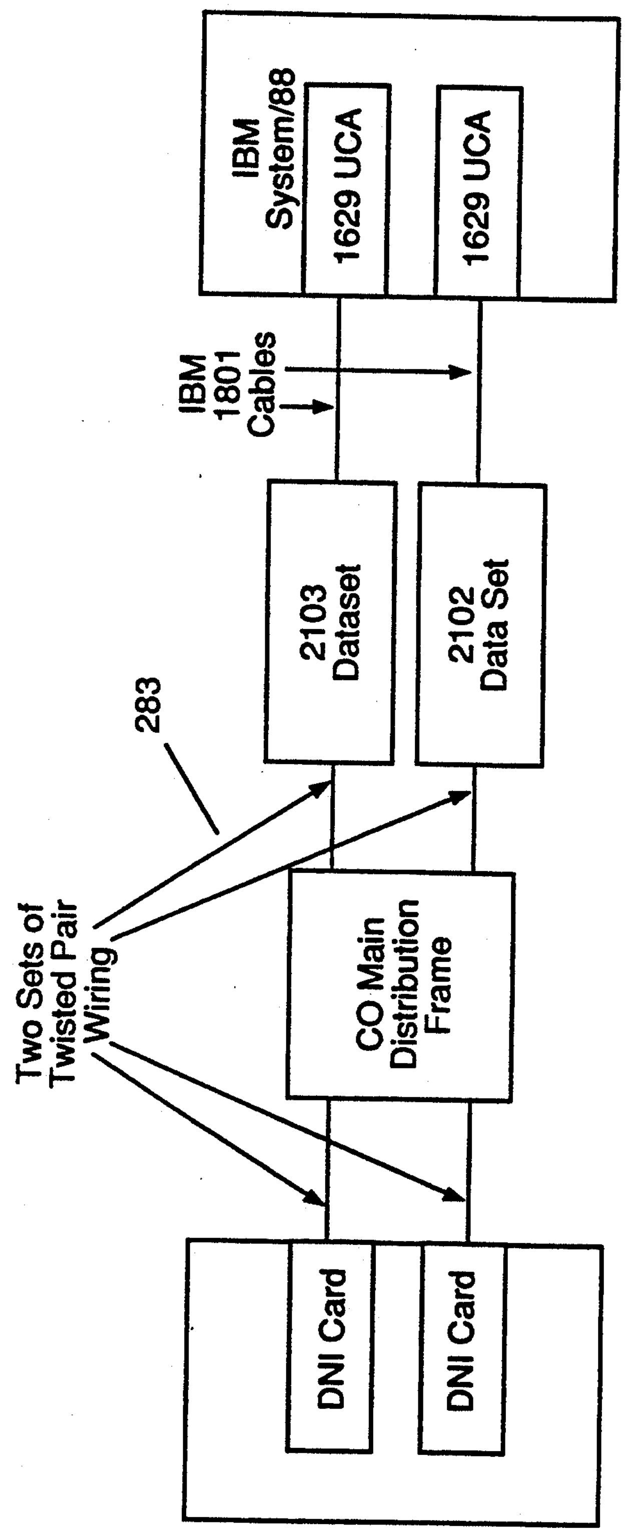
FIG. 12 is a schematic diagram showing a host command interface and its links for communicating between the AP and the call routing switch.

The router process 360 initiates translates and monitors on switch lines (e.g. HCI link 283, FIG. 12) and trunks 206 through the stk process 358. This enables the router process 360 to be notified of call events and ensure that E9-1-1 calls 201 are handled properly.

A PDN port 384 (FIG. 3) of the switch 218 is translated and monitored through the stk process 358 by the router process 360. This allows the router process 360 to transfer the E9-1-1 call 201 to a PSAP hunt group 333. The router process requests that the stk process 358 filter all messages 288 originated from the switch 218 by the monitor established on PDNs 333. The router process 360 also interfaces with incoming E9-1-1 trunks 206 (it is notified of incoming E9-1-1 calls 201 and transfers them to a pSAp 216). If the E9-1-1 call 201 is abandoned any time after it is received by the C.E.R.S. system 200, the router process 360 is notified. The router process 360 also interfaces with the outgoing trunks 302 (allows transfer of calls and origination of calls 318 out to the PSTN 219).

Figure 19A:
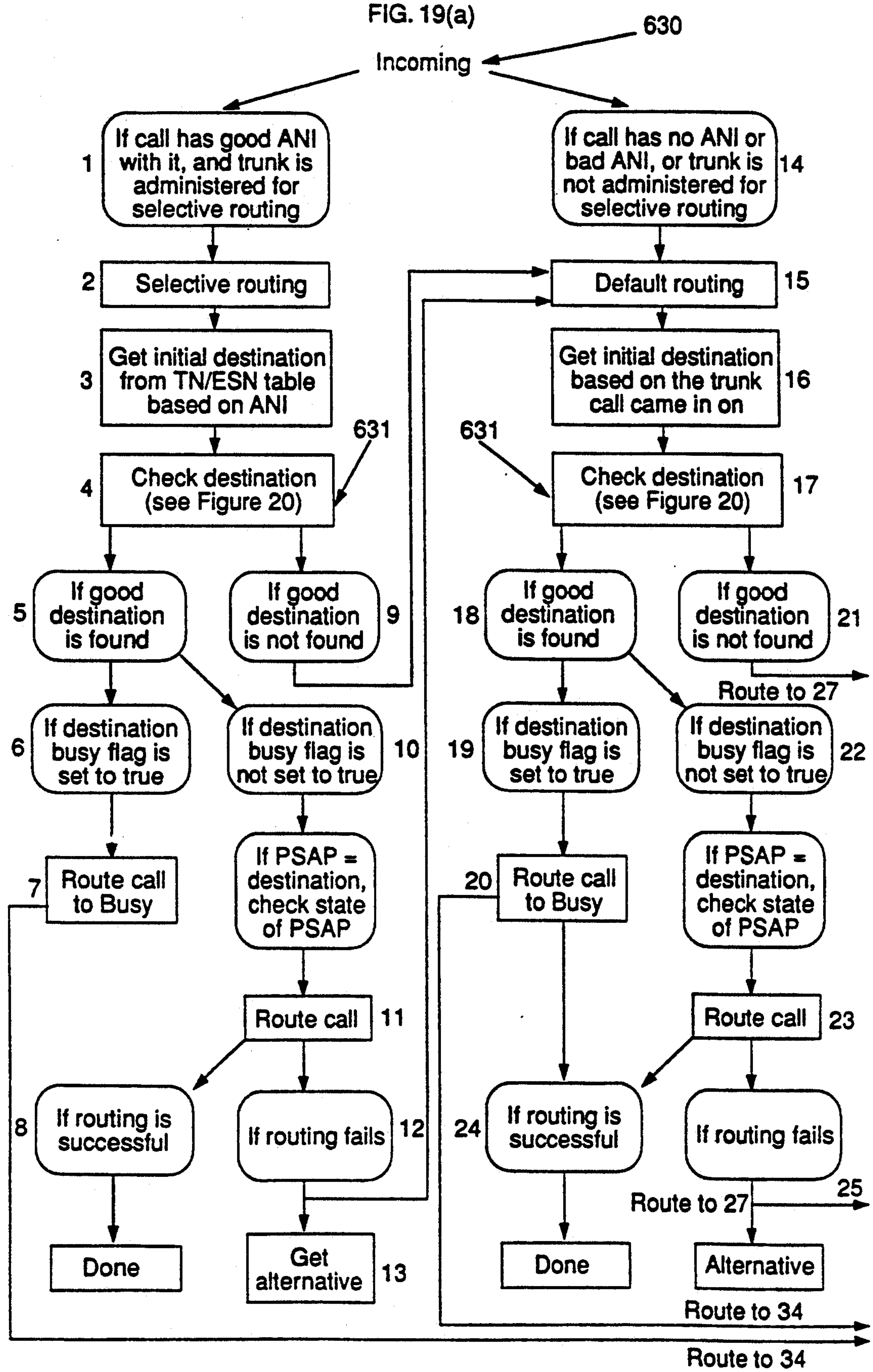
FIGS. 19*a* & 19*b* combine to form a flow chart indicating how the C.E.R.S. system uses Selective Routing, Default Routing and Last Chance Routing to route an incoming E9-1-1 call.
Figure 19B:
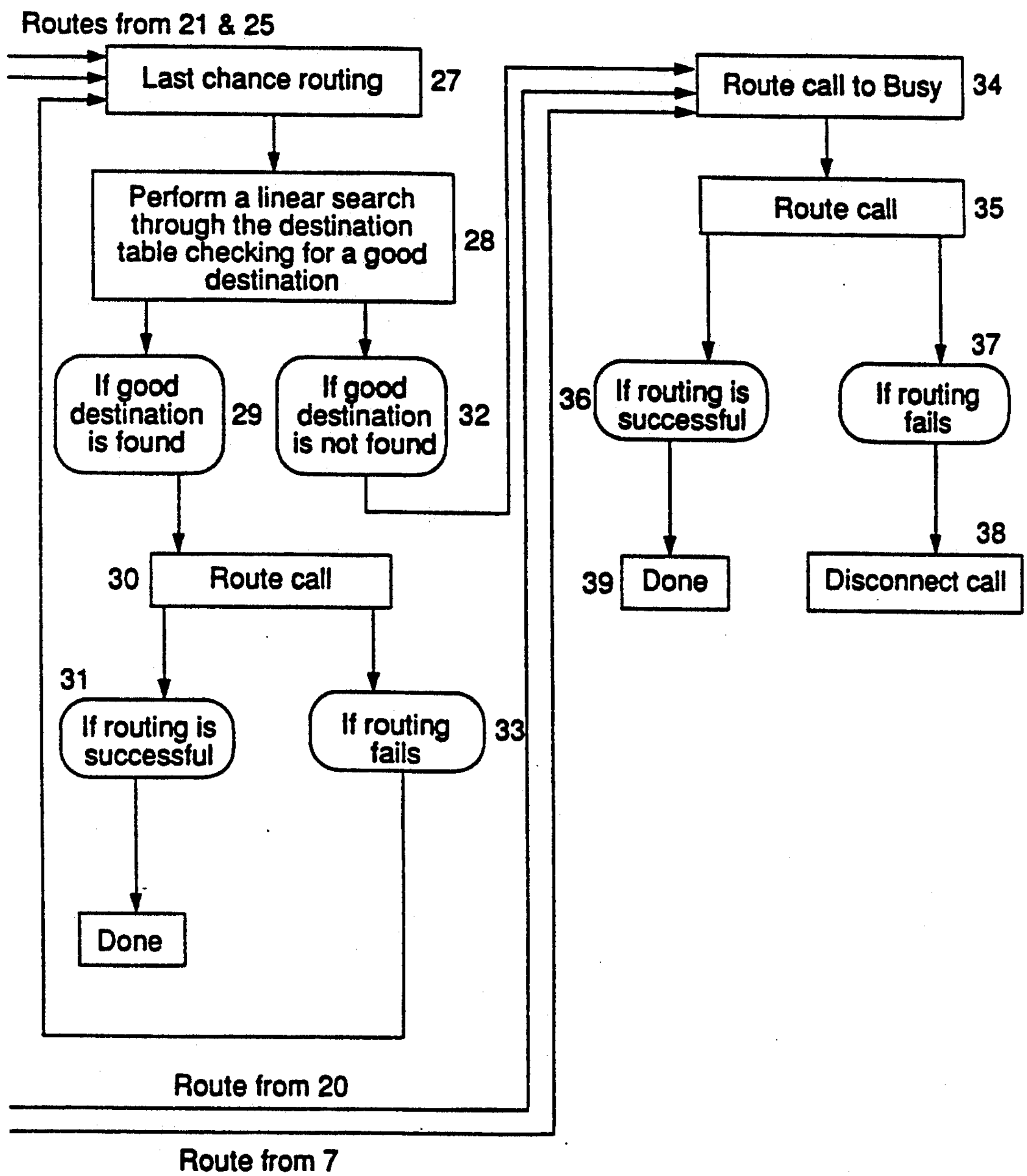
Figure 20:
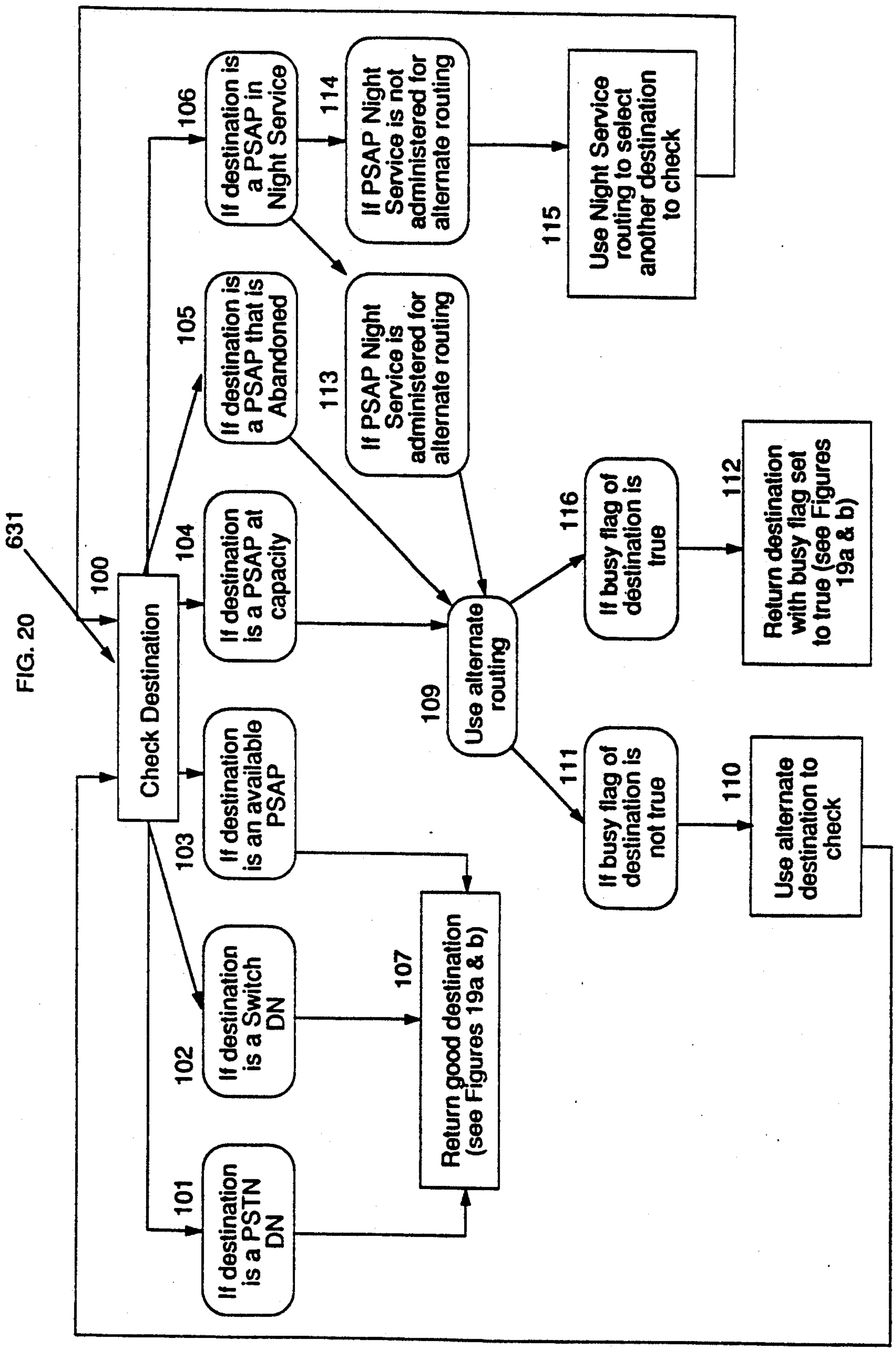
FIG. 20 is a flow chart illustrating how call handling destinations are checked to determine their availability to handle an incoming E9-1-1 call during the routing steps shown in FIGS. 19 (*a*)-(*d*)

Reference is made to the "Routing Chart" below where the steps in FIGS. 19*a*, 19*b* and 20 are related to certain routing files and routines of the router process 360, which files and routines are set forth in the Microfilm Appendix.

| Ref | File | Routine | Line |
|---|---|---|---|
| 1 & 14 | route_call.c | determine_dest( ) | 269 |
| | route_call.c | determine_dest( ) | 275 |
| Determine ANI condition | | | |
| | rtr_call_status_msg.c | trunk_call_status_msg( ) | 192 |
| | rtr_ani_rcvd.c | ani_rcvd( ) | 118 |
| 2 | route_call.c | determine_dest( ) | 301 |
| 3 | rtr_selective_routing.c | selective_routing( ) | 97 |
| 4 | rtr_selective_routing.c | selective_routing( ) | 105 |
| 5 | rtr_selective_routing.c | selective_routing( ) | 117 |
| 6 | rtr_selective_routing.c | selective_routing( ) | 129 |
| 7 | rtr_selective_routing.c | selective_routing( ) | 134 |

-continued

| Ref | File | Routine | Line |
|---|---|---|---|
| 8 & 24 & 31 & 36 | | | |
| | Routing successful is determined by the receipt of a route_determined message from the switch and a transition in the router state machine. | | |
| 9 | rtr_selective_routing.c | selective_routing( ) | 160 |
| 10 | rtr_selective_routing.c | selective_routing( ) | 139 |
| 11 & 23 & 30 & 35 | | | |
| | rtr_route_call.c | route_call( ) | 98 |
| 2 & 25 & 33 & 37 | | | |
| | Routing failed is determined by a receipt of a route failed message from the switch and a transition in the route state machine. | | |
| 13 | rtr_redirect_failed.c | failed to_dest( ) | 229 |
| 15 | rtr_default_routing.c | default_routing( ) | 43 |
| 16 | rtr_default_routing.c | default_routing( ) | 67 |
| 17 | rtr_default_routing.c | default_routing( ) | 84 |
| 18 | rtr_default_routing.c | default_routing( ) | 84 |
| 19 | rtr_default_routing.c | default_routing( ) | 96 |
| 20 | rtr_route_call.c | route_call( ) | 79 |
| 21 | rtr_default_routing.c | default_routing( ) | 90 |
| 22 | rtr_default_routing.c | default_routing( ) | 93 |
| 27 | rtr_route_call.c | last_chance_routing( ) | 118 |
| 28 | rtr_route_call.c | last_chance_routing( ) | 141 |
| 29 | rtr_route_call.c | last_chance_routing( ) | 163 |
| 34 | rtr_route_call.c | route_call( ) | 79 |
| 38 | rtr_route_call.c | route_call( ) | 81 |
| 100 | rtr_inspect_dest.c | inspect_loop( ) | 292 |
| 101 | rtr_inspect_dest.c | inspect_dest( ) | 454 |
| 102 | rtr_inspect_dest.c | inspect_dest( ) | 451 |
| 103 | rtr_inspect_dest.c | inspect_dest( ) | 385 & 417 |
| 104 | rtr_inspect_dest.c | inspect_dest( ) | 384 & 397 |
| 105 | rtr_inspect_dest.c | inspect_dest( ) | 335 |
| 106 | rtr_inspect_dest.c | inspect_dest( ) | 357 |
| 107 | rtr_inspect_dest.c | inspect_loop( ) | 144 |
| 108 | rtr_inspect_dest.c | inspect_loop( ) | 115 |
| | | inspect_dest( ) | 399 |
| 109 | rtr_inspect_dest.c | get_next_dest( ) | 626 |
| | rtr_nite_srvc.c | get_ns_dest( ) | 900 |
| 110 | rtr_inspect_dest.c | inspect_loop( ) | 115 & 102 |
| 111 | rtr_inspect_dest.c | get_next_dest( ) | 625 & 626 |
| 112 | rtr_inspect_dest.c | inspect_loop( ) | 89 & 142 |
| 113 | rtr_nite_srvc.c | get_ns_dest( ) | 885 |
| 114 | rtr_nite_srvc.c | get_ns_dest( ) | 872 |
| 115 | rtr_nite_srvc.c | get_ns_dest( ) | 879 |
| 116 | rtr_inspect_dest.c | inspect_loop( ) | 625 & 628 |

Interaction between the psap process 361 and the router process 360: The outer process 360 interfaces with the psap process 361 which in turn interfaces with all wscp processes 368. The router process 360 notifies the psap 216 process 361 of (1) E9-1-1 calls 201 directed to a PSAP 216 including the reason and the selective transfer information, and (2) the PSAP status (i.e. quening level, Night Service routing state).

If a PSAP 216 has call queuing enabled (via the SAP queue 334), the router process 360 expects the psap process 361 to notify it of the status of the PSAP attendants 221. This information is used in the router process 360 to implement call queuing to the PSAP 216.

The router process 360 maintains the Night Service routing schedule 371 (FIG. 24) for each PSAP 216. When a given PSAP 216 is in the Night Service state the router process 360 notifies the PSAP 216 that Night Service Routing is in effect. As to all calls 201 that would be routed to that PSAP 216, the router process 360 directs them to the Night Service destination. The router process 360 interacts with a TN/ESN utility process 372 to coordinate updates and other run time accesses to the TN/ESN table 213.

The psap process 361: The psap process 361 is a permanent process that controls the telephony operations of all PSAP workstations 212 and PSAP notification lines. The psap is responsible for controlling the PSAP attendants 221 call processing capabilities and additional capabilities provided at each PSAP 216.

The psap process 361 is based on a finite state machine design that is driven by the call processing messages 288 from the switch 218 and from inputs from the PSAP attendant keyboards 228.

The psap process 361 is responsible for:

1. Interacting with the wscp process 368 to provide the ability to each workstation 212 to answer and service E9-1-1 calls 201.
2. Controlling and monitoring PSAP workstation status and PSAP status.
3. Participating with the router process 360 to complete telephony operations, such as call transfers.
4. Participating with the router process 360 to define the system state with respect to routing requirements.
5. Participating in system integrity activities.
6. Distributing administration broadcast messages 240 to the wscp process 368.
7. Call status logging to the op process 366.
8. Metric collection for report generation.

The psap process 361 interfaces with the following processes: (1) the init process 352, (2) the stk process 358, (3) the router process 360, (4) the wscp process 368, (5) the dbmgr process 369, (6) the op process 366, (7) the mtk process 363, and (8) the platform_admin process 384, which sends administration broadcast messages to the psap process 361 for broadcast to all PSAP workstations 212.

The psap process 361 reads some administered data into memory 372 and it also maintains dynamic state tables, including those listed in Chart TABLES.

Chart TABLES
Dynamic state tables maintained by teh psap process 361

| | |
|---|---|
| 1. | PSAP table 382 (FIG. 10) |
| 2. | PSAP workstation table 386 |
| 3. | ESCO (emergency service central office) table 387 |
| 4. | PSAP state table 388, dynamic table that tracks PSAP status. |
| 5. | NPD/NPA table 381 |
| 6. | Workstation state table 391, a dynamic table that tracks workstation status (Receiving Calls vs. Not Receiving Calls) and workstation telephony status. |

Figure 15B:
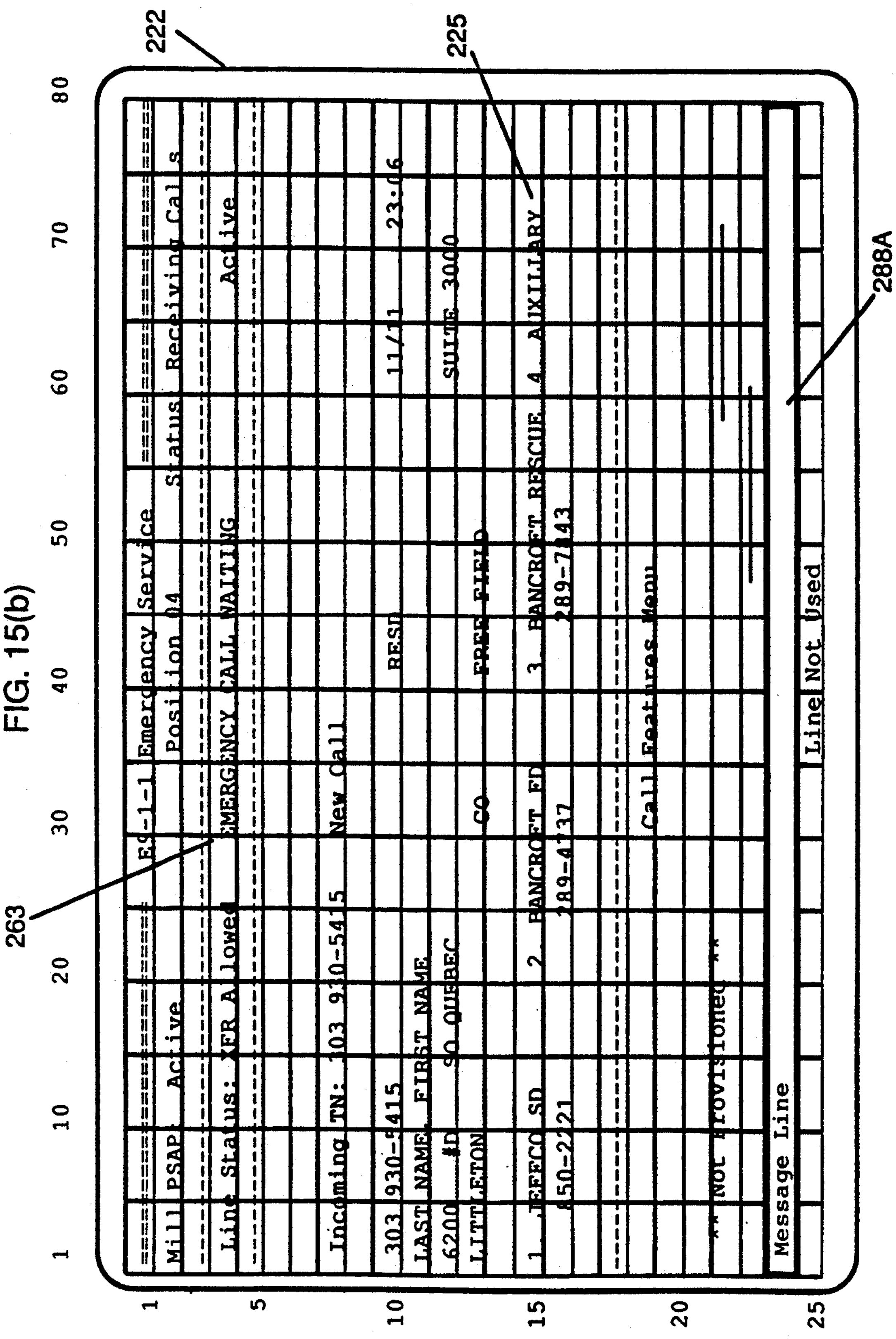
FIG. 15B is a diagram of the screen shown in FIG. 15A, illustrating information for an incoming E9-1-1 cell FIGS. 16(*a*) & 16(*b*) when connected at their respective right and left margins form a plan view of a workstation keyboard showing keys for use by an attendant.

The switch port(s) 384 are translated and monitored by the PSAP process for (1) PSAP attendant lines 512 (FIG. 3) which allow the psap process 361 to determine which PSAP attendant 221 answered an E9-1-1 call 201 and to implement restricted out dialing by PSAP attendants 221; and (2) the PSAP call notification line 241, which allows the psap process 361 to display on attendant screens 222 that E9-1-1 calls 201 are waiting to be answered (FIG. 15B, line 4).

The wscp Process 368: The wscp (workstation control) process 368 controls the workstations 212 of each PSAP 216. One copy of this wscp process 368 exists for each PSAP 216 administered. The wscp process 368 is implemented as a multi-tasking process to take advantage of a unique file descriptor scheme between tasks. Multi-tasking allows the wscp process 368 to control multiple workstations 212 and use a standard input/output device-based user interface package. There is one task responsible for over all process coordination and one task to interface to each PSAP workstation 212. The wscp process 368 uses AP user events from a monitor task to signal the receipt of an IPC message 288 to a particular workstation task. Twenty workstations 212 are supported per wscp process 386.

The wscp process 368 is responsible for controlling the PSAP attendant workstation interfaces, which include the commands entered by the attendant 221 using his or her keyboard 228, and the visual messages 240 on the workstation screen 222. This wscp process 368 interacts with the PSAP attendants' data display workstations 212 (which have the screens 222) and the keyboards 228 and coordinates activities with the psap process 361 which is controlling the voice lines 245. The attendant workstation interface is implemented using a third party user interface software package sold under the trademark JAM, marketed by JYACC Corp. under Model No. STRATUS.

Each wscp process 368 is assigned a unique name (used for IPC) to distinguish them. This assignment is made via command line parameters in a process initialization table 401. Each wscp process 368 is tightly coupled with a PSAP definition in an administration database 402.

The wscp process is responsible for:

1. Updating PSAP attendant screens 222 with ALI, call status, PSAP status, workstation status, and broadcast messages 288. In general, satisfying and implementing the requirements of the PSAP attendant workstation 212 from the standpoint of the workstation interface used by the attendants 221.
2. Implement the ability to initiate answering and servicing of E9-1-1 calls 201 through the PSAP attendant workstation 212.
3. Controlling and monitoring the status of PSAP workstations 212 and PSAPs 216 through interactions with the psap process 361.
4. Providing PSAP-specific administration capabilities through the PSAP attendant workstation interface.
5. Submit requests to the op process 366 to log ALI information from a PSAP 216.
6. Interacting with the ali process 364 and the router process 360 to implement the capability of doing a New ALI Fetch new and selective transfer points for a PSAP attendant-entered NPD and TN pair.
7. Participating in system integrity activities.

As shown in FIG. 8, the wscp process 368 interfaces with the following separate processes of the C.E.R.S. system 200: (1) the init process 352, (2) the router process 360, (3) the psap process 360, (4) the op process 366, (5) the ali process 364, and (6) the dbmgr process 369.

The wscp processes 368 do not communicate directly with each other. The psap process 361 and the router process 360 are an intermediary for all operations between wscp processes (i.e., transfer operations). The following data items are maintained within the wscp process:

1. PSAP administered configuration.
2. PSAP hunt group 333, DN of PSAP common notification line 241, the number of attendants 221 active at a PSAP 216, switch DN for each attendant's line port 403, an AP data port 404 for each attendant 221.

3. State of PSAP 216, e.g. Accepting calls, Abandoned, Night Service, current calls queued.
4. State of PSAP attendant workstation 212. Telephone line state, position state (active or inactive), current display screen state, etc.
5. The wscp process 368 interfaces with AP asynchronous RS232 device ports (not shown) for displaying and receiving data from the PSAP attendant workstations 212.

The ali Process 364: The ali 364 process is responsible for direct access to the remote ALI/DMS system 224. An NPD and TN pair are submitted to the remote ALI/DMS system 224 to retrieve ALI information. There are ALI/DMS process interface software module buffers (not shown) which receive ALI information and forward it to requesting clients 361. ALI information buffered is for some period of time in case another request is made for the same NPD and TN pair.

The ALI/DMS interface module interfaces with the (1 ) init process 352, (2) router process 360, to requests ALI information but not receive responses because the router processes, request initiates a request sent to the ALI/DMS system 224 before a PSAP attendant 221 answers the E9-1-1 call 201, (3) wscp process(es), which requests initial ALI information, re-fetches ALI on demand, and submits requests for new ALI information, the op process 366, to submit ALI/DMS broadcast messages directly to the op process 366 for logging at PSAP printers 355 and in the call log 244, (5) the dbmgr process 369, and (6) the mtk process 363.

The following data items are maintained by the ali process 364: (1) state of each ALI/DMS interface line and line pair 312, (2) requests pending from clients 361 that have been or will be submitted to the ALI/DMS system 224, and (3) received ALI information. The Ali process 364 is responsible for returning a response back to its clients 361 for every response received.

The op Process 366: The op (output) process 366 controls the interface to a system log file (FIG. 59) and the PSAP printers 255 (FIG. 5). The op process 366 interfaces with the AP asynchronous RS232 device ports 404 (FIG. 5) for printing call and ALI information at the PSAP 216. The call log information is optionally printed to the PSAP printer 255 and to the system log file 408. Because the AP 234 blocks processes 361 which write to disk, the output for the system log file 408 is centralized in the op process 366.

The op process 366 interfaces with (1) the init process 352, (2) the router process 360, (3) the psap process 361, (4) the wscp process(es) 368, (5) the ali process 364, which sends the ali broadcast message 407 (FIG. 9) to the op process 366 to be logged at the PSAP ALI printers 254 and in the E9-1-1 call log file 408 (FIG. 9), (6) the dbmgr process 369, (7) the platform_admin process 384, which reports log in failures to the op process 366 for logging and printing at a PSAP 216.

The following data items are maintained by the op process 366 (1) each PSAPs administered printing options, and (2) an array 409 containing each printer supported in the system.

Figure 57:
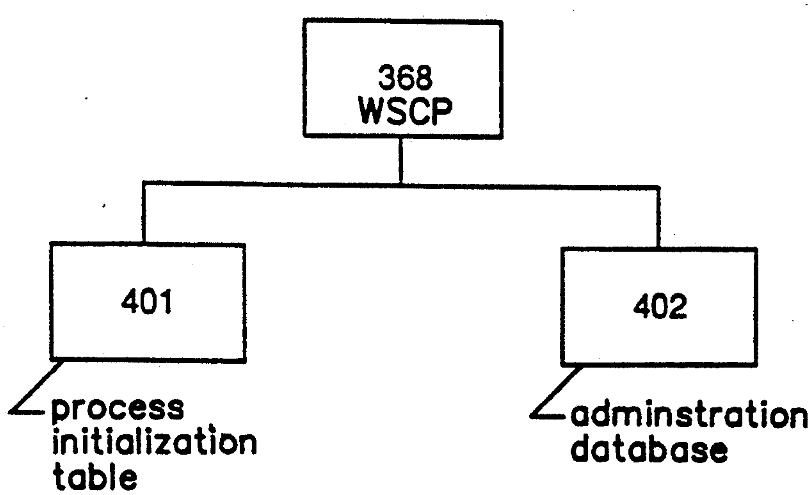
FIG. 57-59 are schematic diagrams showing various dynamic state tables administered by the wscp process and the router process and memory shared by the PSAP and router processes.

The dbmgr Process 369: The dbmgr (database manager) process 369 (FIG. 9) coordinates database updates. It provides a database locking scheme and a foundation for the implementation of run time updates (i.e. application reconfiguration such as adding PSAP workstations 212 or ES trunks 206. At initialization, client processes 361 connect to the dbmgr process 369 and report the database elements of which they have a copy. This registration for update notification allows centralized dynamic tracking of where information is in the run time process configuration. Processes 351 can dynamically request or relinquish write locks on data records or tables. The database manager process 369 handles contention between processes 351 for these locks and provides a scheme to recover a lock which has not been properly relinquished. All database updates are channeled through the dbmgr process 369. The dbmgr process 369 verifies the integrity of the data (i.e. relationship and range value checks) before sending acknowledgments back to the requesting process. The dbmgr process 369 notifies all processes 351 which have registered on data that the data has changed. A special update scheme, instant updates, is provide for data elements that cannot be subjected to possible lock rejects (i.e. such as the PSAP abandonment status in the PSAP definition record) (PSAP state table 388 (FIG. 57).

The C.E.R.S. system 200 limits the data items that can take effect during run time (the alternate is to restart the system 200 so all processes 351 read new versions of the databases). The dbmgr process 369 provides a structure for adding database elements that can be updated and take effect immediately.

The dbmgr process interfaces with (1) the init process 352, (2) the router process 360, (3) the psap process 361, (4) the wscp process 36B, (5) the ali process 364, (6) the op process 366, and (7) the platform admin process 384.

The cm Process 370: The cm (constant monitor) process 370 is a permanent process that coordinates the execution of automatic system diagnostics. The diagnostics include checks for loss of system resources such as the HCI link 283, disk space, and system printers 271. The cm process 370 interacts with the diag process 362 and a fiso process 283 in order to perform these functions.

The cm process 362 is responsible for (1) maintaining the schedule for tests, and (2) notifying the diag process 362 what test to perform and what resources to use in the test. The cm process interfaces 362 with the following processes via IPC (1) the init process 352, (2) the diag process 362, and (3) the fiso process 375.

The following data items are maintained by the cm process 362: (1) a test schedule (the interval for diagnostic checks), (2) test resources, and (3) test results (the status of the last set of checks).

The diag Process 362: The diag (diagnostic) process 362 performs system diagnostics and executes tests as instructed by the cm process 370. The diag process 362 is implemented with an internal state table for determining proper test sequences and results. The diag process is responsible for:

1. monitoring sanity of the HCI link 283.
2. monitoring disk space usage.
3. monitoring the printer subsystem for printer status.
4. interfacing with the fiso process 375 to execute fault detection tests in the background that do not effect the primary system 200 feature responsibilities.
5. interfacing with a platform_maint process 410 to execute fault detection tests on demand.

The diag process 362 interfaces with the following processes via IPC: (1) the init process 352, (2) the stk process 358, (3) the cm process 370, and (4) the platform_maint file/routine.

The following data items are maintained by the diag process 362: (1) current test operations and results, (2)

test resources such as trunks, lines, and printers and (3) statistics about the file and paging systems.

The diag process 362 invokes the transient process gps via the VOS s$start_process system call. gps is the process name that appears under a system process listing, the process is actually a VOS display_print_status command that the diag process uses to inspect the status of a system printer 272 (FIG. 1).

The fiso Process 375: The fiso process 375 performs recovery operations and problem isolation. The fiso process is notified of potential problems by the cm process 370 and by the platform_maint file. It interacts with the diag process 362 to perform additional tests to isolate the problem and test to ensure the problem has been corrected. The fiso process is responsible for interface with the diag process 362 to perform fault detection and isolation tests. The fiso process interfaces with: (1) the init process 352, (2) the diag process 362, and (3) the cm process 370.

The dpsc Process 411: The dpsc process 411 provides an interface with the diagnostic knowledge database. The dpsc process 411 is responsible for providing interface for other processes to the diagnostic knowledge database. The dpsc process 411 interfaces with: (1) the init process 352, (2) the fiso process 375, and (3) platform_maint process 410.

The TN/ESN Table Utility Process 376: The TN/ESN table 213 is received and converted into an internal AP structure that is used to support the Selective Routing feature. The TN/ESN table 213 is maintained in a disk file under the data directory. The data file is read by the router process 360 and maintained there for efficient run time access. The router process 360 can accept a run time update or individual entry update from the TN/ESN utility functions. The TN/ESN table 213 provides a mapping of an NPD and TN pair to an ESN. The ESN retrieved from the TN/ESN table 213 is used to access an AP administered ESN table 390 to determine the routing destination and selective transfer destinations. The TN/ESN table utility provides: (1) reformatting of the TN/ESN table 213 received from the ALI/DMS system 222 to an AP specific structure.

1. Updating the router process 360 with a new TN/ESN table 213, deleting any entries the router process 360 has that are not in the new TN/ESN table 213.
2. Adding TN/ESN entries to the router process 360.
3. Querying the router process 360 for up to twenty NPD TN to ESN mappings at a time.

The TN/ESN table is audited to verify its structure and its ESN with the ESN table 390.

Administration Utility Process 384: The AP administration process 384 interacts with an administrator (e.g., the platform administrator 234) through several different types of terminals (e.g., the switch admin. terminal 270 or the AP admin. terminal 276).

The platform administration process 384 interacts with an administrator (not shown) to modify administration tables (not shown), generate reports, complete system backup and restore operations, inspect system status, or send broadcast messages 407 to PSAP attendants 221. Multiple instances of the platform_admin process 384 can exist. Some administration capabilities are distributed to the PSAP 216 through the PSAP attendant workstations 212.

The platform_admin process 385 provides the following capabilities: (1) update the AP administered data tables 402, (2) send a broadcast message 407 to all PSAP attendants 221 within a PSAP or to all PSAPs of the platform 204, and (3) generate system activity reports.

An adm_dbedit process is a transient process that can only be invoked from the VOS operating system. It provides the following capabilities: (1) dump an administered data table 402 to a printable file, and (2) restore an administered data table 402 from an ASCII file. In addition to the platform_admin 384 and adm_dbedit process 412 there are utilities routines (not shown) used by the processes 351 to retrieve administered data from disk files and interact with the dbmgr process 369.

Report Utility Process 416: System activity reports 416 generated on demand from the data that is collected from system processes. A rpt process 419 reports system activity and reads the data that is deposited in files by system processes, formats the data, and creates an output file 418.

Init_shutdown Process 422: An init_shutdown process 422 can be invoked to have the init process 352 stop and restart all processes or gracefully terminate all C.E.R.S. processes 351. Graceful termination is accomplished by the init process sending out a broadcast message 407 to all processes 351 asking them to exit. If the processes 351 do not exit within a predetermined time period, the init process 352 stops them.

Set_class Process 423: A set_class process 423 is used to dynamically set the level of log messages 288 that are directed to debug files for each process 351 that has successfully initialized with the message logging shared memory 424. It is used during development testing.

Ml_set_log Process 427: A ml_set_log process is used to send log messages 288 to a specific file version number. It is used during development testing.

Shared Memory 367: The following shared memory segments 367 (FIG. 59) are utilities in the C.E.R.S. system 200. All processes 351 that utilize any of these shared memory segments (FIG. 59) declare them in their bind control file. These segments 367 include:

1. ML Shared memory is used to keep the current log file version and entry count available to all processes who log system messages.
2. PSAP/router shared memory is used to keep the number of PSAP attendants status information quickly available to the router process for call routing purposes.
3. IPC_SHMEM. All processes that use IPC shared memory as their ipc mechanism and all processes 351 that connected to a process that use IPC shared memory must be in a special shared memory segment Use of IPC shared memory is discouraged.
4. LOCK PAGE. is a shared memory area that is used to control access to the band the IPC shared memory areas.
5. STK shared memory is used to store its LID/SID table (not shown) and translate and monitor information.
6. TP shared memory is used by the init process 352 to control the rate at which to send process monitors.

Run Time Directory Structure: The following directories 441 (FIG. 9) are used by the C.E.R.S. system 200 run time environment.

1. bin directory contains all executable processes. Also, any files that permanent processes must have their home directory reside in the bin directory. An example of a non-executable file that must reside in this bin directory are the JAM TM screen definition files that are used by the wscp process 368 and platform_admin processes 385.

2. data directory contains all delivered and AP administered data files. These files include: (1) cascade.abbrev, (2) proc_table.dat, (3) mes_init.dat, (4) tnesn_tbl.dat, (5) diag_data.dat, (6) ali.bin, (7) dest.bin, (8) esco.bin, (9) esn.bin, (10) fxdir.bin, (11) night.bin, (12) npa.bin. (13) pdn.bin, (14) platform.bin, (15) psap.bin, (16) trunk.bin, (17) trunk-group.bin, (18) wkst.bin, (19) xfr.bin
3. log Directory contains all system messages 288 activity logs, data logs and development debug logs. These log files automatically start new versions based on number of entries written to them or the current date. These logs include:
   a) system.log.x where x is a file version number. File where all log messages of type informational, critical alarm, major alarm, minor alarm, and clear alarm are written.
   b) debug.log.x (a file where all process log messages are written by convention).
   c) E911_call_m_d_y (where "m" is the numeric two digit month, "d" is day, and "y" is year) is a system activity log file, all E9-1-1 calls 201 received by the system 200 have an entry made in this file. Also, all entries that can be printed at a PSAP printer 255 (i.e., PSAP state, ALI fetch requests, etc.) are written to this file.
   Each process that creates a file in the directory log is responsible for removing it.
   d) metrics directory contains all files that are created from the metrics collection mechanism. Each file has a unique name that is controlled by the mtk subsystem. The mtk process 363 is responsible for removing old metric files from this directory. Metric files are deleted after sixty days.
   e) queues Directory contains any files that are required related to the implementation of IPC and standard output of permanent processes 351. Files to support IPC pipes are created and stored in the queues directory.

Data/Data Tables: Data and data tables that support the C.E.R.S. system 200 include platform data files, as follows: (1) proc_tbl.dat file lists all processes that are started by the init. process 352, (2) mes_init.dat file lists all log file destinations, (3) metrics tbl.dat file lists all metric file base names and the metric collection interval for each, (4) cascade.abbrev file contains all abbreviations used by the processes 351 (including defining the database directory log directory), and (5) diag_data.dat file describes the TNs of RADs 247 that are used to make maintenance and diagnostic test calls.

Figure 11:
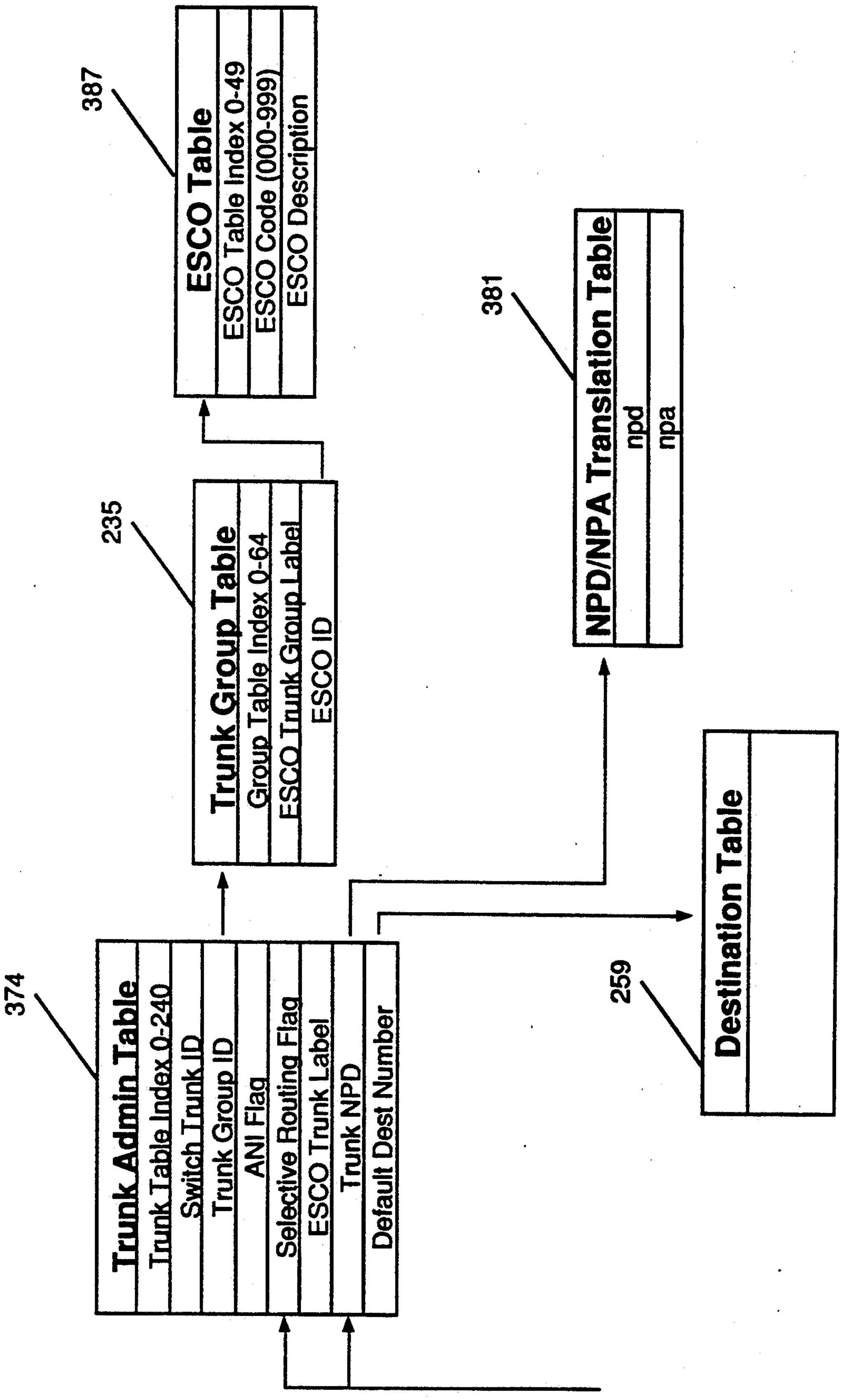
FIG. 11 is a diagram of additional tables of the AP for storing data relating to the incoming E9-1-1 calls.

Application Administered Databases: Administered databases are created from data entered by the system administrator 239. Referring to FIGS. 10 and 11, the data is grouped with related data to form logical tables which include the following.

1. ESN table 451 contains an entry for each ESN supported by the platform 204. The ESN table 451 points to the destination table 373 to define which call handling destination 215 to route an E9-1-1 call 201 to and points to the Selective Transfer table 378 to define the selective transfer points 225 to be displayed if the E-9-1-1 call 201 is answered by a PSAP 378.
2. The destination table 373 defines the attributes of each call handling destination 215 that can receive an E9-1-1 call. The attributes include the destination type, telephone number, and alternate destination. If the call handling destination 215 is a PSAP 216, the destination table 373 points to the PSAP table 382. A reference in the destination table 373 to a particular PSAP 216 may occur more than once, but is distinguished in the utility provided by the alternate destination specification.
3. The PSAP definition table 395 specifies all the information that is required to define a PSAP 216 and implement the required features. The PSAP attributes include pointers into the PSAP workstation table 386.
4. The PSAP workstation table 386 contains an entry for each PSAP attendant workstation 212 defined on the platform 204.
5. The trunk definition table 398 specifies trunks as either incoming emergency call carrying trunks 206 or the outgoing transfer and PSTN origination trunks 302.
6. The TN/ESN table 213 table is received from a remote computer system via a nine-track tape over a dial up link (not shown). The TN/ESN table 213 is read into the AP 234 and converted into an internal structure to support fast access and minimal space consumption. The NPD and TN of an E9-1-1 call 201 with ANI is used to retrieve an ESN from the TN/ESN table 213. The table is up-date controlled by a single process (which one? ), but access is allowed by several processes as described above.

Call Log 244: The call log 244 (FIG. 9) contains various entry types related to processing E9-1-1 calls 201 by the platform 204. It contains an entry for every E9-1-1 call 201 received by the system 200 and reported to the AP 234 by the switch 218. The call log 244 is a super set of all the entries made to PSAP Call printers 255. The call log 244 also contains a copy of all administration broadcast messages 407 and the destinations to which it was sent. The op process 366 is the only process that writes to the system call log 244. System call log entries are initiated by the router process 360, the psap process 361, ali process 364, and the wscp process 368.

System Message Log: The system message log 439 (FIG. 9) is a standard element in the CASCADE architecture. All processes log abnormal or system significant events to this log 439. The system administrator 239 is able to review this log 439 and use its entries to identify abnormal system activity and system problems.

TN/ESN Update Log 452: The TN/ESN process 372 maintains a tn_update.log 452 which includes (1) every update to the TN/ESN table 213 that occurs, (2) the number of TN/ESN entries received and (3) the number of entries that were invalid. This log 452 is used to produce a system activity report.

Parameters Database 470

To enable the C.E.R.S. system 200 to adapt to the unique and time-varying demands of its emergency service area 208 dynamic altering of various parameters used by the applications software 287 is required. This requirement is implemented by (1) establishing a parameter (or application) database 470 which is accessible by the application processes 351, and (2) providing a database manager process 369 to manage updates to the database 470.

Design Approach: An authorized user of the C.E.R.S. system 200 (e.g. the administrator 239) can view, add, change and delete parameters which are used by application processes 351 to determine how to respond to E9-1-1 calls 201 (e.g., using screens 222 shown in FIGS. 33, 36, 49 and 50). Interaction involves viewing the current values of configurable parameters, changing the parameters in some way, and making the changed data available to the application processes 351. In addition, fault-tolerance considerations require that a starting (or restarting) application process 351 be capable of finding the current values of configurable parameters without help from a user (e.g. the administrator 239) or from another process 351.

The database 470 uses disk files 471 for storage. These files 471 are read directly by the application processes 351 which use the data, and are written by the database manager process 369. When the user changes a configurable parameter, the application process 351 providing the user interface asks the database manager process 369 to change the appropriate database file 471, and the database manager process 369 sends IPC messages 288 to affected application processes 351 informing them of the change. The application processes 351 also read the database files 471 to get current parameter values. This allows the processes 351 to initialize without cooperation from the database manager process 369.

Design Constraints: The following constraints were considered during the design of the application database 470:

1. The effect of access to the database 470 upon application processes 351.
2. Messages 288 are used to distribute database changes to application processes 351. The service layer software 350 limits the length of IPC message bodies to five hundred twelve bytes. Data structures are partitioned such that database changes are to be made via IPC using application data structures without exceeding this five hundred twelve byte limit. The only structure that exceeds this size is the one used to hold records of the fixed transfer directory 249.
3. A menu-based user interface (in the form of the various screens 222 and various keyboard 228 actions, is used to configure the application data base 470). This allows input of multiple parameter types in multiple functional areas.

Design Details: The application database 470 consists of a collection of logical data structures which are mapped to a physical disk file structure. The logical data structures define data items for each of the parameters. In addition, some of the structures have elements added to allow the application software 351 to handle certain "housekeeping" tasks. One example of this is that most structures have fields added which are used as an index, or a "key", which uniquely identifies each record in a file. The microfilm appendix includes these data structures which are described below in terms of "C" Language constructs, using typedefs, structure definitions, enums and #defines to logically assemble the data structures. Some of those constructs are used by several of the structures defined below, including:

Constants:

```
#define DAYS_IN_WEEK 7              /* days in week */
#define NS_INTVLS_DAY 3             /* number of night service intervals
                                       per day */
#define NS_INTVLS_WK NS_INVLS_DAY*DAYS_IN_WEEK; /* number of
    night service intervals per week */
#define PLAT_OVERRID -1             /* indicates platform overrodenight
                                       service */
```

Typedefs:

Selected type defs from the Microfilm Appendix are as follows

```
typedef long TICKS  /* used to hold night service times */
typedef char PSAP_LABEL[PSAP_LABEL_CHARS+1];
    /* psap label */
typedef char PSAP_NAME[PSAP_NAME_CHARS+1];
    /* psap name */
typedef int PSAP_NO;          /* psap id no. */
typedef int WKST_NO;          /* wkst id */
typedef char WS_NO_LABEL[WS_NUM_SIZE+1]; /* wkst
                                            id in
                                            alpha */
typedef char XFR_LABEL[XFR_WIDTH*XFER_ROW+1];
    /* sel xfr label */
typedef int XFR_NO            /* sel xfr pt id */
```

Enums:

Selected enums from the Microfilm Appendix are as follows:

```
typedef enum {DEST_TYPE_PSAP = 0,
          DEST_TYPE_SW_DN = 1,
             DEST_TYPE_PSTN_DN = 2} DEST_TYPE;
                /* allowed destination types */
typedef enum {ANY_STATION = 0,
          ACD = 1}                   /* call distribution
          PSAP_CALL_DIST;
                                        enum */
typedef enum {DISABLED = 0,
          IN_EARLY -1,
           OUT_EARLY = 2} OVER_TYPES;
typedef enum {ADM_DB_FIRST_TYPE = -1,
          ADM_DB_PSAP = 0,
          ADM_DB_NIGHT = 1,
          ADM_DB_WKST = 2,
          ADM_DB_DEST = 3,
          ADM_DB_XFR = 4
          ADM_DB_TRUNK = 5,
          ADM_DB_TRUNK_GROUP = 6,
          ADM_DB_ESCO = 7,
          ADM_DB_NPD = 8,
          ADM_DB_ALI = 9,
          ADM_DB_PDN = 10,
          ADM_DB_PLATFORM = 11,
          ADM_DB_FXDIR = 12,
          ADM_DB_ESN = 13,
          ADM_DB_MAINT = 14,
          ADM_DB_STATUS = 15,  /* not currently
                                  used */
          ADM_DB_LAST_TYPE = 16} ADM_DB_TYPE;
                /* database types */
```

Database types whose data is not accessed through the admin library functions (like the above data types are) are defined "with" the others so some of the data base manager process 369 services can be provided for them. They are given in the enum below.

```
typedef enum {ADM_NONDB_FIRST_TYPE =
```

-continued

```
ADM_DB_LAST_TYPE+1,
ADM_NONDB_ALARMS,
ADM_NONDB_PTK,
ADM_NONDB_LAST_TYPE} ADM_NONDB_TYPE;
```

In addition, the data structures presented below also refer to constants which are described in system level include files, specifically stk.h and circe.h. These constants are: MAX_DESTINATIONS, MAX_ESCOS, MAX_TRUNKS, MAX_PDNS, MAX_PSAPS, MAX_XFR_PTS_ESN.

Workstation Table Data Structures: The administrable workstation parameters are used by the applications software processes 351 which need to know how each workstation 212 is configured. The format of the workstation data structure is defined below:

```
typedef struct {
    BOOLEAN delete;              /* delete flag */
    long update_time;            /* the time of last update */
    PSAP_NO psap no;             /* id of psap */
    WKST_NO wkst_no;             /* id of workstation
                                    in PSAP */
    LINE_FLAG line_flag;         /* on-line/off-line flag */
    DN dn;                       /* workstation voice line dn */
    STRATUS_PORT port;           /* workstation data port
                                    designator */
    TERM_TYPE term_type;         /* terminal type of
                                    attendant */
    PORT_SETUP port_setup;       /* parameters for the data
                                    port */
}       PSAP_WKST;
```

Fixed Transfer Directory Table Data Structures: The administrable fixed transfer directory 249 parameters are used by applications software processes 351 which need to know the contents of the fixed transfers directory 249 for a PSAP 216. The format of selected ones of the data structure for the fixed transfer directory 249 are below:

```
typedef struct {
    GROUP_NAME grp_name;
          /* the name of the fxdir group */
          int grp_count; /* current number of entries in the
                            group */
  } FXDIR_GROUP;
typedef struct {
    BOOLEAN delete;       /* delete flag */
    long update_time      /* the time of last update */
    PSAP_NO psap_no;      /* id of psap */
    LINE_FLAG line_flag /* online/offline flag */
    FXDIR_GROUP GRP_headert[NUM_FXDIR_GROUPS];
          /* headers for each fxdir group */
    FXDIR_ENTRY entry[MAX_FXDIR_ENTRIES]; /* the
    fxdir
      entries */
  }    FXDIR;
```

Night Service Table Data Structure: Administrable night service parameters are used by applications software processes 351 which need to know the Night Service schedule 371 for a PSAP 216. The Night Service table does not store Night Service override information; this is stored in the PSAP table 382. The format of the night service data structures are defined below:

```
typedef struct {
TICKS start; /* the starting time of a n.s. interval */
TICKS end;         /* the ending time of a n.s. interval */
```

-continued

```
    ROUTING OPTION night_svc_rte_flag; /* alternate(1) or
                                          nite svc(0)
                                          routing
                                          flag */
    DEST_NO dest_no;          /* the dest no to route to during
                                 n.s. interval */
  }   NIGHT_SCHED;
typedef struct {
    BOOLEAN delete;           /* delete flag */
    long update_time;         /* the time of last update */
    PSAP_NO psapno;           /* id of psap */
    LINE_FLAG lineflag; /* on-line/off-line flag */
    NIGHT_SCHED night service[NS_INTVLS_WK];
              /* the weekly night service schedule */
  }   PSAP_NIGHT;
```

PSAP Table Data Structures: Administratable PSAP parameters are used by applications software processes 351 to control the routing and transfer of E9-1-1 calls 201 to PSAP attendant workstations 212. The format of the PSAP data structure shown in the microfilm appendix is illustrated below:

```
typedef struct {
    BOOLEAN delete; /* delete flag */
    PSAP_NO psap_no; /* psap id */
    PSAP_NAME name; /* unique psap name */
    PSAP_LABEL label; /* psap label */
    DN hunt_group_dn; /* dn of psap hunt group */
    DN not_line_dn; /* dn of psap notification line */
    BOOLEAN clear_screen; /* flag for enabling clear screen
    feature */
    NPD npd; /* the npd for the psap */
    ALI_MATCH ali_match; /* npd-nxx patterns to match for ali
    retrieval */
    BOOLEAN call_cpcty_flag; /* is there a call capacity for
    the psap */
    int call_capacity; /* the call capacity for a psap */
    BOOLEAN abandon_flag; /* psap abandon (0-no 1-yes) */
    BOOLEAN abandon_rte_flag; /* alternate(1) vs abandon (0)
    routing flag */
    DEST_NO abandoned_dest; /* dest. for abandoned psap */
    WKSTNO                /* the workstation attendant
    who_abandoned;
                             that abandoned the PSAP */
    WHO_OVERRID who_overrid; /* identifies who invoked ns
    override */
    OVER_TYPE ns_override; /* for overriding night service */
    long ns_override_time; /* when was ns override invoked */
```

Destination Table Data Structures: The parameters for the administrable destination table 373 are used by applications software processes 351 to control the routing of incoming E9-1-1 calls 201. The format of some of the destination table data structures used in the Microfilm Appendix are defined below:

```
typedef struct {
    DEST_NO alt_dest;    /* dest no to use if psap is
unavailable */
    PSAP_NO psap_no; /* id of destination psap */
    } DEST_PSAP;
typedef struct {
    DN dn; /* dn of esp */
    BOOLEAN busyflag;    /* does this dest entry represent a
busy */
    DEST_NO alt_dest;    /* dest no to use if psap is
unavailable */
    } DEST_SWITCH;
```

ESN Table Data Structures: The parameters for the administrable ESN table 390 are used by applications software processes 351 to control the transfer of E9-1-1 calls 201 which are being handled by PSAP attendants 221. The format of the ESN table data structure is defined below:

```
typedef struct {
    BOOLEAN delete; /* the delete flag */
    long update_time; /* the time of last update for the
record */
    ESN_NO esnno; /* the esn of this entry */
    DEST_NO destno; /* the dest no for this esn */
    ESN_COMMENT comment; /* a comment field for
this esn */
    XFR_NO xfr_Point[MAX_XFR_PTS_ESN];   /* selective
                                            transfer
                                            points for
                                            the esn */
    BOOLEAN busyflag; tells if the esn represents a busy
}   ESN_ENTRY;
```

Selective Transfer Table Data Structure: The parameters for the administrable Selective Transfer table 378 are used by applications software processes 351 to control the transfer of E9-1-1 calls 201 which are being handled by SAP attendants 221. The format of the Selective Transfer table data structure is defined below:

```
typedef struct {
    BOOLEAN delete; /* the delete flag */
    long update_time;  /* the time of last update for the
                          record */
    XFR_NO xfr_no; /* xfr no for this entry */
    XFR_LABEL label; /* sel xfr point label */
    DEST_NO dest_no; /* dest no for this entry */
    }   XRT_ENTRY;
```

Trunk Table Data Structures: The parameters for the administrable trunk table 398 are to define trunk information which is used to route E9-1-1 calls 201 and display information at PSAP attendant works stations 212. The format of the trunk table data structure is defined below:

```
typedef struct {
    BOOLEAN delete; /* the delete flag */
    long update_time;  /* the time of last update for the
                          record */
    TRNK_NO trnk_no; /* trunk id for indexing */
    LINE_FLAG line_flag;      /* on-line (1) vs off-line (0)
                                 flag */
    TRNK_ID switch_id;        /* trunk id used in mitel switch
                                 admin */
    TRNK_GRP_NO trnk_grp_id; /* id of trunk group for this
                                trunk */
    TRNK_LBL esco_label; /* esco label for trunk */
    BOOLEAN ani_flag;            /* ani (I) vs no
                                    ani (0) capability
                                    flag */
    NPD npd; /* npd for calls on this trunk */
    BOOLEAN sel_rte_flag;     /* selective route on(1)/off(0)
                                 for trunk */
    DEST_NO default_dest;     /* dest no to use for default
                                 routing */
    }   TRUNK;
```

Trunk Group Table Data Structures: The parameters for the administrable trunk group table 377 defines trunk group information which is used to route E9-1-1 calls 201 and display information at PSAP attendant workstations 212. The format of the trunk group table data structure is defined below:

```
typedef struct {
    BOOLEAN delete; /* the delete flag */
```

-continued

```
    long update_time; /* the time of last update for the
record */
    TRNK_GRP_NO trnk_grp_no; /* trunk grp id */
    LINE_FLAG line_flag; /* on line (1) vs off-line (0) flag
*/
    ESCO_NO esco; /* id for esco originating this trunk group
*/
    TRNK_GRP_LBL esco_label; /* esco label for trunk group */
    }   TRUNK_GROUP;
```

ESCO Table Data Structures: The parameters for the administrable ESCO table 387 define ESCO names and IDs and are used to display the ESCO from which an E9-1-1 call 201 originated. The format of the ESCO table data structure is defined below:

```
typedef struct {
        BOOLEAN delete; /* the delete flag */
        long update_time; /* the time of last update for the
        record */
        ESCO_NO escono; /* esco no. (used as index) */
        ESCO_ID code; /* esco code (user input) */
        ESCO_SITE LBL name; /* esco name */
        }   ESCO;
```

NPD/NPA Translation Table Data Structures: The parameters for the administrable NPD/NPA translation table 389 are used by the PSAP process 361 when implementing the Call Origination feature. The format of the NPD/NPA Translation table data structure is defined below:

```
typedef struct {
        char digits[MAX_NPA_CHAR+1]; /* storage for npa
digits */
        }   NPA;
typedef struct {
        BOOLEAN delete; /* the delete flag */
        long update_time; /* the time of the last update for the
record */
        NPA npa_tbl[MAX_NPDS]; /* array for npas */
    }       NPA_TBL;
```

ALI/DMS Parameter Data Structures: The parameters for the administrable ALI/DMS table 474 are used by the ali process 364 to control the ALI/DMS interface to the ALI/DMS system 224. The format of the ALI/DMS parameter data structure is defined below:

```
typedef struct {
    BOOLEAN delete; /* the delete flag */
    long update time; /* the latest update time for this
record */
    ALI_LINE_NO_ali_line_no; /* id of ali line pair */
    STRATUS_PORT port_a; /* path to first port of line pair
*/
    STRATUS_PORT port_b; /* path to second port of line pair
*/
    PORT_SETUP port_setup; /* the parameters for the data
ports */
    ALI_FORMAT ali_format;   /* format flag (defined per
                                line pair to save creating
                                extra file */
    }   LINE_PAIR;
```

PDN Parameter Data Structure: The administrable PDN parameters are used by applications software processes 351 to provide phantom DNs. The PDN table 480 consists of PDNs with the following structure:

```
typedef struct {
      BOOLEAN delete; /* the delete flag */
      long updatetime; /* the time of the last update to the
      record */
      PDN_NO pdnno; /* the index for this record */
      DN dn; /* the dn for this pdn */
   }   PDN;
```

Application Database Disk File Layout: The application database 470 is stored in fifteen physical disk files of Stratus "Sequential" type. Each file contains only one record (structure) type. The individual files of the application database 470 are discussed below.

PSAP File. This file contains one record for each PSAP 216 administered on the platform 204. The record contains most parameters related to the PSAP 216. Fixed transfer directory, Night Service and workstation parameters are each stored in separate database files.

Night Service File: This file contains one record for each PSAP 216 administered on the platform 204. The record contains the weekly Night Service schedule 371, and some routing information, for each PSAP 216.

Fixed Transfer Directory File: This file contains one record for each PSAP 216 administered on the platform 204. The record contains fixed transfer directory parameters for each PSAP 216.

PSAP Workstation File: This file contains one record for each workstation 212 administered on the platform 204. The record contains all parameters related to the workstation 212.

Destination File: This file contains one record for each call handling destination 215 administered on the platform 204. The record contains all parameters related to the destination 215.

ESN File: This file contains one record for each ESN administered on the platform 204. The record contains all parameters related to the ESN.

Selective Transfer File: This file contains one record for each Selective Transfer Point 225 administered on the platform 204. The record contains all parameters related to the Selective Transfer Point 225.

Trunk File: This file contains one record for each trunk 205 administered on the platform 204. The record contains all parameters related to the trunk 205.

Trunk Group File: This file contains one record for each trunk group 206A administered on the platform. 204. The record contains all parameters related to the trunk group 323.

ESCO File: This file contains one record for each ESCO (Emergency Service Central Office) 205 administered on the platform 204. The record contains all parameters related to the ESC 205.

NPA File: This file consists of one record which contains the NPD/NPA mappings for the four NPDs administered on the platform 204.

Application Process/Application Database Interfaces: In general, applications processes 351 use data from the application database 470 to determine how E9-1-1 calls 201 should be processed and reported. The applications processes 351 receive this data from one of three sources. The first source is a message 288 (via IPC) from a process other than the database manager process 369. For instance, the router process 360 sends an Incoming Call message 288 to the psap process 361 when an E9-1-1 call 201 is routed to a PSAP 216, and this Incoming Call message 288 contains application data such as trunk id, ESCO label, etc. In cases such as this, neither the application database 470 nor the database manager process 369 is involved in the transfer of the data.

The second source of application data for an application process 351 is direct access of the application database 470 from disk by the applications process 351 itself. This type of access is used at initialization by each process 351 which uses application data without receiving it from another process.

The third source of application data for an application process 351 is a message 288 (via IPC) from the database manager process 369. Such a message 288 contains information about changes to the application database 470. This requires that application processes 351 register with the database manager process 369 for the data they want to be notified about changes made to.

A data transfer of the first type is not considered to create an interface between the process which uses the application data and the application database 470. Transfers such as this are defined in process to-process interfaces. Data transfers of the second and third type are discussed below.

Process/Disk File Interfaces: The application library functions were created to provide a standard interface to the application database 470 on disk. These functions completely shield user processes 451 from the physical details of the application database 470 implementation by allowing the user processes 451 to specify a logical table to open, read, and close. Some functions should not be used by application processes 451. Specifically, any function that writes or deletes a database record should not be used by any process 351 other than the database manager process 369. Functions that application processes can use include the different functions to read the database, the functions to open and close a database table, and some other miscellaneous functions.

There are five different functions that can be used to read database records.

1. adm_read_rec—Most application processes 351 use this function to read database records. It reads the next sequential record (from the current file pointer) that is not marked as logically deleted or off-line.
2. amd_read_raw_rec—Reads the next sequential record from a database file that is not marked as deleted. This function will read records marked off-line.
3. amd_read_all recs—Reads the next sequential record regardless of if it is marked as deleted or off-line.
4. amd_read_rec_num—Reads the record that is in a desired position (not the next sequential record). It reads the record regardless of if it is marked as deleted or offline.
5. adm_read_keyed_rec—Reads the record with a desired key value. It not read records that are logically deleted, but it will read records that are marked offline.

Real-Time Impact: Several steps minimize the performance impact of accessing the application database 470 upon those real-time processes which require the data. First, since disk access imposes the most severe performance penalty, the processes 351 are designed to keep copies of the application data they require in memory 372 local to each process 351 (FIG. 5). These copies are read from disk during initialization, and only updated when the application data changes while the process 351 is executing.

Second, the design of the database manager process 369 ensures that when a given data element in the application database 470 changes, only those processes 351 which have need of the data will be informed of the change. Further, the IPC message used to inform a real-time process that a change has occurred in the application database 470 contain, the changed data itself (unless the record that was changed was a fixed transfer directory record, in which case the record must be read from the database). This allows the processes 351 to update their internal copies of the database without requiring disk access.

Finally, some of the files are ordered so that certain records can be directly read (only one read system call is required) from the database file without having to read through all records, searching for the desired record. Ordering database files, and providing special library functions that take advantage of this ordering, help improve performance significantly in cases where database files are very large, such as the files of the fixed transfer directory 249.

Database Manager Process Functionality

The database manager process 369 is responsible for updating the administration database 470, and for keeping data consistent among all processes 351 in the C.E.R.S. system 200. The database manager 369 implements concurrency control (1) because multiple processes 351 can update the database 470 at the same time, and (2) to notify the necessary processes 351 after the database 470 has been updated to provide runtime update notification. The database manager process 369 does not provide any of the user interface part of administering the database. Database editing is done by workstation attendants 221, by PSAP managers 259, and by platform administrators 239. The user interface to these users is provided by processes, such as the wscp process 368, other than the database manager process 369. These processes communicate with the database manager process 369 to change the database 470. All updates of the database 470 are done through the database manager process 369.

The database 470 may be edited by more than one process 351 at the same time. The database manager process 369 provides runtime update notification for all data in the applications database 470.

Database Updates: There are three types of database updates available for application processes; add a record, delete a record, and change (modify) a record. Two of these update types require the updating process 351 to obtain a database lock 499 on the data that will be updated. This lock 499 is required to insure that data is only being updated by one process 351 at any given time. Database locks 499 are used to provide concurrency control for the database 470.

When a process 351 requests a record lock 506, if another process 351 holds the same record lock 506, or if another process 351 holds a table lock 507, the requesting process 351 is informed that the lock is busy. When a process 351 requests a table lock 507, if another process 351 holds the table lock 506, or if another process 351 holds a record lock 506 on any of the records in the table, the requesting process 351 will be told that the lock is busy. When a lock is busy, a process 351 can wait and try to obtain the lock later.

Of the three types of database updates, only two, deleting and changing (modifying) database records, require the updating process 351 to obtain record locks 506 or table locks 507 on the data being updated (except for instant updates). Adding a database record does not require the use of locks 499.

After obtaining a lock 499, if required, a process 351 calls the update library routine 500 of the database manager process 369, passing some update information and the new data (record). The database manager process 369 updates a system database 500 and informs the requesting process 351 of the outcome of the update. The database manager process 369 also informs other processes 351 using the changed data of the change.

Runtime Update Notification: The database manager process 369 coordinates dynamic data updates. Dynamic data updates differ from other updates in that changes made to data are delivered to processes 351 that use the data immediately after the changes are made. Without dynamic updates processes 351 would never see the new, changed data until the system 200 was re-initialized. The database manager process 369 is responsible for informing the appropriate processes 351 of any changed data. Processes 351 wishing to receive runtime update notifications "register" with the database manager process 369. All data in the application database 470 may be dynamically updated. Runtime update notification is provided for all database files in the application database 470.

Detailed Description: The database manager process 369 provides update notification with a resolution down to the field level (so that when a field of a structure is changed, any process interested in only that field, and not the whole record, would be notified if it was changed by another process).

Concurrency Control: The database manager process 369 provides concurrency control by locking database records that are out for editing. Locking is provided at two levels, (1) database records and (2) database tables. Locking at a database record level prevents editing of a database record by more than one process 351 at the same time. It allows different processes 351 to simultaneously edit different records from the same database table. Locking at a table level (e.g., the PSAP table 382) allows the process holding the lock 499 to update any records of eh table, but prevents updates by other processes 351 wishing to update any of the table's records. Concurrency control uses record keys and locks.

Database Record Keys. The concurrency control mechanism prevents two processes from simultaneously editing the same 'piece' of data. This is done by restricting access to data that will be updated to one process at a time. The "granularity" at which data access will be restricted is down to the level of a database record, since a database record is the unit of data transfer when using the admin library to access the system database 500. Data access restricted at the database record level of granularity means that the smallest 'piece' of data that can be locked is a record (it is the 'finest' granularity of locking). In addition to locking database records, processes are able to lock database tables, e.g., the PSAP table 382.

Database record keys 502 are a way to uniquely identify each record in the database 470 to restrict access to them. A database record is uniquely identified by two things; (1) a record type and (2) a record key 502 uniquely identify any record in the database. The type of record is passed to all database access library routines, and identifies what kind of record the process is interested in. Then, database record's key 502 is used to identify a particular record of a given type.

The key 502 is a field in the database record that is used as an index for the record. It is a field that is used interally to the data base manger process 369 to identify record instances to the processes 351 that use them. The following are the keys 502 that are used for all application database types.

| | |
|---|---|
| ADM_DB_ALI | ali_line_no |
| ADM_DB_DEST | dest_no |
| ADM_DB_ESN | esn_no |
| ADM_DB_ESCO | esco_no |
| ADM_DB_FXDIR | psap_no |
| ADM_DB_NIGHT | psap_no |
| ADM_DB_NPA | no key (only one record) |
| ADM_DB_PDN | pdn_no |
| ADM_DB_PLATFORM | no key (only one record) |
| ADM_DB_PSAP | psap_no |
| ADM_DB_TRUNK | trnk_no |
| ADM_DB_TRUNK_GROUP | trnk_grp_no |
| ADM_DB_MAINT | dev_channel * MAX_ENTS_PER_CHN + dev_entry |
| ADM_DB_WKST | psap_no * MAX_WKSTS_PER_PSAP + wkst_no |
| ADM_DB_XFR | xfr_no |

Responsive messages 288 respond to update and lock requests between the database manager process 369 and updating processes 351. These messages 288 includes the key 502 of the data being updated so that the updating processes 351 knows which record a particular response message 288 is for.

Database Write Locks: Processes are restricted from accessing data that is being updated by other processes 351. This restriction is done using database write locks 503. Two levels of locking are provided by the database manager process 369. The first, record locking, is the lowest level at which the data can be locked. Even if a process 351 is changing only one field of a record, it must lock the entire record, preventing other processes 351 from updating other fields of the record. The second level of locking, table locking, allows a process 351 to lock an entire database table. Holding a table lock 507 is almost equivalent to holding individual record locks on all records in the table. Certain types of data are accessed, and updated, on a per table basis, and the ability to lock an entire database table (database type) is useful in these cases.

Both types of locks, record 506 and table 507, are obtained by requesting them from the database manager process 369 through the library routines 500. Once a process 351 obtains a lock 499, it can keep it for as long as it wishes, but it must respond to lock inquiry messages 288 sent to it from the database manager process 369 in a specified period of time. Lock inquiry messages 288 are sent to processes 351 holding locks 499 when another process 351 wants the lock 499. The process 351 holding the lock 499 may respond by telling the database manager process 369 (1) that it still needs the lock 503, or (2) to release the lock 503. If the process 351 gives up the lock 499, it must abort its update transaction. If it keeps the lock 499, it may proceed with its update transaction. If a process 351 does not respond to a lock inquiry message 288 in a specified period of time (e.g., two seconds), it loses its lock 499 and aborts its update. Therefore, processes 351 hold a lock 503 for as short a time as possible, especially if other processes 351 are trying to get the lock 503 (when they receive lock inquiry messages). Processes 351 interacting with users may give up the lock 503 if the editing user has not shown any activity on its workstation 212 for a certain length of time.

Record Locks: Record locks 506 are used to prevent simultaneous editing of a database record. When a process 351 holds a write lock 503 on a database record, other processes 351 will be prevented from editing (changing or deleting) the record. A process 351 requesting a record lock 506 might not get it if another process 351 holds a record lock 506 on the same record, or if another process 351 holds a table lock 507 on the database table in which the record resides.

Any process 351 that holds a lock on a particular record will be informed when another process 351 wants the same lock, or wants a lock on the table the record is in. This notification comes in the form of a lock inquiry IPC message 288. A process requesting a record lock 506 that is already being held (the record the process 351 wants a lock for is already locked, or the table the record is in is already locked) will be given the lock if the holding process responds to its lock inquiry with a 'release lock'. If the process 351 holding the lock responds with a 'lock still busy', then the requesting process 351 will be told the record is busy. A lock request for a record that does not exist in the database will fail. Locks are only used to prevent simultaneous editing of existing database records.

When a process requests a record lock 506, it must supply the update time of its copy of the record that it is requesting the lock for. This time is a field in all database records. The database manager process 369 compares this time with the update time of the database copy of the record to determine if the process 351 requesting the lock needs to read an up-to-date version of the record before updating it. A read flag is set in the message 288 that grants a process 351 a record lock 506 when the process 351 needs to read a new copy of a record before editing it. Database updates that attempt to modify a record with one that is out-of-date could corrupt the database, and thus are not allowed. A process 351 that will be deleting a record can ignore the read flag. It is used only for processes 351 that will be modifying a database record. When a process 351 changes or deletes a database record, it should release the write lock 503. Once again, locks are not required for adding records to a database table.

Table Locks: When a process 351 holds a write lock 503 on a database table, other processes 351 are prevented from changing or deleting any of the records in the database table. However, processes 351 are able to add new records to this table. Any processes 351 that have registered for runtime updates on a database table are informed of these record additions. Any process 351 that holds a lock 499 on a database table is informed when another process 351 wants the table lock 507, or when another process 351 wants a lock 499 on a record in the locked table. This notification comes in the form of a lock inquiry IPC message 288.

A process requesting a table lock 507 that is already being held will be given the lock 507 if the process 351 holding the table lock 507 releases it in response to its lock inquiry message 288. If the process 351 holding the table lock 507 responds to the lock inquiry message 288 with a 'lock still busy', then the requesting process 351 will be told the record is busy. A process 351 requesting a table lock 507 on a database table which has one or more of its records already locked will be given the lock only if all the processes holding record locks respond to their lock inquiry messages with a 'release lock', otherwise the requesting process 351 will get a lock busy message 288. Table locks 507 must be explicitly released by the process 351 holding them when they are done editing records of a database table.

Database Updates: As described above, any process 361 wishing to edit (update) the application database 470 does so through the database manager process 369. Updating processes 351 first open a connection to the database manager process 369 (usually done at process initialization time). For updates involving deleting or changing records, obtaining locks 499 are required before an update request will be accepted. Updates are done by calling the database manager process 369's update library routine 500, passing the new data, and other update information. All database updates are done at a record granularity (an entire database record is changed, deleted or added per update transaction). Even though a process 351 is only updating one field of a database record, it is considered to be editing the whole database record, preventing any other process 351 from editing the same record.

Database Record Additions: Adding a record to the database 470 is the simplest update operation. No locks 499 are required for a process 351 to add a record to a database table. The process 351 adding a record calls the database manager update library routine 500, giving the record that is to be added and the database table that it is to be added to.

The 'key' field of the record being added can contain a value selected by the calling process 351, or it can contain an ALLOCATE_KEY value. When a process 351 tries to add a record with a key of ALLOCATE_KEY, it is asking the database manager process 369 to find a free key, and to return it to the process 351 trying to add the new record. This is used in cases where the process 351 adding the record does not know which keys are available. There can only be one record in a database table with any given key. If a process 351 fills in the key field of the record with a nonnegative value (a valid key), the database manager process 369 verifies that the key is not already being used. If the key is already being used, the update will fail.

The database manager process 369 takes the record and the type of database (passed to it by the update library routine via an IPC message 288), and tries to write the record to the appropriate database file. If the write is successful, it returns an IPC message 288 with the message type set to UPDATE SUCCESSFUL. If there was an error while adding the record, the database manager process 369 responds with an UPDATE FAILED message 288. The update can fail because of a system or internal error (e.g., the write system call fails), or the updating process could be attempting to add a database record that already exists.

Database Record Modifications: Database record modifications require first obtaining a lock 499 on the record (or the table the record is in). When a process 351 requests a lock 499, it must give the update time of the record (a field in the record) for which it is obtaining a lock 499. If this time is older than the update time of the record in the database 470, the updating process 351 has to read a new copy of the record before doing the update. A process 351 is notified that its copy of a record is out-of-date by examining a read flag contained in the LOCK GRANTED message 288 sent by the database manager process 369 in response to a lock request. If this flag is set, the updating process 351 reads a new copy of the record. It will not be able to successfully modify the record (have it written to the database) unless it reads a update version of the record, and integrates its changes into it. Once a process 351 obtains a lock 499, the update time of the record is not changed since other processes 351 are prevented from modifying the record, so whatever the read flag indicates at lock allocation time is valid until the process 351 releases the lock 499 (i.e., the process obtaining the lock 499 does not have to worry about its copy of the record going out-of-date once it gets an up-to-date copy after obtaining the lock 499).

If the process 351 can not obtain the lock 499 (because some other process already has it), it must abort its update attempt, and maybe retry later. Once a process 351 obtains the lock 499, it can modify the record as it wishes, then have the database manager process 369 write the updated (modified) record to the appropriate database file.

The database manager process 369 attempts to write the record to the database, and if successful, will respond with an IPC message 288 to the updating process 351 with the message type set to UPDATE SUCCESSFUL. The updating process releases the record lock 506 if it is done modifying the database record, or releases the table lock 507 if it is done modifying records of the database table. If the write to the database fails because of a system error or some other internal error, the requesting process 351 receives an IPC message 288 from the database manager process 369 with the message type set to UPDATE FAILED. If the process 351 doesn't hold a lock 499 on the record that it is modifying, it will receive an UPDATE NO LOCK message. If the process 351 tries to update the database with an out-of-date record, it receives an UPDATE OUT OF DATE message 288.

Database Record Deletions: Deleting a record from the database 470 is similar to changing a database record. Both require that the updating process 351 first obtain a lock 499 on the record, or the table the record is in, that it wishes to update. If the record the updating process 351 is interested in is already locked, the process 351 will have to retry later.

After the requesting process 351 receives the lock 499, it can call the update request database manager library routine 500, passing it the database type and the key of the record that it wants to delete. After deleting the record, the process 351 should release the record lock 506. If the process 351 had a table lock 507, it should release the table lock 507 only if it is done editing all records of the table. The database manager process 369 responds with an UPDATE SUCCESSFUL message 288 if the record was successfully deleted, or an UPDATE FAILED IPC message if there was an internal or system error. If the process 351 does not hold a lock 499 on the record it is deleting, it will receive an UPDATE NO LOCK message 288. The update can also fail because a process 351 is trying to delete an only record that must exist (the npd and platform records).

Instant Updates: Instant updates are database updates which change (modify) database records without requiring the updating process 351 to hold a lock 499 on a record. They are required in situations where a process 351 must change some data, regardless of whether it is out for editing by another process 351. The only two updatable objects that are 'instantly updatable' are the Night Service override and PSAP Abandonment. If a workstation attendant 221 pushes a key 511 that is supposed to put the PSAP 516 into Night Service early, the attendant 221 does not want to be told that another process 351 is already editing the database record, and that the PSAP 511 can not go into Night Service.

In addition to not requiring locks 499, instant updates differ from normal updates in that the timestamp of the passed record is not used to see if the record is up-to-date before allowing the update to proceed. The entire record, except the fields that contain the instantly updated data, is ignored and the database manager process 369 changes the fields in the database copy of the record with the instantly updated data.

If a process 351 does an instant update, and the record being modified is not locked by another process 351, then the modification proceeds similar to normal updates (i.e., when a lock 499 is first obtained on a record). If another process 351 holds a lock 499 on the record being instantly updated, when the process 351 that holds the lock 499 tries to update the record, the update fails because the process's record is out-of-date (because the instant update updated the record and the update time was increased). Even though the updating process 351 had an up-to-date record when it got the lock 499, the record has gotten out-of-date. Processes 351 that are doing updates handle an UPDATE OUT OF DATE message 288 from the database manager process 369. If the processes 351 get this message 288, and they have a record that was up-to-date when they were granted a lock 499 on the record being updated, some other process 351 has done an instant update, and the processes 351 read a fresh record from the database and integrate their changes into it before trying the update again.

Runtime Update Notification: Runtime update notifications are available on the entire application database 470 and for data files that are not a part of the application database. Data for which processes 351 can receive runtime update notifications is said to be dynamically updatable. Data that is dynamically updatable differs from other data because any changes made to this data are distributed to the appropriate processes 351 as soon as they are made; the system 200 does not have to be re-started for processes 351 to get a copy of the new data. The runtime update mechanism provided by the database manager process 369 allows data to be dynamically updated.

Updatable Objects: When a 'piece' of data in the system database 501 is changed by one process 351, all other processes 351 that rely on that data must be informed of the change. Processes 351 are told about changes made to an item of data to which they knew exactly how to respond without having to do any computing to figure out what changed. This 'piece', or item, of data is an updatable object. An updatable object is the smallest unit of data for which a process 351 can be notified about changes. It is the 'piece' of data which if changed a process tells (register) the database manager process 369 it is interested in knowing about.

Registering For Runtime Update Notifications: Runtime update notifications require that processes 351 first register with the database manager process 369. Processes 351 must register to receive runtime update notifications on all changed updatable objects. The database manager process 351 builds a table, using information collected when processes 351 register with it, that allows it to inform the necessary processes 351 about changes made to data.

Processes 351 register for runtime update notifications as part of their initialization (after connecting to the database manager process 369), before they read any data. However, the database manager process 369 allows registration at any time, and acts as soon as the runtime update notification registration information is received and incorporated into the update table of the database manager process 369. Processes 351 are not notified of changes made to any data until they have registered for runtime update notifications on that data.

When a process 351 changes some data in a record, all processes 351 that have registered for runtime update notifications on updatable objects that were changed within that record are informed of the change. Generally, processes 351 will be given a copy of the new record (or are told to read a new record from the database if the record is too large to send in an IPC message 288). Other information included in the update notification message 288 is the database type, and which updatable objects of the record were changed.

Processes 351 register for runtime update notifications using the database manager library routine 500 (see the dbmgr_update_notif_reg( ) routine). For each library function call, the calling process 351 specifies the database type, the record key, and the record objects of the specified record in which it is interested. Registration generally occurs on a per database record basis (a process 351 registers for runtime update notifications on one record in each library function call). All record objects of a record are specified in one library function call. If a process 351 registers for runtime update notifications on a record for which it has already registered, the old registration information is replaced by the new information (i.e., the record objects that it had registered for runtime update notifications on before are lost, and are replaced by the record objects given in the most recent registration function call).

Any processes 351 that have registered for runtime update notifications on all records of a database record are notified of any changes made to the specified record objects of any record in the database table 259 for which the registration was made. In addition, the process 351 is notified when a new record is added to the database table (type) for which registration was made. Any processes 351 that have registered for runtime update notifications for all record objects of a record are notified of changes made to any record object of the specified record. Any processes 351 that have registered for runtime update notifications on an updatable object that incorporates both specified record objects and new record objects are notified of changes made to any record object of any record in the specified database table (database type).

Changing an Updatable Object: After an updating process 351 has changed its local copy of a database record, it calls the database manager process 369's update library routine 500. Parameters to the update library routine 500 include a copy of the changed record, and information about all the updatable objects that were changed in the passed record. This information includes the database type, the record key, and a variable that indicates all the record objects of the record that were changed. Another parameter gives the update type, which would be "change." The database manager gets a message from the library routine 500, and attempts to write the changed record to the database. It then reads from its update table, and using the information about which updatable objects were changed (passed to the update library function 500 by the updating process 351), informs the necessary processes 351. To do this, it sends a message 288 to all processes 351 that have registered their interest in any of the changed updatable objects. Included in this message 288 is a copy of the new (changed) record (except for records that are too large to fit in an IPC message 288, in which case the process 351 reads the new record from the database), the database type to which the record belong, the record's key, and a variable telling all the updatable objects that were changed in the record. With the information in this message 288, the process 351 receiving it should be able to update its copy of the data, and take any other necessary actions.

Dynamic Data Updates: Deleting a Record: Updatable objects are not deletable. Only database records are, thus dynamic updates where a record is deleted are handled as if all record objects of that record have been deleted, and any processes 351 that have an interest in any of those updatable objects are notified that the record was deleted. The process 351 that is deleting the record calls the database manager process 369's update library function 500. Other parameters to this function are the database type and the record key for the record it wishes to delete. The process 351 does not need to worry about setting the record object element. The database manager process 369 attempts to delete the record, and if successful, it reads from its update table all processes 351 that have an interest in the record that was just deleted. The process 369 sends all these processes 351 a message 288 indicating that the record was deleted. The message 288 includes the database type of the record and the record's key. The process 351 that requested the delete will be sent a message 288 indicating the success of the update.

When a process 351 is informed of a dynamic update, and the message 288 indicates that the update type was a record delete, it should know to only look at the database type and record key elements of the updatable object. The record object is set to "all," but the process 351 does not need to read it since a delete always infers all record objects.

Dynamic Data Updates: Adding a Record: Updates of type add operate on records, and not on updatable objects (new fields can not be added to structures). When a process 351 wishes to add a record to the database, it calls the update library routine 500. The parameters it must pass include the new record, the database type of the record, the key of the record (set to ALLOCATE_KEY if the process 351 doesn't know what the key is), and the update type, which is set to add. The process 351 can set the record object to all, but this is not required since the update type implies this.

When the database manager process 369 receives an update request message with the update type set to add (sent by the update library routine 500), it attempts to add the record to the appropriate database table. It will read from its update table any processes 351 that have registered an interest in this record. Since the record is new, there will be no processes 351 that have registered for updates on the record (identified by a record key) that was just added, however, it is likely that there is a process 351 that is interested in the database table (the database type) to which this record was added. This is indicated in the update table by a process 351 registering its interest in a record of this database type with a key of all_recs. The key of all_recs indicates that the process 351 is interested in updates to any records of a given type, including new records added.

When a process 351 is informed of a dynamics update, it determines that it is an "add" type of update and determines the database type of the record. It then adds the new record to its copy of the data, and performs any necessary actions.

Restrictions/Limitations: Dynamic data updates to fixed directory database records are handled differently from updates to other database records due to their large size (approximately 6000 bytes). With other types of database records, the record that is to be updated is passed along with the IPC message 288 that tells processes 351 an updatable object they have registered for has been changed by another process 351. Since the maximum size of an IPC message 288 is smaller than the size of a fixed directory database record, the changed record will need to be read from the database 470.

Even though locking takes place at a record (or possibly table) level, it is desirable to inform processes 351 of data changes at a finer granularity than a record. Only a limited number of parameters (which usually correspond to a field in a database record) are able to be dynamically updated. When a process 351 changes any of this data, all processes 351 that are interested in (have registered for runtime update notifications with the database manager process 369) that data are notified. This notification tells them all the updatable objects within the changed record that were modified. Dynamic updates could take place over a broader range of data.

Applications Data Administration

In order to allow any particular C.E.R.S. system 200 to be adapted to the unique and time-varying demands of its service environment, the capability of dynamically altering various parameters used by the applications software 287 is required. In addition, the C.E.R.S. system 200 must allow the administrator 239 to initiate and control audit, maintenance, backup and reporting functions.

Administrable Parameters: Due to the number of features provided in the C.E.R.S. system 200, different configurable parameters must be administrable. Administration is described below in connection with FIGS. 23–25, 27, 30, 32–47, 50A and B–56. Administration includes the following data administration:

1. PSAP Data Administration. (FIG. 44) PSAP data administration functions allow the administrator 239 to view and change the configurable parameters associated with PSAPs 216 and PSAP attendant workstations 212.

Figure 27:
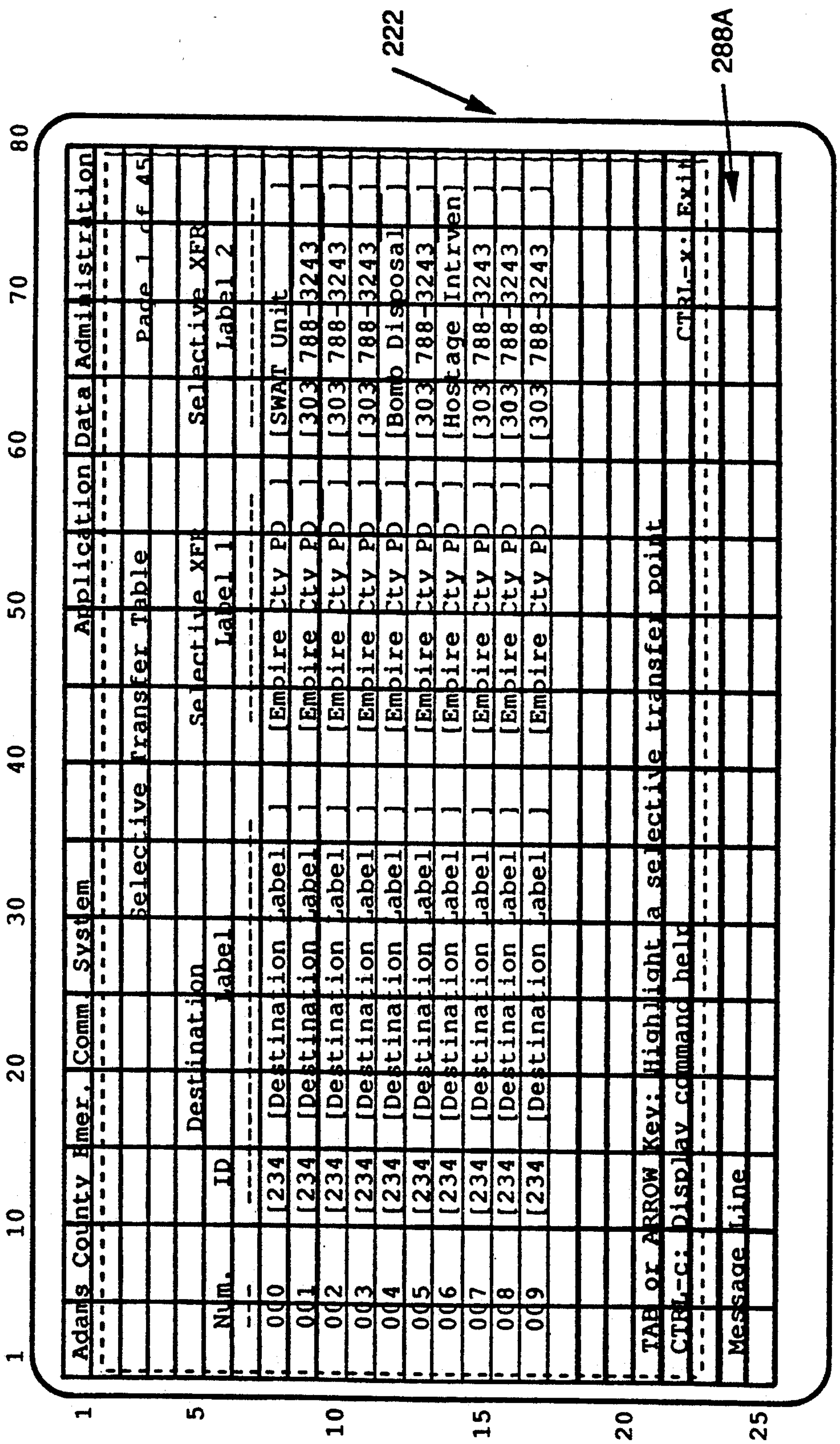
FIG. 27 is a diagram of a screen of a workstation, indicating a list of call handling destinations from which four may be selected and entered in an ESN table indicating selective transfer identifications.
Figure 33:
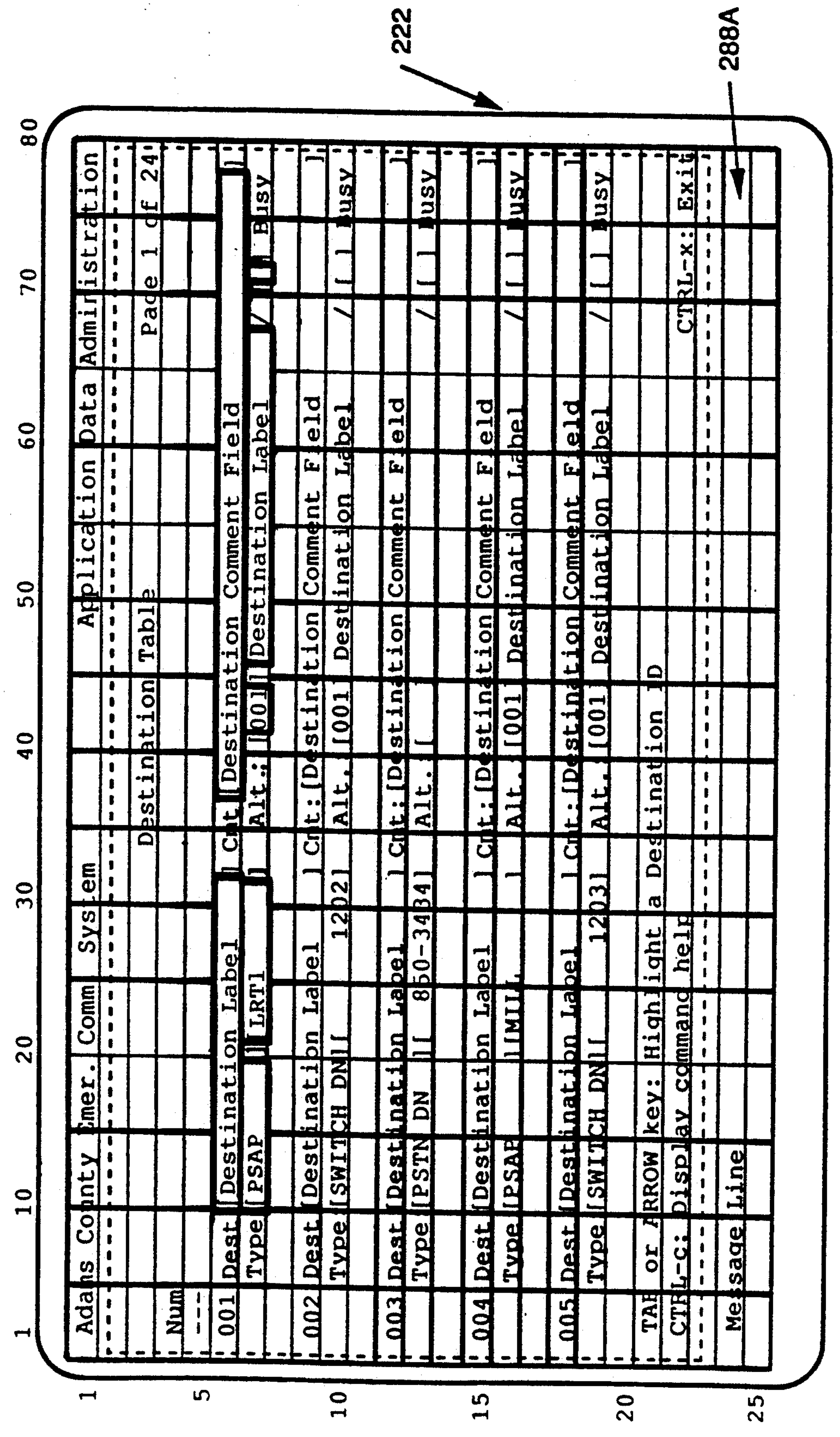
FIG. 33 is a diagram of a screen providing call handling destination information from a destination table.
Figure 36:
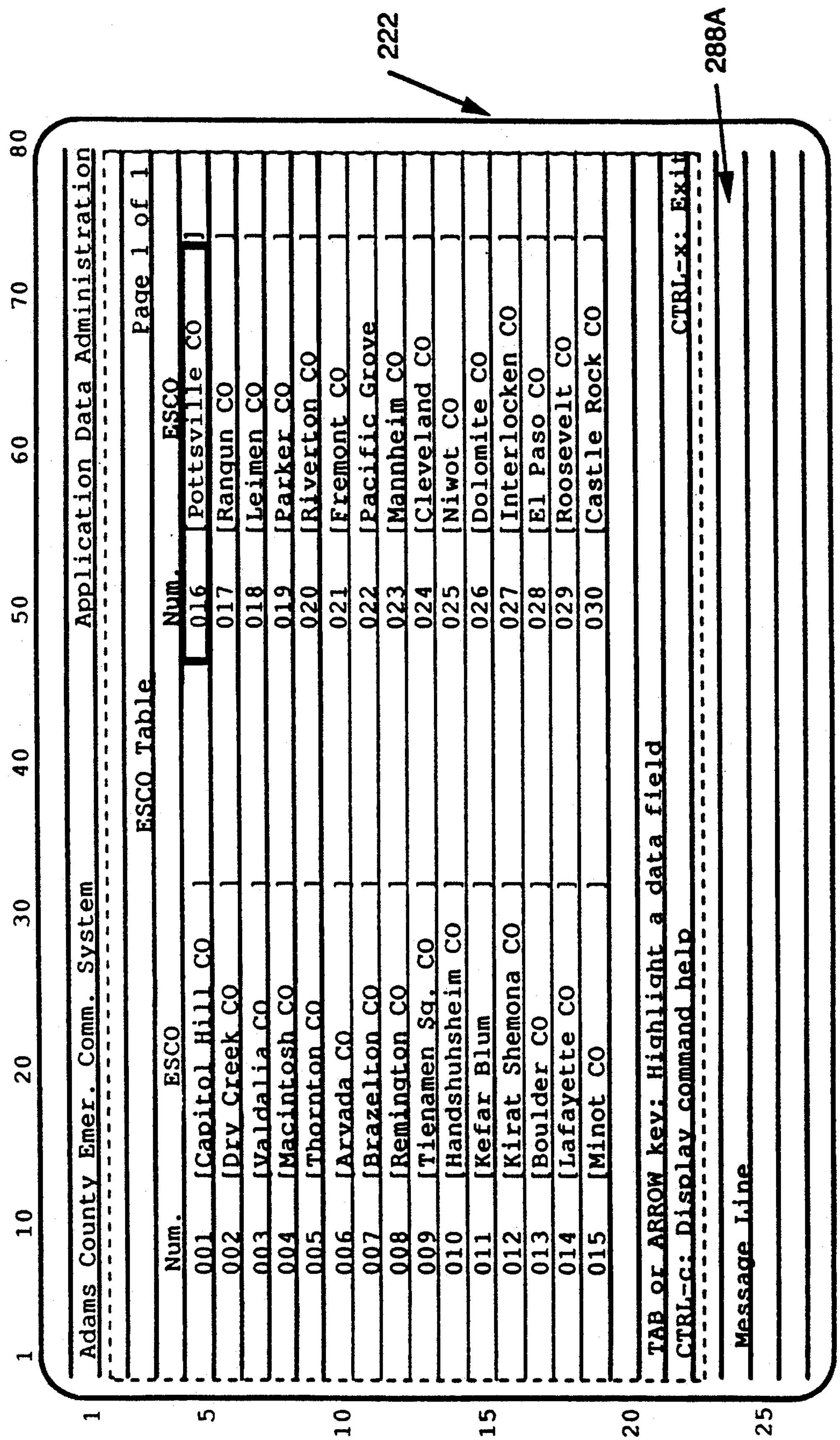
FIG. 36 is a diagram of a screen showing various ESCOs.
Figure 37:
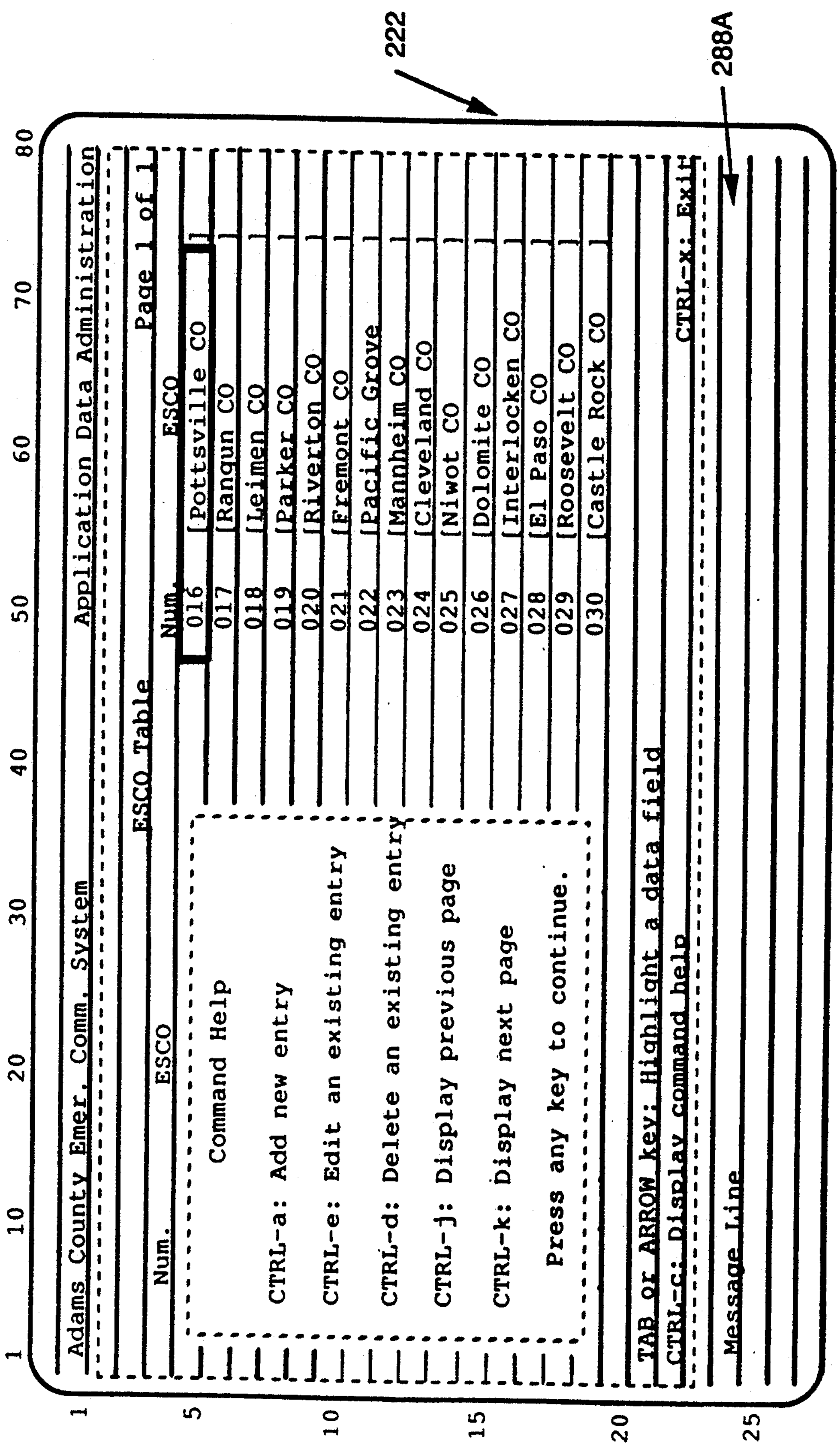
FIG. 37 is a diagram of a screen similar to that shown in FIG. 36 with a command help window shown.

2. Table Data Administration. (FIGS. 27, 33, 36.48). AP Applications software 287 utilizes a variety of information which is manipulated in tabular form. Table data administration allows the administrator 239 to view and edit certain tables, including the following (FIGS. 10 and 11): TN/ESN Table 213, the Destination table 259, ESN Table 451, Selective Transfer Table 378, ESCO Table 387, and NPD/NPA translation table 381.

Figure 50A:
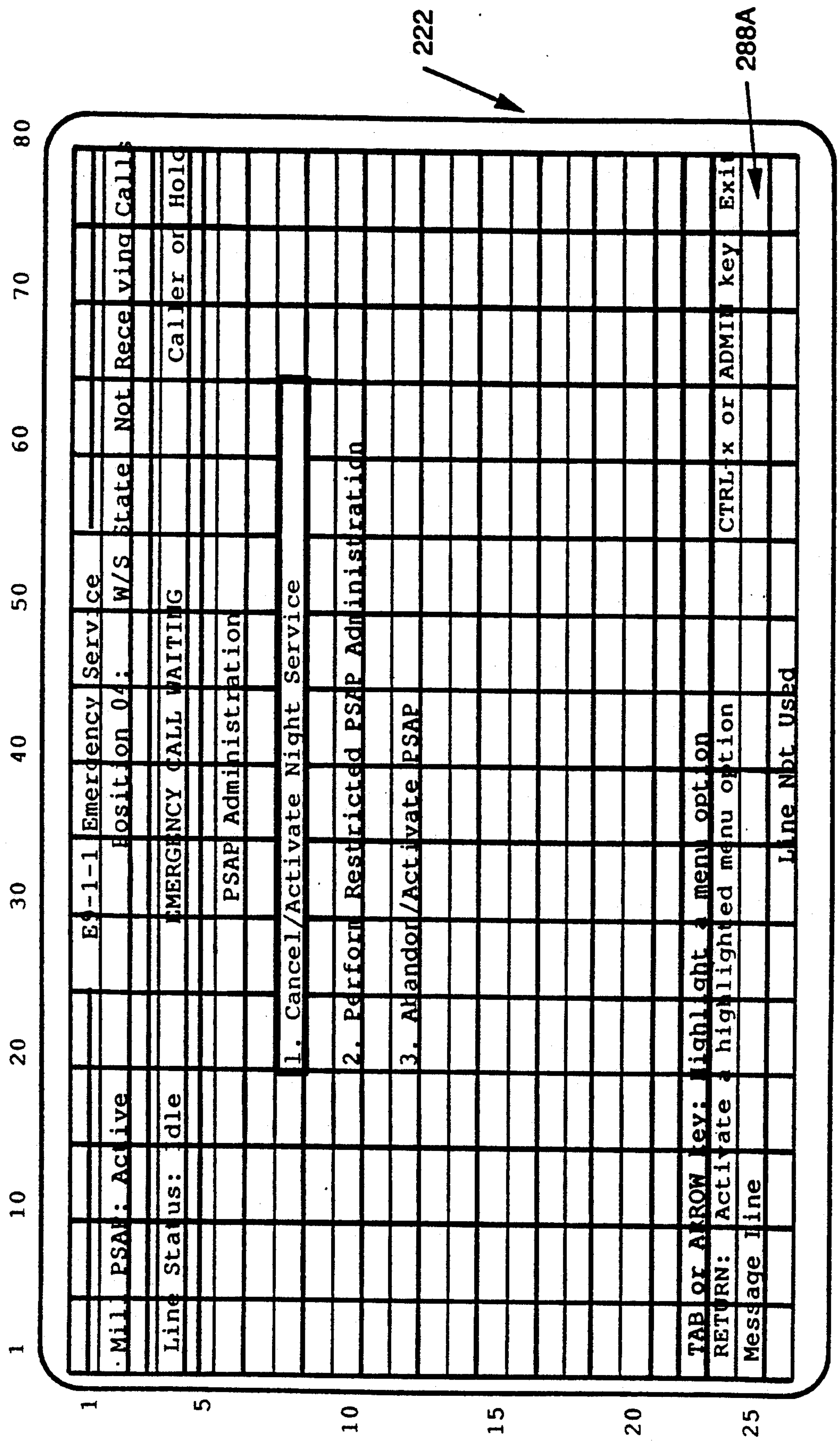
FIG. 50A is a diagram of a screen showing a PSAP administration menu for administering a public safety answering point.

User Access Administration: It is required that only authorized users (e.g., the administrator 239) have access to applications data administration functions. The PSAP manager is able to edit a limited subset of data associated with the PSAP 216 only if the manager 259 knows the correct login/password. The platform administrator 239 is able to edit any system parameters if the administrator 239 knows the correct login/password. Applications data administration provides the administrator 239 with the capability of viewing and editing (add/change/delete, as necessary) parameters including the following:

PSAP Data Administration: (FIGS. 50A and B). Each C.E.R.S. system 200 may support from zero to twenty PSAPs 216. For each PSAP 216, the following parameters are configurable.

PSAP Abandonment: (FIG. 50B, Line 12 . The PSAP state (Active or Night Service) may be overridden by declaring the PSAP 216 to be Abandoned. A PSAP Abandoned flag (see entry in table 382) is provided. When a PSAP 216 is administered to be Abandoned, E9-1-1 calls 201 which would normally be routed to the PSAP 216 are re-routed using alternate routing. The PSAP Abandoned flag is a configurable PSAP Abandonment parameters.

Figure 21A:
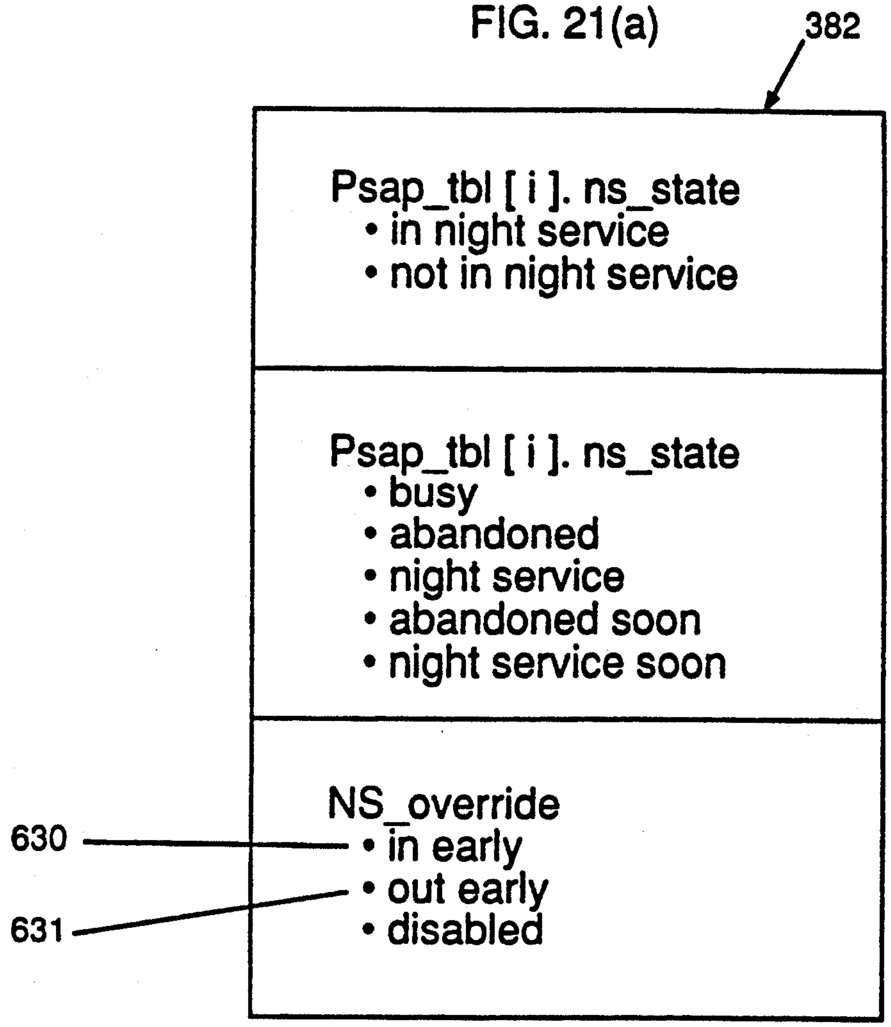
FIG. 21(*a*) is a diagram of a table for indicating information for a PSAP, including night service state and override information.
Figure 21B:
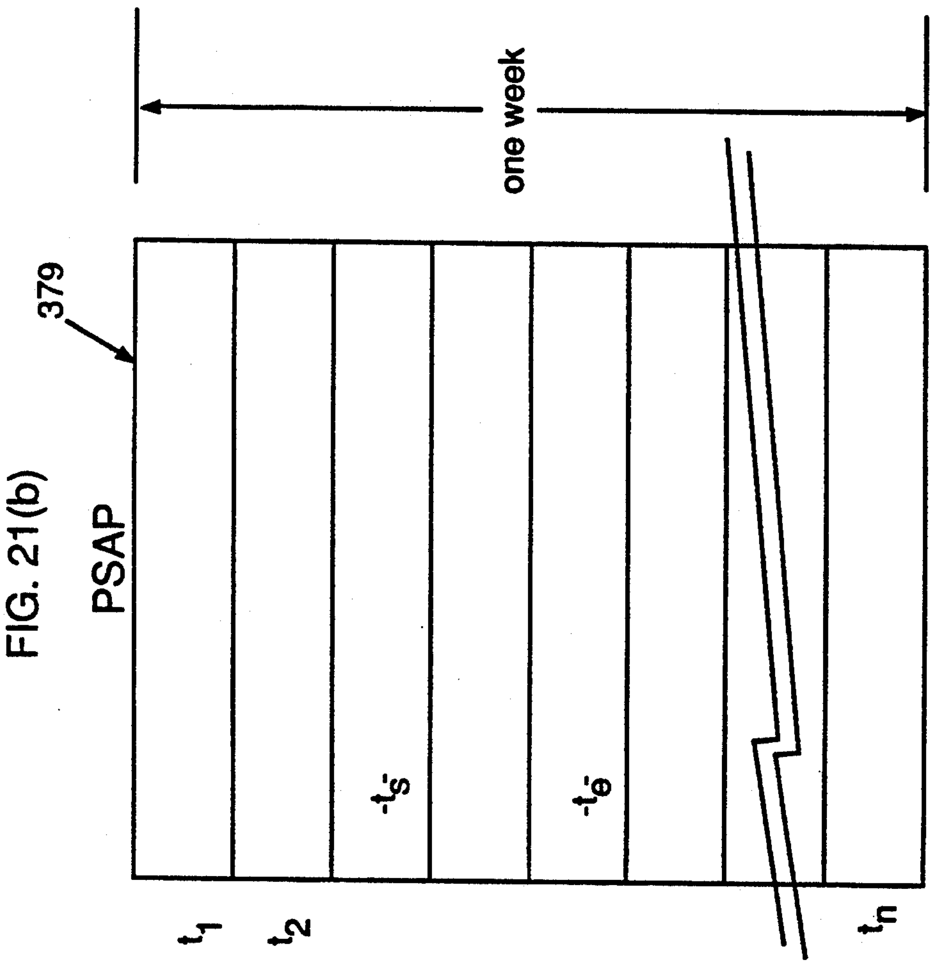
Figure 24:
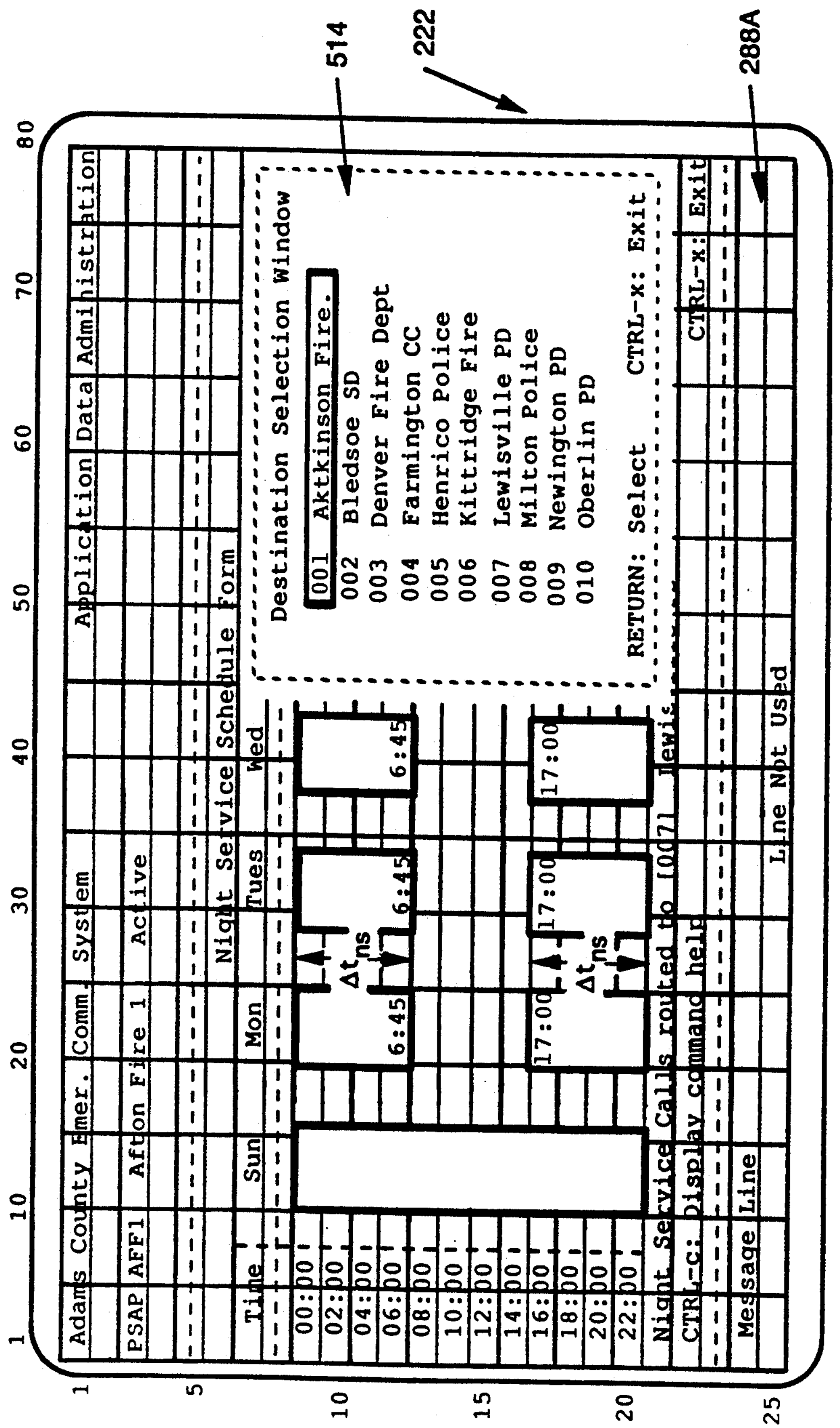
FIG. 24 is a diagram of the screen shown in FIG. 23, adding a destination selection window for identifying call handling destinations to which an incoming E9-1-1 call is to be routed with the primary public safety answering point is in Night Service.

PSAP Night Service Parameters: (FIGS. 24, Lines 8+; 54, 55). When a PSAP 216 is in 'Night Service', E9-1-1 calls 201 which would normally be routed to the PSAP 216 are rerouted. The configurable PSAP night service parameters include the Night Service table 379 (FIG. 21B). For each PSAP 216, the table 379 provides time intervals $t_1$ through $t_n$, where there are less than fifteen minutes in each time interval $t_1$ and $t_2$, for example. Entries in the table 379 denote $t_s$, the time at which a night service interval $\Delta t_{ns}$ starts, and $t_e$, the time at which a night service interval $\Delta t_{ns}$ ends. Each table 379 stores all night service intervals for a given PSAP 216 for one week. There may be up to twenty-one night service intervals in the Table 379. Thus, up to twenty-one Night Service intervals $\Delta t_{ns}$ may be scheduled in one week. The entry following the last defined night service interval $\Delta t_{ns}$ contains a "−1" starting time to indicate that there are no more night service intervals defined for the week. If there are no night service intervals $\Delta t_{ns}$ defined for a PSAP 216, the first entry of the night service table 379 has a "−1" start time. Each night service table entry consists of the following configurable parameters:

1. Night Service start time $t_s$: The starting time $t_s$ of a night service interval $\Delta t_{ns}$ is stored here. It is the number of minutes since midnight on Saturday.
2. Night Service end time $t_e$: The end time $t_e$ of a night service interval $\Delta t_{ns}$ is stored here. It is the number of minutes since midnight on Saturday.
3. Night Service routing option: This flag defines whether E9-1-1 calls 201 which are currently (at time $t_c$) being routed during a night service interval $\Delta t_{ns}$ should be routed via the night service destination number (described below), or via alternate routing. {Default is 'Night Service'}.

Night Service Destination Number: (FIG. 24, Window). This is the destination entry in the destination table 373 to use during the specified night service interval $\Delta t_{ns}$ when the PSAP Night Service routing option is set to 'Night Service'. The applications software 287 uses this table 373 to determine when to transition a PSAP 216 into and out of the Night Service state. The times are assumed to be local times with respect to the platform 204.

Figure 50B:
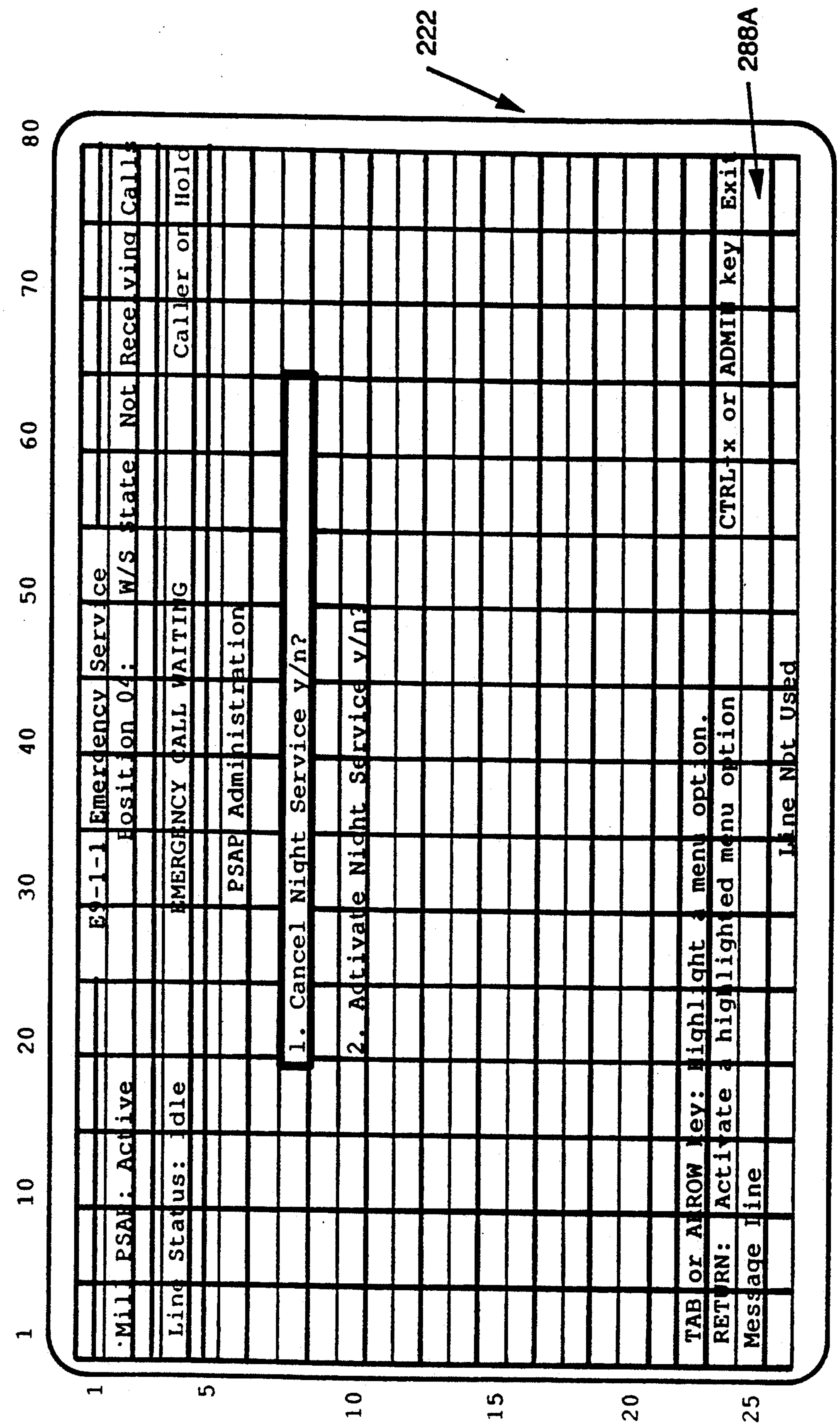
FIG. 50B is a diagram of a screen showing a submenu for administering night service overrides for a public safety answering point.

Night Service Override: (FIG. 50B, Line 8). Night service override allows a PSAP 216 to get into Night Service, or get out of Night Service, early, and requires the following parameters:

1. Night Service Override Indicator. This indicator tells whether a PSAP 216 has been placed in Night Service early, whether a PSAP 216 has been taken out of Night Service early, or whether Night Service override has not been invoked. {In Early, Out Early or Disable; default is Disable).
2. Night Service Override Time. This holds the time ($t_{ia}$ or $t_{oa}$) at which the Night Service Override feature was invoked. This time includes enough information to distinguish both the time of day, and the day that the night service override was invoked. There is no default, and this value is not configurable, but is set by the PSAP manager 259 or the workstation attendant 221.
3. Who Override. This parameter is set by the application software 287 to identify which party (e.g., PSAP manager 259 or attendant 221) invoked the Night Service override. {An 'int' giving the workstation number of the attendant 221 executing night service override.}

PSAP Call Capacity Parameters: (FIG. 25, Line 12). The router process 360 re-routes E9-1-1 calls 201 when a PSAP 216 is determined to be busy (at call capacity, FIG. 20, Step 104). One of the determinants used in this decision is the status of the hunt group queue 243 of E9-1-1 calls 201 at the PSAP 216 waiting to be handled. The configurable parameters pertaining to the call capacity are (FIG. 25):

1. Call Capacity Enable. (Limited/Unlimited; default is 'Unlimited')
2. Call Capacity. {1-99, required if call capacity enabled, default is twice the number of active PSAP workstations 212)

ALI Retrieval: For a New ALI Fetch, an ALI retrieval parameter is used. It is a flag indicating if it will be allowed by PSAP workstation attendants 221. It enables or disables new ALI retrieval {Default is Disable}

Figure 44:
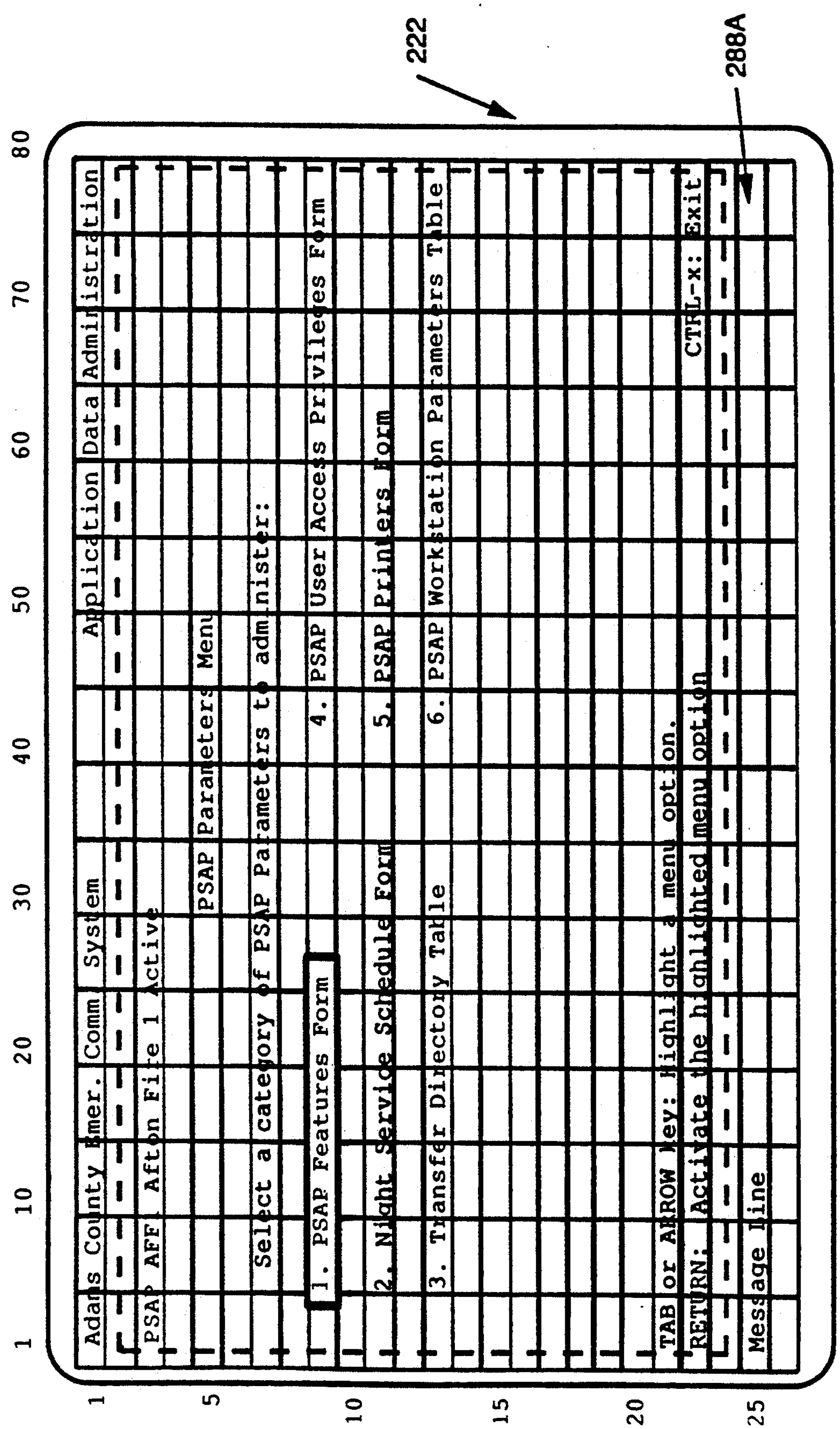
FIG. 44 is a diagram of a screen indicating further administration information for incoming trunks.
Figure 45:
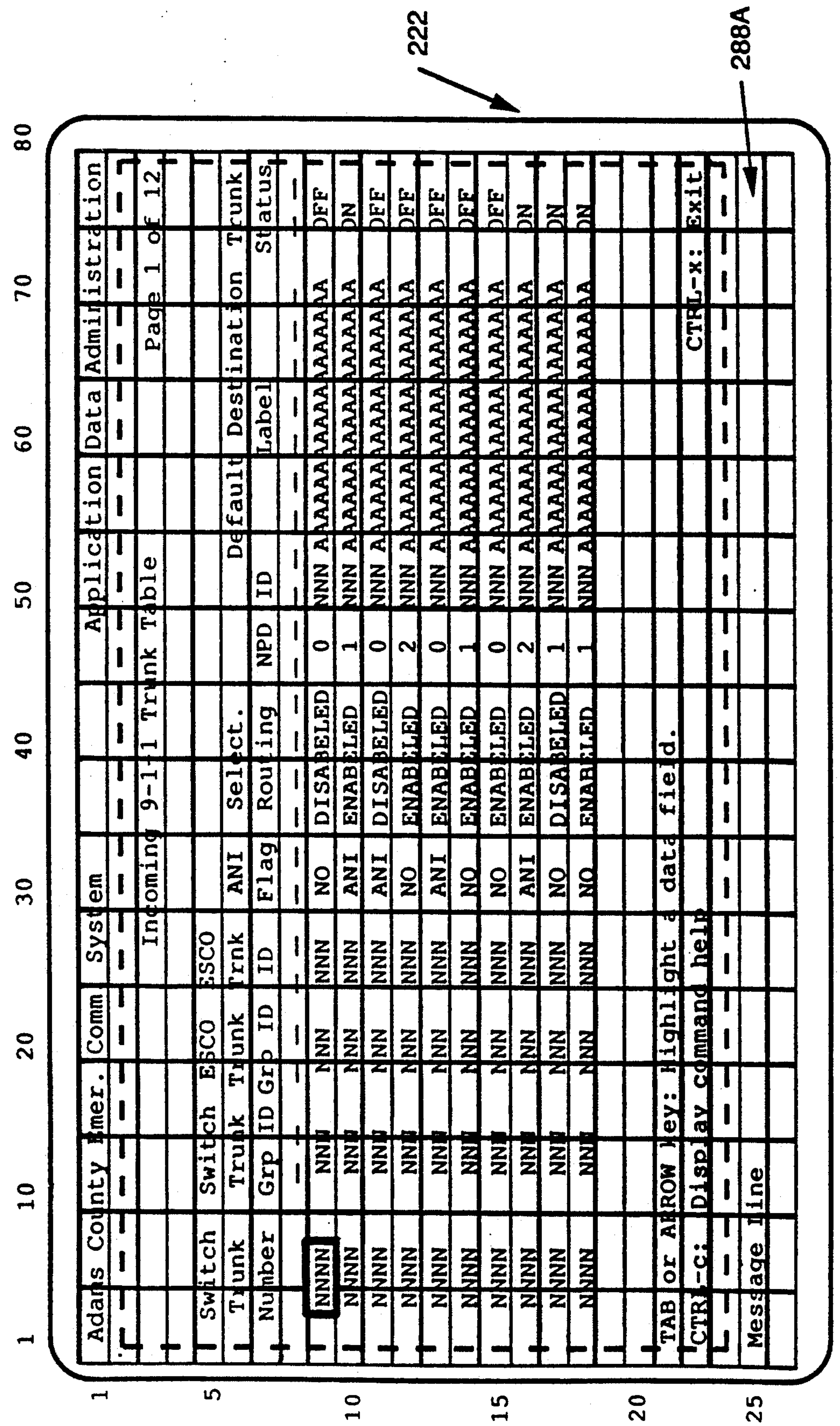
FIG. 45 is a diagram of a screen showing a parameters menu which may be used to administer public safety answering points.

Other PSAP Configuration Parameters: (FIG. 44, Line 13, #6). Several other parameters are necessary to completely configure a PSAP 216, including:

1. PSAP ID. A unique reference number used to identify the PSAP 216. {0–19, no default—entry is required}
2. PSAP Name. A four character mnemonic which is displayed at the PSAP attendant workstations 212. {1–4 chars, no default—entry is required}

3PSAP Off-Line. This flag controls how any particular PSAP 216 is treated by other applications software processes 351. When the flag is set to 'On-Line', the PSAP 216 is considered to be a functioning part of the system 200. When the flag is set to 'Off-Line', it is assumed that the PSAP 216 is not a functioning part of the system 200 and therefore should be ignored by the other applications software processes 351. This allows the user to edit and check PSAP configuration parameters while the PSAP 216 is in the 'Off-Line' state. When editing is complete and the user is satisfied as to the correctness of the PSAP parameter settings, the flag is changed to 'On-Line' and the PSAP 216 is made part of the functioning system 200. {Default is 'Off-Line'}

4. PSAP Hunt Group DN. The DN of the to which E9-1-1 calls 201 to the PSAP 216 are routed when the PSAP 216 is in any station answer routing. {DN format—twelve dial-able characters, no default—entry is required}
5. PSAP Common Notification Line DN. When E9-1-1 calls 201 are routed using any station answer routing, the E9-1-1 calls 201 are first sent to the common notification line 241. This parameter specifies the DN of that line 241. {DN format—12 dial-able characters, no default entry is required}

Figure 35:
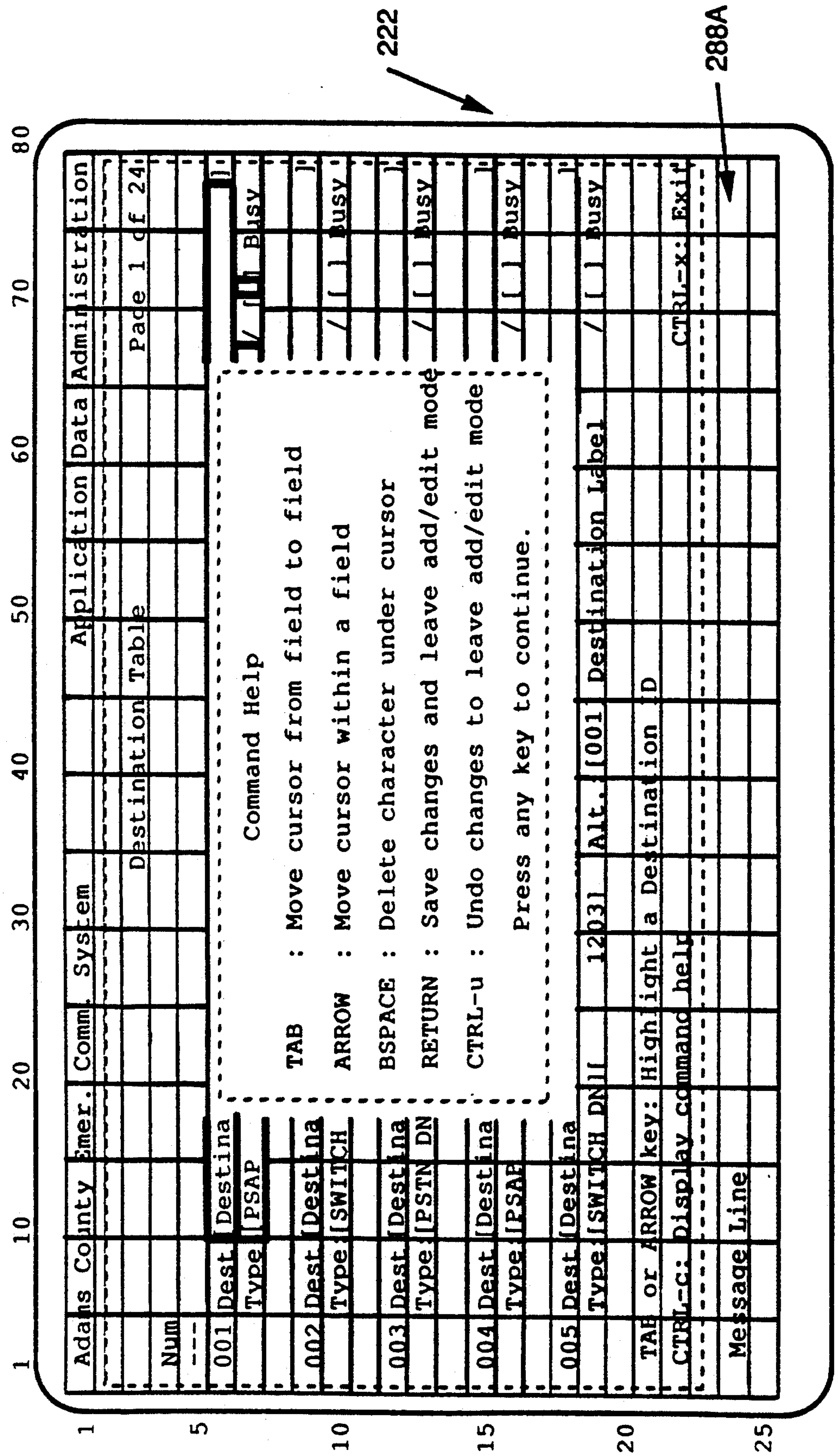
FIG. 35 is a diagram of the screen of FIG. 33 with a further command help window.

Destination Table: (FIGS. 33 & 35). The destination table 259 (FIG. 10) holds information about all possible call handling destinations 215 administered for the system 200. Entries in this table 259 are "pointed" to (via the destination number) by entries in several other database tables, including PSAP table 395, night service table 389, ESN table 390, trunk table 374, and selective transfer tables 378. Each destination table entry contain the following configurable items:

1. Destination Number. A number that uniquely identifies each destination entry. It is used as an index.
2. Destination label. A label that identifies the destination entry {1.20 characters long, no default, an entry is required for each destination table entry}.
3. Destination Comment. This comment field provides more information about the destination entry {1–40 characters long; no default—no entry is required}
4. Destination Type. A flag describing the Destination Type. There are three possible destination types {no default-entry is required}: PSAP, Switch DN, and PSTN DN.

In addition, depending on the destination type, the following items are configurable:

1. For destination types "Switch DN" and "PSTN DN," a destination DN is specified. The destination DN is the DN to which E9-1-1 calls 201 for this destination should be routed.
2. For destination types "PSAP" and "Switch DN," an alternate destination number is specified. This is the destination number to use if the primary destination number is unavailable.
3. For destination types "PSAP" and "Switch DN," a busy flag is specified. This flag tells if a call should be routed to the busy signal 220, or to the Alternate Destination if the primary destination number is unavailable.
4. For destination type "PSAP," a PSAP ID is specified. This is the reference number of the PSAP 216 to which this destination number is associated.

ESN Table: When the system 200 receives an E9-1-1 call 201, the E9-1-1 call 201 will be routed to a destination represented by an ESN selected from the IN/ESN table 213. The ESN Table 213 contains an entry for at least each ESN in the TN/ESN Table 213 (numbered from 0 to 999, or 1000 entries maximum). ESN table 390 entries contain the configurable items shown in FIG. 10.

Selective Transfer Table: (FIG. 27). Each ESN can have from zero to four selective transfer points 225 associated with it. The selective transfer table 378 contains up to 500 selective transfer point entries which are referenced by ESNs in the ESN table 39. Each Selective Transfer Point entry contains the configurable parameters shown in FIG. 10.

Figure 43:
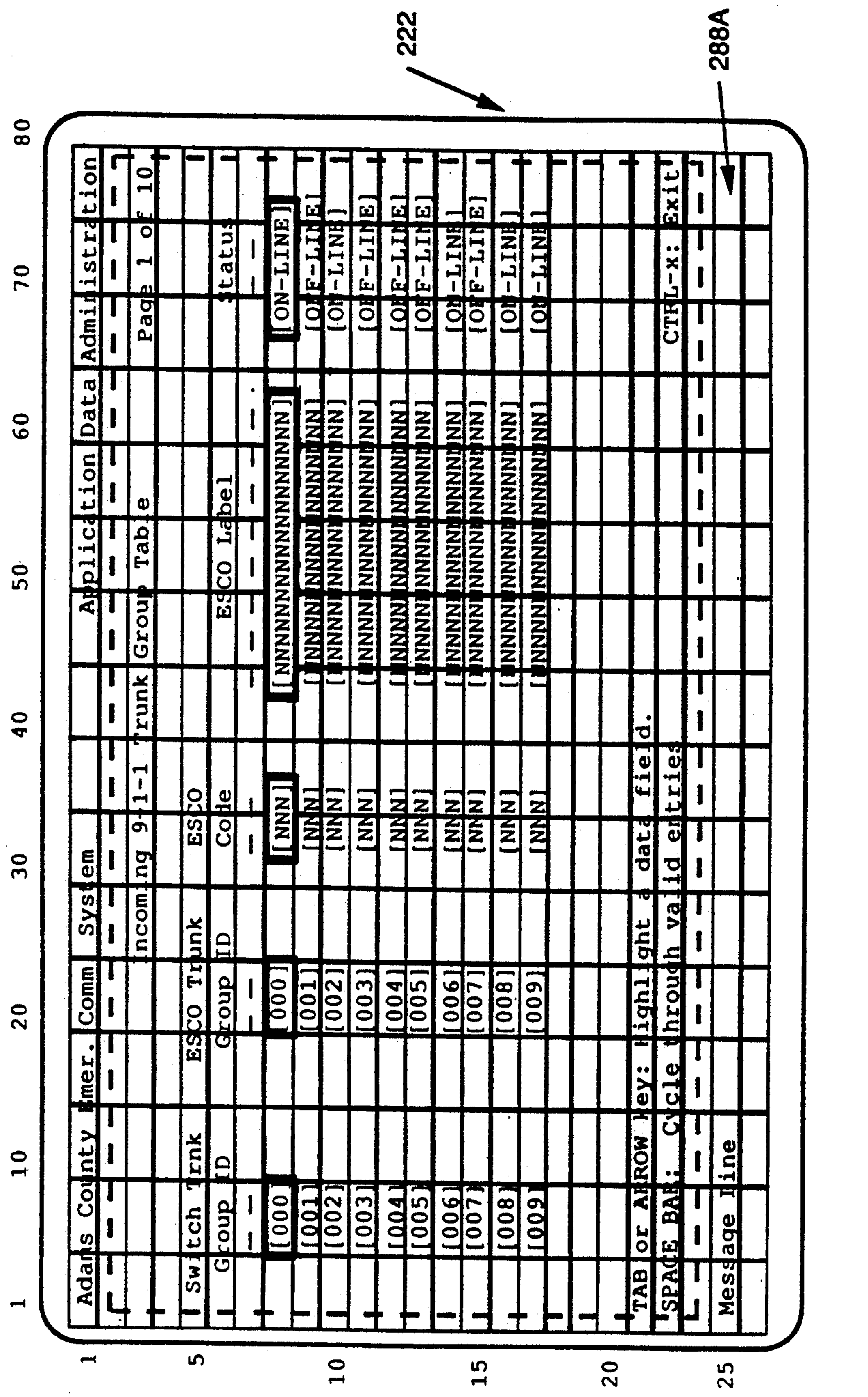
FIG. 43 is a diagram of a screen illustrating selections for incoming trunk groups.

Trunk Table: (FIG. 43). Information on all trunks 206 administered for the system 200 is stored in a trunk table 374. For each trunk 206 in this table 374 the parameters shown in FIG. 10 are configurable.

In addition to the limitation of fifty trunk groups 206A, there is a physical limit to the number of inbound trunks 206 a switch 218 can handle. For the switch 218, this physical limitation is two hundred fifty trunks.

Interactions: Application data administration interacts with other system 200 features both directly and indirectly. Application data administration interacts directly with such features to the extent that when any of the referenced parameters are altered, application data administration and the other features interact to ensure that the change takes effect automatically. Application data administration interacts indirectly with such other features to the extent that the values of such configurable parameters affect the manner in which E9-1-1 calls 201 are handled by such other features.

Call Distribution

The call distribution feature defines how E9-1-1 calls are distributed among attendants 221 at a PSAP 216 and the selection of an attendant 221 after the E9-1-1 call 201 has been routed to a particular PSAP 216.

Referring to FIG. 4, a hunt group directory number is assigned to each PSAP 216 of the C.E.R.S. system 200. Each hunt group has one member, the PSAP notification line 241. The notification device 242 is attached to the notification line 241 at the PSAP 216. The notification device 242 is activated and an "Emergency Calls Waiting" label flashes on all screens 222 at the PSAP 216 when an incoming E9-1-1 call 201 seizes the notification line 241.

A E9-1-1 call 201 directed to the PSAP 216 is immediately sent to the notification line 241 by the switch 218 if a E9-1-1 call 201 is not occupying that line 241. If there is a E9-1-1 call 201 occupying the notification line 241, the E9-1-1 call 201 is put into the until the E9-1-1 call 201 comes to the front of the queue and the notification line 241 is unoccupied. When an E9-1-1 call 201 at the notification line 241 is answered or the ESR 202 hangs up, the switch 218 automatically directs the first E9-1-1 call 201 in the queue 243 to the notification line 241.

Attendants 221 can answer E9-1-1 calls 201 on the notification line 241 by making "Pick Up" requests from their workstation 212. The "Emergency Calls Waiting" label is removed from all screens 222 at a PSAP 216 when the E9-1-1 call 201 at the PSAP notification line 241 has been answered or the ESR 202 has disconnected. The notification device 242 and the label remain inactive until another E9-1-1 call 201 is directed to the notification line 241 by the switch 218.

Attendants 221 are also responsible for handling E9-1-1 calls 201 that have been deliberately directed to their workstation 212 (transfers or direct dialed E9-1-1 calls 201 from other subscribers 202 on the switch 218. For example, an attendant 221 may transfers a E9-1-1 call 201 to another attendant 221 because the native language of the ESR 202 is French and the answering attendant 221 does not speak French. The answering attendant 221 transfers the E9-1-1 call 201 by dialing the phone number assigned to the attendant 221 who can speak French or using the fixed transfer directory 249.

Each PSAP destination supported by the C.E.R.S. system 200 is assigned two phone numbers. One of the phone numbers is referred to as the PSAP hunt group 333 and does not represent a physical circuit on the switch 218. This is the phone number used by the AP 234 to route E9-1-1 calls 201 to the PSAP 216. It is also used as the default destination within switch administration for incoming trunks 206 when the AP 234 cannot route an incoming 9-1-1 call 201 within the allowed time and the PSAP 216 is the default destination for E9-1-1 calls 201 received on those trunks 206. This phone number is administered on the switch 218 as a hunt group pilot number and queuing of E9-1-1 calls 201 is enabled.

Each PSAP 216 is also equipped with the primary notification line 241, which represents a physical line, the second phone number assigned to a PSAP. The line 241 is one member of the PSAP hunt group 333 If the E9-1-1 call 201 cannot be sent to the notification line 241, the E9-1-1 call 201 is put into the queue 243. The E9-1-1 calls 201 remain in the queue 243 with the ESR 202 hearing ring-back until the notification line 241 becomes available.

Because the notification line 241 is the only member of the PSAP hunt group 333, all E9-1-1 calls 201 sent to the PSAP hunt group 333 are sent to the notification line 241 before they can be answered. The notification line 241 is administered to be a single party line on the switch 218. Therefore, when an E9-1-1 call 201 is routed to the notification line 241, the switch 218 applies ringing to the notification line 241 and activates the notification device 242 at the PSAP 216. Attendants 221 at the PSAP 216 either see and/or hear activation of the notification device 242 and at the same time see an "Emergency Calls Waiting" label appear on their screens 222.

Attendants 221 can answer an E9-1-1 call 201 at the notification line 241 by selecting the "Pick Up" key 263A on their keyboard 228. This selection causes the AP 234 to send a "Directed Call Pickup" request to the switch 218 for the notification line 241. The switch 218 redirects the E9-1-1 call 201 that is at the notification line 241 to the attendant 221 making this request. A voice connection 245 between the ESR 202 and the attendant 221 is established if the switch 218 successfully redirects the E9-1-1 to the attendant's DN.

The selection of the "Pick Up" key 263A can be made while the attendant's phone 227 is on-hook or when it is off-hook, but no voice exists with other parties and the attendant 221 is listening to any of the following tones 247: dial-tone, reorder, low-tone, or receiver off-hook.

A low-tone 247 is added to a E9-1-1 call 201 when the ESR 202 making the E9-1-1 call 201 hangs up before the attendant 221 hangs up. The low-tone 247 remains on an attendant's line 245 for five seconds. If no other parties remain on the E9-1-1 call 201 after the low-tone 247 is removed, the attendant 221 hears silence on its line for ten seconds. The ten second interval is the default value used when the switch 218 is installed. A dial-tone 247 is put on the line after this ten second period expires. A "Pick Up" key selection can be made during this ten second interval of silence.

The attendant 221 will be informed that his or her selection was ignored if the attendant 221 makes a "Pick Up" key selection while not listening to one the tones 247 previously mentioned and does not have a voice connection to another party or the selection is not made within such ten second silence interval. This key 263A is also ignored if a selection is made while the attendant 221 is executing administration from the workstation 212.

The attendant's phone 227 rings if it is on-hook when this request is made. The phone 227 rings three times. If the attendant 221 fails to go off-hook before these three rings have expired, the request is ignored. The switch 218 does not redirect the E9-1-1 call 201 to the attendant's line 245 until the attendant 221 has gone off-hook.

Attendants 221 receive a "re-order" tone 247 and a message 240 appears at the bottom of their screens 222 telling them that their request failed if they attempt to pickup a E9-1-1 call 201 and there is no E9-1-1 call 201 present at the notification line 241 to their PSAP 216.

Multiple attendants 221 might simultaneously submit requests to pickup the same E9-1-1 call 201 at the notification line 241 when there are E9-1-1 calls 201 in the queue 243 for the notification line 241. When this occurs, only one of the requests from the attendants 221 is submitted to the switch 218 and the remaining requests are placed in the pick up queue (not shown).

The next pickup request in the pick up queue is sent to the switch 218 when (1) the switch 218 notifies the AP 234 that the E9-1-1 call at the notification line 241 has been directed to the attendant 221 associated with the last pickup request sent to the switch, and (2) a E9-1-1 call 201 from the hunt group queue 243 has been sent to the notification line 241 by the switch 218. If there were no E9-1-1 calls 201 queued in the hunt group queue 243 for the notification line 241, the attendant 221 associated with this last request will receive a "re-order" tone 247. Otherwise, a voice connection 245 between the ESR 202 and the attendant 221 is established. This procedure continues until the AP 234 recognizes that all E9-1-1 calls 201 queued in the PSAP hunt group queue 243 for the notification line 241 have been picked up or there are no outstanding pickup requests from attendants 221. Any outstanding requests after all E9-1-1 calls 201 queued in the hunt group have been picked up, are sent to the switch 218.

These requests may or may not fail to receive a reorder tone 247. The outcome depends on whether any additional E9-1-1 calls 201 are sent to the notification line 241 before a request is sent to the switch 218 and after the last E9-1-1 call 201 was picked up from the notification line.

Information about the E9-1-1 call 201 is displayed on the screen 222 after making the voice connection with the E9-1-1 call 201. At the same time, the "Emergency Call Waiting" label is removed from all attendant screens 222. This label may reappear shortly after being cleared if there are E9-1-1 calls 201 in the PSAP hunt group queue 243 for the notification line 241. Otherwise, the label does not reappear until a new E9-1-1 call 201 is directed to the notification line 241.

The attendant may hear "low tone" 247 over the voice connection 245 when it picks up an E9-1-1 call 201. This is an indication that the ESR 202 disconnected after ANI information for the E9-1-1 call 201 was collected but before the attendant 221 could answer it (i.e. pick the call up from the notification line 241). Information on the disconnected E9-1-1 call 201 is displayed on the screen 222, including the information retrieved from the ALI/DMS. Low-tone 247 can also be heard when the E9-1-1 call 201 is disconnected after the voice connection 245 has been established but before the attendant 221 disconnects. This is an indication to the attendant 221 that the caller 202 has hung up. Low tone 247 is present on the line for five seconds. After five seconds, the tone 247 is dropped and replaced with silence. The silence on the voice line 245 is replaced with a dial-tone 247 after ten seconds of silence. E9-1-1 calls 201 that are directed to a PSAP workstation 212 by another attendant 221 activate an internal telephone ringer on the attendant's phone 227. These E9-1-1 calls are answered by the second attendant 221 when it picks up the second attendant's workstation handset 227 and information on the call 201 is displayed on the attendant's screen 222. If the call is a transfer of an E9-1-1 call 201 information on the E9-1-1 call 201 is displayed along with information on the transfer originator if the transferor is an attendant 221 at a PSAP 216 administered on the system 200. If the call was originated by another attendant 221, the ALI and ANI information displayed on the screen 222, of the second attendant 221 answering the E9-1-1 call 201 matches the ALI and ANI found on that of the first attendant 221 originating the call.

Administration of C.E.R.S. System 200

Reviewing the foregoing description, in general, the term "administration" is used to define the set of tasks (or the process) by which the C.E.R.S. system 200 is configured so as to function as intended. Configuration of the C.E.R.S. system 200 relates to the switch 218, the applications processor 234 and applications data administration generally described above. Configuration may include defining how many workstations 221 are at, and in operation (active) at, a given PSAP 216, and when such PSAP 216 is to be inactive, such as by being Abandoned or in Night Service.

Applications Data Administration: As generally described above, applications data administration relates primarily to administration performed locally at the terminal 276 attached directly to the AP 234 FIG. 1). Remote administration from a PSAP workstation 221 is also described below. Remote administration via a modem (FIG. 1) connected to the AP 234 may also be performed.

Application Data Administration Organization: The applications data administration processes are organized in a menu oriented hierarchy that provides access to data and actions within the system 200. Menu items are objects. Actions, such as add, delete, or change, are performed on the selected objects via direct commands. Administration video display screens that appear on the terminal 276 monitor are forms oriented, with data displayed in labeled fields or tables. Platform administrators 239 navigate among the data fields and, assuming appropriate permissions have been obtained, platform administrators 239 can edit or change the data values presented on the screen 222.

Selection or activation of a system action (e.g., add, change, delete) causes the system 200 to apply a set of consistency rules to the object data prior to committing the action against the administration database 402 (FIG. 9). The platform administrator 239 is informed of the occurrence and outcome of the consistency rule check.

Figure 51:
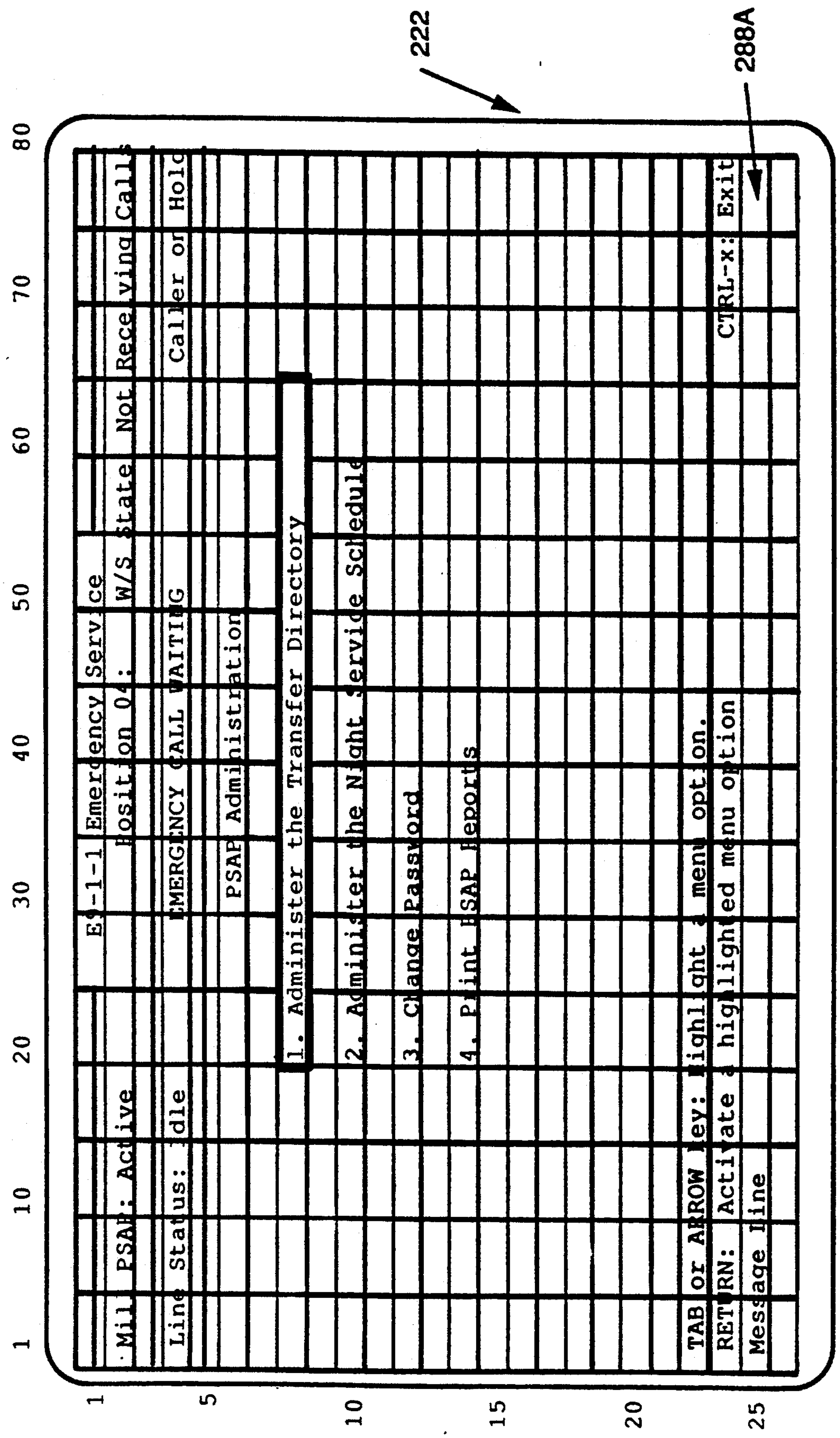
FIG. 51 is a diagram of a screen for administering a PSAP, wherein a password is required to gain access for administration.

Core Navigational Commands Are:

N1. Select (Return Key). Requests the system 200 to display the submenu or data form at the next lowest level of the hierarchy (e.g., FIG. 51).

N2. Previous Page (Control-j). Requests the system 200 to display the previous page of data in a multi-paged table.

N3. Next Page (Control-k). Requests the system 200 to display the next page of the data in a multi-paged table.

N4. Date Field Highlighting (Tab and Arrow Keys). Requests the system 200 to move the highlighting from one field to the next in a logical manner.

N5. Screen Refresh (Control-r). Requests the system 200 to resend the last screen 222 of information delivered to the terminal 276.

N6. Selection Window 514 (Control-w). Requests the system 200 to present a window 514 (e.g. FIG. 24) from which a selection may be made. The data item selected from this window 514 will be automatically placed in the data field on the screen 222. Making a selection initiates two actions to occur: the window 514 is removed revealing the underlying screen 222, and the selected data is placed in the appropriate highlighted field.

N6. Exit (Control-x). Requests the system 200 to save all changes made to a particular form and to display the next highest form of menu of the hierarchy. Requires a confirmation before execution if changes to a screen 222 have been made. Exiting from the main menu logs the user out of the ADA interface.

Core Functional Commands Are:

F1. Add (Control-a). Requests the system 200 to display the appropriate data input form with each field blank or displaying a default value.

F2. Edit (Control-e). Allows the administrator 239 to edit the fields of an existing record of object.

F3. (Control-d) Removes from the database 402 the administrative record or object currently displayed. Requires a confirmation.

F4. (Control.u). Requests the system 200 to redisplay the data contained in a record or form when the last save occurred.

F5. Order (Control.o). Requests the system 200 to order or sort the records of a table in a logical manner. Requires a confirmation.

F6. Command Help (Control.c). Presents a text window 514 of the editing commands available on a specific screen and their actions. This window 514 serves to declutter the screen presentation. Pressing any key 263 removes the window 514 from the screen 222 and places the cursor back on the same location where it was originally.

F7. Selection Window 514 (Control-w). Presents a window 514 of valid entries (e.g., FIG. 24) from which the platform administrator 239 may select. Highlighting an entry within the window 514 and pressing the Return Key serves to remove the window 514 from the screen and placed the highlighted object in the data field.

For those commands requiring a confirmation before execution, (exhibit, order, and delete), the confirmation will be presented to the administrator 239 as a yes/no/-cancel question on the message line 288A of the screen 222.

Administration Screens 222: The administration screens 222 are based on a 24 line by 80 column display format. The screens 222 are character mapped and are presented in a model shown in FIG. 15A, where the following Screen Format Chart presents a key to the letters used in FIG. 15A.

| Screen Format Chart<br>Format of Screen 222 (FIG. 15A) | |
|---|---|
| A = | Method by which call arrived at PSAP |
| B = | NPA |
| C = | NXX |
| D = | Telephone Number |
| E = | Class of Service |
| F = | Month |
| G = | Day |
| H = | Hour |
| I = | Minute |
| J = | Customer Name |
| L = | House Number |
| M = | House Number Suffix |
| N = | Direction |
| O = | Street Name |
| P = | Location Information |
| Q = | Community |
| R = | State |
| S = | OTC (Free Field) |
| T = | Selective Transfer Police (Name and Number) |
| U = | Selective Transfer Fire (Name and Number) |
| V = | Selective Transfer Medical (Name and Number) |
| W = | Selective Transfer Auxiliary (Name and Number) |
| X = | ESCO |
| Y = | Trunk Group |
| Z = | Node ID |
| a = | PSAP Name |
| b = | Locality |
| c = | Trunk Number |
| d = | ESN |
| e = | PSAP ID |
| f = | Pilot Billing Number NXX |
| g = | Pilot Billing Number Telephone Number |
| h = | ESCO ID |
| i = | Numbering Plan Digit |

The screens 222 are composed of the following general areas:

S1. Platform Label. Presented on line 1 of all screens 222. Provides the administrator identification of any screen 222 in the system.

S2. Administration Label. Presented on the line 1 of all screens 222, this is a fixed label.

S3. Screen Title. A descriptive name for the screen 222 that describes the general functionality. This title is the only information on line three. The format of the title is described more fully below.

S4. Line Graphic. A series of four lines joined to form a rectangle. This rectangle defines the boundaries of the workspace.

S5. Workspace. The area of the screen 222 where data entry, menu choices, and system data are displayed. The workspace area consists of 4 through 22.

S6. Message Line 288A. Line 24 of the display. Provides informational messages 240 and contextual confirmation.

All unique screens 222 accessible from the user interface contain a title. All screens are titled and centered on line two of the display, with the major words of the title appearing in initial caps. Data entry fields are the areas where the platform administrator 239 enters system required and other data. The fields look and act as follows:

Field 1. Fields are laid out as "Field label [data]", with a label to the left of the data field or with the label directly above the data field. Fields are denoted by open and close brackets ([]).

Field 2. The extent of the active data field is indicated by high intensity reverse video denoting the maximum valid number of characters that can be entered into the field. Error trapping can prevent the platform administrator 239 from leaving a mandatory data field without submitting a valid entry. The terminal 276 beeps and a message 240 will appear on message line 288A, screen line twenty-four indicating that entry in this data field is required.

Field 3. Much of the data is displayed in table form. A table is defined as having one or more records. A record is a logical group of data fields that are saved as a single entity. For each record there may be several configurable parameters that are displayed on from one to several lines. To distinguish a record as a single entity, each administrable field for that record is placed in low intensity reserve video except for the field in which the cursor is located. That field is placed in high intensity reverse video.

Field 4. Cyclical data fields include data in UPPERCASE lettering or numbers to distinguish it from text data entered into other data fields. For such fields a default entry always exists. Pressing a Space Bar 263A will forward cycle the possible alternatives for the specific field one position per keystroke. Attempting to type in data to such fields results in an error message: "Cyclical field—Use Space Bar."

Field 5. A text cursor can be positioned in the field such that the platform administrator 239 can enter characters into the field. The platform administrator 239 moves the text cursor from field to field by Tab or Arrow Keys 263. Once on a text field, the Arrow keys 263 move the cursor one character position at a time. From the last character position in a field, the cursor jumps to the next field. The cursor is always positioned at character position 1 in a field unless the field is cyclical where no character-by-character editing is permitted.

Field 6. Data entry fields within a form are organized into a visit order. In general, the visit order establishes the sequence of field access by the cursor as the user presses the tab key 263. The sequence is, in general, from left to right and top to bottom on the display for forms and from top to bottom along the left-most column for tables. The specifics of the displayed data should dictate a reasonable visit order of fields. From the last data entry field on a screen 222, pressing the down Arrow Key 263 will move the cursor to the first field at the top of the screen in cyclical fashion.

There are exceptions to the visit order. On tables that contain more than one page of data, pressing tab key 263 or the down Arrow key 263 from the last data field on a screen 222 presents the next full page of data entries. When in edit mode on a record, tab or arrow keys 263 work in cyclical fashion but only within those data fields associated with the selected record. In addition, on tables with multiple pages of records, pressing the Table key 263 for the down Arrow key 263 from the last record on the last screen 222 will not return the cursor to the first record on the first page. Instead, the cursor remains on the last field and beeps to indicate to the platform administrator 239 that this is the end of the table. To move backwards from the last record to the table, the Up cursor key 263 is available.

Field 7. Data entry in afield is terminated by the platform administrator 239 pressing the Tab or Arrow key 263. These events cause the system 200 to perform rudimentary validity checks on the entered data, such as data type (e.g., alpha vs. numeric data),then move the test cursor to the next data field in the visit order.

Field 8. Data fields, in a set of fields on the screen 222, are left justified and are functionally grouped, i.e., related fields are close together. See the section below for a picture of the organization of data fields and their labels.

Choice fields have predetermined sets of correct entries that can be successively displayed by pressing the Space Bar 263A. The data in these fields is distinguished from other data entry fields by the fact that they are always in UPPERCASE lettering. There is always a default entry for each of these fields. When the cursor is placed on such a field, the entire field is displayed in high intensity reverse video. All data entry fields are labeled. The format for these labels are that all labels begin with a capitalized word, and labels in a set of labels are left justified. The administration system uses a blinking block cursor that is readily distinguishable from surrounding test.

Menus 513 (e.g., FIG. 51) are displayed in the workspace area of the screen 222. Each menu option is numbered and the first or default option is highlighted (low intensity reverse video). Platform administrations 239 can place the highlighting on the desired menu option using Tab, Space Bar or the cursor positioning keys 263. Pressing Return activities the selected menu option.

Display Attributes: The following display attributes are used in the interface:

D1. Normal: Used to denote labels and other static text.

D2. High Intensity Reverse Video. Used to display data of an editable field in which the cursor is located. Also used to display the cyclical fields of a record when the cursor is placed on that field.

D3. Low Intensity Reverse Video. Used to display data of an editable field or the same record upon which editing is being done.

Ordering lists of menu options are numbered from 1 to n. Options do not begin with item zero. However, table data is indexed beginning with zero.

Keyboard Mapping: The following keys 263 of the keyboard 228 and their functions are supported:

K1. Tab. Moves the text cursor forward in the field visit order. The visit order includes all data entry fields and all menu items in a menu.

K2. Return. On a menu screen 222, the Return key 263 selects a menu option. When editing a record, the Return key 263 takes the user out of edit mode and save any changes to the record.

K3. Space Bar 263A. Moves the cursor one spaced to the right in a data field. In a cyclical field, pressing the Space Bar 263A cycles through the fixed set of alternatives.

K4. Cursor Keys 263. These keys 263 allow the user to move quickly in either a horizontal or vertical fashion through data entry fields or menu choices. On the table screens 222, only the up and down cursor keys are available until the platform administrator 239 enters the edit mode.

K5. Backspace. Deletes the character just to the left of the test cursor. If the cursor is at the leftmost boundary of a data entry field, Backspace has no effect.

Editing: Data entry fields are edited as follows:

E1. The text cursor is positioned over the first character currently in the field. Character input from the keyboard replaces the character directly under it with the character keyed.

E2. The left and right cursor keys 263 move the cursor within the data field if the platform administrator 239 wishes to make only a partial change to existing characters in a field. However, pressing the left cursor key 263 from the first character position or the right cursor key 263 from the last character position in afield will cause the cursor to jump to the previous or next field in the visitation order respectively.

$E_3$. Backspace erases the character just to the left of the cursor. The Backspace (Delete) key 263 cannot make the cursor jump to the previous data field from the first character position.

Screen Types: The ADA interface consists of three distinct screen types:

SC1. Menu Screen (FIG. 17). This type of screen 222 presents the user with a menu 513 of options. Selecting one of the options removes the selection screen 222 and present the first screen 222 of the option selected.

SC2. To select an option, the platform administrator 239 moves the highlighting to the desired option and presses the Return key 263. In addition, the platform administrator 239 may input the 1- or 2-digit number associated with the option to move quickly to the first screen 222 of the option selected.

Figure 52:
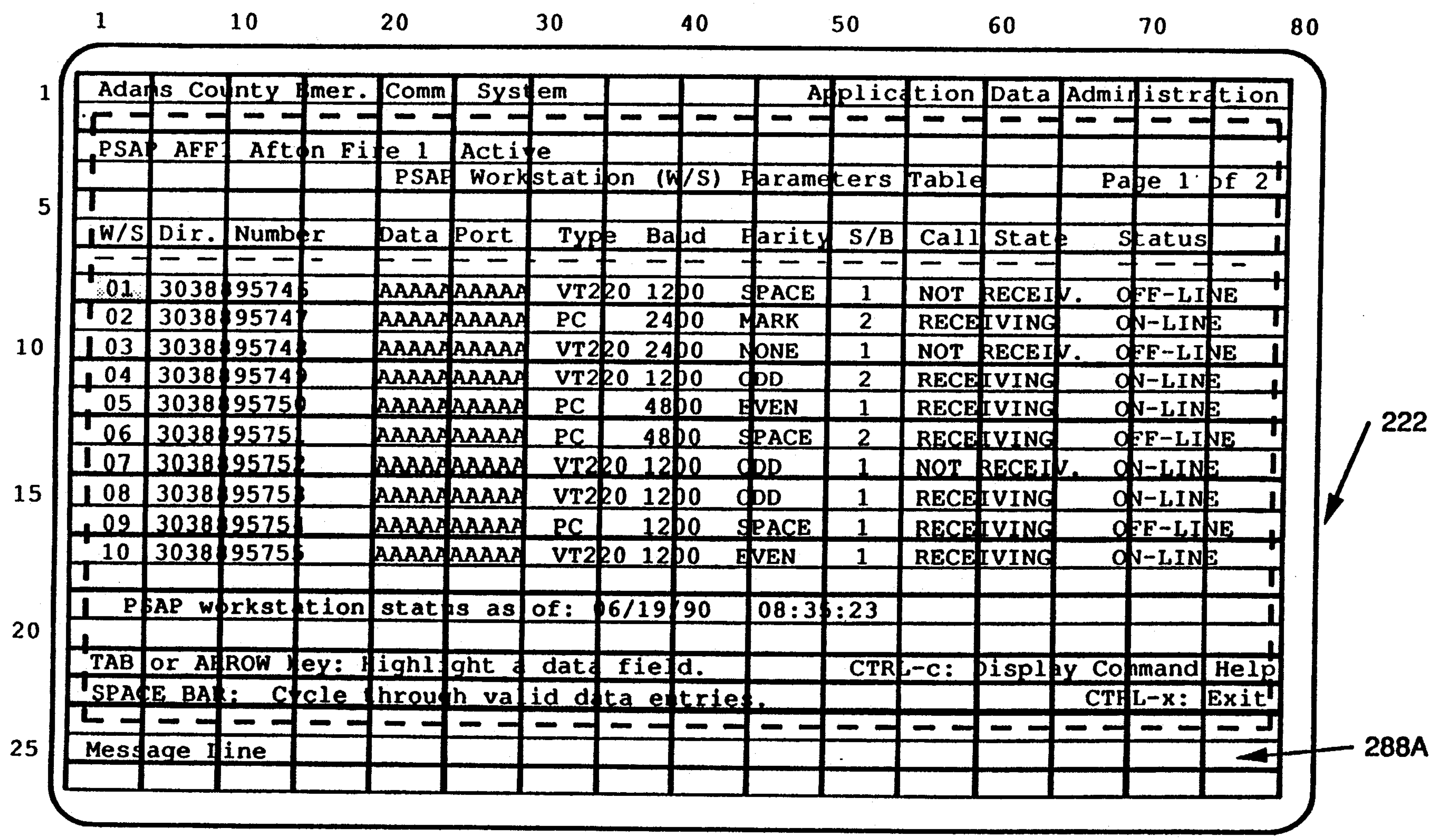
FIG. 52 is a diagram of a screen showing parameters for use at a public safety answering point workstation.

SC3. Form Screen (FIG. 52). Forms are used in defining the parameters for the hardware configuration of the platform 204 and equipment for a PSAP 216. These forms differ from tables in that each field is uniquely labeled and all the fields associated with a form are displayed on one screen 222. With the forms screens 222, the administrator 239 is automatically placed in edit mode. By placing the cursor on a field, the data located can be changed. The visitation pattern of the cursor on the forms screen is: pressing the Tab key 263 repeatedly moves the cursor in a general left to right pattern and top to bottom. Every editable field on the form is visited. To quickly reach a desired field, the user may also use the directional cursor keys 263.

SC4. Table Screen (FIG. 27). The table screens 222 consist of many records that are associated with the same label in a uniform presentation. The records are indexed by ascending number. A particular table may often contain multiple pages of records. With these screens 222, the platform administrator 239 is not automatically placed in edit mode. A purposeful action must be performed to go from the default search mode to edit mode. In search mode, the Tab key 263 moves the highlighted cursor down the index column which is the first column to the far left of the screen 222. In this mode, only the up and down cursor keys 263 are available. Once the record to be edited is located, initiating edit mode (Control-e) highlights all the data fields associated with the record and which run horizontally to the right of the index number. In the edit mode, the platform administrator 239 may use the left or right cursor keys 263 to select the specific field(s) to be edited. Pressing the Return key 263 returns the application to the search mode. On the tabular screens 222, the platform administrator 239 is also able to delete or add records.

Figure 34:
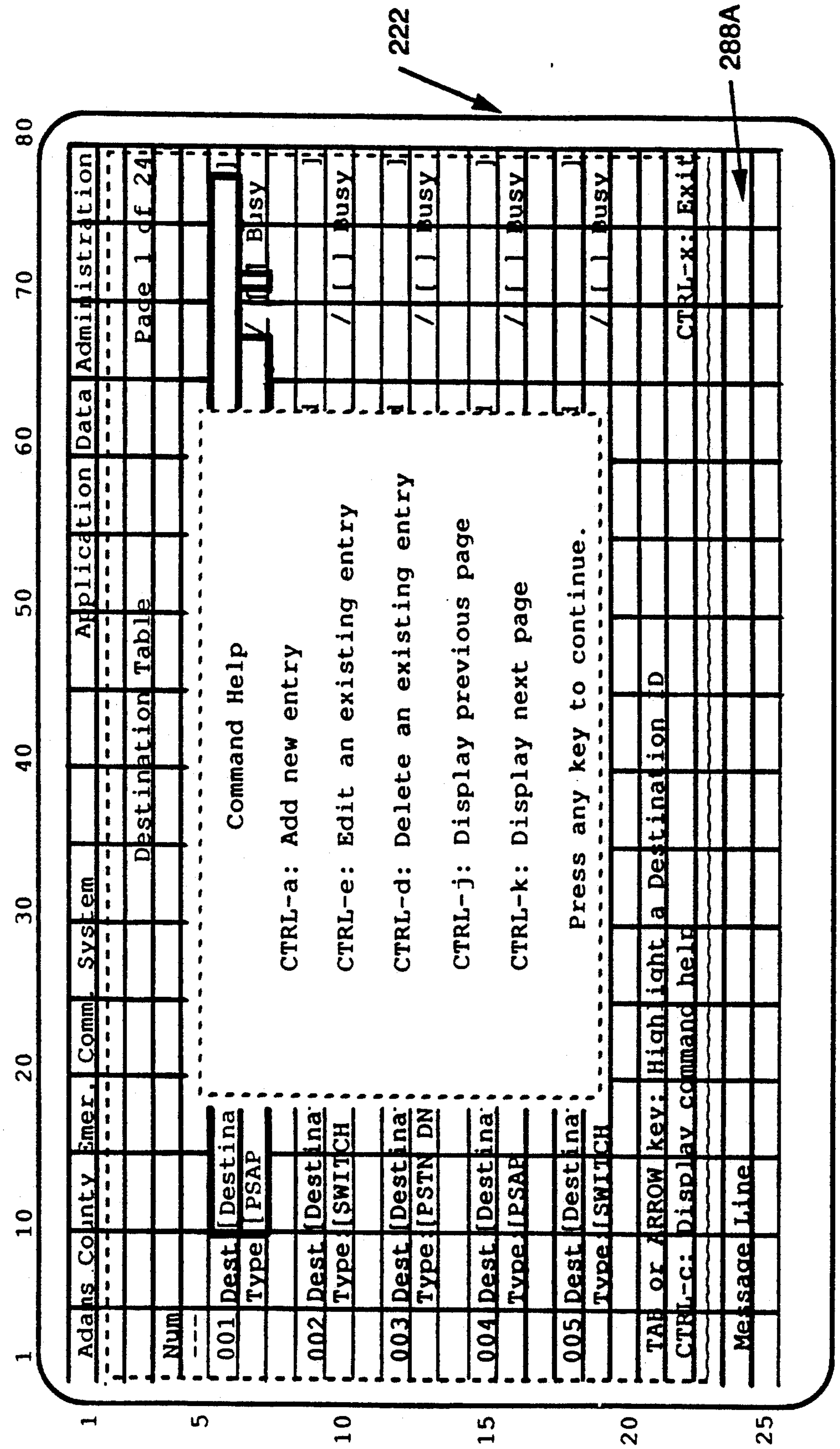
FIG. 34 is a diagram of the screen shown in FIG. 33 with a command help window.

Windows: Throughout the ADA interface, several types of windows 514 (FIG. 24) are either invoked automatically or on demand by the user. Some windows 514 provide assistance to the administrator 239. Others provide a means by which the administrator 239 can select a piece of data from another screen 222 to be placed into a data field on the primary work screen. For elements that appear on more than one screen 222, each will have a home screen 222 on which the labels are editable. When these elements are called as a window 514 from another screen 222, they can only be selected to be represented on the present screen. The basic types of windows 514 that will appear as part of the ADA interface include:

W1. Command Help Window 514 (FIG. 34). Used as a reference to aid the administrator 239 in performing editing tasks. There are two windows 514 of command help that appear depending on the state invoked on the screen 222. The first command help appears when the uses presses Control-c while is selection mode. This listing of command help informs the user of tasks that can be performed on a specific screen, such as add, delete, edit, sort, etc. The other command help window 514 appears only when Control-c is pressed while the user is editing a field. This listing of command help informs the user of the editing capabilities available on a field, such as Backspace, Return, Tab, etc.

W2. Selection Window 514 (FIG. 24). Presented when invoked by the administrator 239. This window 514 contains data fields that can be selected and represented on the appropriate data field on the underlying screen 222. Paging within this window 514 is possible. The border around the entire window 514 serves to distinguish the window 514 from the underlying screen 222.

Interface Mechanism: The following interface mechanisms are central to the navigation functions of the system 200:

I1. Menus 513: Menus 513 consist of sets of functionally organized and hierarchically arranged system objects. When an object is selected, the system 200 either presents a lower level menu 513, a form, or a table.

I2. Forms: When a menu object is selected, the system 200 presents another level of menu 513, either a form or a table. The form contains data entry fields for the platform administrator 239 to enter either data to be used to query the database 402 for an existing record or data to be used to create a new database record. The system 200 determines the intended function by the platform administrators 239 choice of action. All changes to a form are made when the platform administrator 239 moves to leave the screen 222 by pressing Ctrl-X. The form is saved as a single entity. In addition, the form consists only of one screen 222. There is no paging involved.

I3. Tables: In the ADA user interface, there are several administrable areas that are displayed as tables. These tables may include several pages of data all with the same format. Changes to the data on these table screens 222 is saved on a per record basis and not when the administrator 239 moves to the next higher level in the interface hierarchy. To make any changes on these screens 222, the platform administrator 239, after selecting a record, must first invoke the editing state (add/delete/modify). Invoking one of the change states, creates a form for that record in which changes to the fields associated with the record may be made. Pressing the Return key 263 terminates the change state and saves the changes to the database. A confirmation message appears on message line 288A, screen line 24: "Entry Updated".

I4. Workspace: Menus 513, forms, and selection tables are presented in the workspace area of the screen 222. Fields are arranged in a visit order such that successive Tab characters move the text cursor around the set of fields. Entry and exit of the cursor into and out of fields does not effect the data displayed in the field.

User Actions: To perform application data administration, certain actions by the platform administrator 239 are required to perform particular task. These actions are described in terms of the screen(s) 222 that are displayed. The screens 222 logically present the data that must be administered for the C.E.R.S. system 200 to function properly. Navigational and operational command strategies are consistent.

Figure 56:
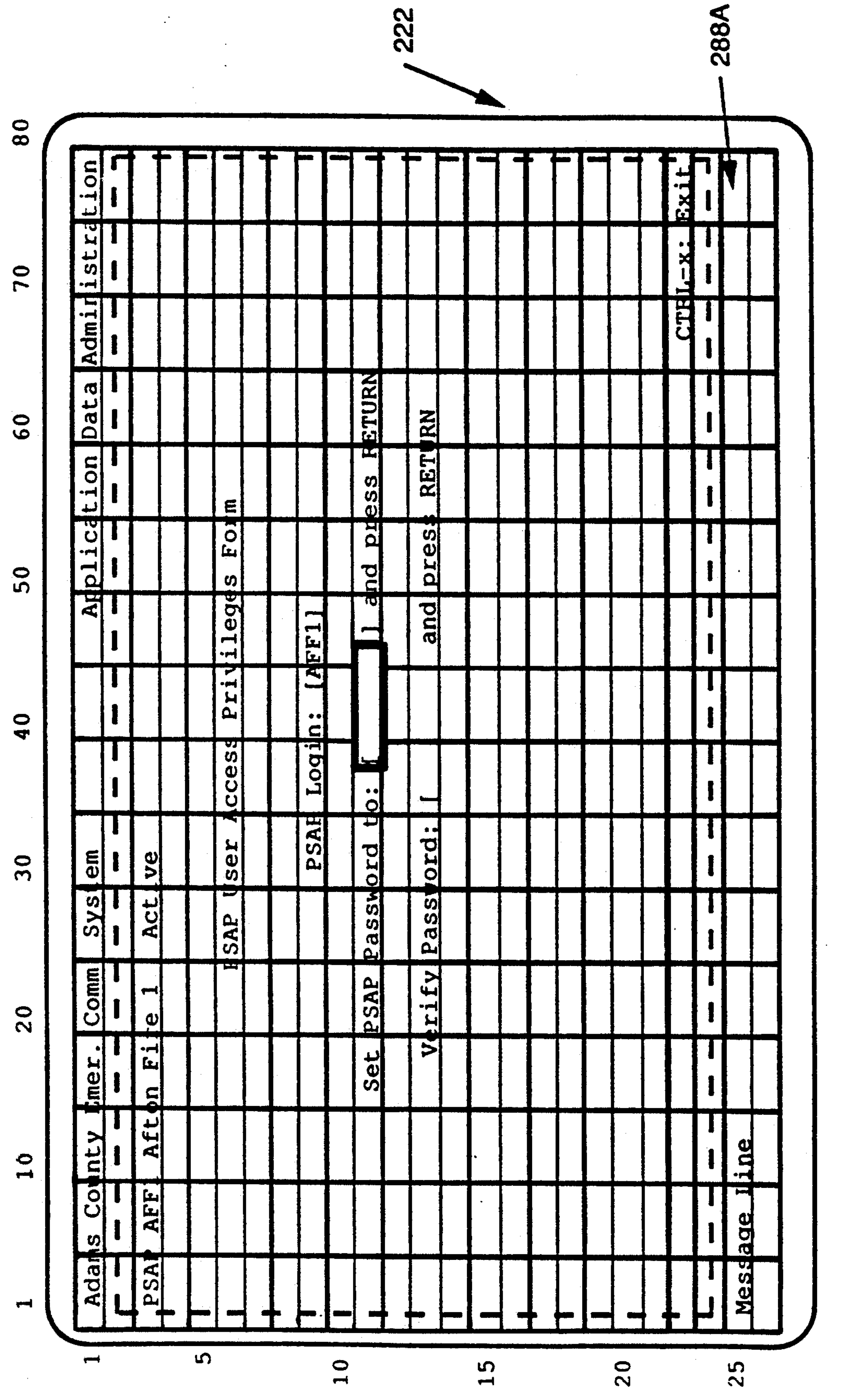
FIG. 56 is a diagram of a screen showing information for limiting users' access to the C.E.R.S. system.
Figure 60:
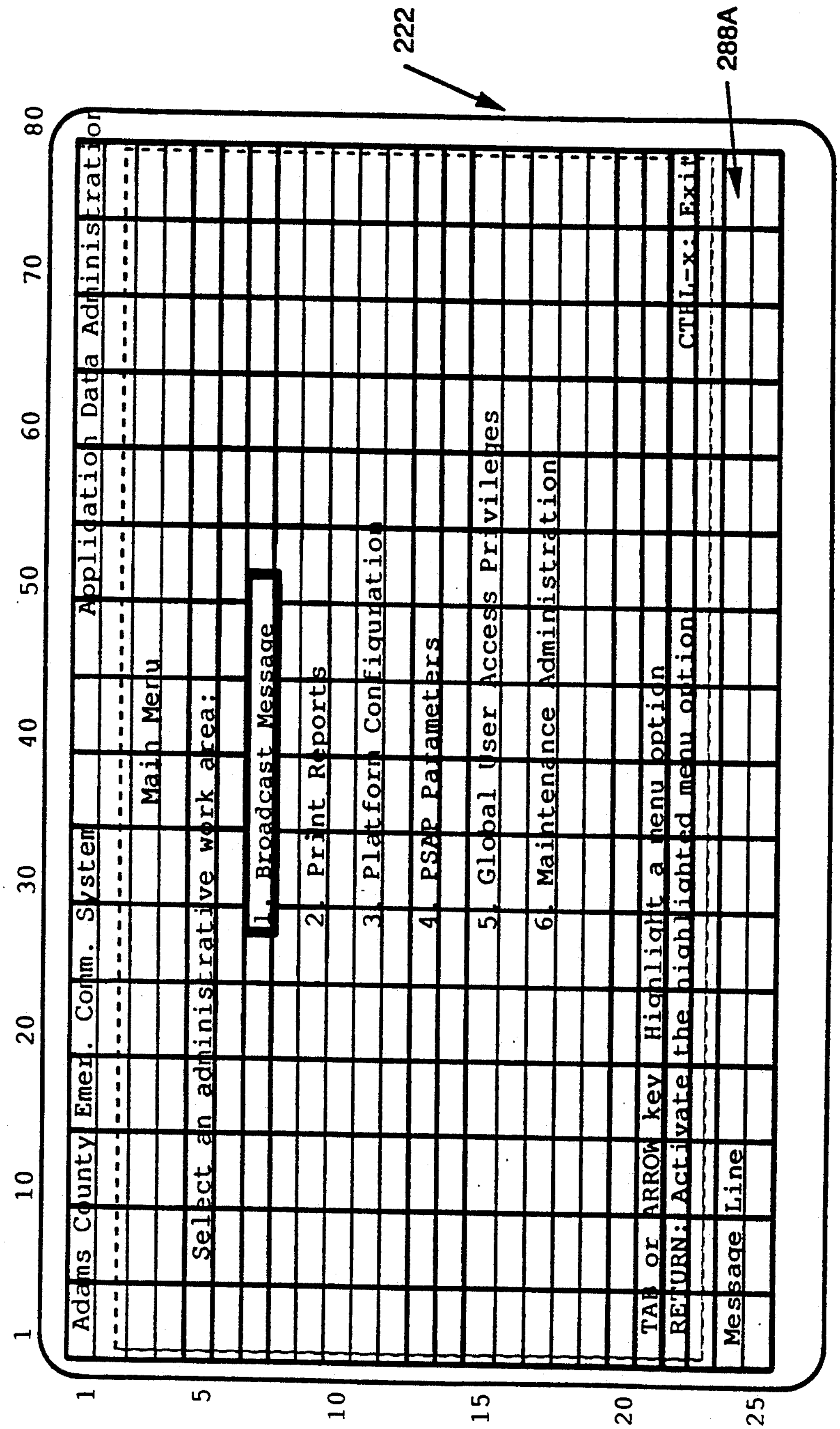
FIG. 60 is a diagram of a screen for use in administering the platform.

ADA Terminal Access: Before entering the ADA interface, the administrator 239 must first log onto the applications processor 234 by inputting both a valid log-in name and password (FIG. 56); and then "platform_admin." This action displays the ADA Main menu (FIG. 60). From here the administrator then selects the first area of the database to administer.

User Interface Organization: The screen 622 of the main menu 513 (FIG. 60) contains the six major sections that the administrator 239 needs to properly configure and maintain the system 200. To select a menu option, the administrator 239 uses the tab and cursor keys 263 to place the highlighting on the desired option.

Platform Configuration: The platform configuration portion of the ADA interface allows the administrator 239 to configure both the hardware components of the platform 204 and the numerous software labels that determine the routing of each E9-1-1 call 201 originating in the area 208 served. The screens 222 for this portion of the interface have been logically grouped into 12 categories, including:

ADA02. Destination Table
ADA04. ESN Table
ADA09. Selective Transfer Table
ADA10. TN/ESN Table The "platform configuration option" is the third option on the ADA main menu 513. Selecting this option presents another selection screen 222 labeled Platform Configuration (FIG. 30) which contains twelve options.

Destination Table (FIGS. 33–35): From FIG. 30, selection of the destination table portion of the interface allows the Administrator 239 to define the parameters of each location where E9-1-1 calls 201 are routed initially by the system 200. This table may consist of up to 1000 (000–999) entries. The editable fields for each entry are displayed on four lines. Each page of the table contains three entries. The user is provided the capability to add new destinations and delete or edit existing destinations.

The platform administrator 239 is placed in selection mode when the screen 222 is displayed. In selection mode, pressing Tab or the up/down cursor keys 263 moves the high intensity cursor bar from one index number to the next.

To perform the various editing tasks on a destination (add/modify/delete), the platform administrator 239 invokes the desired state. Pressing Control-c presents a window 514 of command helps (not shown) so that these commands need not be committed to memory. To add a new destination entry to the table, the administrator 239 presses Control-a. This action invokes the presentation of a data form (window 514) which pushes the original record and all following records down one position. This form presents each administrable field in low intensity highlight; those fields with default values are displayed. Once in change mode, pressing Control-c provides a window 514 of help commands (FIG. 35) that is specific to the editing mode as opposed to the selection mode and describes the editing operations. The visitation order for each destination entry begin on line one of the entry with a destination label, followed by a destination comment field. Once these fields are completed, the administrator 239 classifies the destination entry as either a PSAP 216, Switch-controlled directory number (DN), or PSTN DN. Each of those destination types has a selection field to the left of it on lines two-four of the entry. To select the appropriate type, the platform administrator 239 places the highlighting on the field using the Tab-Shift-Tab key 263 or up and down arrow keys 263 and presses the Space Bar 263. This action places on "X" in the selected field and moves the cursor to the next field on the line of the destination type selected.

If the administrator 239 selects the destination to be a PSAP 216, the cursor moves to the four character field name of the PSAP 216. The administrator 239 may key-in the name or may display a pop-up selection window 514 and select a PSAP 216 from the listing. To display this window 514, the administrator 239 presses Control-w (window). On this PSAP selection window, the administrator 239 uses the navigation keys 263 to highlight a specific PSAP 216 and presses the Return key 263 to select it. Doing so removes the PSAP selection window 514 and places the name of the PSAP 216 in the new destination form.

Having declared the specific PSAP 216, the administrator 239 moves to the next field to define an alternate destination 215 number and label for the new destination 215. In addition, the "Busy" field is also provided for cases where busy tone 220 will be placed on the caller's line 203 if the primary destination 215 is unavailable.

To define the alternate destination 215, the administrator 239 may complete either the alternate destination number field or the alternate destination label field. Filling out either will present the corresponding data in the other field. With the cursor located on either of these fields, the administrator 239 presses Control-w to present a pop-up window 514 of destination index numbers and labels. The administrator 239 highlights and then selects a destination 215. This causes the window 514 to close and the selected destination number and label is placed in the alternate destination fields of the new destination form.

Once the fields for the new destination 215 have been completed, and before returning to selection mode, the new destination 215 is saved into the destination table database 470 (see also FIG. 10 table 259). To do this, the administrator 239 presses Return. This pressure a confirmation on the message line 288A "Entry Updated." Pressing Control-u (undo) cancels any changes made to the record and returns the platform administrator 239 to selection mode. In the case where the administrator 239 entered edit mode on an existing destination 215 but then made no changes, the confirmation does not appear. Once all editing to the Destination Table is complete, the administrator 239 presses Control-x to exit upwards in the interface navigational hierarchy to the platform configuration selection screen.

ESN Table (FIG. 38): The ESN table 390 portion of the interface allows the administrator 239 to define each unique combination of emergency service provides (ESPs) 211. The ESN table 390 defines the ESPs that relate to each caller TN.

Figure 38:
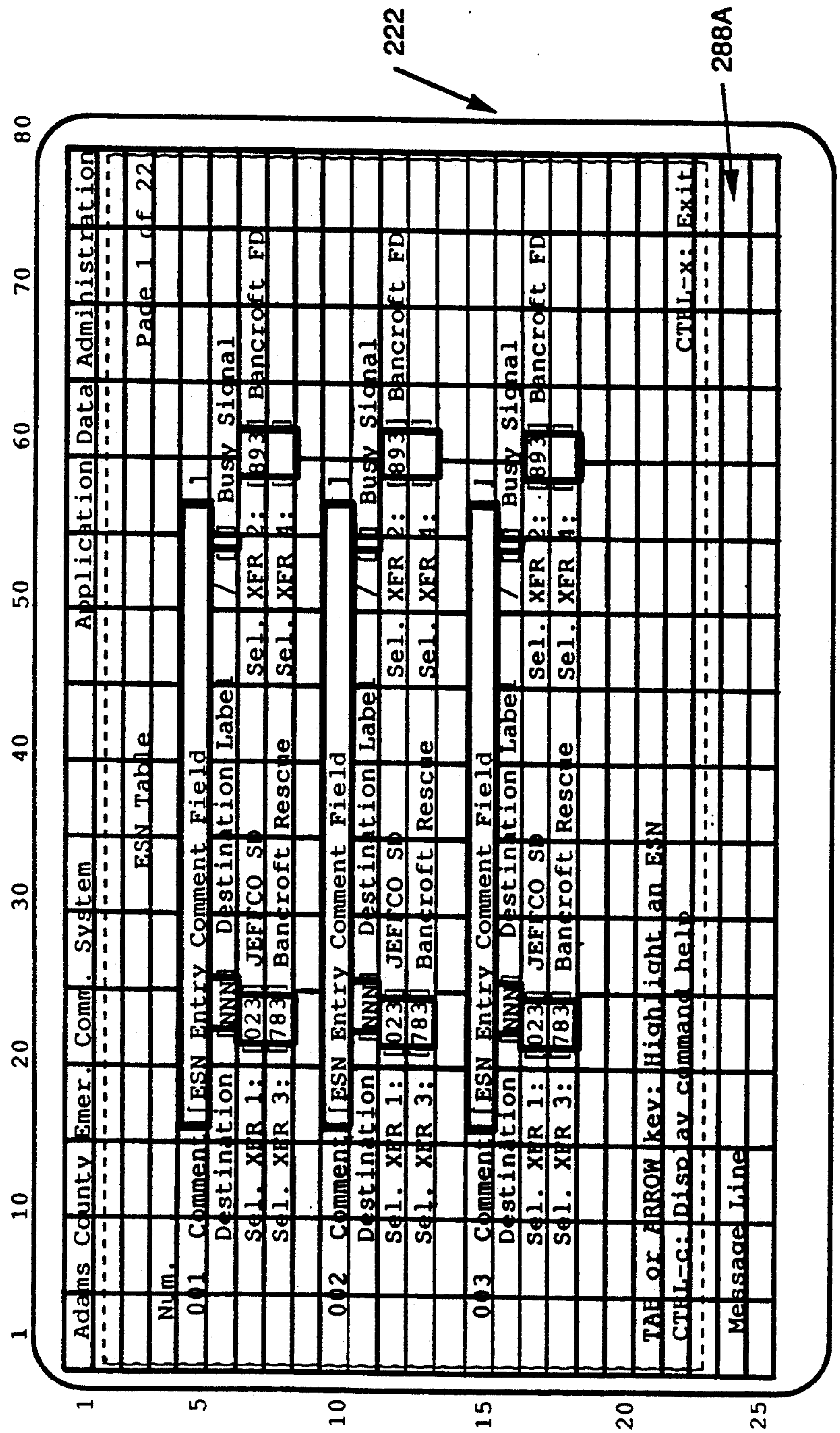
FIG. 38 is a diagram of a screen showing data from an ESN Table.
Figure 39:
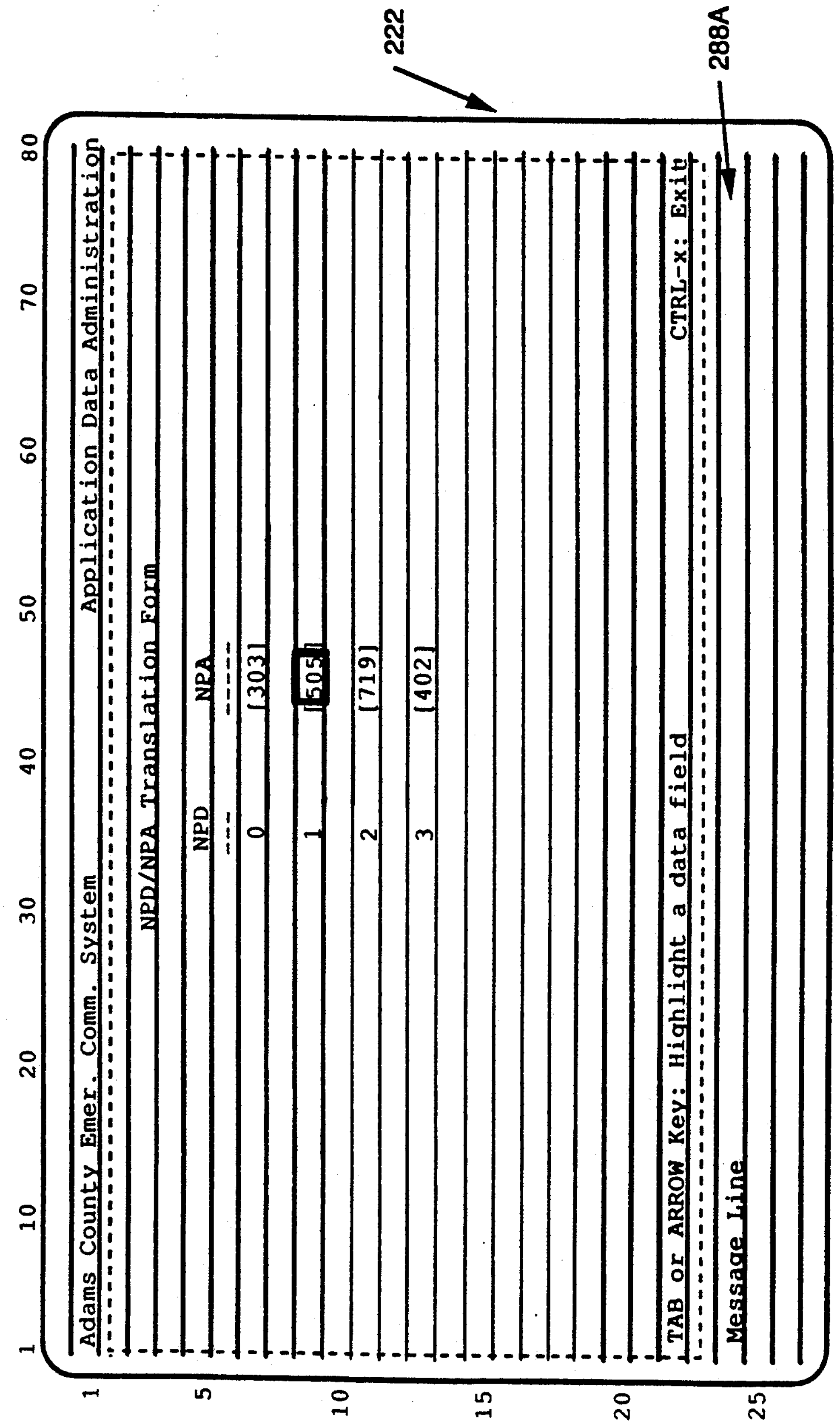
FIG. 39 is a diagram of a screen indicating translations from NPD to NPA.
Figure 40:
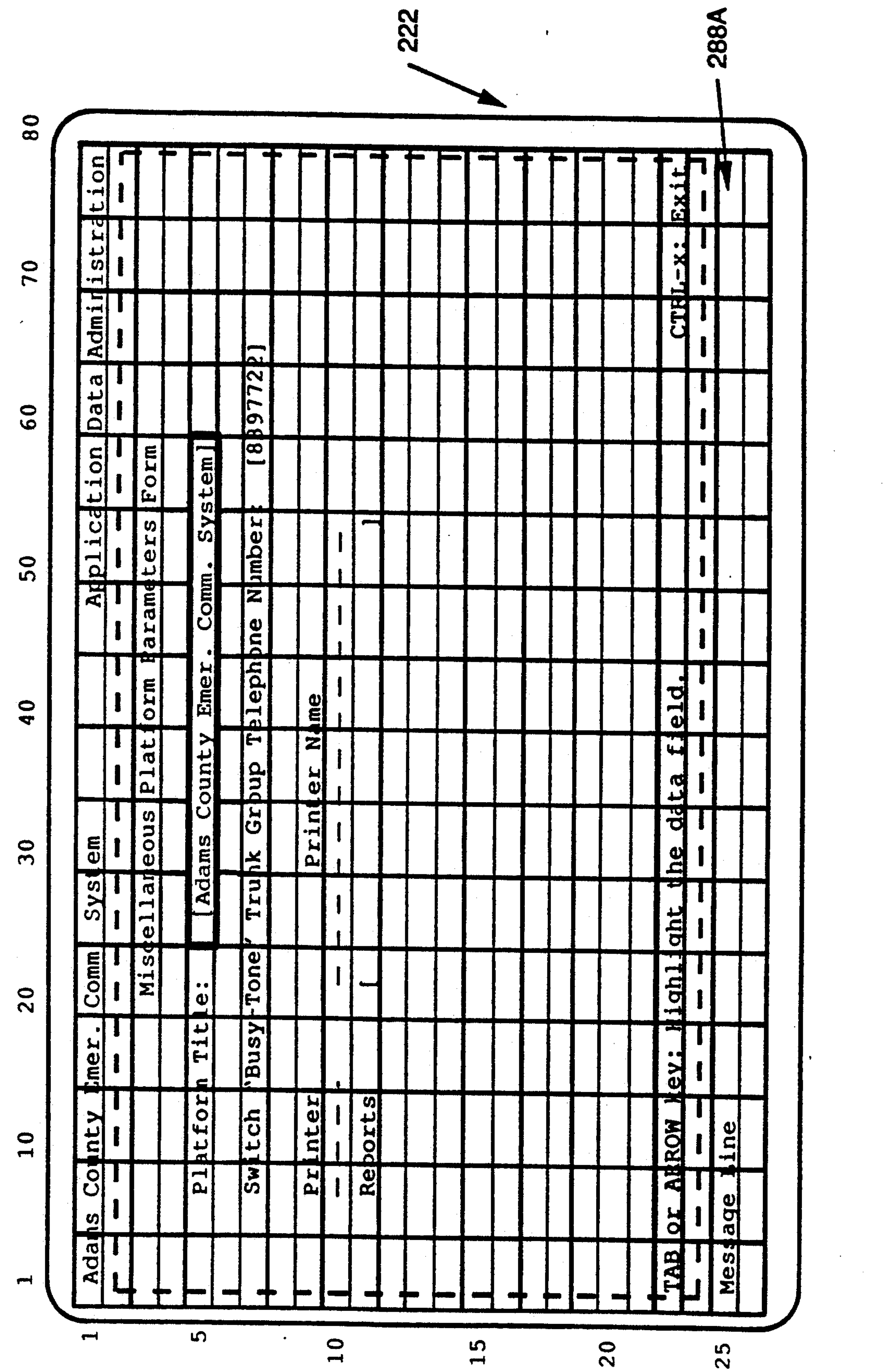
FIG. 40 is a diagram of a screen showing various platform parameters which may be administered.
Figure 41:
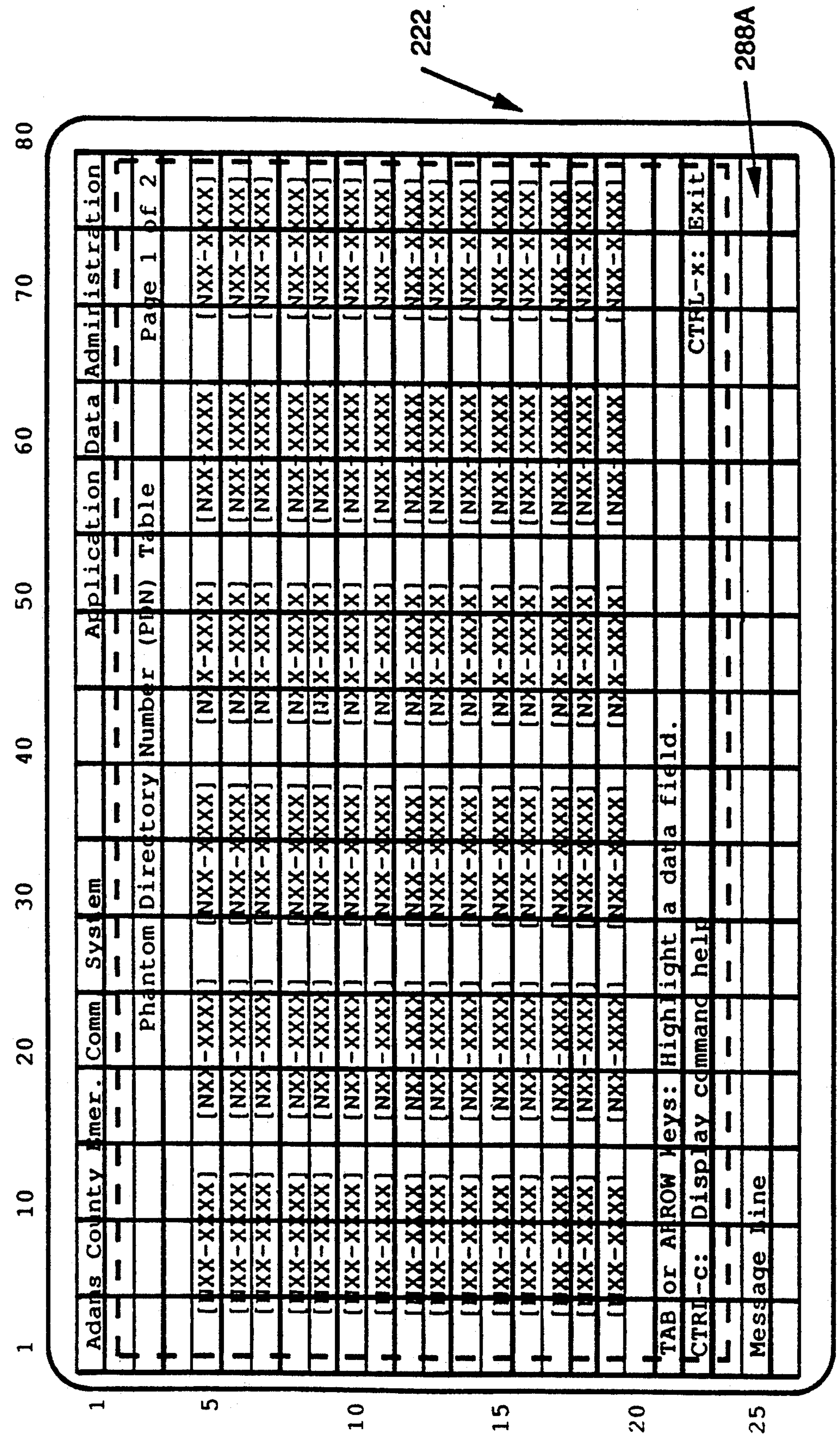
FIG. 41 is a diagram showing a screen for administering phantom directly numbers of the C.E.R.S. system.
Figure 42:
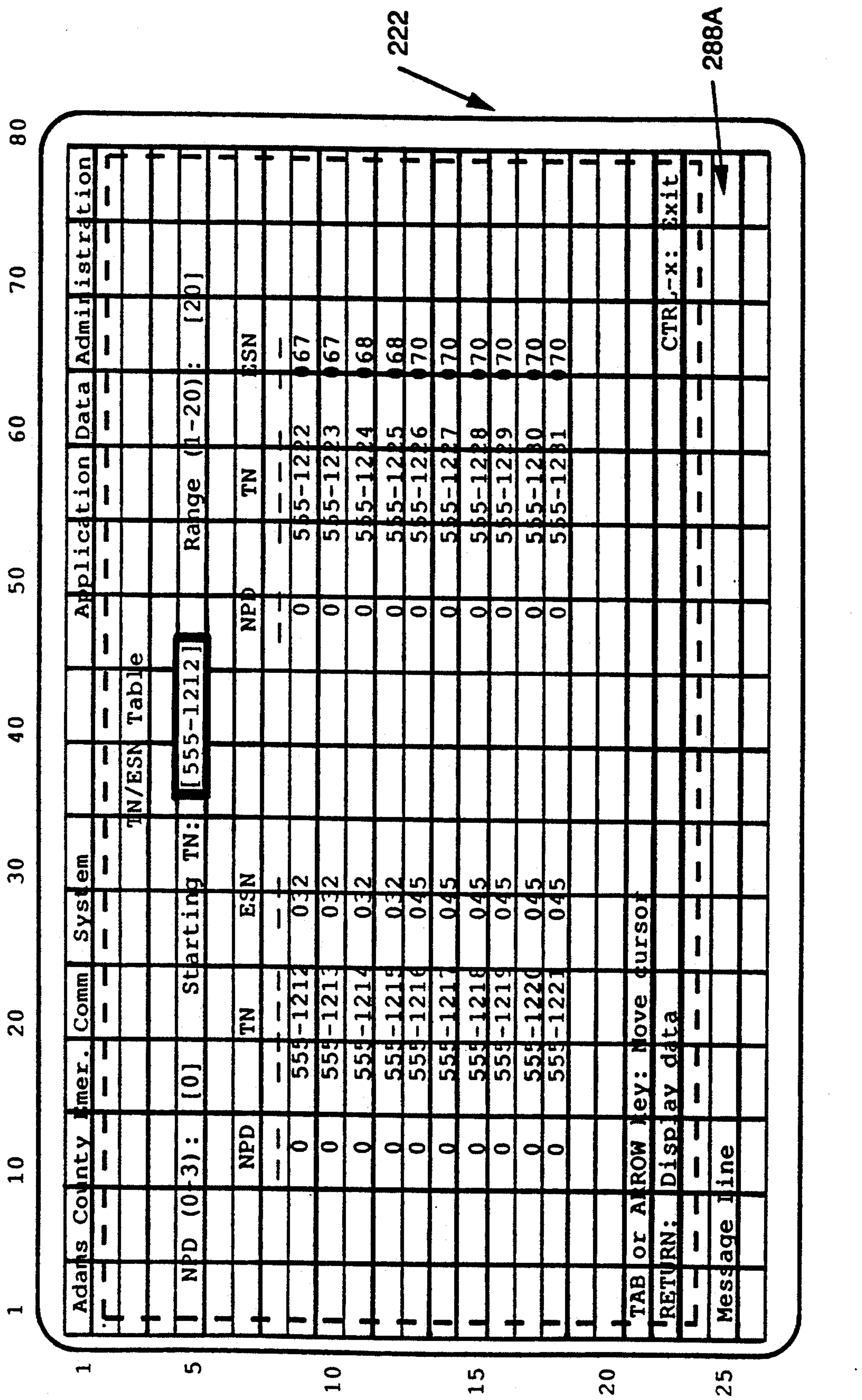
FIG. 42 is a diagram of a screen showing data from a TN/ESN table.

This table 390 may consist of up to 1000 (000–999) entries. The editable fields for each entry are displayed on four lines. Each page of the table contains three entries. All entries are assigned an index number that appears to the far left are of line one of each entry. The remaining lines associated with each entry are indented six character positions to facilitates searching by index number. The platform administrator 239 is provided the capability to add new ESNs and delete or edit existing ESNs. When the platform configuration selection screen 222 (FIG. 30) is presented, the default highlighting is an option #1 ALI/DMS Interface, Highlighting the ESN table 390 option and pressing the Return key 263 presents the first page of the ESN Table (FIG. 38). The user is placed in selection mode when the screen 222 is displayed. In selection mode, pressing Table or the up/down cursor key 263 moves the high intensity cursor bar from one index number to the next. To perform the various editing tasks on a ESN (add/modify/-delete) the platform administrator 239 invokes the desired state. To add a new ESN entry to the table 390, the administrator 239 presses Control-a. This action invokes the presentation of a data from (window 514) which pushes the present record and all following records down one position. This form presents each administrable field in low intensity highlight; those fields with default values are displayed.

The visitation order for each ESN record begins on line one of the record with a ESN record comment field (1–40 characters, no record required). Once this field is completed, the administrator 239 declares the destination 215 to be associated with the ESN. The administrator 239 may key in the number or may display a pop-up selection window 514 and select a destination number and label from the listing. To display this window 514, the administrator 239 presses Control-w. On this selection window 514, the administrator 239 uses the navigation keys 263 to highlight a specific destination and presses Return to select it. The next field allows the administrator 239 to configure the system 20 so that all E9-1-1 calls 201 that would normally be routed to the ESN should instead be routed to a busy signal 220.

The administrator 239 then moves to defines the first of four selective transfer points 225 to be associated with the ESN. Each selective transfer point 225 will be displayed as both an index number and label. Once the fields for the new ESN have been completed, and before returning to selection mode, the new ESN is saved into the ESN table database 470. To do this, the administrator 239 presses the Return key 263. This presents a confirmation on the message line "Entry Updated." Once all editing to the ESN table 390 is complete, the administrator 239 presses Control-x to exit upwards in the interface navigational hierarchy to the platform configuration selection screen.

Selective Transfer Table 378 (FIG. 27): The Selective Transfer Table portion of the interface allows the administrator 239 to declare each selective transfer point 225 associated with the system 200. There can be up to 500 (000–499) selective transfer points 225 associated with the system 200. Each ESN includes from one to four selective transfer points 225 which can be selected from this table 378. The same selective transfer points 225 can be associated with many ESNs. When the platform configuration selection screen 222 is presented, the default highlighting is on option #1 ALI/DMS Interface. Highlighting the selective transfer table option and pressing the Return key 263 presents the first page of the selective transfer table 378.

Each page of the selective transfer table 378 may display up to ten selective transfer points 225. Each record in the table 378 consists of four editable fields. The first field is the three-digit selective transfer point ID. The second field is the destination number. The platform administrator 239 may type in the three-digit destination number to be connected with the selective transfer point 225. Doing so also displays the destination label associated with the number. If the destination number is not known, the platform administrator 239 may press Control-w from this field to display the destination selection window 514. From this window 514, the platform administrator 239 may select the desired destination 215. The last two fields define the selective transfer point label. These fields consists of a maximum of fifteen alpha-numeric characters. These are the fields that are displayed to the PSAP attendant 221 on the ALI Data screen 222 with each emergency call. The platform administrator 239 is placed in selection mode when the screen 222 is displayed. In selection mode, pressing the Tab key 263 or the up/down cursor keys 263 moves the high intensity cursor bar from one index number to the next. To perform the various editing tasks on a selective transfer point 225 (add/modify/delete), the platform administrator 239 invokes the desired state.

Once the label and TN fields for the new selective transfer point 225 have been completed, and before returning to selection mode, the new record is saved into the selection transfer table database 470. To do this, the administrator presses the Return key. This presents a confirmation on the message line 288A "Entry Updated." In the case where the administrator 239 entered edit mode on an existing selective transfer point 225 but then made no changes, the confirmation does not appear. Once all editing to the selective transfer table 378 is complete, the administrator 239 presses Control-x to exit upwards in the interface hierarchy to the platform configuration selection screen 222.

TN/ESN Table 213 (FIG. 42): The telephone number/emergency service number (TN/ESN) table 213 determines where each E9-1-1 call should be routed. Updates to this table 213 are received on a regular basis. The TN/ESN table 213 is launched from the platform configuration menu (FIG. 30). This table 213 contains three editable fields at the top of the screen 222 followed by two columns of ten records each. Each field appears blank initially (default setting) with the exception of the range field which is defaulted to twenty (the maximum number of records that can be displayed at once). The cursor navigation begins with the numbering plan digit (NPD) field, moving onto the starting TN field, followed by the range field. The platform administrator 239 presses the TAB or ARROW keys 263 to move the cursor through the three editable fields. Pressing RETURN initiates the search for records from within the TN/ESN tape to build the table 213. Control-x permits the platform administrator 239 to exit the TN/ESN table screen 222. It can be executed at any time except when a search is under way. Any search periods lasting longer than two second swill include a message 240 displayed on message line 228A (screen line 24) that reads, "Search in progress. Please wait."

The editable fields include:

| Field | Acceptable Entry | Field Size |
|---|---|---|
| NPD | Numbers 0-3 | 1 |
| Starting TN | Numbers (Seven-digit unformatted entry will be automatically formatted.) | 8 |
| Range | Numbers | 2 |

A minimum of one of the first three fields must be modified before a successful search can be initiated. For example, if only the NPD field is modified, a search will result in all TNs, and associated ESNs for the TNs, starting with the lowest and displayed in ascending order.

Figure 46:
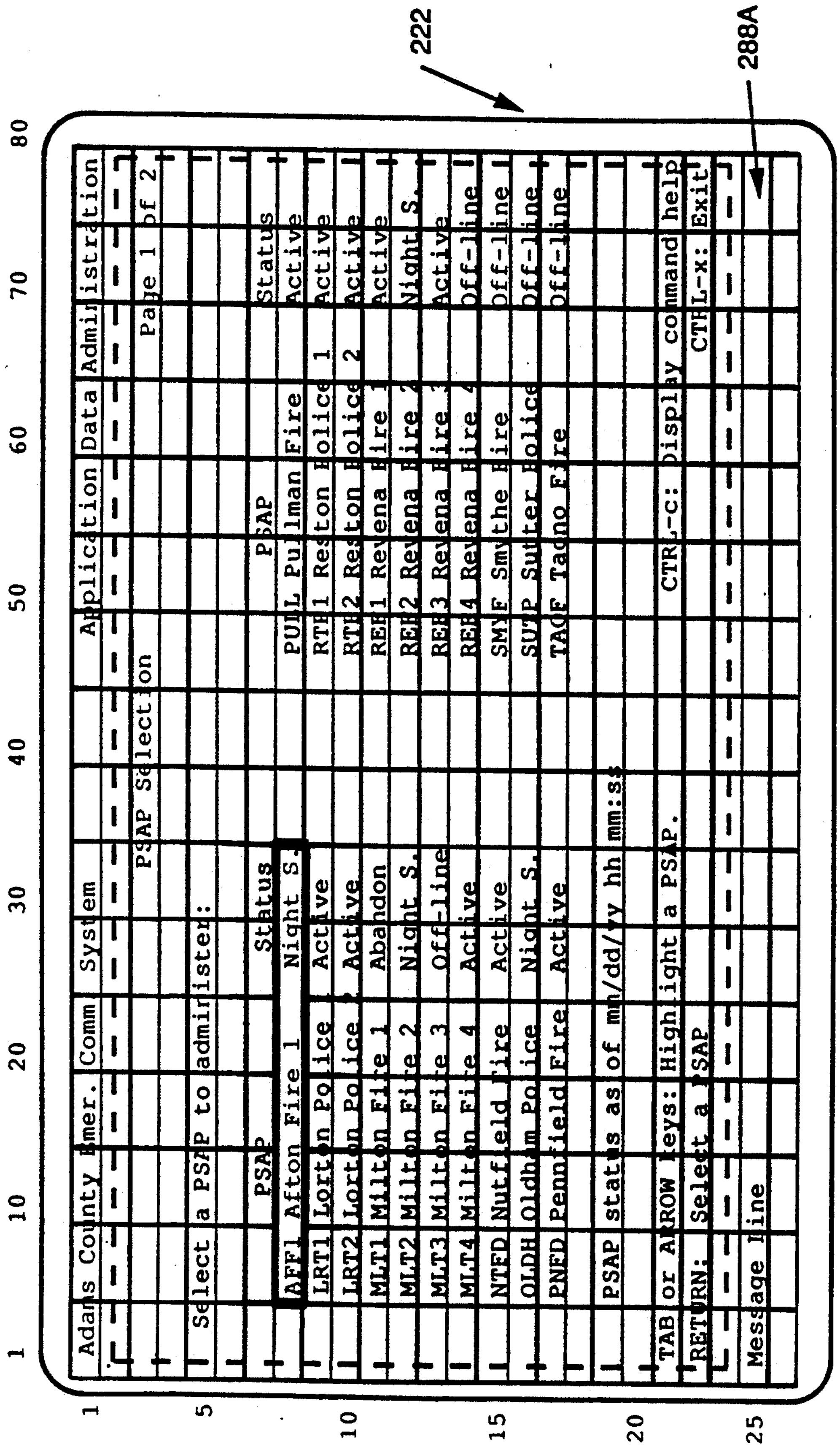
FIG. 46 is a diagram of a screen showing various public safety answering points which may be administered at a given platform.
Figure 47:
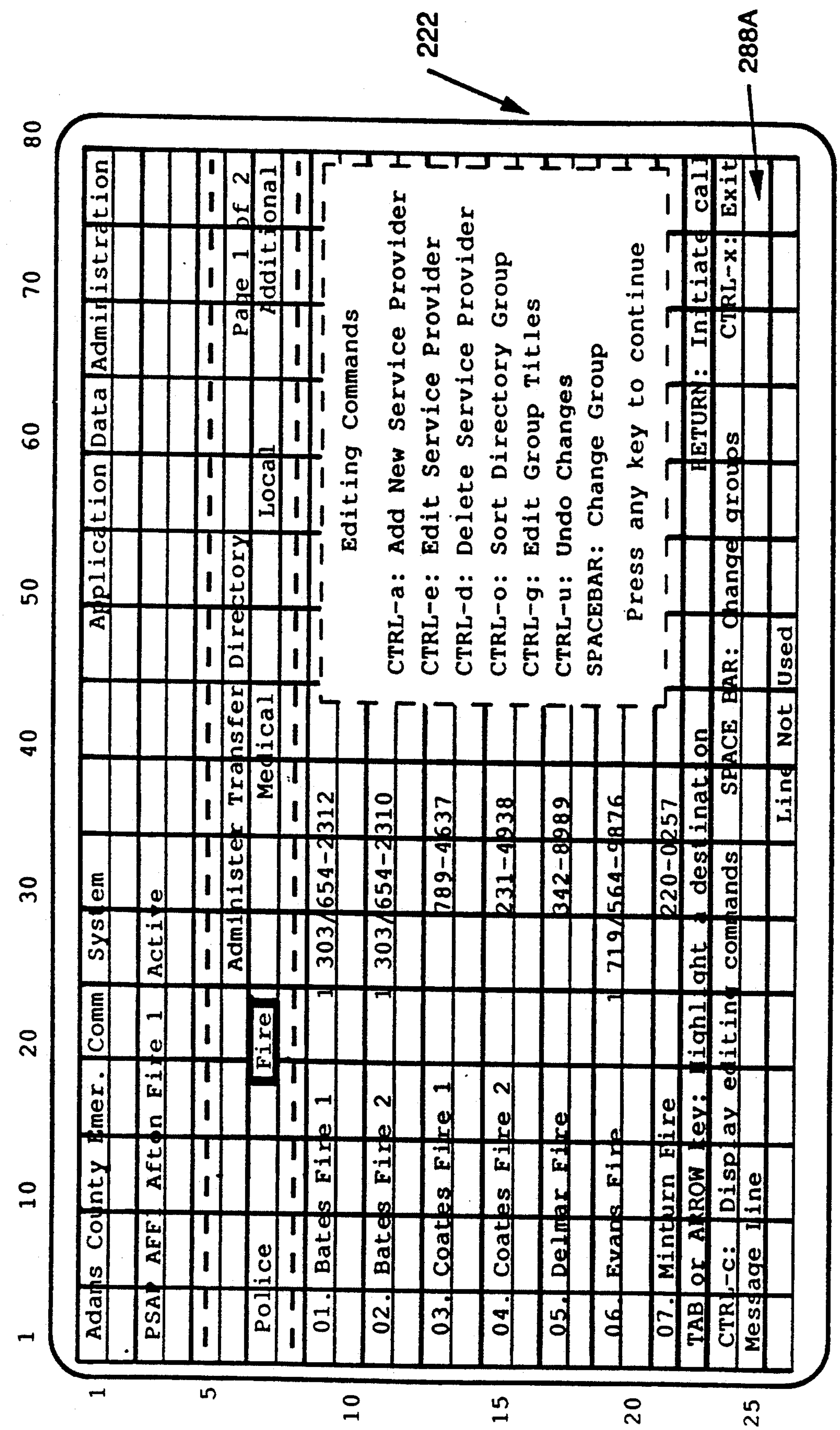
FIG. 47 is a diagram of a screen showing data for administering a transfer directory.
Figure 48:
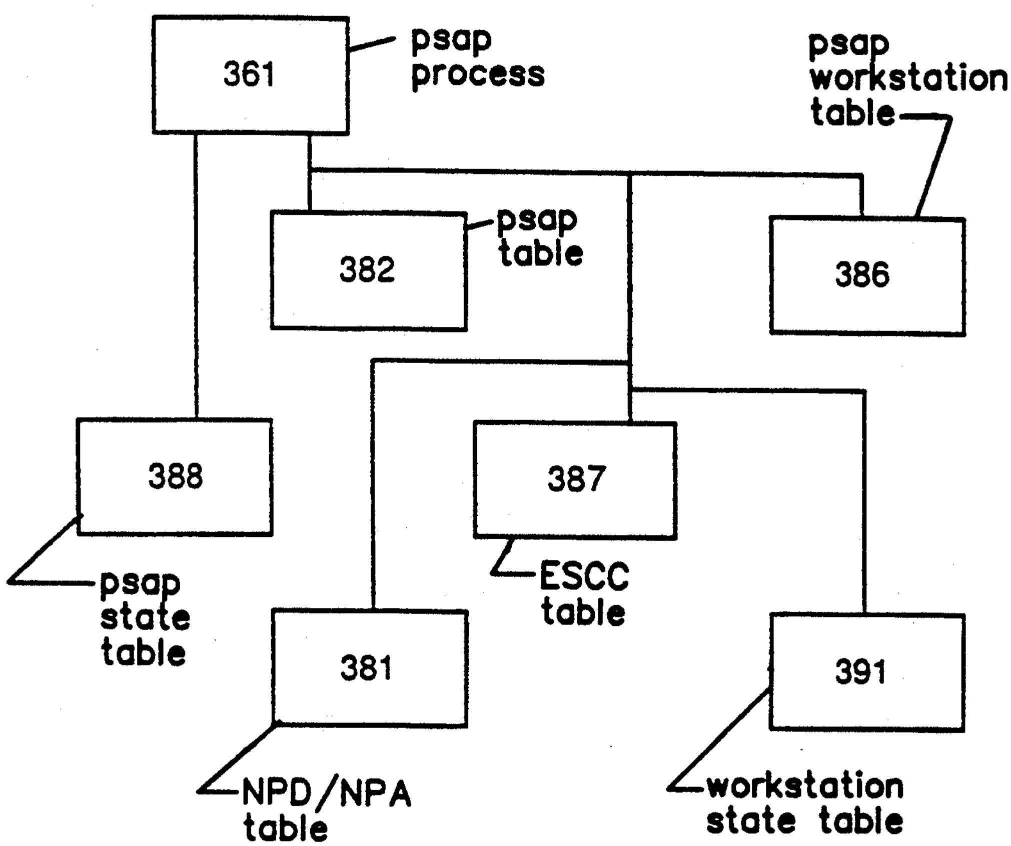
FIG. 48 is a schematic diagram of various tables used by a psap process.

PSAP Parameters (FIG. 44): The administrator 239 selects option #4 from the application data administration main menu 415 (FIG. 60) to configure the PSAP Parameters portion of the ADA. PSAP parameters are configured on a PSAP-by-PSAP basis. Before the administrator 239 reaches the PSAP parameters main menu 415, a PSAP 216 must be selected. Once the PSAP parameters option is selected from the application data administration main menu 415, a PSAP Selection screen 222 is presented (FIG. 46). From the PSAP selection screen 222, the administrator 239 selects a PSAP 216. This screen 222 displays up to twenty PSAPs 216. The first two fields of each PSAP record include the four-character PSAP mnemonic and the fifteen-character PSAP label. These two fields are followed by a field which indicates the present state of each PSAP 216. When the administrator 239 enters the PSAP parameters section of the ADA interface to administer an existing PSAP 216, selecting a PSAP presents the PSAP parameters menu screen 222 (FIG. 44). However, the first time a PSAP 216 is created on the system 200, the first screen 222 displayed is the PSAP features form (FIG. 25) where the PSAP 216 can be defined. Similarly, when a new PSAP 216 is added to the list of existing PSAPs 216 on the system 200, the PSAP parameters menu screen 222 (FIG. 44) is bypassed and the PSAP features form (FIG. 25) is immediately displayed. As a selection screen 222, the platform administrator 239 is placed in selection mode when the screen 222 is displayed. From this selection window 514 (FIG. 46), the platform administrator 239 may add a new PSAP 216 or delete an existing PSAP 216. To modify the name or label of an existing PSAP 216, the platform administrator 239 navigates to the PSAP feature form (FIG. 25). In selection mode on the screen 222 in FIG. 46, pressing the Tab key 263 or the up/down cursor keys 263 moves the high intensity cursor bar from one PSAP 216 record to the next. Pressing Return selects the PSAP to be administered and presents the main menu of PSAP parameters (FIG. 44). Pressing Control-c presents a window 514 of command help so that these commands (Control-a: Add, Control-d, Delete) need not be committed to memory.

To add a new PSAP 216, the administrator 239 presses Control-a. This action by-passes the PSAP parameters menu screen 222 and immediately presents the PSAP features form (FIG. 25). From this form, the platform administrator 239 can define the basic PSAP parameters. To delete a PSAP 216 (FIG. 46), the administrator 239 first highlights a PSAP 216 and then presses Control-d (delete). This action causes all the fields to below intensity highlighted and the confirmation on the message line 288A (screen line 24) reads, "Delete the highlighted PSAP from the database? (y/n)? Once the confirmation is made, the screen 222 returns to selection mode.

A final read-only field is displayed on line nineteen of the screen 222. This field indicates the data and time that this screen 222 was displayed on the terminal. The label and field read: "PSAP Status as of [mm/dd/yy] [hh:mm:ss]." To return to the ADA main menu (FIG. 60) for the selection screen, the administrator 239 presses Control-x.

PSAP Parameters Menu Screen 232 (FIG. 44): This is the screen presented to the user once a PSAP selection has been made, unless a new PSAP is being created. This screen (FIG. 31) presents the six menu options that comprise the PSAP Parameters portion of the ADA interface. Those options include:

- PSAP Features Form
- Night Service Schedule Form

To select a menu option, the administrator uses the Tab and the cursor keys to plate the highlighting on the desired option. The default cursor position when each new screen is presented is the upper left most field. Additionally, the administrator has the option of pressing the number associated with the option to move to the first screen associated with the option.

PSAP Features Form

The PSAP Features form (FIG. 25) contains 14 administrable fields that allows the user to configure basic information needed for the PSAP to become a functioning entity of the E9-1-1 system. As with all PSAP Parameters screens 222, the selected PSAP 212 is displayed in the upper left-hand portion of the screen 222. The highlighted cursor appears first on the PSAP name (4-character mnemonic). The next field in the visitation order is the 20 character PSAP label. This field is followed by the PSAP mode which is a cyclical field (ON-LINE/OFF-LINE). The next field in the visitation order is the PSAP status field (ABANDONED/ACTIVE/NIGHT SERVICE). The cursor next falls to the NPD field (single digit: 0-3) in the visitation order. The third field is the cyclical Call Capacity field (LIMITED/UNLIMITED) followed by the Call Capacity Depth field (2 digits).

The fifth, sixth, and seventh fields are provided for the PSAP primary notification line 241, backup notification line and the PSAP hunt group TNs (7-digits each). This is followed by the cyclical ALI Retrieval field (ENABLE/DISABLED) and the cyclical Call Distribution field (ANY STATION ANSWER).

Once the administrator 239 is ready to save the changes to the form, he or she presses Control-x. This action presents a confirmation message 240 on line 24. "Save changes to the PSAP Features Form?" From here the administrator 239 may press y (yes) to have the changes saved and return to the next highest level—the PSAP Parameters Menu screen 222 (FIG. 44), press n (no) to cancel the changes and return to the PSAP Parameters Menu screen, or press c (cancel) to cancel the changes but remain on the PSAP Features form (FIG. 25).

PSAP Night Service Schedule Form: The platform administrator 239 may modify the times when Night Service goes into effect and when it is removed for each PSAP 216. From the PSAP Parameters Menu screen 222 (FIG. 44), the administrator 239 highlights the second option and presses Return. As a shortcut, the administrator may also press number key "2" which will take the user immediately to the PSAP Night Service Schedule screen 222 (FIG. 24). The Night Service Schedule screen 222 (FIG. 24) displays the hours of the day in 2 hour increments vertically down the left side of the screen 222. The days of the week are displayed horizontally across the top portion of the screen 222.

The administrator 239 uses the cursor keys 263 to navigate to the location that reflects the day and time that Night Service is to begin. After pressing "Return," the administrator 239 can key in the four digits required to indicate the start time $t_s$. The time input can be accurate to the minute. The twenty-four hour format is HH:MM; inputting the colon or a leading zero for single digit hours is not required. Only numerical inputs are acceptable and error checking will occur. By pressing down the cursor key 263, the highlight cursor returns. The administrator 239 then cursors down to the time $t_e$ that is desired for Night Service to end. Once the last digit of the time is entered, the administrator 239 is able to cursor down off the Night Service stop time $t_e$. The days loop so that pressing down from the last block on Tuesday, for example, will move the cursor to the top time block on Wednesday.

The administrator 239 then cursors down to the two hour block in which Night Service is to end. By again pressing "Return," the administrator 239 can enter the Night Service end time $t_e$ and then cursors off the time block. This action causes the window 514 to disappear and for all the two hour cells between the start time $t_s$ and the end time $t_e$ to be displayed as a block indicating a Night Service interval $\Delta t_{ns}$.

To delete a Night Service block, the administrator 239 places the cursor somewhat in the highlighted block and presses "Control-d." This action removes the inverse video and the start and stop times from the screen 222. The administrator 239 can also expand or compress a night service interval $\Delta t_{ns}$. This is done by cursoring to either the start or stop time of the interval, typing in the new time, and pressing Return. The screen 222 will be updated with more or fewer time blocks highlighted to indicate the change. There is one restriction, if expansion of a Night Service interval $\Delta t_{ns}$ is desired, the expanded interval $\Delta t_{ns}$ cannot overlap an existing interval $\Delta t_{ns}$. If this is desired, one interval $\Delta t_{ns}$ should be deleted before the other interval $\Delta t_{ns}$ is expanded.

Each incoming E9-1-1 call 201 received during a Night Service interval $\Delta t_{ns}$ is sent to a designated location. The default location is the designated alternate destination 215. However, the administrated 239 has the option of changing this Night Service designation to another destination 215. This is done by placing the cursor in a Night Service interval $\Delta t_{ns}$ and pressing "Control-t." This moves the cursor to the routing field on line 21. In this field, the user may key in a destination or press "Control-w" to display a selection window 514 of all the valid destinations in the system 200 (FIG. 33). From this window 514, the administrator 239 can first highlight and then select the destination 215 to be the Night Service destination for all E9-1-1 calls 201 during that Night Service interval. Selecting a destination 215 from this window 514 causes the window 514 to disappear and the selected destination to appear in the field on line 21. Once the administrator 239 is ready to save the changes to the form, he or she presses Control-x. This action presents a confirmation message 240 on line 24: "Save changes? (y/n/c)." From here the administrator 239 may press y (yes) to have the changes saved and return to the next higher level—the PSAP Parameters Menu screen 222 (FIG. 44), press n (no) to cancel the changes and return to the PSAP Parameters Menu screen, or press c (cancel) the changes but remain on the PSAP Features form (FIG. 25).

Remote Administration From PSAP Terminal: Administration may be performed from the location of a PSAP 216 by an attendant 221 using an attendant workstation 212. The PSAP attendant workstation 212 can be placed in several different states depending upon the status of the AP 234 and the switch 218. The PSAP 216 can be placed into any of the three operational states, which directly impact the extent to which the attendant 221 can interact with the C.E.R.S. system of the perform administration. The operational states of the workstation are divided into two major segments that define what functions the attendant 221 can perform at any particular time. The major segments include the state of each particular PSAP workstation 212 and the line status for each PSAP workstation 212.

In the active state of a PSAP 216, emergency calls are directed to the PSAP. the PSAP 216 is fully operational. Input from any key 263 may be acceptable depending upon the state of the workstation 212 and the telephone line 245 connected to the workstation 212.

In the Night Service state, E9-1-1 calls 201 that are normally routed to the PSAP 216 are redirected to a designated night service destination 215. In this state, all functionality of the workstation 212 is available to the attendant 221 including the pickup key 263. The availability of the pickup key 263 is necessary for the race condition that may exist when an E9-1-1 call 201 to another PSAP 216 is being transferred to a specific PSAP workstation 212 at approximately the same time. When a PSAP 216 goes into Night Service, all idle workstations 212 are placed automatically in the "Not Receiving Calls" mode. Once the PSAP 216 is completely in Night Service, no further E9-1-1 calls 201 will be directed to or can be transferred to the PSAP 216. Attempting to transfer an E9-1-1 call 201 to a PSAP 216 in Night Service results in an audible indicator that alerts the caller 202 of "do not disturb" on the PSAP lines.

As described below, from the PSAP administration menu 513 (FIG. 60) the attendant 221 can place the PSAP 216 back in the Active state. When the PSAP 216 emerges from Night Service, all workstations 212 remain in the "Not Receiving Calls" state until placed in the "Receiving Calls" state.

The Abandoned state may be administered by the attendant 221 placing the PSAP 216 in the "Abandoned" state from any of the workstations 212. Then, E9-1-1 calls 201 that normally routed to the PSAP 216 are redirected to the designated destination 215. In this state, all keyboard-based functionality is available to the attendant 221.

When the PSAP 216 is placed in the abandoned state, all workstations 212 are placed automatically in the "Not Receiving Calls" mode. Once the PSAP 216 is completely in the Abandoned state, no further E9-1-1 calls 201 will be directed to or can be transferred to the PSAP 216. Attempting to transfer a call 201 to a PSAP 216 in the Abandoned state results in an audible indicator that alerts the caller 202 of "do not disturb" on the PSAP lines. From the PSAP administration menu 513 (FIG. 50), the attendant 221 can return the PSAP 216 to the Active state. When the PSAP 216 emerges from the Abandoned state, all workstation 212 remain in the "not receiving calls" state until manually placed in service.

Each PSAP workstation 212 can be in one of two states. In the Receiving Calls state, input from any key 263, except the "Help", "Admin." keys, may be acceptable depending upon the state of the telephone line 245 connected to the workstation 212.

Not Receiving Calls state: The major distinction between this state and the "Receiving Calls" state is that in the "Not Receiving Calls" state the attendant 221 can perform some tasks not allowed during the "Receiving Calls" state. When an E9-1-1 call 201 arrives at the PSAP 216, its presence is communicated to the attendant 212 via a blinking "EMERGENCY CALL WAITING" label (screen 222, line 4, FIG. 11) and a wall-mounted ringer. By pressing a "Pick Up" key 263, the attendant's workstation 212 automatically returns to the "Receiving Calls" state and the E9-1-1 call 201 will be directed to his or her specific workstation 212. While in the PSAP Administration portion of the interface, the attendant 221 is not able to directly answer an E9-1-1 call 201 or initiate any of the other call processing functions that would otherwise be available in the "Not Receiving Calls" state.

The line status for a particular workstation 212 can be in one of six state:

Idle: This state describes those periods when the phone 227 (FIG. 1) is "on-hook." Allowable keyboard inputs are dependent upon the current screen display. This state pertains only to E9-1-1 calls 201, i.e., calls processed by the C.E.R.S. system 200.

XFR Allowed: This state involves those periods when the attendant 221 has gone off-hook. This state includes those periods when the attendant 221 is communicating with one party and thus a transfer is permitted.

XFR in Use: This status indicator reflects those periods when a three party call has been established. With three parties connected, no additional transfers can be initiated.

Transferring: This indicator reflects the state when the system 200 is in the process of transferring a call 201. It is typically a state of short duration.

Ringing: This status indicates when an attendant's specific workstation phase 227 is ringing. This can occur when a call 201 is transferred to a specific workstation 212, for instance, when a call 201 is transferred to a Spanish speaking attendant. When such a call 201 arrives at a workstation 212, the line status indicator blinks "Ringing" in inverse video if the phone set 227 is "on-hook." In addition, using a phase set 227 with a light that flashes when ringing calls further attention to the fact that the phone set 227 and not a wall-mounted annunciator (not shown) was ringing.

Unknown: This status indicates a state caused by a software error where the psap process 361 has lost track of the state of the specific call 201. This confusion disappears when the call 201 is dropped and the line status returns to idle.

Not Available: This status indicates that the telephone set 227 at that workstation 212 is not operating properly. In all likelihood, it indicates that the line has been left in idle state for too long a period. However, it may indicate that there is a problem with the line 245 and reprovisioning by the switch 218 is required.

Function Key Description: The labeling for the keycaps is identical for both the VT220 and microcomputer keyboards 228. Key color coding and relative position is very similar. The VT220 keyboard 228 (FIG. 16) contains a bank of twenty function keys 263 as well as four PF keys. To ensure that the layout of the VT220 keyboard 228 remains essentially the same as the keyboard layout for the microcomputer interface, only twelve of the function keys 263 are utilized for the C.E.R.S. application 200.

The following Function Key Chart identifies certain function key locations on the keyboard 228, the feature label and a description of the feature. The identified function keys 263 on the keyboard 228, the editing keypad, and the upper row of the numerical keypad are used in the following manner:

Function Key Chart

| PC | VT | Feature | Description |
|---|---|---|---|
| F4 | F8 | Admin | This key allows the attendant 221 to administer certain parameters for the PSAP 216. This key 263 is only available when the workstation 212 is in the "Not Receiving Calls" state.<br>For some features within the administration menu (updating the transfer directory, generating reports, changing passwords, or modifying the Night Service schedule 262), the attendant is required to input a password sequence before accessing a menu-based series of screens 222.<br>Other features located under the administration main menu (FIG. 50), such as manually entering or leaving Night Service or PSAP Abandonment, are available to all attendants 221 without requiring password access. |
| F7 | F11 | Prev Scrn | This key 263 allows the attendant 221 to page backward in any mode of the application where multiple screens 222 exists, for example, Transfer Directory screens, or the Help screens. This key 263 is only available when a previous screen 222 exists. Otherwise, pressing this key 263 emits a beeping tone. |
| F8 | F12 | Next Scrn | This key 263 allows the attendant 221 to page forward in the XFR Directory and Administration portions of the application where multiple screens exist. This key 263 is only available when additional screens 222 beyond the displayed screen exist. Otherwise, pressing this key 263 emits a beep tone. |
| F9 | F13 | Print ALI | This key 263 allows the attendant 221 to selectively print out a copy of the ALI data for a particular call 201. In addition, the PSAP 216 can be configured by the platform administrator 239 to have all ALI records sent to the PSAP printer 255 automatically. |
| F10 | F14 | Call Origin | This key 263 allows the attendant 221 to toggle between displaying information regarding the origination and transmission path of the E9-1-1 call 201. This information can be of great value when attempting to trouble shoot a system problem. While the attendant 221 can blank out this information from the main screen 222, the information is carried with the ALI data to the printer 255. This key 263 functions during all screen |

-continued

Function Key Chart

Figure 49:
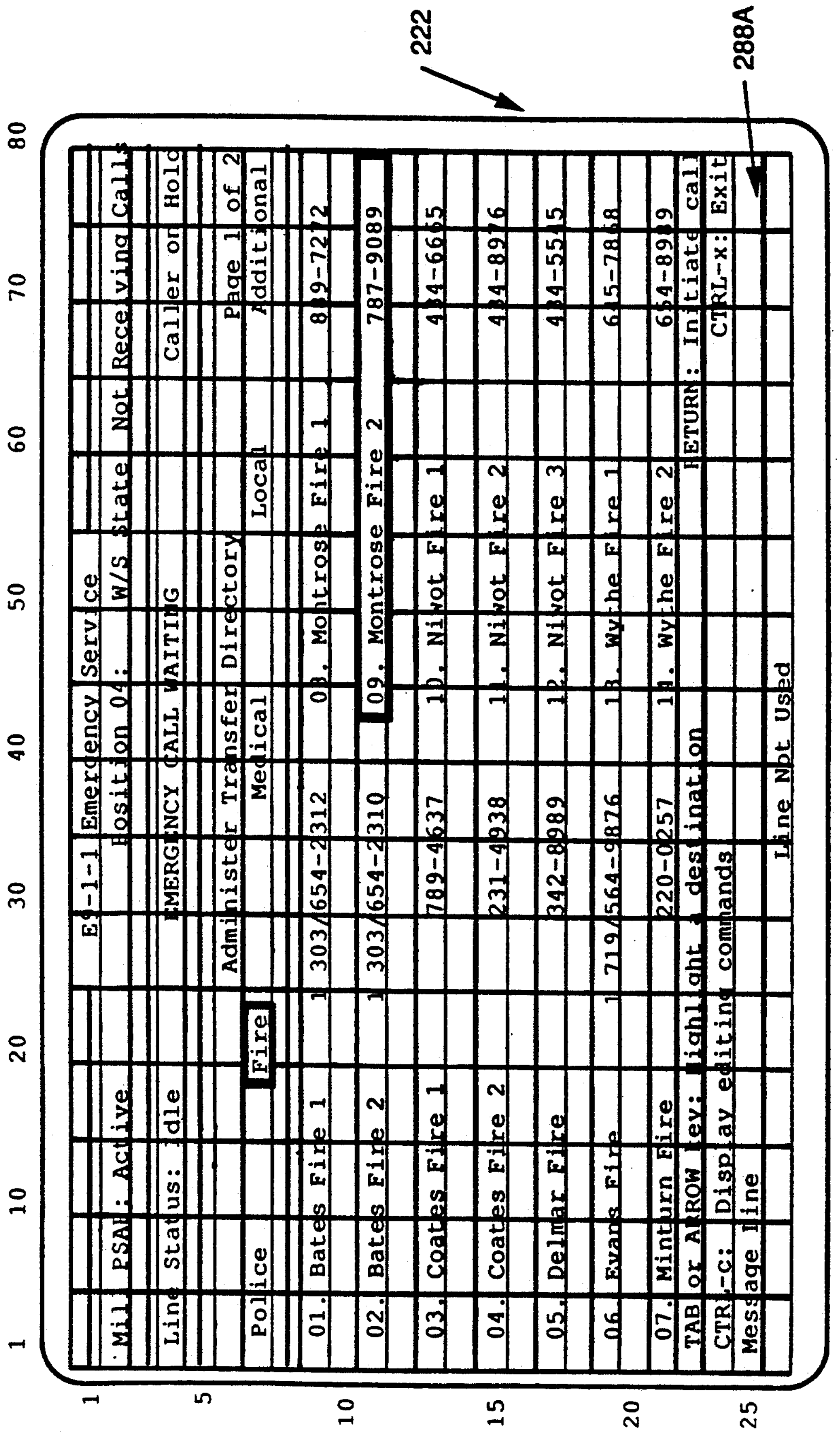
FIG. 49 is a diagram of a screen used for further administration of a transfer directory.

| PC | VT | Feature | Description |
|---|---|---|---|
| | | | states. |
| F11 | F15 | Clear Scrn | This key 263 clears the ANI, ALI, the four selective transfer points 225, and call origin information from the main screen 222. This key 263 is active in all states. |
| F12 | F16 | Attdt Status | This key allows the attendant 221 to toggle between the "Receiving Calls" and "Not Receiving Calls" modes. If the PSAP 216 is placed in Abandonment or Night Service, this key 263 is not operational. The "Not Receiving Calls" mode increases the functionality available to the attendant 221. In the "Not Receiving Calls" state, the attendant 221 can initiate certain operations via keystroke that are not available during the "Receiving Calls" mode. Those actions include:<br>• performing PSAP administration, and<br>• entering the Help screens. |
| Home | Insert Here | Call History | This key allows the attendant 221 to cycle through up to the last four calls 201 that were handled at the workstation 212. This key 263 is available when the ALI Data screen 222 is displayed.<br>Once the attendant 221 completes an E9-1-1 call 201 and returns to "Idle," a "Call History 1" indicator appears above the ALI data for the call 201. Pressing the "Call History" key 265 once recalls the second most recently completed call 201. Each successive press of the key 265 move to the next call 201 back in temporal order. This action continues with each press of the key 265 until the fourth previous call (or the last call 201), if less than four calls 201 have been processed, is displayed.<br>Each previous call 201 displayed is identified with a label (Call History 1-4) to ensure that the attendant 221 is aware that the ALI data displayed is not part of an active call 201. If an attendant 221 uses the "Call History" feature while on an active call 201, the active call 201 will be labeled "Current Call" to quickly distinguish it from the completed calls in the "Call History" array 620. |
| Page Up | Re-Move | Call Back | This key allows the attendant 221 to dial the TN of the caller 202 whose NPD + TN information appears on the screen 222. |
| De-lete | Se-lect | XFR Dir | This key 263 presents the directory of fixed transfer points 225 (FIG. 49). The directory consists of five fixed groups with each group containing one or more screens 222 of 14 entries each. The maximum number of entries per group is 99. The entire directory can contain a maximum of 210 entries. This key 263 is active regardless of workstation state. |
| End | Prev Scrn | Hold | This key 263 allows the attendant 221 to place one call 201 on hold for an indeterminate amount of time. This key 263 is available when the workstation 221 is in the "Active" state.<br>The "Hold" key toggles between |

-continued

Figure 53:
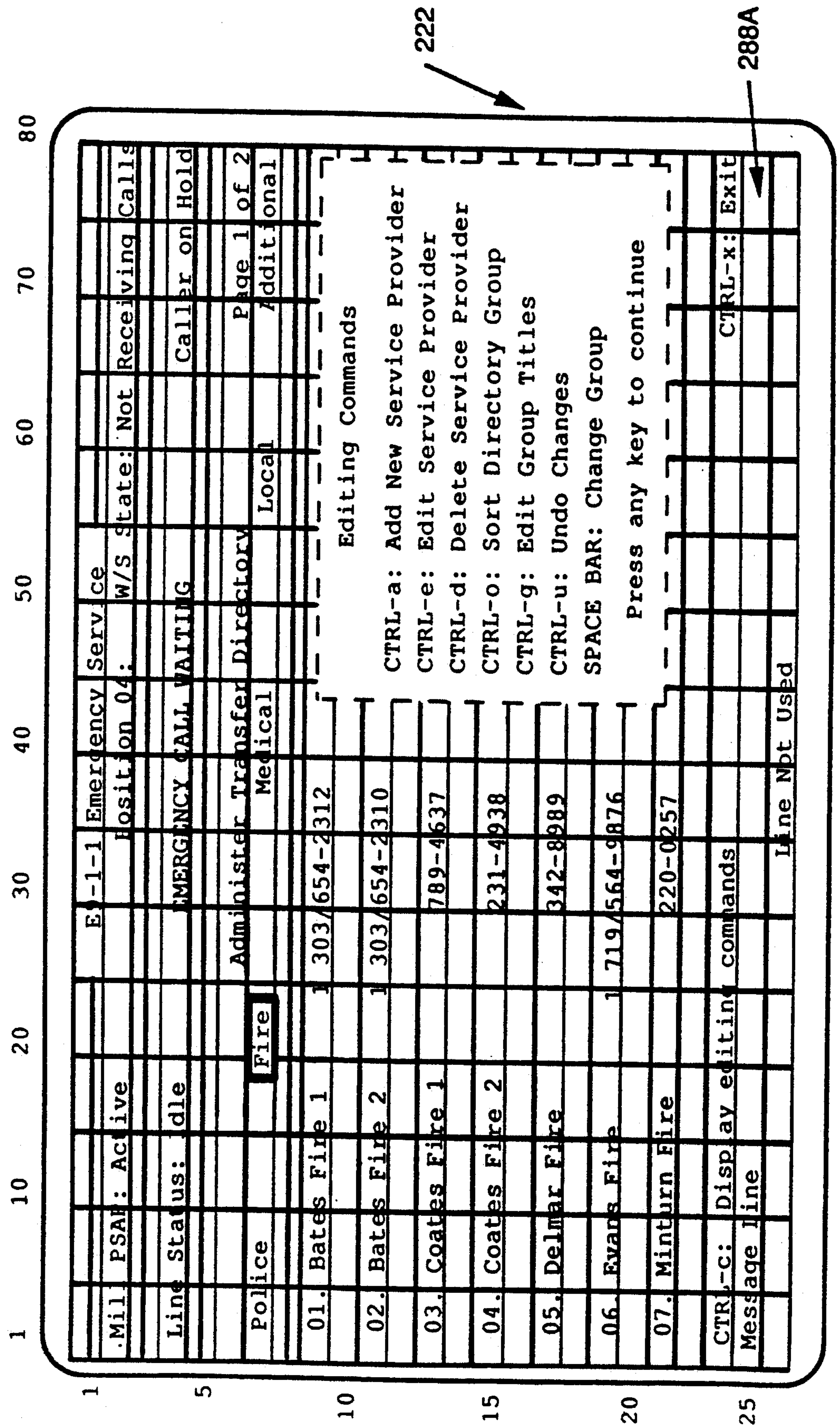
FIG. 53 is a diagram of the screen shown in FIG. 47, illustrating an "editing commands" window.
Figure 54:
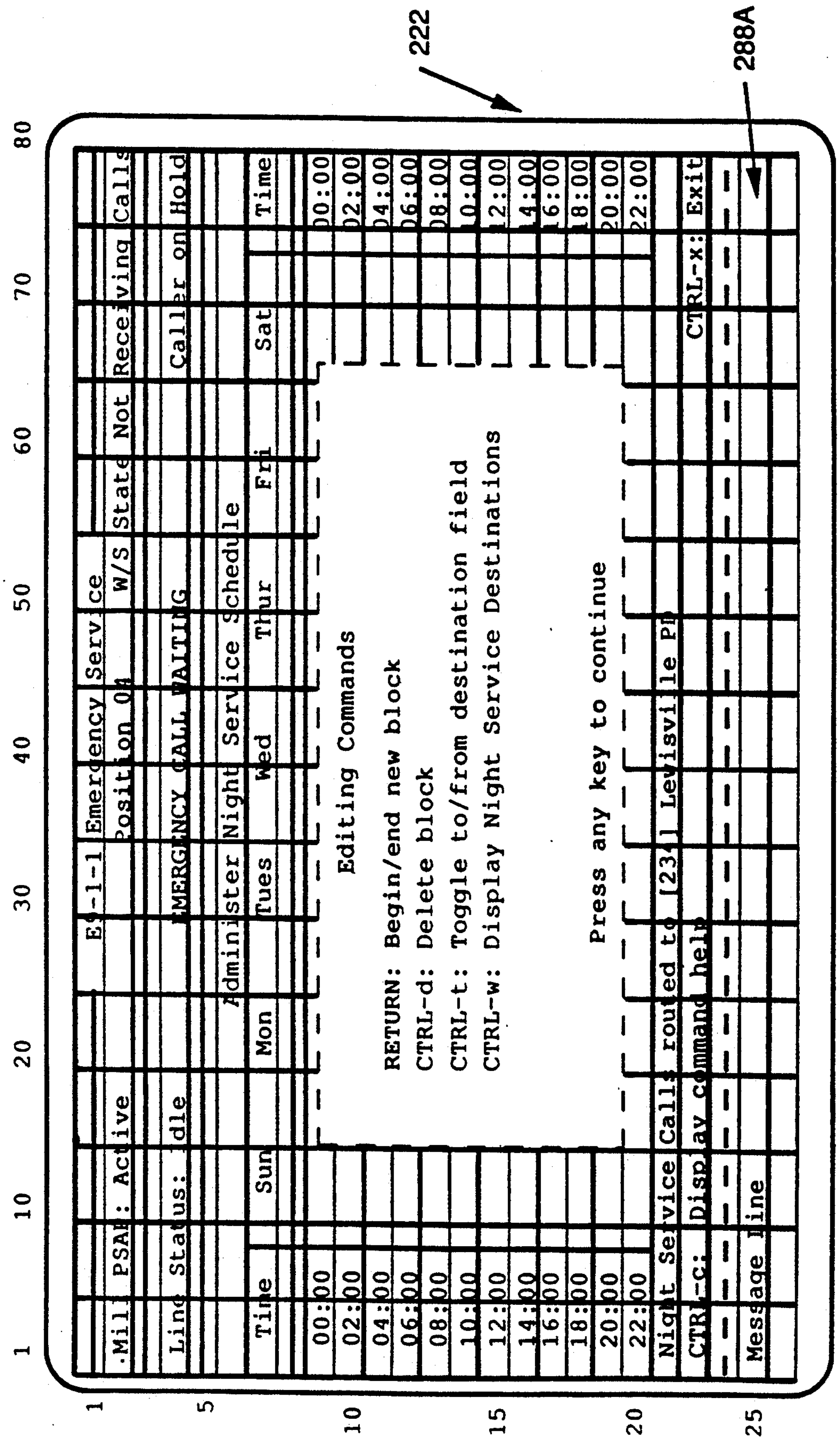
FIG. 54 is a diagram of a screen showing an "editing commands" window.
Figure 55:
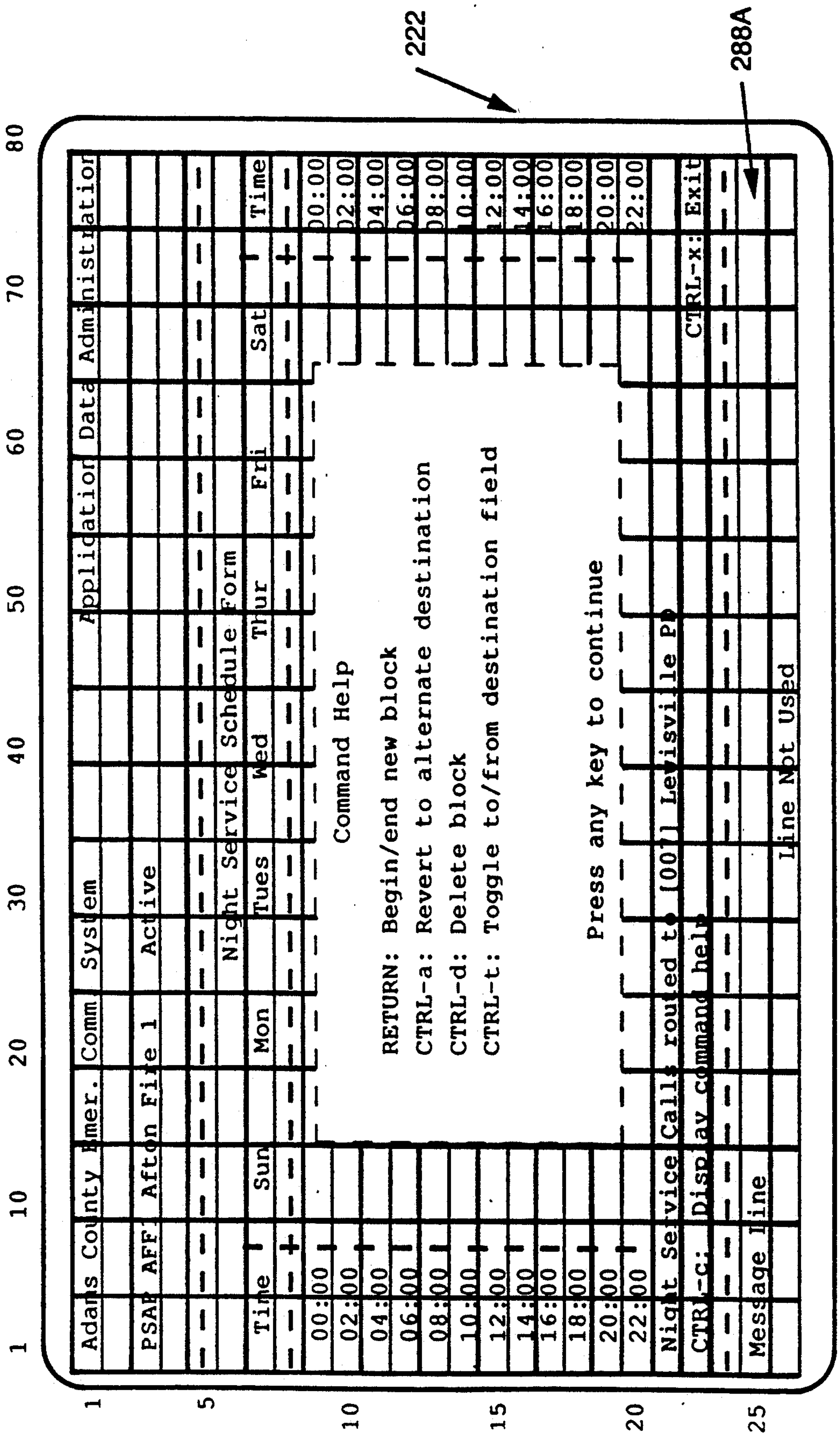
FIG. 55 is a diagram of a screen showing the screen shown in FIG. 23, illustrating a "command help" window.

| Function Key Chart | | | |
|---|---|---|---|
| PC | VT | Feature | Description |
| | | | placing a call 201 on hold and retrieving the call 201. When a call 201 is placed on hold, the label "Caller on Hold" is displayed on the far right portion of line 4 (FIG. 53). This label remains displayed until the attendant 221 retrieves the call 201. In the event that the caller 202 on hold goes on-hook (abandons), the attendant 221 is made aware of this event only after he or she presses the "Hold" key 263 in an attempt to reconnect the call 201. At that time, the message 240 "Caller on Hold has abandoned" appears on the message line 288A. |
| Page Down | Next Scrn | Pick Up | This key 263 allows the attendant 221 to direct an incoming E9-1-1 call 201 to the workstation 212. This key 263 is available regardless of workstation state when an E9-1-1 call 201 has been directed to the PSAP 216 unless the attendant 221 is in the administration portion of the interface. If the attendant 221 is on-hook when the "Pick Up" key 263 is pressed, the AP 234 first rings the attendant's phone set 227. When the attendant 221 goes off-hook, he or she is immediately connected to the ESR 202. |
| / | PF2 | Forced Discon | This key 263 allows the attendant 221 to drop the emergency call trunk 206. It is only available when the attendant 221 is connected with an emergency caller 202. The "Forced Discon" key 263 operates differently if it is pressed during a two-party or three-party call. In a two-party call, pressing the "Forced Discon" key 263 provides the same result as pressing the "Drop Out" key 263, returning the attendant 221 to the dialing state. In a three-party call, pressing the "Forced Discon" key 263 removes the emergency caller 202 from the call 201, but allows the attendant 221 and the ESP 211 to continue communicating. |
| * | PF3 | Cncl XFR | This key 263 allows the attendant 221 to drop the ESP 202 from the call 201. The attendant 221 and ESR 211 remain connected in a two-party call. In the event that the attendant 221 initiates a transfer to an incorrect action before the ESP 202 answers, it allows the attendant 221 to initiate a new transfer action. In a three-party call, this key 263 drops the attendant 221 out of the call 201 while leaving the ESR 211 and ESP 202 connected in a two-party call. In either case, the attendant line reverts to dial tone after a short delay. |

When the PSAP attendant 221 begins a work shift, the terminal is in the "Not Receiving Calls" state. In this state, the attendant 221 can perform all the functions available during the "Receiving Calls" state as well as perform some other tasks that are not available to the attendant 221 while in the "Receiving Calls" state. E9-1-1 calls 201 directed to the PSAP 216 will be reflected on a "Not Receiving Calls" screen 222 (FIG. 23) by the blinking EMERGENCY CALL WAITING indicator (line four).

In the "Not Receiving Calls" state (FIG. 23), the label in the upper right hand corner of the screen 222 reads in reverse video: "Not Receiving Calls." In addition, in this state the attendant 221 can press the "Admin." key 263, which is unavailable to the attendant 221 while the workstation 212 is Receiving Calls, and from there choose from a menu 213. Under normal operating conditions, the attendant 221 places the workstation 212 in the "Receiving Calls" mode to begin call taking. By pressing the key 263 labeled "Attdt Status", the attendant 221 places the workstation 212 in the "Receiving Calls" mode. This is reflected on the screen 222 (FIG. 15A) by the "Not Receiving Calls" label being replaced with the "Receiving Calls" label and by the line status label and field being displayed on line four. The section of the screen 222 on line two provides information on the availability of the PSAP 216 (FIG. 15B) (Active, Abandoned, or Night Service) and the individual workstation ID and workstation status (Receiving Calls or Not Receiving Calls). Lie four information includes line status (Idle, Transfer Allowed, Transfer in Use, Ringing or Unavailable), the "Emergency Call Waiting" indicator and the "Caller on Hold" indicator.

When the E9-1-1 call 201 arrives at the PSAP 216, a wall-mounted ringer (not shown) announces the call 201. The call 201 will be routed to the first attendant to go off-hook and press the "Pick Up" key 263. The "Pick Up" key 263 enables the attendant 221 to make connection with the emergency caller 202. Even when a workstation 212 is "Not Receiving Calls", the presence of an E9-1-1 call 201 is reflected on any screen 222 present at the PSAP 216. By pressing the "Pick Up" key 263, the workstation 212 is automatically returned to the "Receiving Calls" state and the screen 222 displayed (FIG. 15B).

The exception to this operating philosophy is the administration portion of the interface. While in the administration portion of the interface, the attendant 221 will not have the "Pick Up" key 263 immediately available. To answer the call 201, the attendant 221 must first exit the administration portion of the interface and then press the "Pick Up" key 263. This restriction is placed on the interface so that changes to the PSAP administration screens 222 can be saved before exiting.

Whenever the attendant 221 initiates an action via keystroke input that is sent to the switch 218, a status indicator lets the attendant 221 know that the input was received. This "Working" indicator in the far right portion of line six (FIG. 15A) appears until the anticipated response from the switch 218 occurs.

The field labeled "Emergency Call Waiting" located at the center of line four gives the attendant 221 at each workstation 212 a visual indication of the waiting E9-1-1 call 201. This label appears on each PSAP workstation 212 as a E9-1-1 call 201 is directed to that particular PSAP 216. It disappears from all PSAP screens 222 once one of the attendant 221 presses the "Pick Up" key 263. In addition, when all attendants 221 are occupied with an E9-1-1 call 201 and another call 201 arrives at the PSAP 216, the indicator appears again and begins blinking until an attendant 221 accepts the call 201.

In the event that all other workstations 212 at the PSAP 216 are "Not Receiving Calls", attempting to disable the last workstation 212 results in the following confirmation window 514 displayed in the center of the screen 222 accompanied by an alerting double beep:

"*This action will cause your PSAP to become abandoned since you are the last attendant position 'Receiving Calls'. Do you want to abandon your PSAP (Y/N) ?*"

Placing all PSAP workstations 212 in the "Not Receiving Calls" mode will result in PSAP Abandonment. E9-1-1 calls 201 are then rerouted to the designated abandonment destination 215.

The attendant 211 answers an E9-1-1 call 201 by picking up the handset 227 and pressing the "Pick Up" key 263. If the attendant 221 presses the "Pick Up" key 263 before going off-hook, the E9-1-1 call 201 is directed to that workstation 212 and the system rings the attendant's individual phone set 227. To accept a second E9-1-1 call 201, the attendant 221 presses the "Hold" key 266. This places the original caller 202 on hold and allows the attendant 221 to take the waiting E9-1-1 call 201. A "Caller on Hold" indicator or message 240 appears on the screen 222 line four as a remainder to the attendant 221. Once two calls 201 have been accepted, no other E9-1-1 calls 201 can be processed until the attendant 221 finishes with the second or active call 201. If the attendant 221 goes on-hook with a caller 202 on hold, the system 200 will blink the "Caller on Hold" message 240 in inverse video to make the attendant 221 aware of the forgotten call 201 on hold. This message 240 flashes until the call 201 is retrieved or another call 201 is accepted.

Message Line

Line twenty-four of the screens 222 is dedicated to presenting the messages 240 from the AP 234 and messages from the ALI/DMS system 224. These messages 240 are often informational in nature and provide the attendant 221 feedback when invalid keyboard input is attempted. Messages 240 displayed on line twenty-four are seventy-five characters or less in size and can appear on any screen 222 displayed. Most messages 240 displayed originate at the AP 234 and involve invalid keyboard input. These messages 240 are accompanied by a single burst (beep) indicating user error. For such messages 240, the next keyboard action removes the messages 240. Messages 240 of an informational nature are accompanied by a double beep.

PSAP Administration: The PSAP attendant 221 can perform a variety of administrative tasks from a workstation 212 that is in the "Not Receiving Calls" mode. There are two categories of tasks within PSAP administration. The first category requires password access; the other do not. By pressing the "Admin." key, the administration main menu 513 is displayed (FIG. 50). With this screen 222, the attendant 221 can select one of three items:

1. Cancel/Activate Night Service;
2. Perform Restricted PSAP Administration; or
3. Abandon/Reactivate PSAP.

The second option, "Perform Restricted PSAP Administrative Tasks", is limited to those users with password access. The first and third options are available to all PSAP attendants 221. Once the attendant 221 calls up the administration screens 222 via the "admin." key 263, the functionality of the call processing keys 263 is not available. To accept an incoming E9-1-1 call 201 while on an administration screen 222, the attendant 222 first exists the administration portion of the interface before pressing the "Pick Up" key 263. In all other cases while in the "Not Receiving Calls" mode, all call processing functionality is available to the attendant 221, and pressing the "Pick Up" key placing the workstation 212 in the "Receiving Calls" mode and sends the call to the workstation 212.

The attendant 221 can exit the PSAP administration main menu 513 in one of two ways (1) press "Ctrol-x" to exit the screen 222 or (2) press the "Admin." key to exit the screen 222.

PSAP Night Service & Abandonment: From the "PSAP Administration" main menu screen 222 (FIG. 50),the attendant 221 may take the PSAP 216 into or out of Night Service. By the "enter" key 263, this confirmation window 514 will appear on line twenty-four of the screen 222 and read:

"Cancel Night Service? (Y/N)"

If the PSAP 216 is not in Night Service, the confirmation will read:

"Activate Night Service" (Y/N)"

This action takes the PSAP 216 into or out of Night Service. To close the PSAP Administration main menu 513, the attendant 221 presses the "Admin." key 263 or presses "Ctrol-x".

If an attendant 221 places an active PSAP 216 manually into Night Service, each on-line workstation 212 receives a system message 240 stating that the PSAP 216 will be in Night Service momentarily. Approximately a minute later, a new message 240 appears indicating that the PSAP 216 is now in Night Service. Any attendant can initiate the action to Abandon the PSAP 216 or conversely to bring the PSAP 216 out of Abandonment. By selecting the "Abandon/Activate PSAP" option (#3, FIG. 50) and pressing "Return", a confirmation window 514 at the center of the screen 222 is displayed. The confirmation wording is dependent upon the present state of the PSAP. If the PSAP 216 is in the Active or Night Service state, the confirmation on line twenty-four reads:

"Abandon PSAP? (Y/N)?"

If the PSAP 216 is already in Abandoned, the confirmation reads:

"Reactivate PSAP? (Y/N)"

By pressing ∓Y", the PSAP 216 is placed in the Abandoned state or in active state depending upon the original state of the PSAP 216. Each workstation 216 at the PSAP 216 receives a message 240 to that effect. Pressing "N" displays the ALI DATA screen 222 (FIG. 15B) with PSAP status unchanged.

Restricted PSAP Administration: Designated PSAP attendants 221 will be able to perform a set of administrative tasks from a PSAP workstation 212 that is in the "Not Receiving Calls" state. Access to the administration screens 222 is possible for those attendants 221 using a valid password and login sequence. With the workstation 212 in the "Receiving Calls" state, pressing the "Admin." key 263 presents the attendant 221 with an error message. Pressing the "Admin." key 263 from a workstation 212 placed in the "Not Receiving Calls" state will display the PSAP Administration main menu 513 (FIG. 50). Selecting the second option, "Perform Restricted PSAP Administration", prompts the attendant 221 to input a login sequence. This login sequence is echoed on the screen 222. Pressing the "Return" key 263 sends the login sequence to the AP 234 and prompts the attendant 221 for a password. The password sequence is not echoed on the attendant's screen 222. By pressing "Return", the password is sent to the AP234. If correct, the attendant 221 is presented with another menu of administration task options. If either the login or password were incorrect access is denied, but no information as to what portion of the login sequence failed is provided. The error message may read:

"*Login Failed. Access Denied.*"

Finally to input a correct login or password twice returns the workstation 212 to the ALI Data screen (FIG. 15B). To try again, the attendant 221 must begin from the start by pressing the "Admin." key 263. There is only one valid login sequence per PSAP 216. The default login is the four character PSAP name. This login can be changed but only by the platform administrator 239.

The platform administrator 239 is considered the "super user" and can access the entire C.E.R.S. system 200 administration interface from any workstation 212 attached to the system 200. This provides the system administrator 239 the ability to troubleshoot problems and make changes to the platform administration database from a PSA 216. The platform administrator 239 will call up the same administration interface screens 222 as would be used at the platform 204. Only a single attendant 221 at a PSAP 216 can access the administration screens 222 at any time. Once one attendant 221 at a PSAP 216 has successfully accessed the administration portion of the system 200, all other attempts to gain access are denied. Pressing the "Admin." key 263 from a workstation 212 once another attendant 221 has gained access presents the following error message on line twenty-four: "Access denied. PSAP Administration in Progress."

Once the attendant 221 has correctly entered his or her password, the PSAP Administration submenu 513 (FIG. 51) is presented. From this screen 222 the attendant 221 can select one of four available categories of tasks to administer as well as quit the administration portion of the system, e.g.

∘ Administer the Night Service Schedule

The user of the administration screens 222 must always return to the PSAP Administration main menu screen 222 (FIG. 50) to quit administration. This is done by pressing Control-x.

Figure 23:
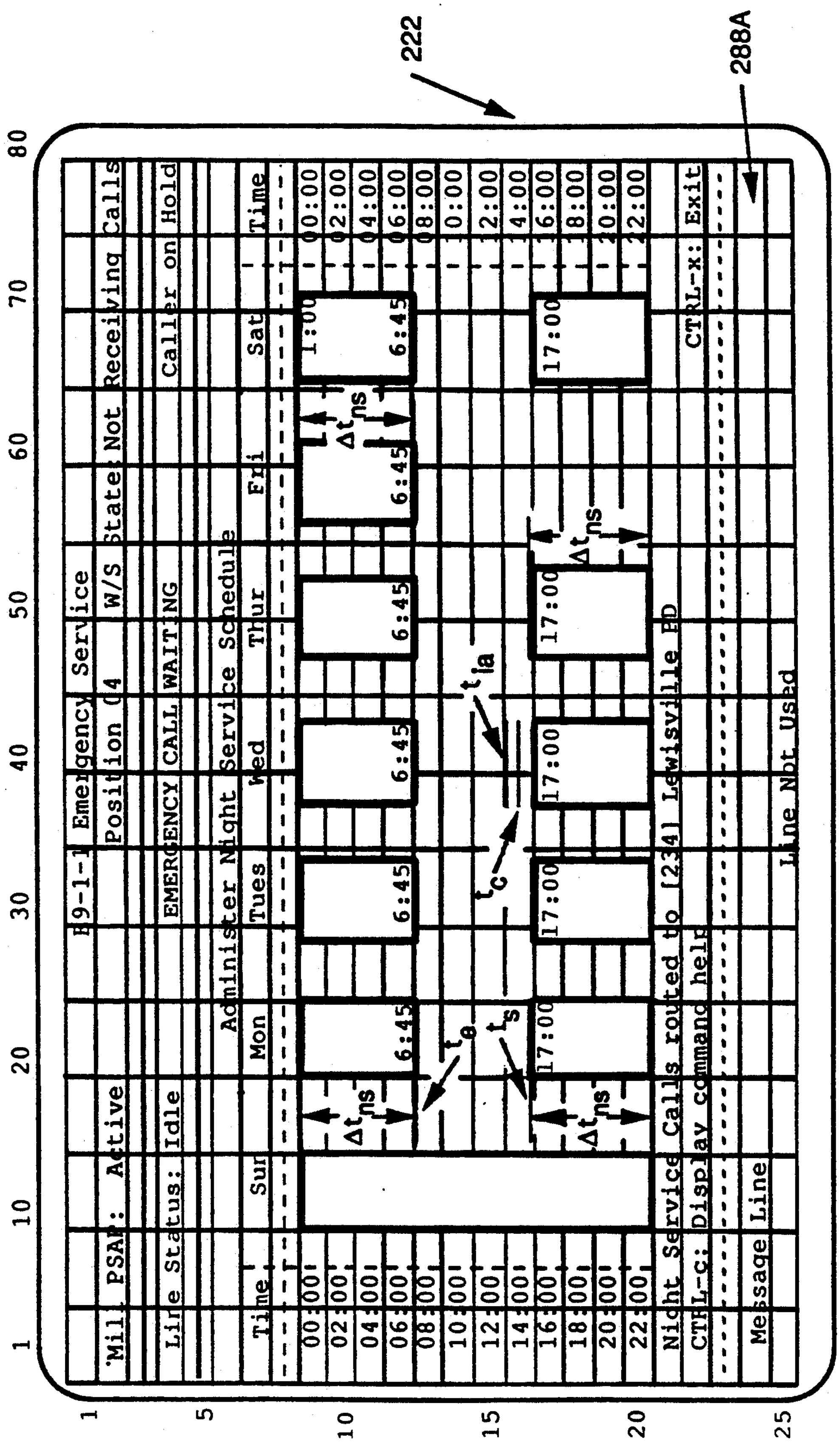
FIG. 23 is a diagram of a screen of a workstation illustrating night service schedules for a particular PSAP.

Administer Night Service Schedule: The PSAP manager 259 is able to modify the times when Night Service goes into effect and when it is removed. From the PSAP Administration submenu 513 (FIG. 51), the attendant 221 selects the second option by cursoring until the highlight bar is over "Administer Night Service Schedule" and process "Enter". Will take the user immediately to the Night Service Schedule screen 222 (FIG. 23). This administration is the same as that described above for the applications data administration.

Message Formats: Because of the critical nature of the tasks performed by the PSAP attendant 221, the design of the interface must minimize attendant errors messages. Alert message 240 are therefore infrequent. Messages 240 presented on the screens 222 of the PSAP attendant workstation 212 come from either of two sources: the AP234 or the ALI/DMS system 224. Attendant errors that impact the telephony portion of the emergency call transfer sequence are generated by the AP234. When errors are detected, the error message 240 clearly describes what the error is, provides a probable cause if possible, and describes an appropriate corrective action. Normal attendant errors produce a tone of short duration (beep) and display an error message 240 on line twenty-four. The next user input will remove the message from the message line.

In the event the more than one message is sent to a PSAP workstation in a short period of time, an asterisk (*) will appear to the far right of the message line. This symbol indicates that multiple messages have been queued and are awaiting review. When queued message 240 occur, the attendant 221 presses message acknowledge to remove the displayed message 240 and display the next. Once the last queued message 240 is displayed, the asterisk disappears from the message line 288A.

System Message Formats: System message 240 covey to the attendant 221 a change in the status of the system 200 or some attempt on the part of the attendant 221 to operate the system 200 in an incorrect manner. These messages 240 are classified as either "critical" or "non-critical". Critical message 240 are accompanied by a double beep. These messages 240 also override the non-critical messages 240 and are displayed immediately to the attendant 221. Errors committed by the attendant 221 elicit a message 240 and a short duration beep. These messages 240 include the following:

∘ PSAP will be in Night Service momentarily: MM/DD/YY HH/MM

This message appears when the platform administrator 239 prepares to place a PSAP 216 in the Night Service state. This message 240 appears for one minute and then the message 240 changes to "PSAP in Night Service" and remains on the screen 222 until the PSAP returns to the Active state. A double beep accompanies the message 240.

Critical ∘ PSAP returned to active state on: MM/DD/YY HH/MM.

This message 240 appears once an attendant 221 returns the PSAP 216 to the Active state. Each attendant 221 must manually reactivate his/her workstation 212, (toggle the Attdt Status key from "Not Receiving Calls" to "Receiving Calls"), to receive E9-1-1 calls 201. A double beep accompanies the messages 240.

Critical ∘ PSAP [XXXX] in Night Service. Direct call to alternate PSAP.

This message 240 appears when the attendant 221 attempts to transfer a caller 202 to another PSAP 216 that is currently in Night Service. A double beep accompanies the message 240.

Critical ∘ Caller on Hold has disconnected.

This message 240 appears when the attendant 221 attempts to retrieve the call 201 on hold and that caller 202 has abandoned during the hold interval. A double beep accompanies the message 240.

∘ Call History request failed. Use manual procedures.

This message 240 appears when the attendant 221 presses the Call History key 265 and the request fails because of a system malfunction. A single beep accompanies the message 240.

∘ Must have a previous call screen displayed to use Call Back.

This message 240 appears when the attendant 221 attempts to initiate a call back when no call 201 is displayed at the workstation screen 222. A single beep accompanies the message 240.

∘ No call history available.

This message 240 appears when the attendant 221 attempts to display call history and no previous calls 201 have been accepted at the workstation 212. A single beep accompanies the message 240.

Critical ∘ PSAP abandoned on: MM/DD/YY HH/MM.

This message 240 appears when the PSAP 216 is placed in the Abandoned state. A double beep accompanies the message 240.

◦ Critical PSAP in Night Service on: MM/DD/YY HH/MM.

This message 240 appears when the PSAP 216 enters the Night Service state. A double beep accompanies the message 240.

Critical ◦ PSAP will be abandoned momentarily: MM/DD/YY HH/MM.

This message 240 appears when the AP234 prepares to place the PSAP 216 in the Abandoned state. A double beep accompanies the message 240.

Call Routing Sequence

Referring now to FIGS. 19(*a*), 19(*b*) and 20, the switch 218 and the AP 234 interact via the stk process 358 and the tlp process 357, and through the HCI interface 282 to route E9-1-1 calls 201 to call handling destinations 215 and then to ESP's 211. The messages 288 and steps taken during such routing are described below.

1. The emergency service requester (ESR) 202 dials the E9-1-1 call 201. The ESR 202 is calling from a telephone number (TN).
2. The E9-1-1 call 201 is received at the end office 205 of the PSTN 219.
3. At the PSTN 219, ANI data is added to the E9-1-1 call 201. The E9-1-1 call now includes:
   i. the number called ("9-1-1"),
   ii. the ESR's TN (seven digits), and
   iii. an I-digit, which indicates the attributes of the ANI data (e.g., "is the TN one of a multi-party line" and "cannot obtain ANI data for the E9-1-1 call 201").
4. The E9-1-1 call 201 is sent to the switch 218 via the inbound CAMA trunks 206 using inbound signaling with ANI data being sent during call setup.
5. The switch 218 assigns a unique call reference to the E9-1-1 call 201 (referred to as "call ref"). The call_ref is a unique value according to the switch 218 to which the E9-1-1 call 201 is sent. The switch 218 also generates call status messages 288 when the switch 218 uses any device which the AP 234 monitors. For example, the switch 218 sends the AP 234 a <dialing> message to notify the AP 234 that the E9-1-1 call 201 was received on the inbound trunk 206. The AP 234 monitors the progress of routing the E9-1-1 call 201 by receiving the call status messages 288 such as <dialing>.
6. The <dialing> message 288 includes:
   i. the identification of the inbound trunk 206 on which the E9-1-1 call 201 was received by the switch 218, and
   ii. the unique call reference value (call_ref) for the E9-1-1 call 201.
7. The AP 234 does not respond to the <dialing> message 288 that indicates that the inbound CAMA trunk 206 was seized. The AP 234 records the <dialing> message and waits for the next call progress message 288. The switch 218 has the hunt group 333 of DNs that do not have terminating devices attached to them. The routing of the E9-1-1 call 201 to the hunt group (PDNs) 333 is done automatically by the switch 218 in response to administration data assigned to the trunk 206.
8. Upon routing the E9-1-1 call 201 to a PDN 333, the switch 218 sends a <route determined> message 288 to the AP 234, so that the AP 234 can further monitor the status of routing the E9-1-1 call 201. An "other parties" information field of this <route determined> call status message 288 contains other DN information related to the E9-1-1 call 201 (i.e. TN of PDN hunt group member) to which the E9-1-1 call 201 was routed. This call status message 288 also includes ANI data for the E9-1-1 call 201.

The switch 218 also sends a <seized> call status message 288 for the PDN 333 to the AP 234, which indicates to the AP 234 that the E9-1-1 call 201 is at the PDN 333. An "other parties" information field of the PDN's <seized> call status message 288 contains other DN information related to the E9-1-1 call 201 (i.e., the trunk 206). Thus, by way of the <route determined> and <seized> call status messages 288, the AP 234 monitors the E9-1-1 calls 201.

In response to the <route determined> message 288 (which includes the TN of the incoming E9-1-1 call 201), the router process 360 submits a request for ALI information to the ali process 364. No response is expected. This request to the ali process 364 forces the ali process 364 to submit a request to the ALI/DMS, and not check the buffers of the ali process 364. In this manner, each unique E9-1-1 call 201 will result in an ALI/DMS request.

In response to the <route determined> message 288, the router process 360 accesses the trunk administration table 374 to determine the classification of the incoming trunk 206 with respect to ANI and Selective Routing. (FIG. 19, Step 2).

The router process 360 logs a system error message if ANI was not received on a CAMA trunk 206, if the I-digit is not equal to 0 or 3, or if the ANI data includes anything other than seven recognized digits. If the I-digit is 1 or 4, the wscp process 368 displays a message 240 on the screen 222, such as "possible call from multi-party line".

10. The trunk administration table 374 (FIG. 11) is accessed using the identification of the inbound trunk 206 (which was sent to the AP 234 as part of the <dialing> message 288.) The trunk administration table 374 defines a numbering plan digit (NPD) for the incoming trunk 206 on which the E9-1-1 call 201 was received. The trunk administration table 374 also defines a flag indicating whether or not Selective Routing is to be used for E9-1-1 calls 201 received on that inbound trunk. If Selective Routing is to be used, steps 2-13 described below with respect to FIG. 19 are used to automatically direct the E9-1-1 call 201 to the ESR's primary PSAP 216, based on the ESR's TN and NPD. If not, Default Routing steps 15-26 described below with respect to FIG. 19 are used.
11. Having the NPD from the trunk table 374, and having the ESR's TN from the ANI data, the router process 360 responds to the Selective Routing Flag from the trunk administration table 374 and obtains the emergency service number (ESN) corresponding to such NPD and TN from the TN/ESN table 213.
12. In response to the ESN output from the TN/ESN table 213, the router process 360 accesses the entry (in the ESN table 390) which is assigned this ESN value. Each ESN table 390 defines a call handling destination 215 which should receive the E9-1-1 call 201 by pointing to a specific entry in a destination table 259 which corresponds to that ESN. The destination entry defines:

i. the destination type (e.g., PSTN 219, or switch DN or PSAP 216), ii. the DN of the destination 215, and iii. an alternate destination, except for entries that are DNs of the PSTN 219.

FIG. 10 indicates that the destination table 259 for the ESN may indicate a variety of call handling destinations 215 for the ESN to which the destination table 213 relates. When a destination 215 is a PSAP 216, the ESN table 390 may point to up to a selected number of additional entries, up to four entries, in the selective transfer table 378. These entries (or data) represent the selective transfer points 225. When the destination 215 of the E9-1-1 call 201 is a PSAP 216, the router process 360 forwards all of the selective transfer data related to that ESN to the psap process 361, which forwards it to the appropriate wscp process 368. The selective transfer points 225 are displayed on the PSAP screen 222 if the E9-1-1 call 201 is routed or transferred to one of the PSAPs 216 of the system 200. If the destination 215 is not a PSAP 216, the selective transfer data is not used.

Referring to FIG. 10, the destination 215 in the destination table 259 is indicated by the following entries:

1. "dest table index" is the record number entry in table/linear numbering.
2. "dest label" is the short name used to identify the destination 215. This name is displayed to PSAP attendants 221 and written to log files.
3. "dest comment field" is a longer description of the destination 215 used for administration record keeping.
4. "busy signal flag" indicates that the alternate destination 215 for the destination 215 is a busy signal 220.
5. "alternate dest number" identifies an alternate destination to which the E9-1-1 call 201 is directed if the primary destination 215 cannot accept the E9-1-1 call 201.

If the destination is of the type PSTN 219, the DN in the PSTN 219 is pointed to. If the destination is a DN serviced by the switch 218, the DN in the switch 218 is pointed to. If the destination is a PSAP 216, a record in the PSAP table 395 is pointed to, to identify the PSAP 216.

An entry in the ESN table 390 may also indicate that the ESR 202 is to receive a busy signal 220. This allows all E9-1-1 calls 201 destined for a particular ESN to be routed to the busy signal 220 as described in respect to FIG. 19, Steps 7 and 34, for example.

13. Destination Inspection. The router process 360 receives the entry from the destination table 259 by a table lookup. If the call handling destination 215 is a PSAP 216, status information about the PSAP 216 is inspected (FIG. 20, Steps 105, 106 and 104) in the following order before the E9-1-1 call 201 is routed:
    1. PSAP Abandoned If the router process 360 determines that the PSAP 216 is defined to be in the "abandoned" state, the router process 360 routes the E9-1-1 call 201 to the alternate destination 215 (FIG. 20, Step 109) specified for the destination 215 and performs destination inspection on the new destination (FIG. 20).
    2. PSAP Night Service: If the PSAP Night Service schedule 262 coincides with the current date and time to, or if the Night Service override is active, the E9-1-1 call 201 is handled according to the Night Service feature.
    3. PSAP Call Capacity: The router process 360 determines whether call capacity is administered (FIG. 25, line 11 of the screen 222). If so, the router process 360 inspects (a) the number of E9-1-1 calls 201 that are currently being handled at the PSAP 216 plus those that are in the hunt group queue 243, against (b) the administered call capacity depth (FIG. 25, line 12). The E9-1-1 call 201 is directed to the PSAP 216 in the event that the number (b) is greater than the number (a), or Alternate Routing is invoked in the event that the numbers (a) and (b) are equal or the number (a) is greater than the number (b).

If the primary destination specified in the destination table 259 is a switch DN, the router process 360 redirects (FIG. 19) the E9-1-1 call 201 to that DN without any further analysis. If the E9-1-1 call 201 cannot be redirected to the DN (i.e., a switch redirect-call command fails because the DN does not exist or is busy), the system 200 will attempt to route the E9-1-1 call 201 to the alternate destination specified through the destination table 259. If the primary destination 215 specified in the destination table 259 is a PSTN DN, the router process 360 redirects the E9-1-1 call 201 to that DN without any further analysis. If the attempt to route the E9-1-1 call 201 to the PSTN DN fails (redirect command fails), the E9-1-1 call 201 will be routed to busy 220.

14. If the destination 215 of the E9-1-1 call 201 is a PSAP 216, the router process 360 causes the switch 218 to redirect the E9-1-1 call 201 from the PDN to the hunt group 333 DN which is associated with that PSAP 216. The hunt group 333 has only one member, which is the common notification line 241 DN of that PSAP 216. E9-1-1 calls 201 at the common notification line 241 of a PSAP 216 can be answered by any attendant 221 at the given PSAP 216.

The router process uses a redirect-call command of the HCI 282 to change the ringing destination from the PDN to the PSAP hunt group 333 (see FIG. 4). The switch 218 generates a call status message 288 when the PSAP hunt group 333 becomes the ringing destination 215. The call status message 288, is sent to the psap process 361. In response to the redirect-call message sent to the switch 218, the switch 218 causes the <route determined> message 288 corresponding to the trunk 206 to be sent to the AP 234, verifying that the E9-1-1 call 201 has been redirected to the hunt group 333. Also, an <idle> HCI message 288 is generated for the PDN.

Before the router process 360 initiates the redirect-call switch request, it sends an incoming call message 288 to the psap process 361. The incoming call message 388 notifies the psap process 361 to expect an incoming E9-1-1 call 201 and identifies the attributes of the E9-1-1 call 201. The incoming call message 288 to the psap process 361 includes:

1. i.d. of the inbound trunk 206,
2. ANI-TN if available,
3. NPD,
4. call reference value ("call_ref") assigned to this E9-1-1 call 201 by the switch 218,
5. call routing mechanism (i.e., Selective Routing, Alternate Routing, . . .),
6. the ESN,
7. selective transfer labels,
8. the time at which the E9-1-1 call 201 was received, and
9. the time at which the E9-1-1 call was routed.

The PSAP process 361 matches (or maps) the incoming call message 288 to the call status message 288 received from the switch 218 for the DN of the PSAP notification line 241. Using the trunk i.d. and ANI-TN found in the message 288 from the router process 360 and the call status from the switch 218. This mapping allows the psap process 361 and he wscp process 368 to display ALI and call routing information to the answering attendant 221.

Any number of E9-1-1 calls 201 can be routed to the DN of the PSAP hunt group 333. The E9-1-1 calls 201 are placed in the hunt group 333 and routed to the common notification line 241 of the corresponding PSAP 216 on a first in first out (FIFO) basis. Each time the notification line 241 becomes idle, the next E9-1-1 call 201 in the hunt group queue 243 is directed to the notification line 241. The psap process 361 is notified of an E9-1-1 call 201 at the notification line 241 by a <seized/new-call> HCI message 288. The E9-1-1 call 201 ringing at that notification line 241 is picked up by the first PSAP attendant 221 to invoke the pickup operation from the attendant's workstation 212.

The AP 234 does not fully determine how many E9-1-1 calls 201 are at a hunt group 333 of a PSAP 216. The router process 360 and the psap process 361 attempt to determine the E9-1-1 calls 201 by tracking the E9-1-1 calls 201 which are directed to the hunt group DN by the AP 234. The above description does not relate to any E9-1-1 Calls 201 that may have been directed to the PSAP 216 via transfers, Switch Default routing, or other calls originated by the platform 204.

15. Routing an E9-1-1 Call 201 to a DN on the Switch 218

When the destination of an E9-1-1 call 201 is a DN on the switch 218, the router process 360 performs the redirection without trying to determine the DN's status. That is, the AP 234 does not check to see if the DN is busy or a valid number on the switch 218. The AP 234 initiates this redirection by sending a command to the switch 218 to redirect the E9-1-1 call 201 and the <route determined> and <idle> messages 288 are generated as described above with respect to directing an E9-1-1 call 201 to a PSAP 216. The switch 218 indicates that the connection of the E9-1-1 call 201 to the DN has been established by causing the <route-determined> message 288 of the HCI 282 to be sent to the AP 232 and no further action is taken by the router process 360 to ensure that the E9-1-1 call 201 is answered. If the E9-1-1 call 201 cannot be routed to the DN, the switch 218 generates a failure message 288. In response, the router process 360 tries to route the E9-1-1 call 201 to other destination 215 based upon the current routing method. (See FIG. 19, Step 12 or 25).

In the event that the ESR 202 hangs up (e.g., disconnects the E9-1-1 call 201 by hanging up the ESR's handset 207), the incoming trunk 206 is released, and the router process 360 makes a call entry log in the system call log file 408 (FIG. 9) if the E9-1-1 call 201 was not directed to a PSAP 216.

16. Routing an E9-1-1 Call 201 to a DN on the PSTN 219. When the call handling destination 215 of an E9-1-1 call 201 is a DN on the PSTN 219, the router process 360 performs the redirection in the manner described above for the redirection of an E9-1-1 call 201 to a DN on the switch 218. This redirection is also done without trying to determine the status of the DN of the destination 215. The switch 218 indicates that the redirection request was successful by causing the <route-determined/dest seized> message 288 to be sent to the AP 234, in which event no further action is taken by the router process 360 to ensure that the E9-1-1 call 201 is answered. The system 200 does not take steps to assure that the E9-1-1 call 201 is answered supervision function is not provided to the switch 218 through the PSTN 219. Thus, the DN on the PSTN 219 could actually be busy, but no further action will be taken by the system 200. If the router process 360 cannot redirect the E9-1-1 call 201 it routes the E9-1-1 call 201 to a busy signal 220. (FIG. 19, Steps 12 or 25.) The AP 234 makes no special considerations to modify the dialable number when routing an E9-1-1 call 201 to the PSTN 219. It is assumed that the switch dial plan features of the switch 218 will handle all dial plan and trunk selection issues.

When the incoming trunk 206 is released, the router process 360 makes a call entry in the system call log file 408. The router process 360 determines that the trunk 206 has been released when the router process 360 receives an <idle> call status message 288 associated with the trunk 206.

17. Routing to a Busy Signal 220. When routing to a busy signal 220, the E9-1-1 call 201 is directed to a trunk group of loop back lines 337 (FIG. 4). The outgoing trunks 302 will operate successfully, but the incoming trunk ports, via trunk services assignment, will fail digit translation and result in the generation of a busy signal 220 by the switch 218. These outgoing trunks 302 are administered such that any outgoing calls 318 over these trunks 302 to unassigned numbers on the switch 218 will cause the switch 218 to generate the busy tone 220. If more E9-1-1 calls 201 are directed to the busy signal 220 than there are loop back trunks 302 available, the AP 234 redirect request (the redirect-call command) to the switch 218 will fail and the AP 234 will drop the E9-1-1 call 201 by disconnecting the inbound 9-1-1 trunk 206.

If the E9-1-1 call 201 cannot be routed to the DN of the trunk group 328, the E9-1-1 call 201 is disconnected by releasing the inbound 9-1-1 trunk 206. A system error message 288 is produced describing the failure and all relevant information about the E9-1-1 call 201.

There are three conditions where an E9-1-1 call 201 can be routed to a busy signal 220:

1. when it is specified as the destination 215 for an ESN in the ESN table 390,
2. when it is specified as the alternate destination for an entry in the destination table 259, and
3. when it is the last resort if the router process 360 cannot direct the E9-1-1 call 201 all to any other destination 215 (FIG. 19, Step 34).

18. Default Routing. Default routing is based on the identification of the trunk 206 on which the E9-1-1 Call 201 was received by the router process 360. Trunk administration on the AP 234 can specify that every E9-1-1 call 201 received over a particular trunk 206 will be routed to a particular destination 215. This destination 215 is specified by a destination table entry reference in the trunk table 374.

Every trunk 206 has a default destination 215 specified. An call 201 can be Default Routed for the following reasons (FIG. 19, Step 14):

1. Trunk table administration specifies that all E9-1-1 calls 201 received over a trunk 206 are routed to the default destination 215 (via turning off Selective Routing for the trunk 206).

2. The emergency E9-1-1 call 201 did not include ANI, or ANI was not received correctly or completely.
3. The ANI that was received combined with the NPD assigned to the trunk 206 in the trunk table administration does not match an entry in the TN/ESN table.
4. The ESN produced from the TN/ESN table 213 does not match an entry in the ESN table 390.
5. An administration table (not shown) on the AP 234 contains an invalid reference (such as the ESN table 390 does not reference a valid destination table entry.)

If the default destination 215 defined in the trunk table 374 is not valid, last chance routing is attempted.

19. Switch Default Routing. This performed by the native switch facilities, Call Rerouting/Call Forward No Answer administration for PDN hunt groups 333. Switch Default Routing is invoked by the switch 218 when the AP 234 does not respond within a specified time period to the switch 218 after a E9-1-1 call 201 has arrived at a PDN 333. The AP 234 may not have responded because of a failure of the AP 234, a messaging performance problem, or a failure of the HCI link 283.

The switch default routing DN should be the same as the default routing destination administered on the AP 234 in the trunk table 374 (FIG. 11). However, there is no capability to synchronize these two pieces of data between the AP and the 20 switch. A timer 632 is set by the switch 218 when a E9-1-1 201 is sent to the PDN hunt group 333. The value of the timer 632 is initially set to the call forward no answer value found in the Class of Service Administration for the PDN hunt group 333. The PDN hunt group administration Call Reroute feature redirects the E9-1-1 call 201 to the default DN if the AP 234 does not send commands to the switch 218 to redirect call before the timer 632 expires. This switch default DN can be any DN recognized by the switch 218. If more than one trunk group 328 has the same Switch Default Routing destination, the E9-1-1 calls 201 from both end offices 205 (ESCOs) can be routed to the same PDN hunt group DN 333. If the switch 218 routes using Switch Default Routing, no consideration can be given to PSAP call capacity administration that may have been specified on the AP 234.

20. Alternate Routing. The destination table 259 defines a primary destination 215 and an alternate destination 215 (unless the destination 215 is a DN on the PSTN 219). The alternate destination 215 can be defined as another entry in the destination table 259 or busy signal 220. An entry in the destination table 259 cannot specify itself as the alternate destination 215. AP administration of the AP 234 attempts to enforce this requirement by verifying the administered data before allowing updates to administration data.

If the primary destination 215 cannot receive the E9-1-1 call 201 for any reason (i.e., except that the destination is in Night Service) the destination's alternate destination is used. If the destination is in Night Service the Night Service destination 215 (FIG. 24) is the next destination to which an attempt is made to route the E9-1-1 call 201. If the new destination in the alternate entry cannot receive the E9-1-1 call 201, its alternate specification is used (exception for Night Service). This link list search for a destination 215 that can accept the E9-1-1 call 215 continues until a destination already inspected is inspected again. This prohibits an infinite loop through destination entries. If Alternate Routing does not produce an available destination 215, either because of the link list search loop detection or because the destination entry's reference is invalid, Default Routing is invoked. If Default Routing had already been applied, Last Chance routing is invoked.

21. Last Chance Routing. Last Chance routing involves sequential search through the destination table 259 looking for entries that define a potential destination 215. PSAPs are inspected before DNs. If no destination entry defining an available destination 215 is found, the caller 201 is redirected to a busy signal 220. Any invocation of Last Chance routing causes a system error log entry to be made recording the ESR's TN, the trunk 206, the failure reason, the call history, and the final routing destination 215.

22. Night Service Routing. Night Service Routing is the ability to redirect E9-1-1 calls 201 based on a day and time schedule, the Night Service schedule 371. The destination 215 and Night Service schedule 371 is determined through administration on the AP 234 (FIG. 24). If the primary destination 215 is in Night Service, an attempt is made to route to E9-1-1 call 201 to the Night Service destination 215 (FIG. 19, Steps 106, 114, 115).

23. Abandoned PSAP. The Abandoned PSAP feature operation is shown in FIG. 20, Steps 105, 109, 111 and 116.

Last Chance Routing

Figure 61:
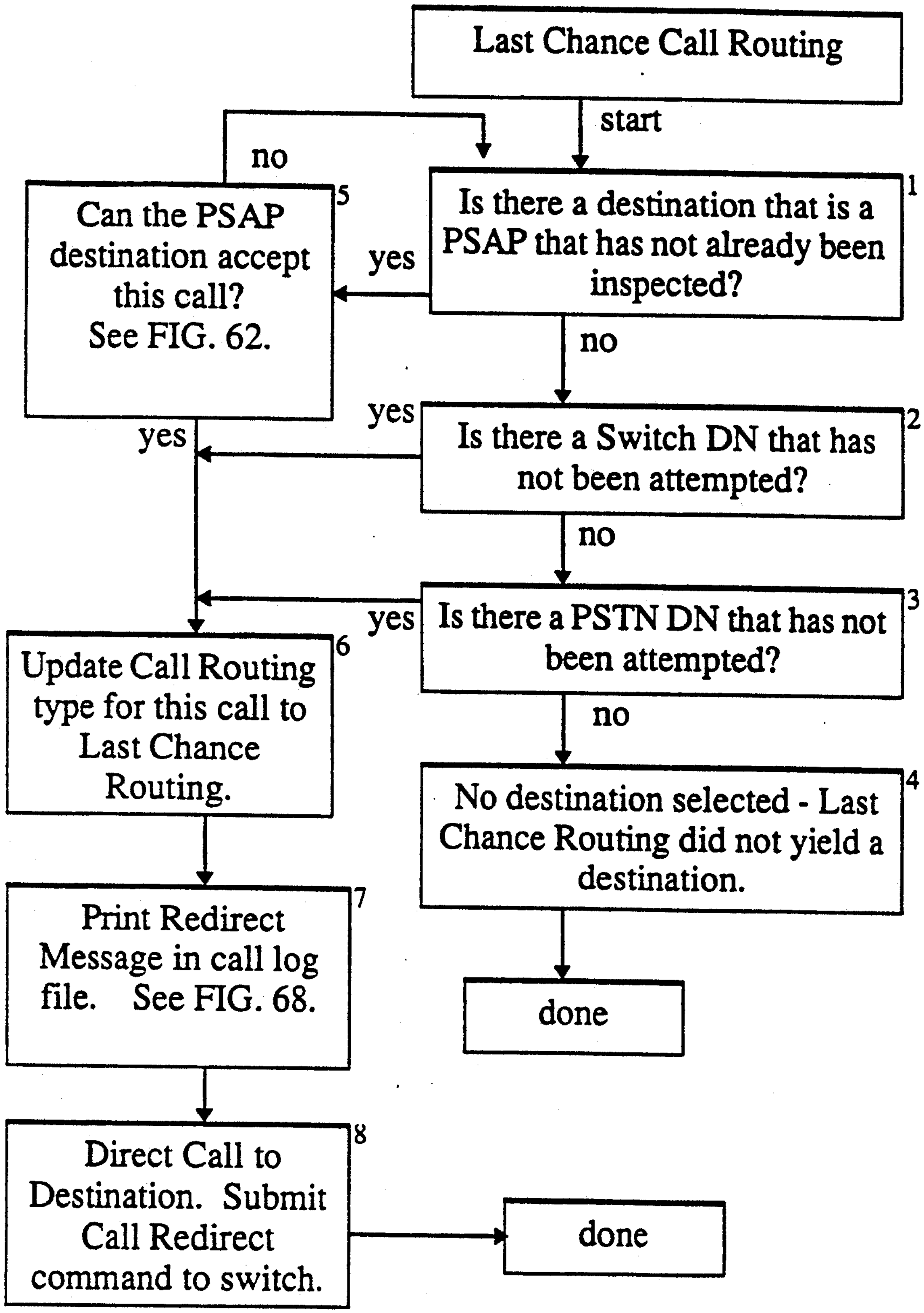
FIGS. 61 through 68 are flow charts illustrating steps taken to provide last chance routing to emergency telephone calls, including determining whether a particular call handling destination is at call capacity.

As discussed above in reference to FIGS. 10(*a*), 19(*b*) and 20, the C.E.R.S. system 200 normally first attempts to route an incoming E9-1-1 call 201 via Selective Routing (FIG. 19, Step 2). If Selective Routing fails to identify a good destination 215 (Step 9, FIG. 19), Default Routing is used to identify a destination 215, or if routing to a Selective Routing destination 215 fails (FIG. 19, Step 12), an alternate destination 215 is identified (FIG. 19, Step 13) In each case, a check destination facility 630 is used to determine whether the respective Default Routing or the alternate destination 215 is available to handle the incoming E9-1-1 call 201 (FIG. 19, Steps 4 and 17, FIG. 20). If the check destination facility 630 fails to identify a "good" destination (FIG. 20, Steps 104–106), or if it identifies a good destination (FIG. 20, Step 107), but the switch 218 fails to route the E9-1-1 call 201 to such destination 215, then an attempt is made to route the next incoming E9-1-1 call 201 by a last chance routing facility 631 (FIG. 19, Step 27; FIGS. 61–68). Reference is made to FIGS. 61.68, which are flow charts indicating functions performed by instructions set forth in the Microfilm Appendix. FIGS. 61–68 include numbers 1–52 which correspond to the following steps. Chart CC/LC 1 below relates those steps in lines in those files and routines.

Chart CC/LC1

| Steps in FIGS. 61–68 | File | Routine | Line |
|---|---|---|---|
| 1 | rtr_route_call.c | last_chance_routing( ) | 149 |
| 2 | rtr_route_call.c | last_chance_routing( ) | 150 |
| 3 | rtr_route_call.c | last_chance_routing( ) | 151 |
| 4 | rtr_route_call.c | last_chance_routing( ) | 252 |
| 5 | rtr_route_call.c | last_chance_routing( ) | 169 |
| 6 | rtr_route_call.c | last_chance_routing( ) | 189 |
| 7 | rtr_route_call.c | last_chance_routing( ) | 190 |
| 8 | rtr_route_call.c | route_call( ) | 95 |
| 9 | rtr_inspect_dest.c | inspect_dest( ) | 333, |

-continued

Chart CC/LC1

| Steps in FIGS. 61-68 | File | Routine | Line |
|---|---|---|---|
| | | | 335, 357, 385 |
| 10 | rtr_inspect_dest.c | inspect_dest( ) | 390 |
| 11 | rtr_inspect_dest.c | inspect_dest( ) | 394 |
| 12 | rtr_inspect_dest.c | inspect_dest( ) | 397 |
| 13 | rtr_inspect_dest.c | inspect_dest( ) | 417 |
| 14 | rtr_inspect_dest.c | check_psap_capacity( ) | 563 |
| 15 | rtr_inspect_dest.c | check_psap_capacity( ) | 564 |
| 16 | rtr_inspect_dest.c | check_psap_capacity( ) | 570 |
| 17 | rtr_inspect_dest.c | check_psap_capacity( ) | 572 |
| 18 | rtr_inspect_dest.c | check_psap_capacity( ) | 575 |
| 19 | rtr_redirect_failed.c | redirect_failed( ) | 115 |
| 20 | rtr_redirect_failed.c | redirect_failed( ) | 125 |
| 21 | rtr_redirect_failed.c | redirect_failed( ) | 132 |
| 22 | rtr_redirect_failed.c | redirect_failed( ) | 199 |
| 23 | rtr_redirect_failed.c | failed_to_dest( ) | 210 |
| 24 | rtr_redirect_failed.c | failed_to_dest( ) | 230 |
| 25 | rtr_redirect_failed.c | failed_to_dest( ) | 241 |
| 26 | rtr_redirect_failed.c | failed_to_dest( ) | 250 |
| 27 | rtr_redirect_failed.c | failed_to_dest( ) | 252 |
| 28 | rtr_redirect_failed.c | failed_to_dest( ) | 266 |
| 29 | rtr_redirect_failed.c | failed_to_dest( ) | 284 |
| 30 | rtr_redirect_failed.c | failed_to_dest( ) | 269 |
| 31 | rtr_redirect_failed.c | failed_to_dest( ) | 278 |
| 32 | rtr_redirect_failed.c | failed_to_dest( ) | 279 |
| 33 | rtr_direct_to_dest.c | direct_to_dest( ) | 101 |
| | rtr_sem_space.c | none | 247, 297 |
| 34 | rtr_sem_space.c | state event matrix | 274 |
| | rtr_route_progress.c | rprog_psap_n1( ) | 208 |
| 35 | rtr_route_progress.c | rprog_psap_n1( ) | 235 |
| 36 | rtr_route_progress.c | rprog_psap_hg( ) | 237 |
| 37 | rtr_route_progress.c | rprog_psap_hg( ) | 186 |
| 38 | rtr_route_progress.c | rprog_psap_hg( ) | 188 |
| 39 | rtr_route_progress.c | rprog_psap_hg( ) | 190 |
| 40 | rtr_route_progress.c | rprog_psap_hg( ) | 199 |
| 41 | rtr_call_brkdwn.c | trk_call_brkdwn( ) | 104 |
| 42 | rtr_call_brkdwn.c | trk_call_brkdwn( ) | 112 |
| 43 | rtr_call_brkdwn.c | trk_call_brkdwn( ) | 127 |
| 44 | rtr_call_brkdwn.c | trk_call_brkdwn( ) | 149 |
| 45 | rtr_call_brkdwn.c | trk_call_brkdwn( ) | 157 |
| 46 | rtr_call_brkdwn.c | trk_call_brkdwn( ) | 211 |
| | p_distrib.c | p_rtr_distrib( ) | 1886 |
| | p_call_log_print.c | p_call_log_print( ) | 135 |
| 47 | rtr_call_brkdwn.c | trk_call_brkdwn( ) | 219 |
| 48 | rtr_call_brkdwn.c | trk_call_brkdwn( ) | 226, 254 |
| 49 | rtr_inspect_dest.c | redir_message( ) | 169 |
| 50 | rtr_inspect_dest.c | redir_message( ) | 175 |
| 51 | rtr_inspect_dest.c | redir_message( ) | 193 |
| 52 | rtr_inspect_dest.c | redir_message( ) | 203 |

Step 1—The last_chance_routing() routine of the last chance routing facility 631 is called by the determine_dest() routine of the rtr_route_call.c file of the router process 360. In that routine, at line 373, the dest_ptr is set to a last_chance_routing() routine of the last chance routing facility 631. At lines 146 and 147 a determination is made as to whether a particular call handling destination 215 which is administered has previously been inspected. The term "inspected" is used to designate that the router process 360 (via the rtr_route_utils.c file, check_dest_bit/set_dest_bit routines) has previously determined whether or not that destination 215 was available to handle the next incoming E9-1-1 call 201. The set_dest_bit() routine is called to record that the particular destination 215 has been inspected at the time $t_c$ at which the next incoming E9-1-1 call 201 is to be routed. The inspection is performed primarily by the rtr_inspect_dest.c file of the router process 360, for example, using the inspect_loop() routine at line 107 where alternate destinations 215 are inspected. If the inspection of the particular destination 215 had been made, the next incoming E9-1-1 call 201 was not routed to that destination for one of many reasons described above. These include a PSAP 216 having been at call capacity (FIG. 20, Step 104) at the time the attempt was made to route the E9-1-1 call 201 to the PSAP 216. Also, the PSAP 216 may be in the Abandoned state (FIG. 20, Step 104). For a DN that was a destination 215, there may have been a redirect command issued to direct the next incoming E9-1-1 call 201 from that DN. The record of such inspection for the particular destination 215 is in the form of a bit map (flag) 600, FIG. 58. The bit map 600 is implemented via an integer array 601 contained in a CALL_REF_ENTRY record 602 defined in a rtr_hdr.h file, line 291 of the router process 360. The field is inspect_dest_mask []. There is one CALL_REF_ENTRY record for each E9-1-1 call 201 handled.

That determination as to whether a particular destination 215 had been inspected is made with respect to the destinations 215 to which dest_ptr points in the last_chance_routing() routine, lines 149-151 of a three pass loop of the rtr_route_call.c file (router process 360). Step 1 is performed when dest ptr in line 149 points to all PSAPs 216, and determines IF there is any PSAP 216 which has not already been inspected.

Step 2—If no PSAP 216 has not been inspected to determine whether it was available to handle the next incoming E9-1-1 call 216, pass 2 (line 150, of the last_chance_routing() routine) occurs and determines whether any DN of the switch 218 was not inspected to determine whether, at the time of inspection, it was available to handle the next incoming E9-1-1 call 201.

Step 3—If no DN of the switch 218 was not inspected to determine whether it was available to answer the next incoming E9-1-1 call 201, pass 3 (line 151) occurs and determines whether any DN of the PSTN 219 was not inspected to see whether it was available to handle the next incoming E9-1-1 call 201.

Step 4—Failing in all three loops to identify a destination 215 which had yet to be inspected for availability to handle the next incoming E9-1-1 call 201, at line 252 the message "return (NULL)" is returned. The NULL return indicates that the last_chance_routing() routine does not yield a destination 215. The last_chance_routing() routine returns NULL to the determine_dest() routine line 374 which returns to the route_call() routine at line 73. It is here that the application processes 351 determine whether all call routing methods (including last chance) failed to yield a destination 215, such that the E9-1-1 call 201 may be routed to busy (line 101).

Step 5—If the determination in Step 1, lines 145-149, is that there is a given PSAP 216 which has not been inspected, then a branch is taken to Step 5 where a determination described below is made as to whether that given PSAP 216 is available to handle the next incoming E9-1-1 call 201.

Step 6—If the given PSAP 216 is a destination 215 that is available to handle the next incoming E9-1-1 call 201, or if the destination 215 is either a switch DN (Step 2) or a PSTN DN (Step 3), a branch is taken to Step 6. At line 176, a call is made to an update_route_type() routine in a rtr_inspect_dest.c file which updates the call routing type to "last chance" for this next incoming E9-1-1 call 201.

Step 7—After Step 6, at line 190 an instruction is processed to write a message 288 in the call log file 244 that the next incoming E9-1-1 call 201 was redirected from the destination 215 of first choice to the PSAP 216 which was identified by the first loop (Step 1), or to the switch DN or PSTN DN. These call log file entries are printed at the PSAP printer 255 after the E9-1-1 call 201 is successfully routed.

Step 8—At line 95, the E9-1-1 call 201 is directed to the destination 215 (see also the rtr_direct_to_dest.c file, line 84).

Determine Whether PSAP 216 Is Available To Handle E9-1-1 Call 201

Figure 62:
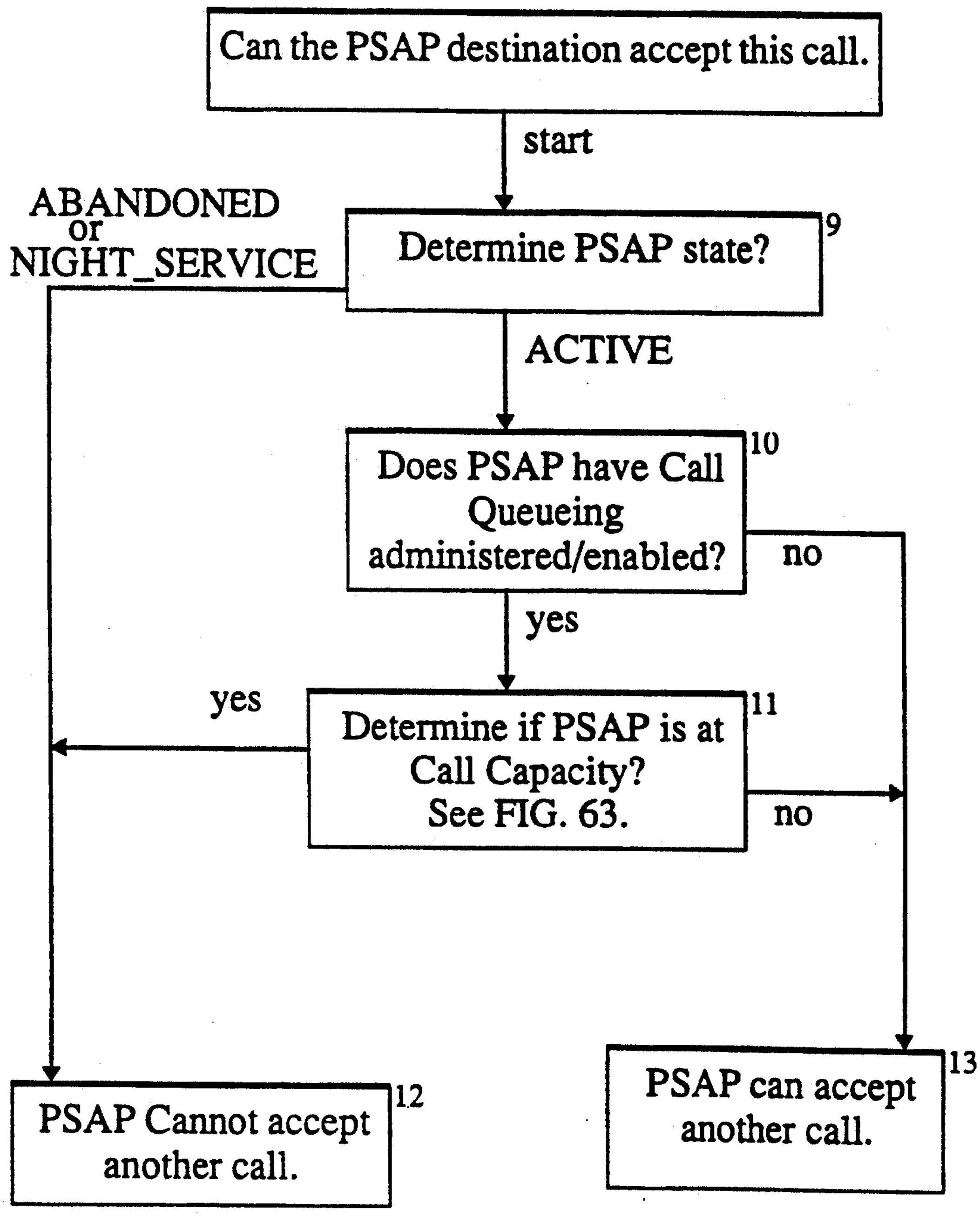

Step 9—For the situation in which there is a destination 215 that is a PSAP 216 which has not already been inspected, reference is made to FIG. 62 and to the rtr_inspect_dest.c file, inspect_dest() routine at line 232. Initialization and preliminary instructions confirm that the given PSAP 215 is administered and control variables are set to !=NULL. At line 292 the PSAP destination type is determined by the switch 218. For the PSAP destination type, the case DEST_TYPE_PSAP (line 294) applies and the state of the given PSAP 216 may be determined at lines 333, 335, 357 and 384.

Step 12—If the given PSAP 216 is in the Abandoned or Night Service state, then the respective cases starting at lines 335 or 357 are processed and each indicates that the given PSAP 216 is not available to handle the next incoming E9-1-1 call 201.

Step 10—If Step 9 determines that the given PSAP 216 is in the Active state, a branch is taken to Step 10, line 390, where a determination is made as to whether call queuing is administered (i.e., enabled). If call queuing is not administered (FIG. 25, line eleven of screen 222, "UNLIMITED"), there is no limit to the number of next incoming E9-1-1 calls 201 that may be routed to the PSAP 216 to be handled, such that the PSAP 216 can never be at "call capacity". Therefore, a "no" branch is taken to Step 13, described below. If call queuing is administered, it indicates that for the given PSAP 216 there is a limit administered for the number of next incoming E9-1-1 calls 201 which may be in process of being handled at that given PSAP 216 at the current time to at which the E9-1-1 call 201 is to be routed. E9-1-1 calls 201 that are in process of being handled by a given PSAP 216 include E9-1-1 calls 201 currently (1) in the queue 343 to the notification line 241 of the given PSAP 216, and (2) being handled by the given PSAP 216. E9-1-1 calls 201 currently being "handled" by the given PSAP 216 include E9-1-1 calls 201 currently:

i. ringing at the notification line 241 to the given PSAP 216;
ii. ringing at the attendant workstation 212 at the given PSAP 216;
iii. being answered by the attendant 221 of the given PSAP 216 (attendant 221 "On line"); and
iv. put on hold by the attendant 221 at a workstation 212 of the given PSAP 216.

Such limit is referred to as a "call capacity" or "call capacity limit" of the given PSAP 216. When the number $N_{SH}$ of E9-1-1 calls 201 in process of being handled by the given PSAP 216 equals the call capacity $N_{CC}$, the given PSAP 216 is said to be "at call capacity." In the event that call capacity is administered for the given PSAP 216, a "yes" branch is taken to Step 11.

Step 11—A "yes" answer to the IF at line 394 indicates that the given PSAP 216 is at call capacity, such that the corresponding branch is taken to Step 12, described above. The ELSE at line 414 indicates that the given PSAP 216 is not at call capacity, and a "no" branch is taken to Step 13. The details of this determination are described below in connection with FIG. 63. The ret_indicator at line 398 is set to FALSE to identify or indicate that the PSAP 216 is not available to handle the next incoming E9-1-1 call 201.

Step 13—The psptr→state is set to PS ACTIVE and indicates that the given PSAP 216 is active and is available to handle the next incoming E9-1-1 call 201. The ret indicator is not reset after it was set on line 289.

Figure 63:
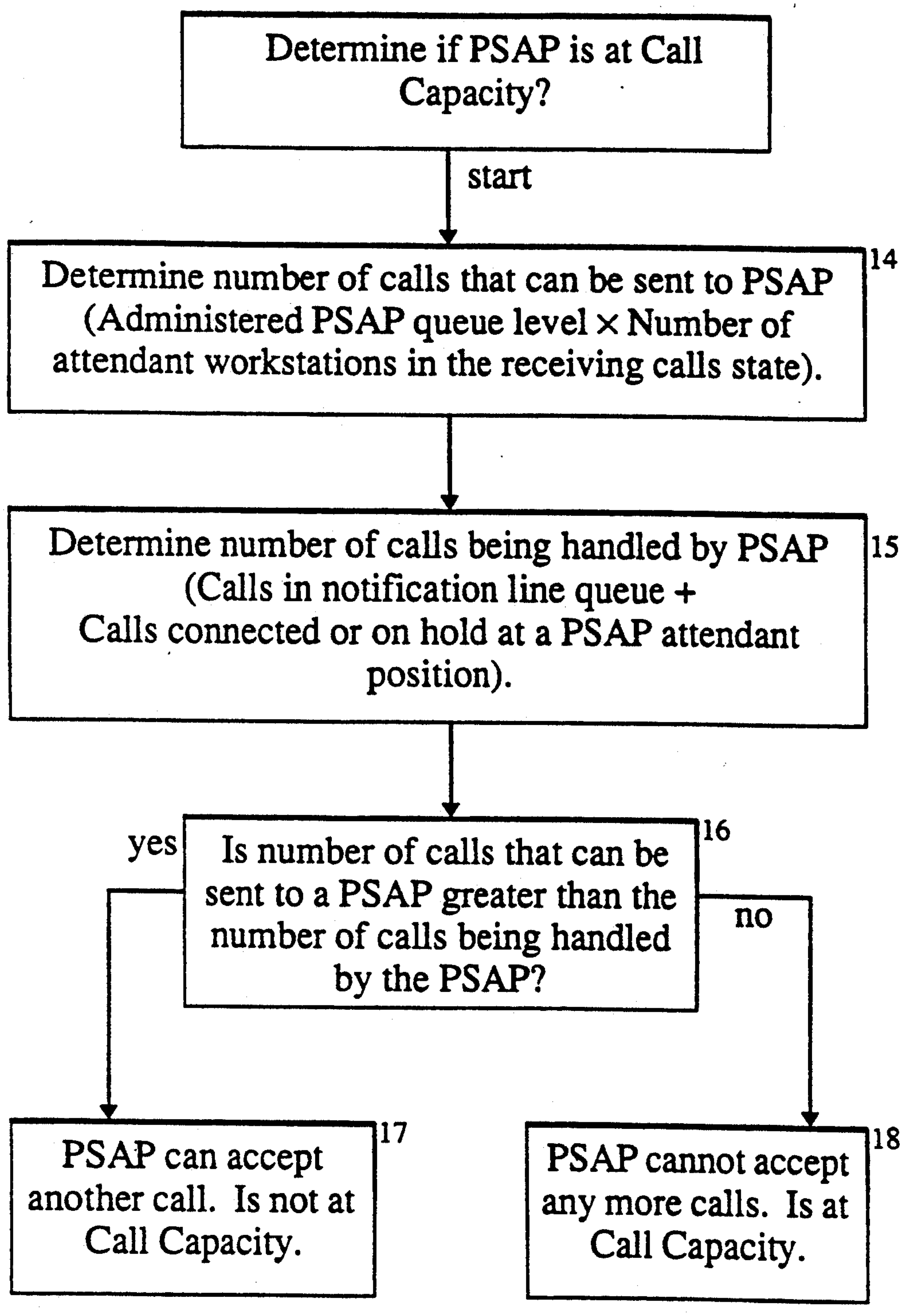
Figure 64:
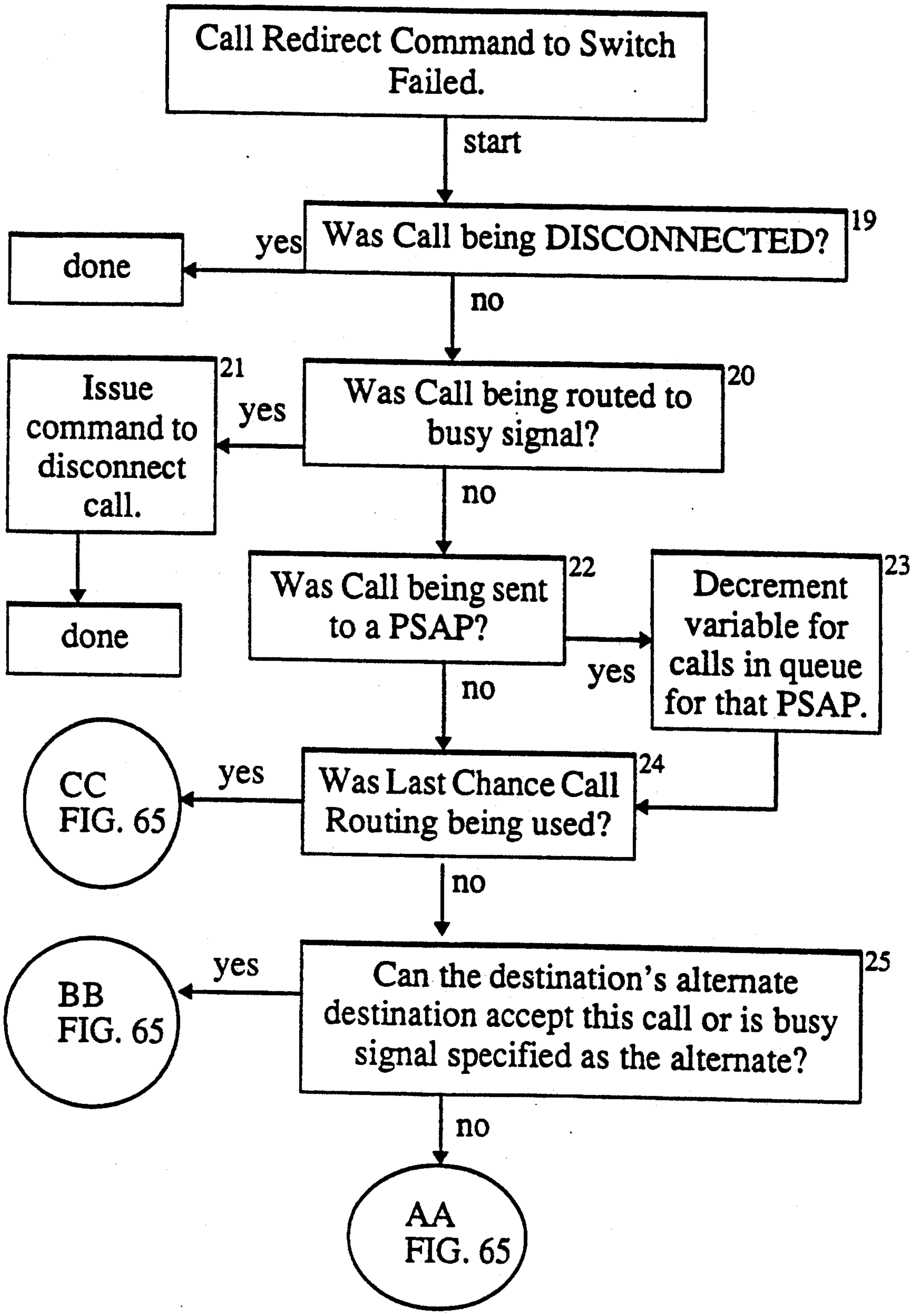

Call Capacity (FIG. 63)

Referring to FIG. 63, in Step 11 a check_psap_capacity() routine was called at line 394 of the inspect_dest() routine to request a determination as to whether the given PSAP 216 is available to handle the next incoming E9-1-1 call 201. This determination depends on whether, at the current time to at which the E9-1-1 call 201 is to be routed to the given PSAP 216, the given PSAP 216 is at call capacity, which in turn is based on the call capacity limit. The call capacity limit is based on a number ($N_{CCD}$) referred to as the "PSAP call capacity depth." This number may be established (or set) by the platform administrator 239 using the PSAP feature screen 222 described above (FIG. 25). The platform administrator 239 sets $N_{CCD}$, the "call capacity depth", on line twelve of that screen 222. The PSAP call capacity depth $N_{CCD}$ represents the number, per workstation 212 of the given PSAP 216, of E9-1-1 calls 201 which may be in process of being handled. The call capacity limit is determined by multiplying the call capacity depth number $N_{CCD}$ times the current number ($N_{RC}$) of attendant workstations 212 of the given PSAP 216 which are in the Receiving Calls state as indicated by the wscp process 368 and the psap process 361 (see wstation.ws_state, and WS.STRUCT in the p_psap_types.h file, line 313).

Step 14—At line 563 of the check_psap_capacity() routine, this Step determines the value of the call capacity limit by obtaining the product of the call capacity depth number $N_{CCD}$ and the workstation number $N_{RC}$. Referring to line 563, "PQ_shmem.q factors" is the number $N_{RC}$ and is represented in memory 367 (FIG. 59) that is shared by the psap process 361 and the router process 360. PQ_shmem.q is updated by the psap process 361 and as described above indicates the number of attendant workstations 212 of the given PSAP 216 which are in the Receiving Calls state at the current time $t_c$ at which the next incoming E9-1-1 call 201 is to be routed.

Figure 18:
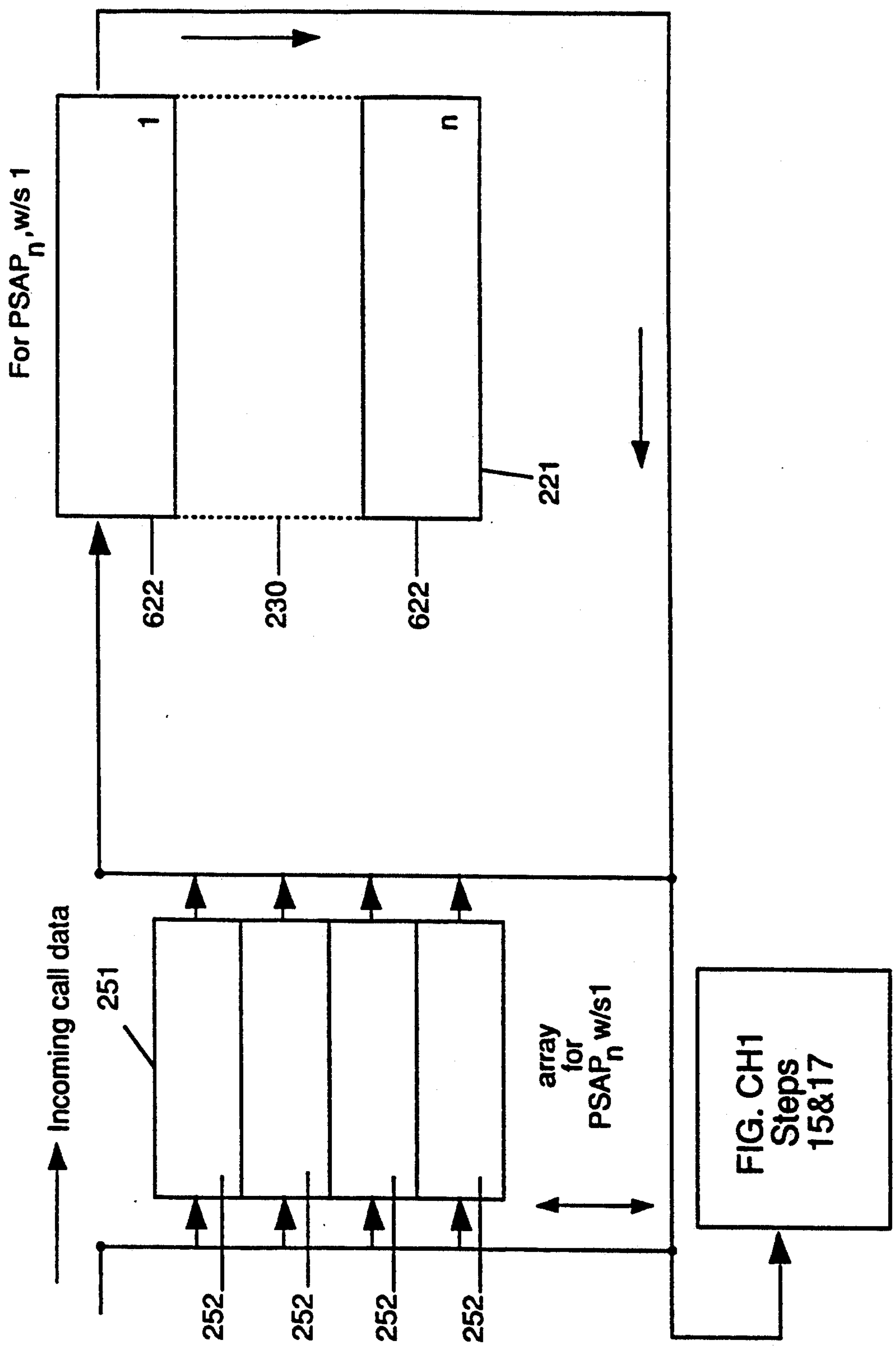
FIG. 18 is a schematic diagram of a call history log and a hard held storage location, where such logs stores records for four incoming E9-1-1 calls and such location stores a record for one E9-1-1 call placed on hard hold.

Step 15—At line 564, the value of item (1) of E9-1-1 calls 201 in process of being handled is determined based on the value of "queued_calls", which is maintained by the router process 360 and represents the number of E9-1-1 calls 201 currently (at time $t_c$) in the queue 243 (FIG. 4) to the notification line 241 of the given PSAP 216 Also at line 564, "psap_calls" represents the four items (a)-(d) of the E9-1-1 calls 201 currently (at time $t_c$) being handled by the given PSAP 216 (as described with respect to Step 10 above). This is shown in FIG. 1: (a) by ringing at the notification line 241 of the given PSAP 216, (b) by ringing at an attendant workstation 212 at the given PSAP 216, (c) where an E9-1-1 call 201 is being answered (see off hook handset 227, FIG. 13) by the attendant 221 at a workstation 221 of the given PSAP 216, and (d) where there is an E9-1-1 call 201 on hold at a workstation 221 of the given PSAP 216 (FIG. 18, hard hold storage location 622).

Step 16—Using the values from lines 563 and 564, this Step determines whether currently there is "capacity" to accept the next incoming E9-1-1 call 201 at the given PSAP 216. If the given PSAP 216 is not at call capacity, there is "capacity" to handle the next E9-1-1 call 201. That is, capacity results from the number $N_{BH}$ of E9-1-1 calls currently being handled by the given PSAP 216 being less than the call Capacity limit $N_{CC}$. Such capacity depends on the value of "num calls left" at line 562. Step 16 determines whether num calls left is greater than zero.

Step 17—TRUE (line 572) indicates that there is call capacity and is shown by a "yes" branch to Step 17. The TRUE return is the basis for ELSE at line 414. The PSAP state is set to PS_ACTIVE in Psap_tbl []in the router process 360 (FIG. 21). By setting the state of the given PSAP 216 to PS_ACTIVE, there is an indication that the given PSAP 216 may accept the next incoming E9-1-1 call 201.

Step 18—FALSE (line 575) indicates no call capacity at time $t_c$, is shown by a "no" branch to Step 18 and PS_BUSY is set in psap_tbl [](FIG. 21). The FALSE return is to line 394, Step 11.

Call Redirect Failed

Last Chance routing is not complete until a redirect request to the switch 218 is returned with a route_determined call status, which indicates successful redirection of the incoming E9-1-1 call 201. Prior to this, the router process 360 initiated sending the redirect request to the switch 218 by calling the direct_to_dest() routine. If successful in routing the next incoming E9-1-1 call 201 to the desired destination, the switch 218 returns the route_determined message 288. If unsuccessful, the switch 218 returns a failed call message 288 (rtr_sem_space.c file, line 226). A route_determined call status message 28 is received by the router process 360 as an IPC from the stk process 358 and is handled by the rtr_call_status_msg.c file via the following routines:

call_status_msg(), line 60;
trunk_call_status_msg(), lines 111, 138;
state_event_table(), lines 196, Also, the rtr_sem_space.c file at lines 274 and 239 is used. The router process 360 invokes the STK_REDIRECT_CALL() function to redirect the next incoming E9-1-1 call 201 to the hunt group or queue 243 of the given PSAP 216. Redirect call is one of the functions from a class of functions known as invoke_call_functions. The invoke_call_func() routine has a parameter that determines what operation is to be performed (see the rtr_direct_to_dest.c file, line 84).

In detail, failure of the switch 218 to successfully redirect the next incoming E9-1-1 call 201 to the desired destination 215 is in the form of an STK_FAILED_CALL message 288 received by the router process 360. The redirect_failed() routine (1) determines what call routing events were occurring at time $t_c$ at which the switch 218 was attempting to route the next incoming E9-1-1 call 201 in response to a prior call routing determination 215; and (2) depending upon which event was occurring, disconnects the next incoming E9-1-1 call 201 or redirects it so that further routing determinations can be made. In response to the STK_FAILED_CALL message 288, the redirect_failed() routine is called at line 58 of a rtr_redirect_failed.c file.

Step 19—If the next incoming E9-1-1 call 201 was being disconnected at the time $t_c$ at which the switch attempted to route such E9-1-1 call 201, this is determined at line 115. If YES, a branch is taken to "done" and no further action is taken to route the incoming E9-1-1 call 201. If the incoming E9-1-1 call 201 was NOT being so disconnected, THEN a branch is taken to Step 20.

Step 20—If at the current time to such E9-1-1 call 201 was being routed to busy 220, this is determined at line 125. If YES, a branch is taken to Step 21, ELSE at line 140 the routine gets a record of the destination 215, calls the failed_to_dest() routine at line 153 and the routine ends.

Step 21—At line 132, the result of routing the next incoming E9-1-1 call 201 to busy is a command to disconnect such E9-1-1 call 201.

Step 22—If the next incoming E9-1-1 call 201 was not being routed to busy 220, the destination 215 to which it was being routed is checked at line 141. The destination 215 is determined to be valid, and a failed_to_dest() routine is called. IF the destination 215 to which such incoming E9-1-1 call 201 was to be routed was a PSAP 216 (line 199), and a YES branch is taken to Step 23.

Step 23—Failure of the attempt to route the next incoming E9-1-1 call 201 to that PSAP 216 results in the queued calls variable representing one too many E9-1-1 calls 201, as stored in the database 470. This variable is incremented by rprog_psap_hg() upon receipt of a route determined message 288. To correct this situation, at line 209 this variable is decremented by one.

Step 24—Whether or not the next incoming E9-1-1 call 201 was being routed to a PSAP 216 is no longer important to Step 24. The code from lines 237 to 253 is only to be executed if Last Chance routing was not used. A NO branch is taken to Step 24 IF the incoming E9-1-1 call was not being Last Chance routed. At Step 24, line 276, the failed_to_dest() routine determines that (1)(a) no new destination 215 has been determined, and (b) there is no message 288 to route the E9-1-1 call 201 to busy; and (2) that either (a) Default Routing or Last Chance Routing was in progress at time to At line 280, a YES branch is taken to Step 30 (FIG. 65), described below. A NO branch is taken to Step 25 IF the Last Chance Routing was not being used.

Step 25—An alternate destination 215 may have been administered for the primary destination of the next incoming E9-1-1 call 201. At line 231, new_dest_ptr gets this alternate destination 215, and starting at line 240, a determination is made with respect to this alternate destination 215. IF the inspect_dest() routine returns FALSE, it indicates that such alternate destination 215 will not accept the next incoming E9-1-1 call 201. In that event, a NO branch is taken to FIG. 65, where additional attempts are made to route the next incoming E9-1-1 call 201. A YES branch indicates that such alternate destination for the primary destination will accept the E9-1-1 call 201, and the branch is taken to Step 29 (FIG. 65), described below.

Step 26—The sequence in which further routing attempts are made starts with Selective Routing. At line 262, if Selective Routing had been used to select the destination for which the routing attempt failed, then a branch is taken to Step 27.

Step 27—At line 264, the new_dest_ptr is set to a destination determined by default routing.

Step 28—With the new_dest_ptr now set to a destination 215 determined by Default Routing, new_dest_ptr is set to NULL if no destination 215 was selected via Default Routing. With NULL and no busy flag, a branch is taken to Step 30. It (new_dest_ptr) points at a destination record/entry if a destination 215 was selected via Default Routing. In that event, at line 278 the IF is not TRUE. A YES branch is taken to Step 29 at ELSE, line 291, to indicate that a destination has been selected.

Step 29—At line 294 a pointer is set to the PDN record/entry.

Step 30—IF no destination 215 had been selected via Selective Routing, or Default Routing, then Last Chance Routing is attempted, as described above.

Step 31—IF no destination 215 is selected via last chance routing (FIG. 61), a "no" branch is taken to Step 32, whereas if a destination 215 selected, a branch is taken to Step 29 described above.

Step 32—At line 287, the no branch to Step 32 is represented as no new destination 215, and at line 289 the E9-1-1 call 201 is routed to generate the busy signal 220. The busy signal 220 is intended to cause the ESR 202 to redial the E9-1-1 call 201.

Route Determined Message 288 Received From Switch 218

Figure 66:
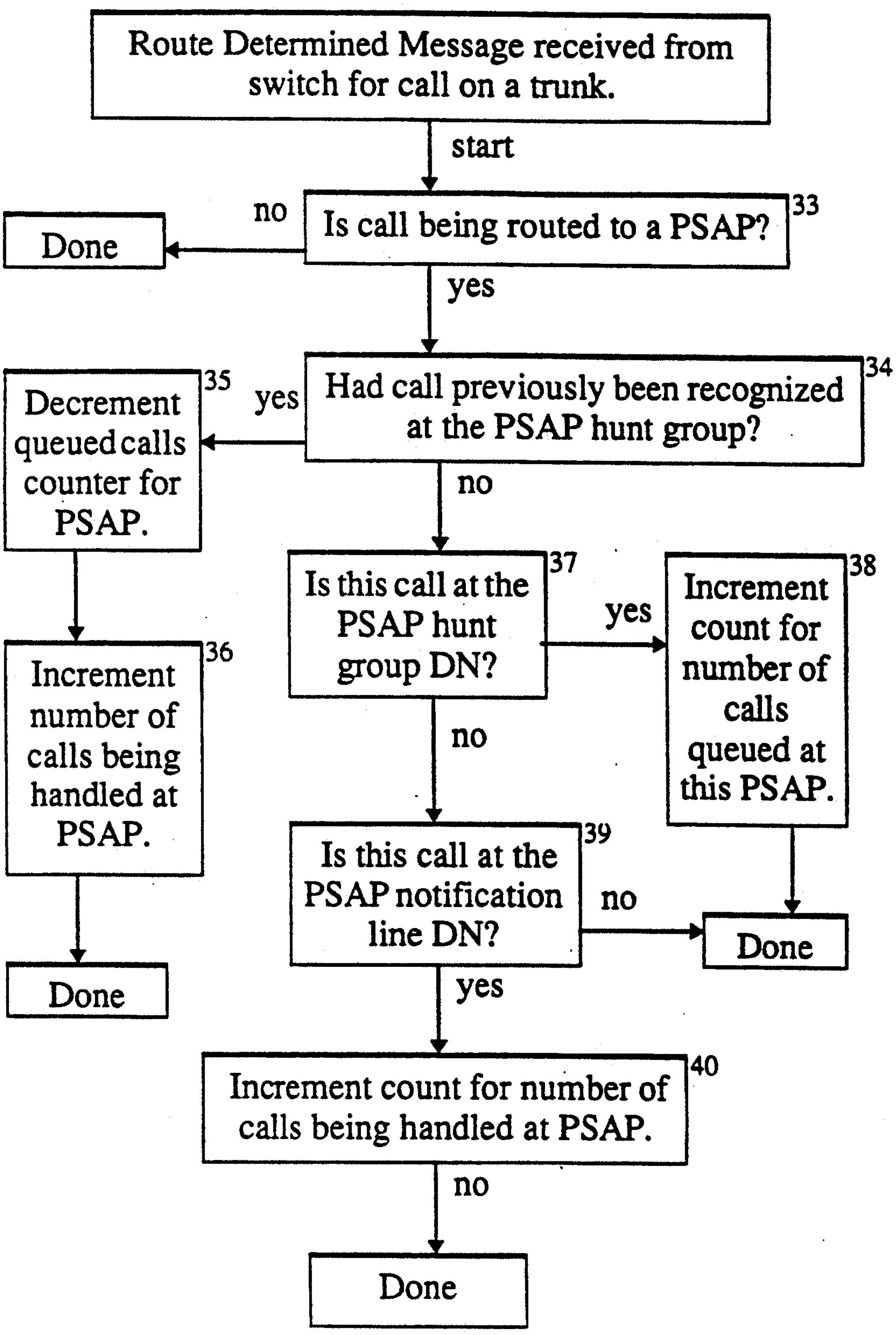
Figure 67:
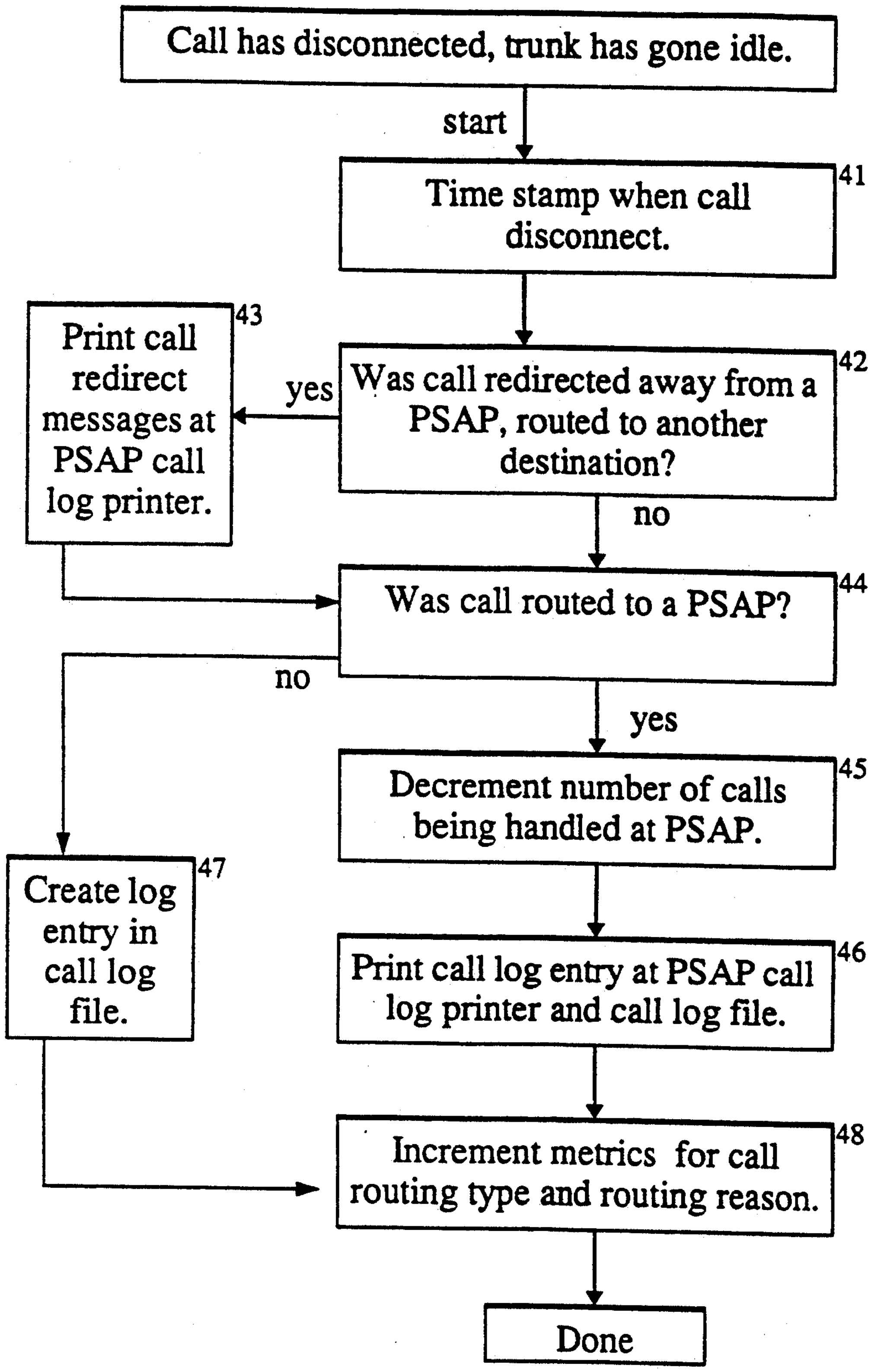

The router process 360 has selected a desired destination 215, and sent a message 288 to the switch 218 to direct the call 201 to the desired destination 215. As described above under the Call Redirect Failed heading, if successful in routing the next, incoming E9-1-1 call 201 to a PSAP 216, the switch 218 returns the route determined message 288. If the next incoming E9-1-1 call 201 is not being routed to a PSAP 216, the call progress is tracked no further than the first route_determined message 288 received from the switch 218. If the destination 215 is either a switch DN or a PSTN DN, no switch messages 288 are received by the route process 360 when these devices are seized. Referring to FIG. 66, the process of routing the next incoming E9-1-1 call 201 is completed as follows.

Step 33—The switch 218 has selected a PSAP 216 as the desired destination type (dest_ptr). This is indicated by the use of case "DEST_TYPE_PSAP" case at line 97. Line 101 represents where the router process 360 set a variable indicating that the next incoming E9-1-1 call 201 has been sent to the given PSAP 216. If not, the routine is done. If YES, at Step 33, a "yes" branch is taken to Step 34.

Step 34—At line 275 of the rtr_sem_space.c file, reference is made to the rprog_psap_hg routine, which, starting at line 158, determines whether the next incoming E9-1-1 call 201 was recognized at (1) the DN of the PSAP hunt group 333 at the switch 218 or (2) the DN of the PSAP's notification line 241. The instruction at line 274 is processed in response to the state CS_TO_PSAP_HG and the receipt of the route determined message 288 from the switch 218 If the next incoming E9-1-1 call 201 was recognized at the DN of the PSAP hunt group 241, the next route_determined message 288 from the switch 218 causes the router process 360 to call the rprog_psap_nl() routine at line 208. At line 208, the rprog_psap_nl routine determines whether the next E9-1-1 call 201 had been recognized a the DN of the PSAP hunt group 241.

Step 35—IF the next incoming E9-1-1 call 201 had previously been recognized at the PSAP hunt group 333, then the next E9-1-1 call 201 had been placed in the queue 243 and is currently at the notification line 241. Because the queue 243 is before the notification line 241, the queued calls counter is decremented after the next E9-1-1 call goes to the notification line. Therefore, the value of queued_calls (FIG. 66) is decremented by one.

Figure 59:
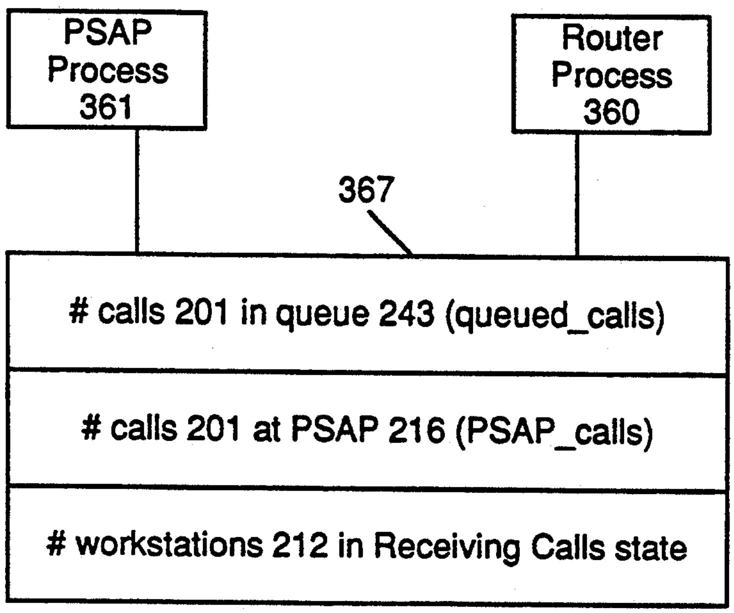

Step 36—Following Step 35, the presence of the next incoming E9-1-1 call 201 at the PSAP 216 is reflected by incrementing the value of psap_calls by one (FIG. 59). This the next incoming E9-1-1 call 201 is ringing at the notification line 241 of the given PSAP 216.

Step 37—IF the next incoming E9-1-1 call 201 had not previously been recognized at the DN of the PSAP hunt group 333, a "no" branch is taken to Step 37. A determination is made as to whether at the current time $t_c$ the next incoming E9-1-1 call 201 is at the DN of the PSAP's hunt group 333 (line 186). If YES, a branch is taken to Step 38, or IF NO, a branch is taken to Step 39.

Step 38—IF the next incoming E9-1-1 call 201 is at the DN of the PSAP hunt group 333, the value of queued_calls (FIG. 59) is incremented to note such presence (line 188).

Step 39—IF the next incoming E9-1-1 call 201 is not at such DN of the hunt group 333, then at line 190 a determination is made as to whether the E9-1-1 call 201 is at the DN of the PSAP notification line 241. If YES, a branch is taken to the Step 40.

Step 40—The value of psap calls (FIG. 59) is incremented at line 199 to reflect the addition of the next incoming E9-1-1 call 201 as one being handled at the PSAP 216.

E9-1-1 Call Disconnected—Trunk Idle

A next incoming E9-1-1 call 201 on an incoming trunk effective to initiate many operations. Therefore, when the incoming trunk 206 which previously had carried an E9-1-1 call 201 becomes idle, as by a disconnected E9-1-1 call, the C.E.R.S. system 200 elements associated with the now disconnected E9-1-1 call 201 are allowed to handle a new incoming E9-1-1 call 201. The trk_call_brkdwn() routine is called in response to an idle message 288 when the trunk 206 becomes idle. This call is via the rtr_sem_space() routine, e.g., line 330, where an answ_aband_call() routine is called, which calls the trk_call_brkdwn() routine.

Step 41—The time to at which E9-1-1 call 201 was disconnected is noted at line 104 of the trunk call brkdwn() routine.

Step 42—If the next incoming E9-1-1 call 201 had been redirected away from the PSAP 216, the IF at line 112 of the rtr_call_brkdwn() routine is TRUE, and a branch is taken to Step 43.

Figure 65:
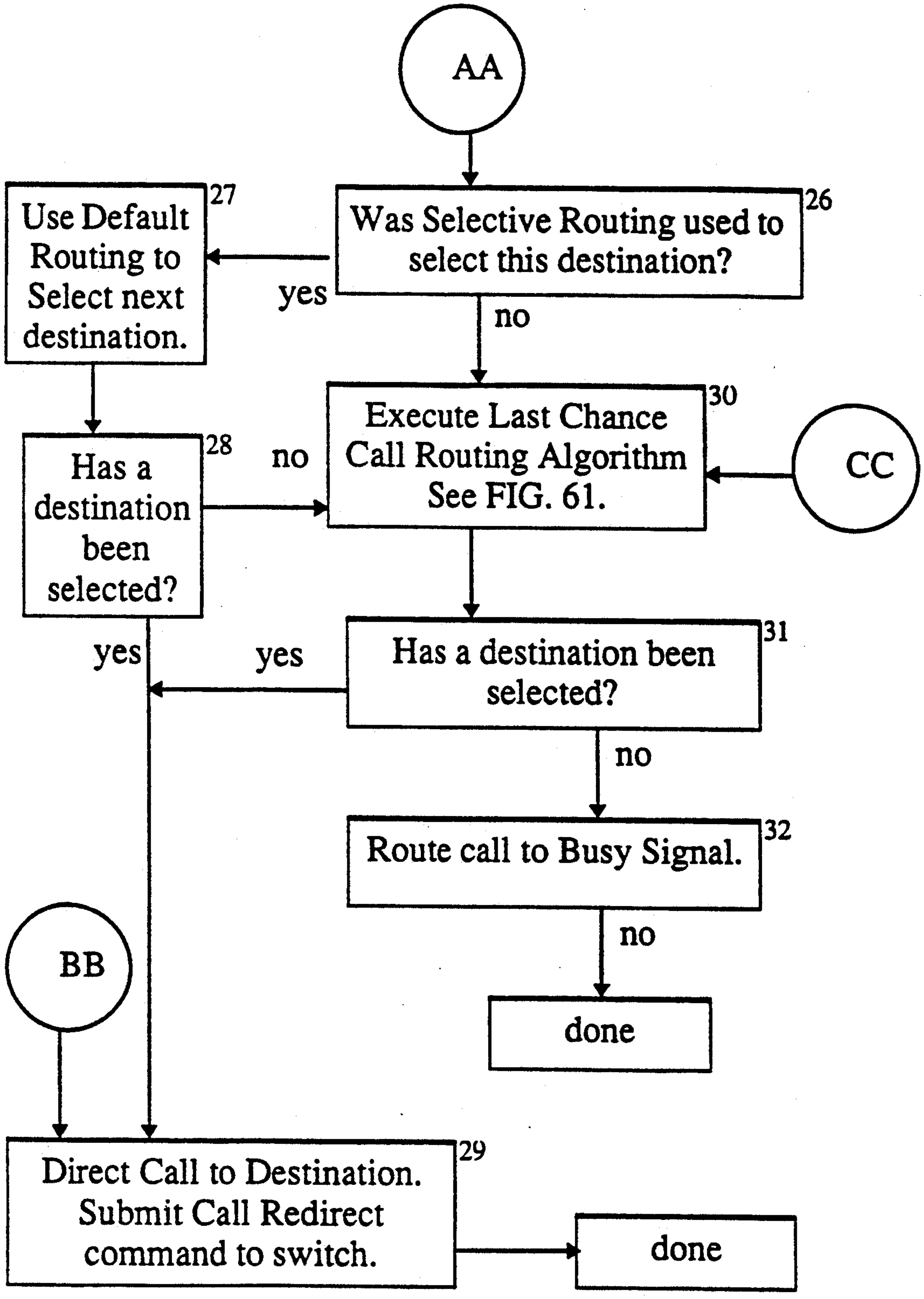

Step 43—At line 127 of the rtr_call_brkdwn() routine, the command causes the redirect messages 288 to be printed at the PSAP call log printer 255 (FIG. 65).

Step 44—Following the printing in Step 43, and separately IF there was no redirect for the next incoming E9-1-1 call 201, that E9-1-1 call 201 may have been routed to a PSAP 216. At line 149 of the rtr_call_brkdwn() routine, the IF determines whether the destination type was a PSAP 216. IF YES, a branch is taken to Step 45, ELSE at line 214 the psap_ptr will be NULL, and a branch is taken to line 219, Step 47.

Step 47—Since the E9-1-1 call 201 was not routed to a PSAP 216, the call log file 244 (FIG. 9) receives an entry for the E9-1-1 call 201.

Step 45—Since the next incoming E9-1-1 call 201 has disconnected, and since that E9-1-1 call 201 previously resulted in incrementing the number held by psap_calls at rprog_psap_nl at line 237, psap calls is now decremented by one.

Step 46—Having decremented psap_calls, at line 211 the psap process 361 is notified that the trunk 206 on which the next incoming E9-1-1 call 201 was carried is available. In the p_distrib.c file, p_rtr_distrib() routine, at line 1886, the call log file 244 is called and in the p_call_log_print.c file, a p_call_log_print() routine at line 135, a call log entry is made and an entry at a PSAP printer 255 may be made.

Step 48—Following both Steps 47 and 46, the metrics are collected for reporting purposes. The administrator 239 can generate reports to evaluate what features of the system 200 have been used and how many E9-1-1 calls 201 have been handled.

Figure 68:
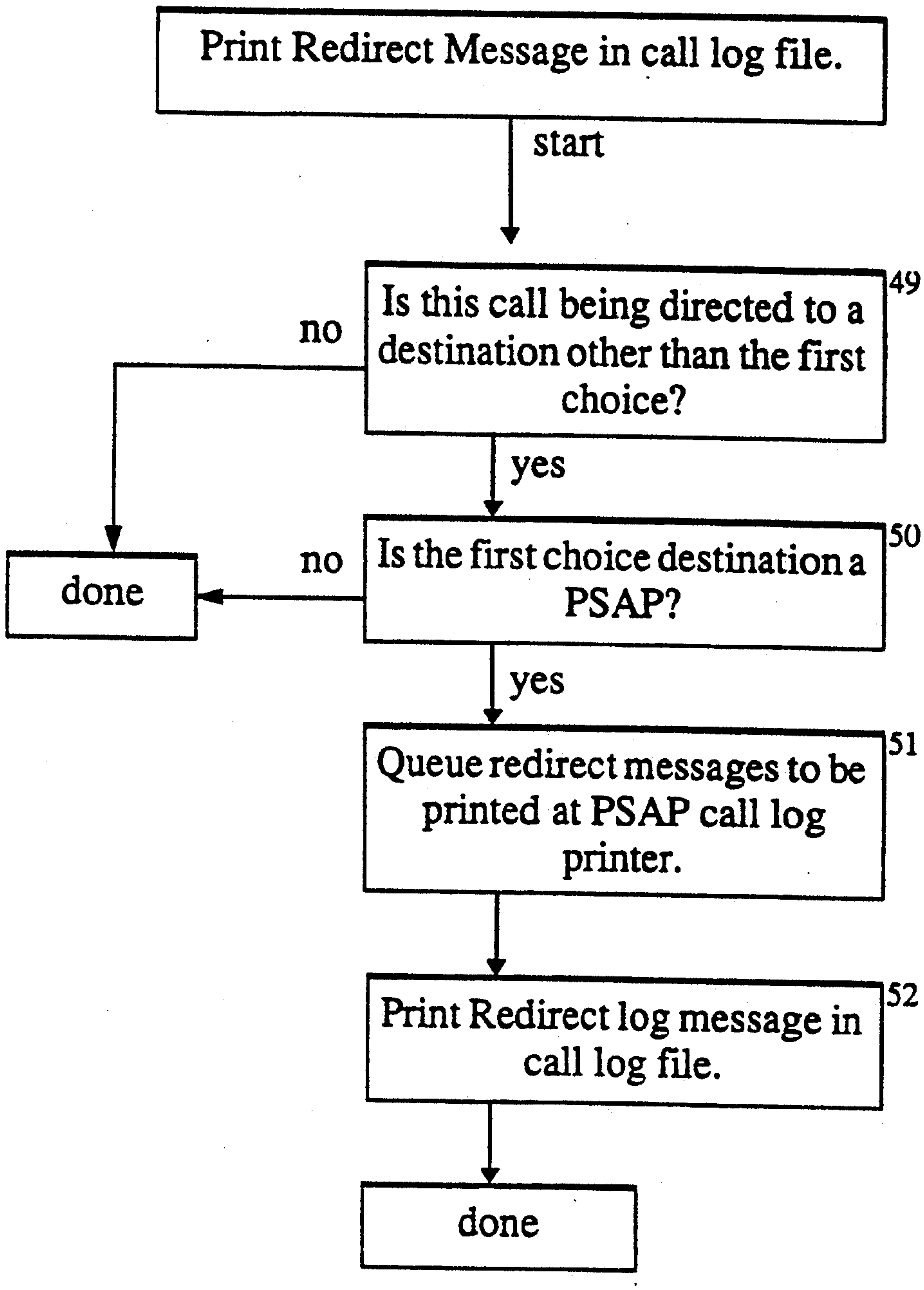

The C.E.R.S. system 200 monitors redirect messages 288 which direct E9-1-1 calls 201 from a PSAP 216 which was the destination 215 of first choice. Referring to FIG. 68, such monitoring starts at Step 49.

Step 49: The E9-1-1 call 201 has not been redirected to a destination 215 if either of the following is "NULL": (1) cref_ptr, and (2) trunk_ptr, at line 169 of a redir_message( ) routine, or if cref_ptr→rtr_flag is zero. In this event, a "no" branch is taken to "done." If the E9-1-1 call 201 had been redirected from the first choice destination 215, then a "yes" branch is taken to Step 50.

Step 50: At line 175, the redir_message( ) routine determines whether the destination table 259 identifies a PSAP 216 as the first choice destination (cref_ptr→first_inspect dest). If no, a branch is taken to "done." If yes, a "yes" branch is taken to Step 51.

Step 51: At line 193, the op_lib_init_redir( ) routine is called to send (or queue) a redirect message 288 to the PSAP printer 255.

Step 52: At line 203 of the redir_message() routine, the redirect message 288 is printed at the printer 255 in the call log file 244.

While the preferred embodiment has been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. A system for routing incoming emergency calls to one of a plurality of answering points, selected ones of said answering points being adapted to place said incoming emergency calls routed thereto in a queue, comprising:

means for setting a limit of the number of said incoming emergency calls which may be placed in each said queue; and means for routing said incoming emergency calls to a selected one of said answering points until the number of said incoming emergency calls in said queue reaches said limit, said routing means interrupting said routing of further ones of said incoming emergency calls to said queue until the number of said incoming emergency calls in said queue is less than said limit.

2. A system for routing incoming emergency calls according to claim 1, wherein each said answering point has a plurality of terminals each of which may be active or inactive;

said means for setting a limit of the number of said incoming emergency calls further comprising:

first means for determining the number of said terminals which are active at the time that a given one of said incoming emergency calls is to be routed;

second means for setting a maximum queue level of said incoming emergency calls which may be in the queue of a selected one of said answering points; and third means for obtaining the product of said number of active terminals and said queue level.

3. A system for routing incoming emergency calls according to claim 2, wherein said incoming emergency calls routed to said selected one of said answering points may be out on hold, be in the process of being answered, or be in said queue, further comprising:

said second means also being for setting queue level with respect to all of said incoming emergency calls to be routed to said selected answering point; and said routing means also being for routing said incoming emergency calls to said selected answering point until the total number of said incoming emergency calls at said selected answering point on hold, or being answered or in said queue reaches said queue limit set with respect to all of said incoming emergency calls routed to said answering point.

4. A system for routing incoming emergency calls to answering points in one of a plurality of different calling areas, each said answering point having means for queuing said incoming emergency calls routed thereto, comprising:

means for designating said incoming emergency calls from a given calling area to be routed to a selected one of said answering points;

means for limiting the number of said incoming emergency calls that may be placed in said queuing means at each said answering point to a selectable call capacity limit number; and means for adding said incoming emergency calls from said given calling area to said queuing means of said selecting answering point only if the number of said incoming emergency calls in said queuing means has not reach said selectable call capacity limit number selected for said selected answering point.

5. A system according to claim 4, wherein each of said answering points may have a different number of answering terminals active for answering one of said incoming emergency calls, further comprising:

said limiting means being able to select a different call capacity limit number for each of said answering points, said selection being according to how many of said terminals are active at a particular one of said answering points.

6. A system for routing incoming emergency calls to answering points according to claim 4, said adding means further comprising:

first means for determining the number of said incoming emergency calls in said queuing means at said selected answering point at the time a given one of said incoming emergency calls is to be routed;

second means for determining that the call capacity limit number for said selected answering point minus said number of said incoming emergency calls in said queue of said selected answering point exceeds zero; and means responsive to said second determining means for permitting another of said incoming emergency calls to be routed to said selected answering point.

7. A system for routing incoming emergency calls to answering points according to claim 4, said adding means further comprising:

first means for determining the number of said incoming emergency calls in said queuing means at said selected answering point at the time a given one of said incoming emergency calls is to be routed;

second means for determining that the call capacity limit number for said selected answering point minus said number of incoming emergency calls in said queuing means of said selected answering point is zero or less than zero; and means responsive to said second determining means for preventing said adding means from adding said given one of said incoming emergency calls to said queuing means of said selected answering point.

8. A system for routing emergency calls to a selected answering point having a plurality of call answering workstations; said system having a notification line for said answering point and means for placing said emergency calls in a queue to said notification line; said answering point having means for handling said emergency calls routed to said workstations, comprising:

means for limiting the number of said emergency calls that are simultaneously being handled by said answering point and in said queue, said limiting means setting a call capacity limit number; and means effective at a current time for adding to said queue another one of said emergency calls to be routed, said adding occurring only if the number of said emergency calls being handled by said answering point and in said queue has at said current time not reached said call capacity limit number.

9. A system for routing emergency calls to a selected answering point according to claim 8, said adding means further comprising:

first means for determining the number of said emergency calls being handled by said answering point at said current time;

second means for determining that said call capacity limit number minus said number of said emergency calls being handled at said current time exceeds zero; and means responsive to said second determining means for permitting another of said emergency calls to be routed to said selected answering point at said current time.

10. A system for routing emergency calls according to claim 9, further comprising:

said means for adding being effective to add only after determining that said answering point is active and has said handling means in operation.

11. A system according to claim 10, further comprising:

said means for adding being ineffective to permit another of said emergency calls to be routed to said selected answering point regardless of the result of operation of said second determining means if said handling means is not in operation.

12. A system for routing emergency calls according to claim 8, wherein each of said workstations of said answering point may be active or inactive at said current time, said means for limiting further comprising:

first means for determining the number of said workstations which are active at said current time at which a given one of said emergency calls is to be routed;

second means for setting a maximum level of emergency calls which at said current time may be handled by said answering point per each one of said active workstation; and third means for obtaining the product of said number of active workstations and said maximum level.

13. A system according to claim 11, further comprising:

means for rendering said placing means inoperative.

14. A system according to claim 12, further comprising:

said answering point having means responsive to said emergency calls for ringing said notification line and for ringing said workstations, means for placing said emergency calls on hold, and means for answering said emergency calls; and said emergency calls being handled at said current time by said answering point per active workstation including the number of said emergency calls causing said ringing means to function and the number of said emergency calls being answered by said answering means and the number of said emergency calls being on hold.

15. A system for routing emergency calls to an answering point or to a second destination; said answering point having a notification line, means for placing in a queue said emergency calls to be routed to said notification line, and call answer terminals which may be active or inactive at a current time at which one of said emergency calls is to be routed, comprising:

first means for determining the number of said terminals that are active at the current time;

second means for setting a call capacity depth as a function of said number of active terminals at any current time;

third means for multiplying said call capacity depth times said number of active terminals to obtain an answering point call capacity limit representing the maximum number of said emergency calls which may be in process of being handled by said answering point at any one of said current times;

fourth means for determining the current number of said emergency calls which are in process of being handled by said answering point at said one current time;

fifth means for determining whether said call capacity limit exceeds, equals or is less than said current number of said emergency calls; and sixth means for routing one of said emergency calls at said current time to said answering point if said fifth determining means determines that said call capacity limit exceeds said current number, and for routing said one call at said current time to said second destination if said call capacity limit is less than or equal to said current number of calls.

16. A system according to claim 15, said system further comprising:

means responsive to said emergency calls for ringing said notification line and said call answer terminals;

means for placing one of said emergency calls on hold at each of said terminals; and said fourth means being effective at said one current time to obtain the sum of said emergency calls causing said ringing means to operate, of said calls placed on hold, of said calls in said queue and of all of said calls being answered by said active terminals; and said queuing limit also being based on the number of said emergency calls which are on hold at said answering point at said current time.

17. A system according to claim 15, said second means further comprising:

said call capacity limit also being based on the number of said emergency calls which are on hold and which are connected to said answering point at said current time.

18. A system for routing emergency calls to one or the other of first and second types of destinations, comprising:

first means for determining whether said first type of destination is available to handle a given on of said emergency calls; and second means rendered effective upon said determining means not identifying said first type of destination as being available to handle said given call for determining whether said second type of designation is available to answer said given call.

19. A system according to claim 18, wherein said first type of destination has a plurality of separate destinations therein, further comprising:

said first determining means being effective to sequentially search said destinations of said first type in an attempt to identify one of said destinations to which no prior attempt has been made to route one of said emergency calls thereof;

upon identifying one of said destinations, said first means then determining whether said one destination is available to handle said emergency call; and said second means being effective, upon said first determining means determining that there is no destination of said first type to which no attempt has been made to route one of said emergency calls.

20. A system according to claim 19, wherein said destinations of said first type of destination are public safety answering points, further comprising:

means for queuing said emergency calls that are routed to any of said public safety answering point destinations, said queuing means being administered for limiting the number of said emergency calls which are routed to a given public safety answering point and in process of being handled by said given answering point, or said queuing means not being administered for allowing the routing to said public safety answering point of unlimited numbers of said emergency calls; said public safety answering point destinations being an active state or being busy;

third means effective, upon said first determining means identifying one of said destinations to which no attempt had been made to route said emergency call thereto, for determining whether said one destination is in said active state;

fourth means effective in the event that said one destination is in said active state for determining whether said one destination has said emergency call queuing means administered for operation; and means effective if said emergency call queuing means has not been administered for routing said emergency call to said one destination.

21. A system according to claim 20, further comprising:

said queuing means being provided for each said destination of said first type, said queuing means having a queue for said emergency calls routed to it, and having a call capacity limit which restricts the number of said emergency calls which may be routed to said given public safety answering point and in process of being handled by said given answering point;

sixth means effective if said queuing means is administered, for determining whether the number of said emergency calls in process of being handled at said one destination is less than said call capacity limit thereof; and means for routing said emergency call to said one destination if said number is less than said call capacity limit.

22. A system according to claim 21, further comprising:

said first determining means being effective in response to said one public safety answering point being at said call capacity limit for continuing said sequential search of said destinations of said first type; and said second determining means being effective if no attempt had been made to route said emergency calls.

23. A system for routing emergency calls to a selected one of many destinations at which said emergency calls are to be answered, wherein there is at least one preferred type of destination and more than one destination of that type, wherein there is at least one second type of destination and more than one destination of that second type, comprising:

first means for determining whether any of said destinations of said first type of destination is available at a current time to handle a given one of said emergency calls, said first determining means not necessarily making said determination as to all of the destinations of said preferred type such that at said current time there may be unchecked destinations of said preferred type;

second means rendered effective upon said determining means not identifying any destination of said preferred type of destination as being available to handle said given emergency call for linearly searching said destinations of said first type to identify one or more of said unchecked destinations;

for each said unchecked destination of said preferred type as may exist, third means effective for determining whether said unchecked destination is available to handle said given emergency call;

said second means searching to identify another unchecked destination if said unchecked destination is not available to handle said given emergency call; and fourth means responsive to said second means not identifying any of said destinations of said preferred type as being available to handle said given emergency call for causing said second searching means to repeat said linear searching with respect to said destinations of said second type, said repeated linear searching determining whether there was any prior attempt made to route said given emergency call to any of said destination of said second type.

24. A system according to claim 23, further comprising:

means effective upon said second searching means repeating said linear searching and not identifying any of said second type of destinations to which not attempt had been made to route said emergency calls, for routing said emergency calls to busy.

25. A system according to claim 23, further comprising:

each said destination of said first type having a queue which may be administered to limit the number of said emergency calls routed thereto and which when not administered does not limit the number of said emergency calls routed to it;

fourth means effective, in response to said second means identifying a given unchecked one of said first type of destinations to which no attempt was made to route said given emergency call, for determining whether said given destination is active;

fifth means for determining whether said given destination has the queue thereof administered; and means effective to route said given emergency call to said given destination which did not have the queue thereof administered.

26. A system according to claim 25, further comprising:

said given destination having a call capacity limit of emergency calls routed to it and in process of being handled;

sixth means effective if said queue is administered, for determining whether the aggregate number of said emergency calls routed to and still in process of being handled at said given destination at said current time is less than said call capacity limit of said given destination.

27. A system according to claim 26, further comprising:

said sixth means comprising:

seventh means for determining the number of said emergency calls in process of being handled at said given destination at said current time;

eighth means for determining that said call capacity limit for said given destination minus said number of said emergency calls exceeds zero; and ninth means responsive to said eighth determining means for permitting another of said emergency calls to be routed to said given destination.

28. A system according to claim 26, further comprising:

each of said destinations of said first type of having plurality of workstations each of which may be active or inactive; and limit means for setting said call capacity limit of emergency calls comprising:

first workstation means for determining the number of said workstations which are active at the time a given one of said emergency calls is to be routed:

second capacity means for setting a maximum call capacity depth of said emergency calls which may be routed to a selected one of said destinations of said first type; and third product means for obtaining a call capacity limit represented by the product of said number of active workstations and said maximum call capacity depth.

29. A system according to claim 26, further comprising:

means effective if said aggregate number of said emergency calls equals or is greater than said call capacity limit for a given destination for causing said second determining means to repeat said linear searching again in an endeavor to identify and additional unchecked destination of said first type.

30. A system for routing emergency calls to one of many destinations at which the emergency calls are handled, wherein public safety answering points are a preferred type of destination, wherein switch directory numbers are a second type of destination and public switched telephone network directory numbers are a third type of destination, comprising:

first means for determining whether there is any said public safety answering point to which no attempt was made to route a given one of said emergency calls, said first determining means not necessarily making said determination as to all of said public safety answering points such that there may be unattempted public safety answering points to which not attempt was made to route said given emergency call;

second means rendered effective upon said first determining means not identifying one of said unattempted public safety answering points for sequentially searching all of said public safety answering points, said searching including all of said unattempted public safety answering points as may exist and determining whether any of said public safety answering points was unattempted;

third means responsive to said searching means not identifying any of said public safety answering points as being unattempted for repeating said sequential searching with respect to said switch directory numbers, said repeated sequential search determining whether there is any said switch directory number to which no attempt was made to route said given emergency call; and fourth means responsive to said third means not identifying any of said switch directory numbers as being unattempted for repeating said sequential searching with respect to said public switched telephone network directory numbers, said last-mentioned repeated searching determining whether there is a public switched telephone network directory number to which no attempt was made to route said given emergency call.

31. A system for routing emergency calls according to claim 30, wherein said second means identifies one of said unattempted public safety answering points, said unattempted public safety answering point having possible active and inactive states, and said unattempted public safety answering point having means for queuing emergency calls routed to it, said queuing means being administrable to render said queuing means effective or not effective to limit the number of said emergency calls which are routed to it and which are in process of being handled at a current time at which said given one of said emergency calls is to be routed, said limit being a call capacity limit number, further comprising:

state check means for determining whether said unattempted public safety answering point is in said active or said inactive state at said current time;

administration check means for determining whether said active public safety answering point has said queuing means administered; and redirect means responsive to said administration check means determining that said queuing means of said active public safety answering point is not administered for redirecting said given emergency call to said active public safety answering point.

32. A system according to claim 31, wherein said administration check means determines that said queuing means is administered, further comprising;

call capacity means effective when said queuing means is administered, said call capacity means being for determining if the number of said emergency calls routed to said unattempted public safety answering point and currently in process of being handled is less than said call capacity limit number; and means effective when said call capacity means makes a true determination for redirecting said given emergency call to said unattempted public safety answering point.

33. A system according to claim 32, wherein said if determination by said call capacity means may be false, further comprising:

means effective in response to said if determination being false for causing said second means to continue said sequential searching to identify another unattempted public safety answering point.

34. A system according to claim 32, further comprising:

means for recording attempts to route said given emergency call to any of said destination; and said redirecting means further comprising:

update means for noting in said recording means the attempt to route said given emergency call to said unattempted destination; and means for printing a message in a log file that said given emergency call is to be redirected to said unchecked destination.

35. A system for routing an emergency call according to claim 30, further comprising:

said second means identifying one of said unattempted public safety answering points, said unattempted public safety answering point having a possible active state and possible night service and abandoned inactive states, and said unattempted public safety answering point having means for queuing emergency calls routed to it, said queuing means being administrable to render said queuing means effective or not effective to limit the number of said emergency calls routed to it and which are in process of being handled at a current time at which said given one of said emergency calls is to be routed, said limit being a call capacity limit number, further comprising:

state check means for determining whether said unattempted public safety answering point is in said active or one of said inactive states at said current time;

administration check means for determining whether said active public safety answering point has said queuing means administered; and redirect means responsive to said administration check means determining that said queuing means is administered for determining if the number of said emergency calls routed to said one unattempted public safety answering point and currently in process of being handled is less than said call capacity limit number.

36. A system according to claim 35, further comprising:

means responsive to said if determination of said redirect means being true for routing said given call to said one public safety answering point.

37. A system according to claim 36, wherein said if determination by said redirect means may be false, further comprising:

means effective in response to said if determination being false for causing said second means to continue said sequential searching in an attempt to identify another unattempted public safety answering point.

38. In a system for routing an emergency call to one of many possible destinations; said possible destinations being in a preferred priority and including at least one public safety answering point, an alternate destination for said public safety answering point in the form of a routing switch directory number, or a third destination in the form of a public switching telephone network directory number; said system comprising means for routing said emergency call and means for sending commands to control said routing means; the improvement in said sending means comprising:

last chance means for searching said destinations in a selected order in an attempt to identify one of said destinations that is available to handle said emergency call, said last chance means being effective after said routing means has failed to route said emergency call to one said destination that is first in said priority;

first means responsive to said routing means failing to route said emergency call in response to one of said commands for determining if said routing means was attempting to route said emergency call to one of said public safety answering points; and second means effective whether or not said routing means was attempting to route said emergency call to one of said public safety answering points for determining if said last chance means was being used by said routing means to route said call.

39. In the system of claim 38, the further improvement comprising:

third means effective if said last chance means was being used for causing said last chance means to attempt to route said emergency call to one of said possible destinations which had not previously been inspected.

40. In a system according to claim 38, the improvement further comprising:

third means effective if said last chance means was not being used, for determining whether said alternate destination, is available to handle said emergency call.

41. In a system according to claim 40, wherein said emergency call may be received by said system on one of a plurality of incoming trunks, the improvement further comprising:

selective routing means for causing said routing means to route said emergency call to a destination according to the telephone number of said emergency call;

default routing means for causing said routing means to route said emergency call to a destination according to which of said trunks carried said emergency call to said system;

fourth means effective if said alternate destination is not available to handle said emergency call for determining if said selective routing means was not used to select the destination to which said routing means failed to route said emergency call, or if said default routing means was used, that said default routing means had not selected another destination to which said emergency call is to be routed; and fifth means responsive to a yes determination made by said fourth means for causing said last chance means to search said destinations.

42. In a system for routing said emergency call to one of said many destinations according to claim 41, wherein said destinations of said preferred priority including more than one destination of that type, and wherein said alternate and third destinations each include more than one destination of that alternate and third types, said sensing means being effective to determine whether any of said destinations of said preferred priority is available to handle said emergency call, said sending means not necessarily making said determination as to all of the destinations of said preferred priority such that there may be unchecked destinations of said preferred priority, said improvement further comprising:

said last chance means being rendered effective by said fourth means for linearly searching said destinations of said first priority to identify one or more of said unchecked destinations;

for each said unchecked destination of said preferred priority as may exist, said third means being effective for determining whether said unchecked destination is available to handle said emergency call;

said last chance means searching to identify another unchecked destination if said unchecked destination is not available to handle said emergency call;

means responsive to said last chance means not identifying any of said destinations of said preferred priority as being available to handle said emergency call for causing said last chance means to repeat said linear searching with respect to said destinations of said alternate type, said repeated linear searching determining whether there was any destination of said alternate type of destination to which not attempt was made to route said emergency call.

43. In a system according to claim 42, the improvement further comprising:

means effective upon said last chance means repeating said linear searching said not identifying any of said alternate type of destination to which no attempt had been made to route said emergency calls, for causing said last chance means to repeat said linear searching with respect to said third destinations.

44. In a system according to claim 42, the improvement further comprising:

each said destination of said preferred priority having a queue which may be administered to limit the number of said emergency calls routed thereto and which when not administered does not limit the number of said emergency calls routed to it;

sixth means effective in response to said last chance means identifying a given one of said preferred priority of destinations to which no attempt was made to route said emergency call, for determining whether said given destination is active;

seventh means for determining whether said given destination has the queue thereof administered; and eighth means effective to route said emergency call to said given destination which did not have the queue thereof administered.

45. In a system according to claim 44, the improvement further comprising:

said given destination having a call capacity limit of emergency calls routed to it and still in process of being handled at a current time;

ninth means effective if said queue is administered, for determining whether the aggregate number of said emergency calls routed to and still in process of being handled at said given destination at said current time is less than said call capacity limit of said unchecked destination.

46. In a system according to claim 45, the improvement further comprising:

said ninth means comprising:

tenth means for determining the number of said emergency calls in process of being handled at said given destination at said current time;

eleventh means for determining that said call capacity limit for said given destination minus said number of said emergency calls exceeds zero; and twelfth means responsive to said eleventh determining means for permitting another of said emergency calls to be routed to said given destination.

* * * * *